US012577952B2

(12) United States Patent
Maishigi et al.

(10) Patent No.: US 12,577,952 B2
(45) Date of Patent: Mar. 17, 2026

(54) INFORMATION PROCESSING APPARATUS, INFORMATION PROCESSING SYSTEM, INFORMATION PROCESSING METHOD, PROGRAM, SUBSTRATE PROCESSING APPARATUS, CRITERION DATA DETERMINATION APPARATUS, AND CRITERION DATA DETERMINATION METHOD

(71) Applicant: EBARA CORPORATION, Tokyo (JP)

(72) Inventors: Keiji Maishigi, Tokyo (JP); Tetsuro Sugiura, Tokyo (JP); Katsuaki Usui, Tokyo (JP); Masahiro Hatakeyama, Tokyo (JP); Chikako Honma, Tokyo (JP); Toru Osuga, Tokyo (JP); Koichi Iwasaki, Tokyo (JP); Jie Yuan Lin, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 0 days.

(21) Appl. No.: 18/508,671

(22) Filed: Nov. 14, 2023

(65) Prior Publication Data

US 2024/0077079 A1     Mar. 7, 2024

Related U.S. Application Data

(63) Continuation of application No. 16/467,472, filed as application No. PCT/JP2018/009681 on Mar. 13, 2018, now Pat. No. 11,946,470.

(30) Foreign Application Priority Data

Mar. 17, 2017   (JP) ................................. 2017-052189
May 18, 2017   (JP) ................................. 2017-098691

(Continued)

(51) Int. Cl.
    *F04C 28/28*        (2006.01)
    *F04D 27/00*        (2006.01)
    (Continued)

(52) U.S. Cl.
    CPC ............ *F04C 28/28* (2013.01); *F04D 27/001* (2013.01); *G06F 9/542* (2013.01); *G06F 17/18* (2013.01)

(58) Field of Classification Search
    None
    See application file for complete search history.

(56) References Cited

U.S. PATENT DOCUMENTS

2003/0034885 A1    2/2003   Catton et al.
2003/0158705 A1    8/2003   Ishii et al.
                (Continued)

FOREIGN PATENT DOCUMENTS

CN        1419045 A      5/2003
CN        1804114 A      7/2006
                (Continued)

OTHER PUBLICATIONS

International Patent Application No. PCT/JP2018/009681; Int'l Search Report; dated Jun. 19, 2018; 5 pages.
                (Continued)

*Primary Examiner* — Matthew G Marini
(74) *Attorney, Agent, or Firm* — BakerHostetler

(57) ABSTRACT

An information processing apparatus detecting presence or absence of abnormality of a vacuum pump derived from a product produced within a target vacuum pump, including: a determination unit configured to determine a normal variation range or a normal time variation behavior of a target state quantity which is a state quantity varying depending on a load of gas flowing into the vacuum pump, based on at least one of past target state quantities of the (Continued)

target vacuum pump or another vacuum pump; and a comparison unit configured to compare a current target state quantity of the target vacuum pump with the normal variation range or the normal time variation behavior and output the comparison result.

9 Claims, 93 Drawing Sheets

(30) Foreign Application Priority Data

| | | |
|---|---|---|
| May 18, 2017 | (JP) ................................ | 2017-098899 |
| Sep. 15, 2017 | (JP) ................................ | 2017-177611 |
| Feb. 2, 2018 | (JP) ................................ | 2018-016875 |

(51) Int. Cl.
  *G06F 9/54*     (2006.01)
  *G06F 17/18*     (2006.01)

(56) References Cited

U.S. PATENT DOCUMENTS

| | | | |
|---|---|---|---|
| 2004/0064212 A1* | 4/2004 | Samata ................... | F04C 28/28 |
| | | | 702/183 |
| 2004/0138773 A1 | 7/2004 | Tomoyasu | |
| 2006/0042544 A1 | 3/2006 | Hasebe et al. | |
| 2008/0010030 A1 | 1/2008 | Cheung et al. | |
| 2008/0109185 A1 | 5/2008 | Cheung et al. | |
| 2009/0035151 A1* | 2/2009 | Sugiura ................... | F04C 25/02 |
| | | | 700/282 |
| 2012/0041663 A1 | 2/2012 | Suzuki et al. | |
| 2012/0209569 A1* | 8/2012 | Becourt ................. | F04D 19/04 |
| | | | 702/183 |
| 2013/0211785 A1 | 8/2013 | Bonissone et al. | |
| 2014/0271106 A1 | 9/2014 | Alessandro et al. | |
| 2014/0344624 A1 | 11/2014 | Nishikawa et al. | |
| 2016/0128203 A1 | 5/2016 | Lim | |
| 2018/0286705 A1 | 10/2018 | Barros et al. | |

FOREIGN PATENT DOCUMENTS

| | | | |
|---|---|---|---|
| CN | 101080700 A | 11/2007 |
| CN | 101095214 A | 12/2007 |
| CN | 101111680 A | 1/2008 |
| CN | 101560906 A | 10/2009 |
| CN | 102326065 A | 1/2012 |
| CN | 102459914 A | 5/2012 |
| EP | 2843237 A1 | 3/2015 |
| EP | 3104005 A1 | 12/2016 |
| JP | H11-062846 A | 3/1999 |
| JP | 2003-263475 A | 9/2003 |
| JP | 2004-150340 A | 5/2004 |
| JP | 2005-009337 A | 1/2005 |
| JP | 2006-161677 A | 6/2006 |
| JP | 2008-524492 A | 7/2008 |
| JP | 2008-524493 A | 7/2008 |
| JP | 2008-534831 A | 8/2008 |
| JP | 2009-024577 A | 2/2009 |
| JP | 4266802 B2 | 5/2009 |
| JP | 2011-112041 A | 6/2011 |
| JP | 2011-202516 A | 10/2011 |
| JP | 2012-064881 A | 3/2012 |
| JP | 2013-515187 A | 5/2013 |
| JP | 2014-177936 A | 9/2014 |
| JP | 2014-228887 A | 12/2014 |
| JP | 2015-212594 A | 11/2015 |
| JP | 2017-003465 A | 1/2017 |
| KR | 100793244 B1 | 1/2008 |
| WO | WO 2006/064990 A1 | 6/2006 |
| WO | WO 2006/064991 A1 | 6/2006 |
| WO | WO 2006/109861 A1 | 10/2006 |
| WO | WO 2010/149738 A1 | 12/2010 |

OTHER PUBLICATIONS

China Patent Application No. 201880004933.4; Office Action; dated Mar. 24, 2020; 57 pages.

Japan Patent Application No. 2018-016875; Notice of Reasons for Refusal; dated May 26, 2020; 17 pages.

European Patent Application No. 18766870.2; Extended Search Report; dated Dec. 8, 2020; 14 pages.

Ma et al.; "Analysis and Diagnosis of Abnormal Vibration of Water-Ring Vacuum Pump in Thermal Power Plant"; China Academic Journal Electronic Publishing House—Equipment Management and Maintenance; vol. S2; Aug. 2016; p. 15-17.

* cited by examiner

Figure 12:
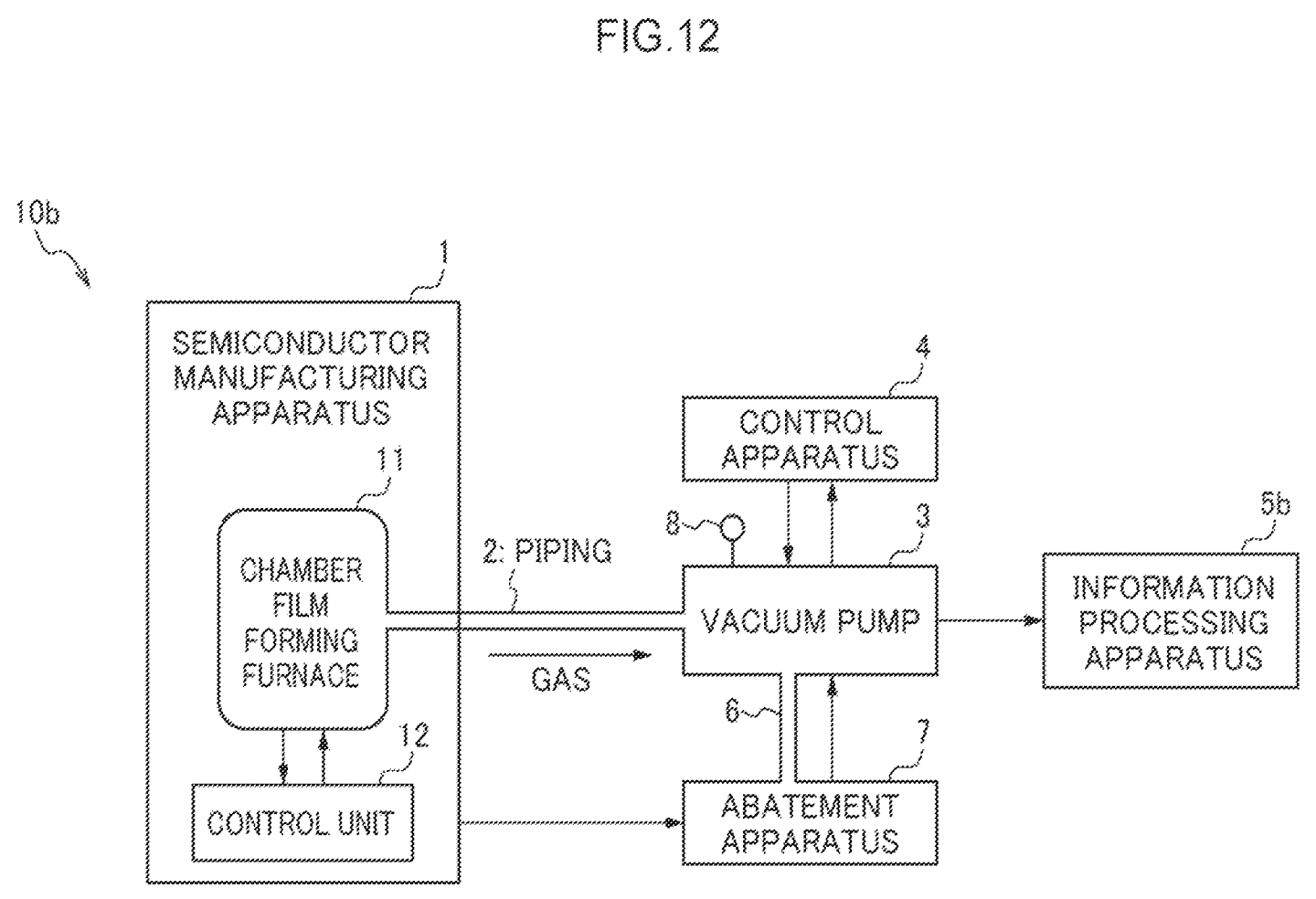

SEMICONDUCTOR MANUFACTURING APPARATUS 1

CHAMBER FILM FORMING FURNACE 11

CONTROL UNIT 12

2: PIPING

GAS

CONTROL APPARATUS 4

VACUUM PUMP 3

8

6

7 ABATEMENT APPARATUS

INFORMATION PROCESSING APPARATUS 5b

10b

OPERATION TIME

ACCUMULATED VALUE OF ABNORMALITY OCCURRENCE FREQUENCY

FIG.23

| ACCUMULATED VALUE OF ABNORMALITY OCCURRENCE FREQUENCY IN PROCESS 1 | FAILURE INDEX (FAILURE PROBABILITY) [%] |
|---|---|
| 0.5~1 | 10 |
| 1~1.5 | 20 |
| ⋮ | ⋮ |

FIG.25

| ACCUMULATED VALUE OF NUMBER OF TIMES OF ABNORMALITY OCCURRENCE IN PROCESS 1 | FAILURE INDEX (FAILURE PROBABILITY) [%] |
|---|---|
| 5~10 | 10 |
| 10~15 | 20 |
| ⋮ | ⋮ |

FIG.26

| CHANGE RATE OF ABNORMALITY OCCURRENCE FREQUENCY IN PROCESS 1 | FAILURE INDEX (FAILURE PROBABILITY) [%] |
|---|---|
| 0.1～0.2 | 10 |
| 0.2～0.3 | 20 |
| ⋮ | ⋮ |

FIG.27

| CHANGE START TIMING [MONTH] | CHANGE RATE OF ACCUMULATED VALUE OF ABNORMALITY OCCURRENCE FREQUENCY IN PROCESS 1 [FREQUENCY/DAY] | FAILURE INDEX (FAILURE PROBABILITY) [%] |
|---|---|---|
| 1~2 | 0.1~0.2 | 10 |
| 2~3 | 0.2~0.3 | 20 |
| ⋮ | ⋮ | ⋮ |

FIG.28

| INTEGRAL VALUE OF CURVE OF ACCUMULATED VALUE OF ABNORMALITY OCCURRENCE FREQUENCY IN PROCESS 1 | FAILURE INDEX (FAILURE PROBABILITY) [%] |
|---|---|
| 1~2 | 10 |
| 2~3 | 20 |
| ⋮ | ⋮ |

ACCUMULATED VALUE OF ABNORMALITY
OCCURRENCE FREQUENCY IN ALL PROCESSES

FIG.31

| ACCUMULATED VALUE OF ABNORMALITY OCCURRENCE FREQUENCY IN ALL PROCESSES | FAILURE INDEX (FAILURE PROBABILITY) [%] |
|---|---|
| 0.5~1 | 10 |
| 1~1.5 | 20 |
| ⋮ | ⋮ |

FIG.34

| ACCUMULATED VALUE OF ABNORMALITY OCCURRENCE FREQUENCY IN PROCESS I | OPERATION CONTINUATION INDEX (OPERATION CONTINUATION PROBABILITY) [%] |
|---|---|
| 0.5～1 | 90 |
| 1～1.5 | 80 |
| ⋮ | ⋮ |

FIG.37

| ACCUMULATED VALUE OF ABNORMALITY OCCURRENCE FREQUENCY IN ALL PROCESSES | OPERATION CONTINUATION INDEX (OPERATION CONTINUATION PROBABILITY) [%] |
|---|---|
| 5~10 | 90 |
| 10~15 | 80 |
| ⋮ | ⋮ |

FIG.41

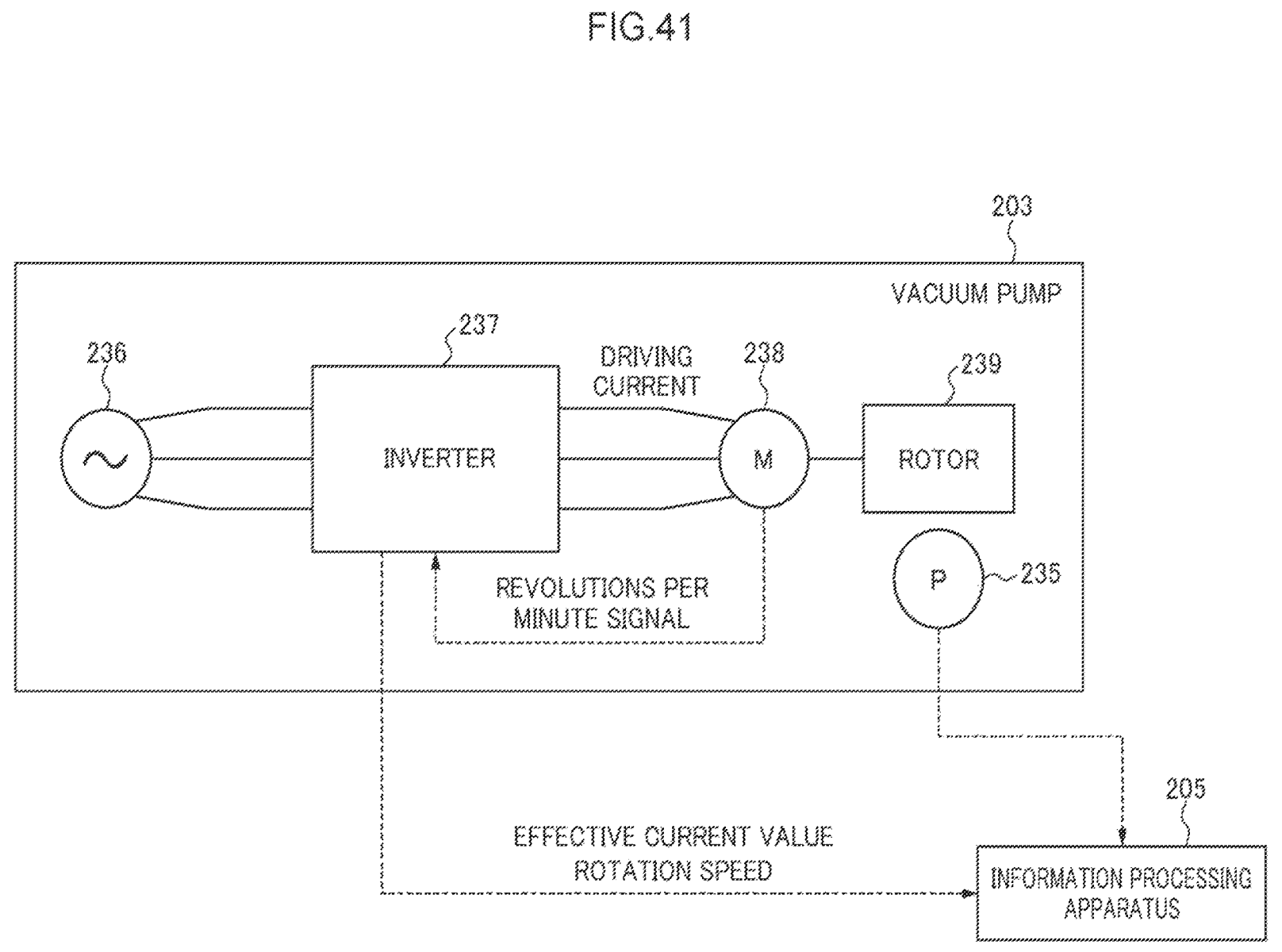

VACUUM PUMP 203

INVERTER 237

M 238

ROTOR 239

P 235

DRIVING CURRENT

REVOLUTIONS PER MINUTE SIGNAL

236

EFFECTIVE CURRENT VALUE
ROTATION SPEED

INFORMATION PROCESSING APPARATUS 205

| ATTRIBUTE OF VACUUM PUMP | CRITERION DATA |
|---|---|
| A | Tdata1 |
| B | Tdata2 |
| ⋮ | ⋮ |

| ATTRIBUTE OF VACUUM PUMP | FILE NAME OF ABNORMALITY DATA |
|---|---|
| A | data1 |
| B | data2 |
| ⋮ | ⋮ |

| ATTRIBUTE OF VACUUM PUMP | CRITERION DATA |
|---|---|
| A | Tdata1 |
| B | Tdata2 |
| ⋮ | ⋮ |

| ATTRIBUTE OF VACUUM PUMP | FILE NAME OF ABNORMALITY DATA |
|---|---|
| A | data1 |
| B | data2 |
| ⋮ | ⋮ |

| VACUUM PUMP IDENTIFICATION INFORMATION | PROCESS IDENTIFICATION INFORMATION | SEMICONDUCTOR MANUFACTURING APPARATUS IDENTIFICATION INFORMATION | MANUFACTURING NUMBER | DATA OF STATE QUANTITY |
|---|---|---|---|---|
| 00001 | 1 | 11 | EV~s100 | Data1 |
| 00002 | 2 | 12 | EV~s200 | Data2 |
| ⋮ | ⋮ | ⋮ | ⋮ | ⋮ |

Figure 82:
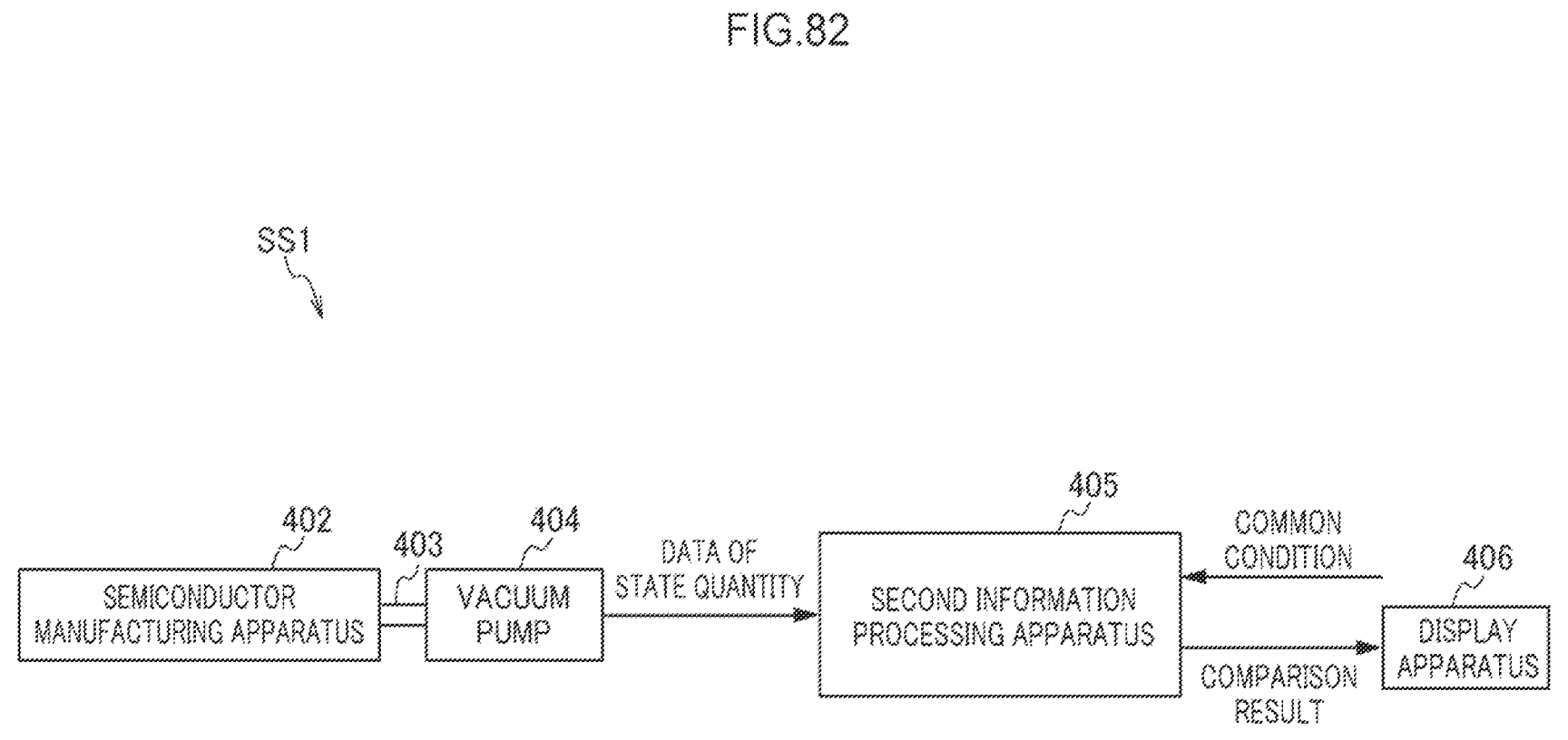

SEMICONDUCTOR MANUFACTURING APPARATUS
402

403

VACUUM PUMP
404

DATA OF STATE QUANTITY

SECOND INFORMATION PROCESSING APPARATUS
405

COMMON CONDITION

COMPARISON RESULT

DISPLAY APPARATUS
406

| PROCESS IDENTIFICATION INFORMATION | COMMON CONDITION |
|---|---|
| 1 | Cdata1 |
| 2 | Cdata2 |
| ⋮ | ⋮ |

T43

| SEMICONDUCTOR MANUFACTURING APPARATUS IDENTIFICATION INFORMATION | COMMON CONDITION |
|---|---|
| 11 | Cdata11 |
| 12 | Cdata12 |
| ⋮ | ⋮ |

T44

| MANUFACTURING NUMBER | COMMON CONDITION |
|---|---|
| EV-s100 | Cdata100 |
| EV-s200 | Cdata200 |
| ⋮ | ⋮ |

INFORMATION PROCESSING APPARATUS, INFORMATION PROCESSING SYSTEM, INFORMATION PROCESSING METHOD, PROGRAM, SUBSTRATE PROCESSING APPARATUS, CRITERION DATA DETERMINATION APPARATUS, AND CRITERION DATA DETERMINATION METHOD

CROSS-REFERENCE TO RELATED APPLICATION

This application is a continuation of U.S. patent application Ser. No. 16/467,472 filed on Jun. 6, 2019, which is the U.S. National Phase Application of International Patent Application PCT No. PCT/JP2018/009681 filed on Mar. 13, 2018, which claims the benefit of Japanese Patent Application No. 2017-52189 filed on Mar. 17, 2017, Japanese Patent Application No. 2017-98691 filed on May 18, 2017, Japanese Patent Application No. 2017-98899 filed on May 18, 2017, Japanese Patent Application No. 2017-177611 filed on Sep. 15, 2017, and Japanese Patent Application No. 2018-16875 filed on Feb. 2, 2018, the contents of which are incorporated herein by reference.

TECHNICAL FIELD

The present technique relates to an information processing apparatus, an information processing system, an information processing method, a program, a substrate processing apparatus, a criterion data determination apparatus, and a criterion data determination method.

BACKGROUND ART

In a semiconductor manufacturing apparatus, a vacuum pump that exhausts a gas used in a semiconductor manufacturing process from an inside of a chamber is in widespread use for the purpose of creating a vacuum environment in the chamber. As such a vacuum pump, a displacement type vacuum pump having a roots type or screw type pump rotor is known.

Generally, the displacement type vacuum pump includes a pair of pump rotors disposed in a casing, and a motor for rotationally driving the pump rotors. A minute clearance is formed between the pair of pump rotors and between the pump rotor and an inner surface of the casing, and the pump rotor is configured to rotate while being in non-contact with the casing. As the pair of pump rotors rotates in an opposite direction to each other while synchronizing, the gas in the casing is transferred from a suction side to a discharge side and is exhausted from the chamber or the like connected to a suction port.

Gas used in the semiconductor manufacturing process or a substance generated by a chemical reaction of the gas used contains components which are solidified or liquefied as temperature drops. Normally, since the vacuum pump described above generates compression heat during the transfer of the gas, the temperature of the operating vacuum pump rises to some extent. In the case where the temperature of the vacuum pump rising by the compression heat is not higher than the solidification or liquefaction temperature of the components or products in the gas, the temperature of the vacuum pump is maintained by heating a pump main body from the outside or heating an inflowing gas. Even when the gas containing the above-described components is exhausted by using the vacuum pump, good evacuation is performed without solidifying or liquefying the components or products in the gas.

However, there is a semiconductor manufacturing process that cannot prevent the liquefaction and solidification of the gas used or the products from the gas used in increasing the temperature of the vacuum pump as described above. When the operation of the vacuum pump is continued in this process, the solidified products (reaction products) are deposited in a clearance between the pump rotors and a clearance between the pump rotor and the casing. As the products are deposited, an excessive load is applied to the vacuum pump during the operation of the vacuum pump, such that the vacuum pump stops during the manufacturing process and articles are severely damaged during the manufacturing process.

On the other hand, Patent Literature 1 discloses a fault diagnosis apparatus of a vacuum pump which compares a state change amount measured when a rotation speed of the rotor of the vacuum pump is changed with the state change amount in a normal state and determines that abnormality occurs when the measured state change amount is larger or smaller than the state change amount in the normal state by a predetermined amount to predict factors due to the stop of the pump in advance, thereby preventing a damage to a semiconductor wafer or the like due to the sudden stop of the vacuum pump.

In the technique of Patent Literature 1, for example, the state change amount from the stop until the pump reaches a rated rotation at the time of starting of the pump is measured so as to predict the factors of stopping the pump in advance. Therefore, it is not only necessary to increase the rotation speed of the pump to the rated rotation speed at the starting of the pump, but also it is not possible to predict the factors of stopping the pump until the rotation speed of the pump is increased to the rated rotation speed.

On the other hand, Patent Literature 2 discloses detecting a situation in which products are deposited in a casing of a vacuum pump at the time of starting of the vacuum pump and outputting a maintenance signal which evokes maintenance of the vacuum pump to a user in accordance with this situation so as to prevent the vacuum pump from stopping during the manufacturing process.

CITATION LIST

Patent Literature

Patent Literature 1: JP 2005-9337 A
Patent Literature 2: JP 2011-202516 A
Patent Literature 3: JP 2008-534831 A
Patent Literature 4: JP 11-62846 A

SUMMARY OF INVENTION

Technical Problem

An information processing apparatus of an embodiment, the information processing apparatus detecting presence or absence of abnormality of a vacuum pump derived from a product produced within a target vacuum pump, comprises: a determination unit configured to determine a normal variation range or a normal time variation behavior of a target state quantity which is a state quantity varying depending on a load of gas flowing into the vacuum pump, based on at least one of past target state quantities of the target vacuum pump or another vacuum pump; and a comparison unit configured to compare a current target state quantity of the target vacuum pump with the normal variation range or the normal time variation behavior and output the comparison result.

BRIEF DESCRIPTION OF DRAWINGS

FIG. 1 is a schematic diagram showing an example from a normal state to a failure.

FIG. 2 is a schematic diagram showing an example of a time transition from the normal state to the failure.

FIG. 3 is a schematic configuration diagram of a semiconductor manufacturing system 10 according to the present embodiment.

FIG. 5 is a schematic functional configuration diagram of the vacuum pump 3 according to the present embodiment.

FIG. 12 is a schematic configuration diagram of a semiconductor manufacturing system 10b according to a second embodiment.

FIG. 23 is a diagram showing an example of a table showing a correspondence relationship between a range of the accumulated value of the abnormality occurrence frequency in process 1 and a failure index corresponding to the range.

FIG. 25 is a diagram showing an example of a table showing the correspondence relationship between the range of the accumulated value of the number of times of abnormality occurrence in process 1 and the failure index corresponding to the range.

FIG. 26 is a diagram showing an example of a table showing a correspondence relationship between a change rate of the accumulated value of the abnormality occurrence frequency in process 1 and the failure index corresponding to the range.

FIG. 27 is a diagram showing an example of a table showing a correspondence relationship between a set of a range of a change start timing of the accumulated value of the abnormality occurrence frequency and a range of a change value of the accumulated value of the abnormality occurrence frequency and the failure index corresponding to the set.

FIG. 28 is a diagram showing an example of a table showing a correspondence relationship between a range of an integrated value of a curve of the accumulated value of the abnormality occurrence frequency in process 1 and the failure index corresponding to the range.

FIG. 31 is a diagram showing an example of a table showing the correspondence relationship between a range of the accumulated value of the abnormality occurrence frequency in all processes and the failure index corresponding to the range.

FIG. 34 is a diagram showing an example of a table showing a correspondence relationship between a range of the accumulated value of the abnormality occurrence frequency in process 1 and an operation continuation index corresponding to the range.

FIG. 37 is a diagram showing an example of a table showing the correspondence relationship between a range of the accumulated value of the abnormality occurrence frequency in all processes and the operation continuation index corresponding to the range.

FIG. 41 is a schematic functional configuration diagram of a vacuum pump 203 according to the third embodiment.

FIG. 43 is a diagram showing an example of a table T1 stored in a storage unit 253.

FIG. 46 is a diagram showing an example of a table T2 stored in a storage unit 223.

FIG. 61 is a diagram showing an example of a table T31 stored in a storage unit 353.

FIG. 64 is a diagram showing an example of a table T32 stored in the storage unit 323.

FIG. 70 is a graph showing a third example of the relationship between the effective current value I of the motor 338 and the operation time in the certain continuously operable vacuum pump.

FIG. 72C is a graph showing a fourth example of the relationship between the effective current value I of the motor 338 and an operation time.

FIG. 80 is a diagram showing an example of a table related to a state quantity stored in the storage unit.

FIG. 82 is a block diagram showing a schematic configuration of the semiconductor manufacturing system according to the eleventh embodiment.

FIG. 84 is a diagram showing an example of a table stored in the storage unit by a computing unit.

DESCRIPTION OF EMBODIMENTS

Figure 4:
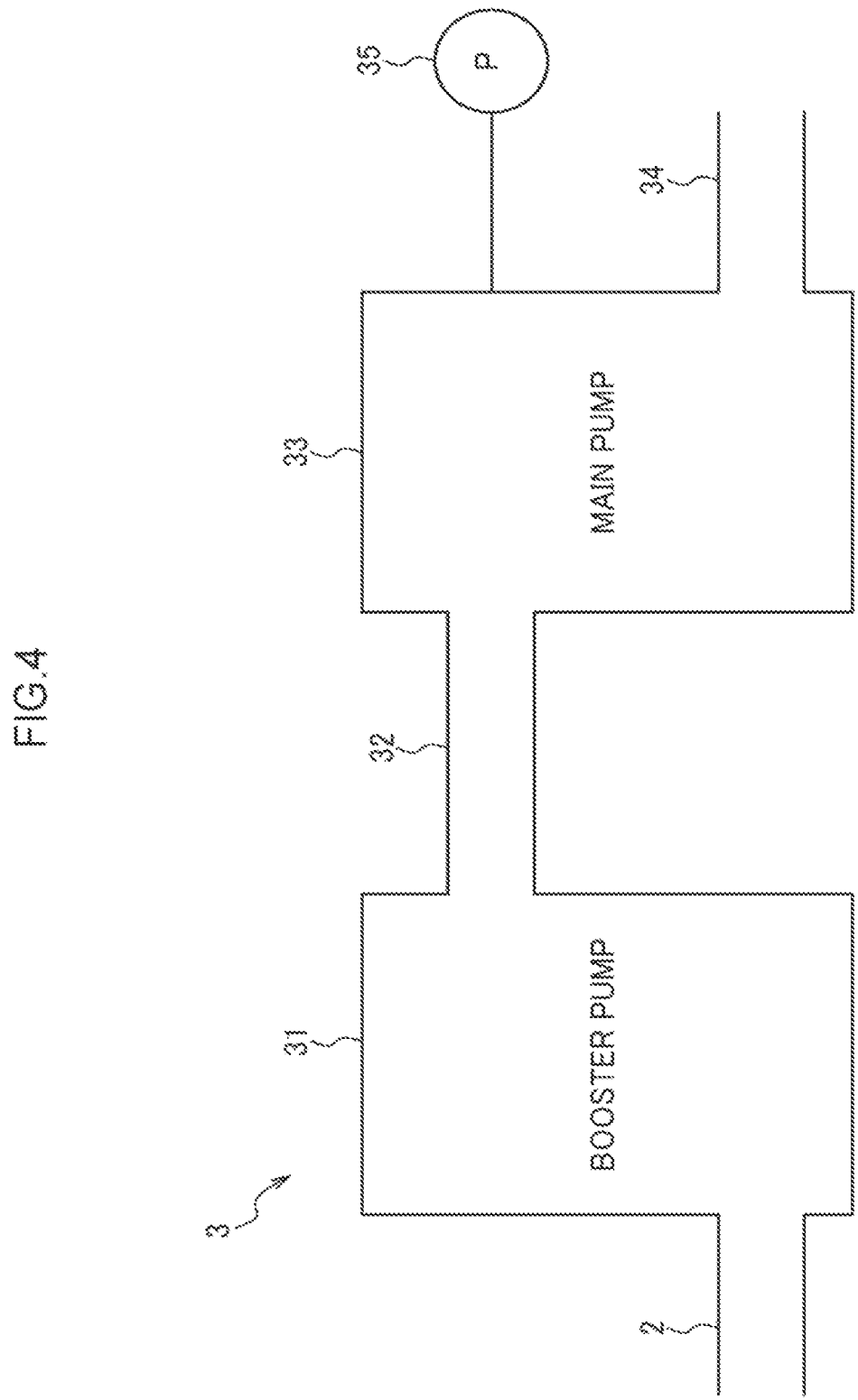
FIG. 4 is a schematic structural diagram of a vacuum pump 3 according to the present embodiment.

However, even in the technique of Patent Literature 2, there is still a problem that it is impossible to predict the situation in which the vacuum pump stops due to the abnormality derived from products of the vacuum pump only at a limited timing such as the starting of the vacuum pump.

EMBODIMENT

It is preferable to provide an information processing apparatus, an information processing system, an information processing method, and a program which can predict a situation in which a vacuum pump stops due to abnormality derived from products of the vacuum pump at an arbitrary timing during an operation of the vacuum pump and reduce the possibility of damaging articles during a manufacturing process in a semiconductor manufacturing apparatus.

An information processing apparatus of a first aspect of an embodiment, the information processing apparatus detecting presence or absence of abnormality of a vacuum pump derived from a product produced within a target vacuum pump, comprises: a determination unit configured to determine a normal variation range or a normal time variation behavior of a target state quantity which is a state quantity varying depending on a load of gas flowing into the vacuum pump, based on at least one of past target state quantities of the target vacuum pump or another vacuum pump; and a comparison unit configured to compare a current target state quantity of the target vacuum pump with the normal variation range or the normal time variation behavior and output the comparison result.

According to this configuration, the normal variation range or the normal time variation behavior of the target state quantity due to factors other than the products is determined, so that it is possible to detect the abnormality due to the factors of products by comparing the normal variation range or the normal time variation behavior with the current target state quantity during the operation of the vacuum pump. Therefore, it is possible to detect the presence or absence of abnormality derived from the solidified or liquefied products in the target vacuum pump during the operation period before the operation of the vacuum pump stops once. By doing so, it is possible to predict the situation in which the vacuum pump stops due to the abnormality derived from products of the vacuum pump at an arbitrary timing while the vacuum pump is continuously operated and to reduce the possibility of damaging articles during the manufacturing process in the semiconductor manufacturing apparatus.

An information processing apparatus of a second aspect of an embodiment, the information processing apparatus of according to the first aspect, wherein the determination unit corrects the past target state quantity based on a pressure in the target vacuum pump or a pressure in the other vacuum pump, and determines the normal variation range or the normal time variation behavior using the corrected past target state quantity, and the comparison unit corrects the current target state quantity of the target vacuum pump based on the pressure in the target vacuum pump or the pressure in the other vacuum pump, and compares the corrected target state quantity with the normal variation range or the normal time variation behavior.

According to this configuration, it is possible to correct the change in the target state quantity (for example, current value) due to the pressure and judge to be abnormal when the corrected target state quantity deviates from the normal variation range or the normal time variation behavior. Therefore, it is possible to improve the judgment accuracy.

An information processing apparatus of a third aspect of an embodiment, the information processing apparatus of according to the first or the second aspect, wherein the determination unit determines the normal variation range or the normal time variation behavior of the target state quantity for each process based on the target information amount for each process corresponding to a predetermined number of times after the target vacuum pump is operated, and the comparison unit compares the current target state quantity of the target vacuum pump with the normal variation range or the normal time variation behavior of the target state quantity, for each corresponding process.

According to this configuration, it is possible to detect the presence or absence of abnormality derived from products for each corresponding process. Therefore, it is possible to reduce a labor of detecting the presence or absence of abnormality derived from the products.

An information processing apparatus of a fourth aspect of an embodiment, the information processing apparatus of according to any one of the first to the third aspect, wherein the normal variation range is a variation range of a time change in the target state quantity at the time of a normal state, and the comparison unit compares a time change in the current target state quantity of the target vacuum pump with a variation range of a time change in the target state quantity at the time of the normal state.

According to this configuration, by comparing the time changes with each other in this way, it is possible to detect the presence or absence of abnormality derived from products. Therefore, it is possible to improve the detection accuracy of the presence or absence of abnormality derived from products.

An information processing apparatus of a fifth aspect of an embodiment, the information processing apparatus of according to any one of the first to the fourth aspect, further comprising:

a division unit configured to divide a period, in which a size of the target state quantity, a size of a variation, and/or a variation cycle are different, into different processes, wherein the determination unit determines the normal variation range or the normal time variation behavior of the current target state quantity of the target vacuum pump for each divided process, and the comparison unit compares the current target state quantity of the target vacuum pump with the normal variation range or the normal time variation behavior for each divided process.

According to this configuration, it is possible to automatically divide the processes and to detect the presence or absence of abnormality derived from products for each divided process. Therefore, it is possible to reduce a labor of detecting the presence or absence of abnormality derived from the products.

An information processing apparatus of a sixth aspect of an embodiment, the information processing apparatus of according to any one of the first to the fourth aspect, further comprising: a division unit configured to divide a period, in which a gas type and a flow rate of gas used during a process in a semiconductor manufacturing apparatus with which the target vacuum pump communicates are different, into different processes, wherein the determination unit determines the normal variation range or the normal time variation behavior of the current target state quantity of the target vacuum pump for each divided process, and the comparison unit compares the current target state quantity of the target vacuum pump with the normal variation range or the normal time variation behavior for each divided process.

According to this configuration, it is possible to automatically divide the processes and to detect the presence or absence of abnormality derived from products for each divided process. Therefore, it is possible to reduce a labor of detecting the presence or absence of abnormality derived from the products.

An information processing apparatus of a seventh aspect of an embodiment, the information processing apparatus of according to any one of the first to the sixth aspect, wherein the comparison unit determines the presence or absence of the abnormality derived from the product based on a degree of change in the target state quantity for each process in a semiconductor manufacturing apparatus with which the target vacuum pump communicates.

According to this configuration, it is possible to detect the presence or absence of abnormality derived from products.

An information processing apparatus of an eighth aspect of an embodiment, the information processing apparatus of according to any one of the first to the seventh aspect, wherein the comparison unit outputs as the comparison result data determined that there is the abnormality derived from the product produced within the target vacuum pump.

According to this configuration, the manager of the vacuum pump can grasp the data determined to be abnormal.

An information processing apparatus of a ninth aspect of an embodiment, the information processing apparatus of according to any one of the first to the eighth aspect, wherein the other vacuum pump has substantially an identical specification to the target vacuum pump.

According to this configuration, it is possible to determine the normal variation range or the normal time variation behavior of the target state quantity by using at least a past target state quantity of another vacuum pump having substantially the same specifications as the target vacuum pump.

An information processing apparatus of a tenth aspect of an embodiment, the information processing apparatus detecting presence or absence of abnormality of a vacuum pump derived from products produced within a target vacuum pump, comprises: a determination unit configured to determine a normal variation range or a normal time variation behavior of a target state quantity which is a state quantity varying depending on a load of gas flowing into the vacuum pump, based on recipe information on a process of a semiconductor manufacturing apparatus with which the target vacuum pump communicates; and a comparison unit configured to compare a current target state quantity of the target vacuum pump with the normal variation range or the normal time variation behavior and output the comparison result.

According to this configuration, the information processing apparatus detecting presence or absence of abnormality of a vacuum pump derived from products produced within a target vacuum pump, comprises: a determination unit configured to determine a normal variation range or a normal time variation behavior of a target state quantity which is a state quantity varying depending on a load of gas flowing into the vacuum pump, based on recipe information on a process of a semiconductor manufacturing apparatus with which the target vacuum pump communicates; and a comparison unit configured to compare a current target state quantity of the target vacuum pump with the normal variation range or the normal time variation behavior and output the comparison result.

An information processing apparatus of an 11th aspect of an embodiment, the information processing apparatus of according to the first aspect, wherein the determination unit determines the normal variation range of the target state quantity for each process using the past target state quantity of the target vacuum pump or the past target state quantity of the other vacuum pump as the target state quantity which is the state quantity varying depending on a load of gas flowing into the vacuum pump, and the comparison unit compares a target state quantity of an operating target vacuum pump with the normal variation range for each process to detect an abnormality data deviating from the normal variation range, and wherein the information processing apparatus further comprises a judgment criterion determination unit configured to determine a pump state judgment criterion for judging a failure possibility or an operation continuation possibility or a warning determination criterion for determining whether to output a warning, based on a statistical value of a target parameter related to the number of abnormality occurrences in a target process or all processes depending on whether the vacuum pump fails.

According to this configuration, the information processing apparatus 5*b* can use the pump state judgment criterion to judge the failure possibility or the operation continuation possibility of the operating target vacuum pump or can use the determination criterion for the operating target vacuum pump to determine whether to output a warning.

An information processing apparatus of a 12th aspect of an embodiment, the information processing apparatus of according to the 11th aspect, further comprises: an output unit configured to compare the statistical value of the target parameter related to the number of abnormality occurrences of an operating target pump in the target process or all the processes with the pump state judgment criterion determined by the judgment criterion determination unit to output a pump state diagnostic value, wherein the pump state diagnostic value includes a failure index indicating a failure possibility or an operation continuation index indicating an operation continuation possibility.

According to this configuration, the manager of the operating target pump can grasp the failure possibility or the operation continuation possibility, so that it is possible to improve the possibility of performing the replacement or maintenance of the vacuum pump before failure.

An information processing apparatus of a 13th aspect of an embodiment, the information processing apparatus of according to the 12th aspect, wherein the judgment criterion determination unit performs statistical processing on the target parameter related to the number of abnormality occurrences on the failed vacuum pump in the target process or all the processes to determine a correspondence relationship between the statistical value of the target parameter and the failure index as the pump state judgment criterion, and the output unit compares the statistical value of the target parameter related to the number of abnormality occurrences of the operating target pump in the target process or all the processes with the correspondence relationship to output the failure index.

According to this configuration, the manager of the operating target pump can grasp the failure possibility, so that it is possible to improve the possibility of performing the replacement or maintenance of the vacuum pump before failure.

An information processing apparatus of a 14th aspect of an embodiment, the information processing apparatus of according to the 12th aspect, wherein the determination unit performs statistical processing on the target parameter related to the number of abnormality occurrences on the vacuum pump continuously operated without failure in the target process or all the processes to determine a correspondence relationship between the statistical value of the target parameter and the operation continuation index as a judgment criterion, and the output unit compares the statistical value of the target parameter related to the number of abnormality occurrences of the operating target pump in the target process or all the processes with the correspondence relationship to output the operation continuation index.

According to this configuration, the manager of the operating target pump can grasp the operation continuation possibility, so that it is possible to improve the possibility of performing the replacement or maintenance of the vacuum pump before failure.

An information processing apparatus of a 15th aspect of an embodiment, the information processing apparatus of according to the 11th aspect, further comprises: a warning output unit configured to compare the statistical value of the target parameter related to the number of abnormality occurrences of the target pump in the target process or all the processes with a warning determination criterion determined by the judgment criterion determination unit and output a warning depending on the comparison result.

According to this configuration, the manager of the operating target pump can grasp the operation continuation possibility of the target pump, and it is possible to improve the possibility of performing replacement or maintenance before the target pump fails.

An information processing apparatus of a 16th aspect of an embodiment, the information processing apparatus of according to any one of the 11th to the 15th aspect, further comprises: a division unit configured to divide the past target state quantity of the target vacuum pump or the past target state quantity of the other vacuum pump into each process, wherein the determination unit determines the normal variation range of the target state quantity for each divided process.

According to this configuration, it is possible to determine the normal variation range of the target state quantity for each process.

An information processing apparatus of a 17th aspect of an embodiment, the information processing apparatus of according to the 16th aspect, wherein the division unit divides the past target state quantity of the target vacuum pump or the past target state quantity of the other vacuum pump into each process based on film formation start timing included in a film formation start signal input from an abatement apparatus as a starting point.

According to this configuration, it is possible to certainly divide the target state quantity for each process.

An information processing apparatus of a 18th aspect of an embodiment, the information processing apparatus of according to the 16th aspect, wherein the vacuum pump is provided with a gas sensor configured to measure concentration of specific gas within the vacuum pump, and the division unit determines a film formation start signal based on a sensor value detected by the gas sensor, and divides the past target state quantity of the target vacuum pump or the past target state quantity of the other vacuum pump for each process based on the film formation start timing as a starting point.

According to this configuration, it is possible to certainly divide the target state quantity for each process.

An information processing apparatus of a 19th aspect of an embodiment, the information processing apparatus of according to any one of the 11th to 18th aspect, wherein the target parameter related to the number of abnormality occurrences is the number of times of abnormality occurrence or an abnormality occurrence frequency obtained by dividing the number of times of abnormality occurrence by a period of the specific process.

According to this configuration, the pump state judgment criterion is determined using the number of abnormality occurrences or the statistical value of the abnormality occurrence frequency (for example, the accumulated value of the number of times of abnormality occurrence or the accumulated value of the abnormality occurrence frequency), so that it is possible to improve the judgment accuracy on the failure probability or the operation continuation possibility.

An information processing system of a 20th aspect of an embodiment, the information processing system detecting presence or absence of abnormality of a vacuum pump derived from a product produced within a target vacuum pump, comprising:

a determination unit configured to determine a normal variation range or a normal time variation behavior of a target state quantity which is a state quantity varying depending on a load of gas flowing into the vacuum pump, based on at least one of past target state quantities of the target vacuum pump or another vacuum pump; and a comparison unit configured to compare a current target state quantity of the target vacuum pump with the normal variation range or the normal time variation behavior and output the comparison result.

According to this configuration, the normal variation range or the normal time variation behavior of the target state quantity due to factors other than the products is determined, so that it is possible to detect the abnormality due to the factors of products by comparing the normal variation range or the normal time variation behavior with the current target state quantity during the operation of the vacuum pump. Therefore, it is possible to detect the presence or absence of abnormality derived from the solidified or liquefied products in the target vacuum pump during the operation period before the operation of the vacuum pump stops once. By doing so, it is possible to predict the situation in which the vacuum pump stops due to the abnormality derived from products of the vacuum pump at an arbitrary timing while the vacuum pump is continuously operated and to reduce the possibility of damaging articles during the manufacturing process in the semiconductor manufacturing apparatus.

An information processing method of a 21st aspect of an embodiment, the information processing method detecting presence or absence of abnormality of a vacuum pump derived from a product produced within a target vacuum pump, comprising: determining a normal variation range or a normal time variation behavior of a target state quantity which is a state quantity varying depending on a load of gas flowing into the vacuum pump, based on at least one of past target state quantities of the target vacuum pump or another vacuum pump; and comparing a current target state quantity of the target vacuum pump with the normal variation range or the normal time variation behavior and outputting the comparison result.

According to this configuration, the normal variation range or the normal time variation behavior of the target state quantity due to factors other than the products is determined, so that it is possible to detect the abnormality due to the factors of products by comparing the normal variation range or the normal time variation behavior with the current target state quantity during the operation of the vacuum pump. Therefore, it is possible to detect the presence or absence of abnormality derived from the solidified or liquefied products in the target vacuum pump during the operation period before the operation of the vacuum pump stops once. By doing so, it is possible to predict the situation in which the vacuum pump stops due to the abnormality derived from products of the vacuum pump at an arbitrary timing while the vacuum pump is continuously operated and to reduce the possibility of damaging articles during the manufacturing process in the semiconductor manufacturing apparatus.

A program of a 22nd aspect of an embodiment, the program detecting presence or absence of abnormality of a vacuum pump derived from products produced within a target vacuum pump, the program allowing a computer to execute: a determination unit configured to determine a normal variation range or a normal time variation behavior of a target state quantity which is a state quantity varying depending on a load of gas flowing into the vacuum pump, based on at least one of past target state quantities of the target vacuum pump or another vacuum pump; and a comparison unit configured to compare a current target state quantity of the target vacuum pump with the normal variation range or the normal time variation behavior and output the comparison result.

According to this configuration, the normal variation range or the normal time variation behavior of the target state quantity due to factors other than the products is determined, so that it is possible to detect the abnormality due to the factors of products by comparing the normal variation range or the normal time variation behavior with the current target state quantity during the operation of the vacuum pump. Therefore, it is possible to detect the presence or absence of abnormality derived from the solidified or liquefied products in the target vacuum pump during the operation period before the operation of the vacuum pump stops once. By doing so, it is possible to predict the situation in which the vacuum pump stops due to the abnormality derived from products of the vacuum pump at an arbitrary timing while the vacuum pump is continuously operated and to reduce the possibility of damaging articles during the manufacturing process in the semiconductor manufacturing apparatus.

A substrate processing apparatus of a 23rd aspect of an embodiment, the substrate processing apparatus comprising a chamber film forming furnace configured to introduce a film forming gas to form a substrate, a vacuum pump apparatus configured to communicate with the chamber film forming furnace, an abatement apparatus configured to process exhaust gas of the vacuum pump, and a control apparatus configured to control the vacuum pump, and continuously processing a plurality of substrates, wherein the control apparatus has a generation circuit configured to divide a past target state quantity of a target vacuum pump or a past target state quantity of another vacuum pump read from a storage apparatus into each process based on the film formation start timing included in a film formation start signal input from the abatement apparatus as a starting point after starting the vacuum pump to make the chamber film forming furnace into a predetermined degree of vacuum, and generate the divided target state quantity, and a determination circuit configured to determines a normal variation range of a target state quantity which is a state quantity varying depending on a load of gas flowing into the vacuum pump for each divided target state quantity.

According to this configuration, the normal variation range of the target state quantity due to factors other than the products is determined, so that it is possible to detect the abnormality due to the factors of products by comparing the normal variation range or the normal time variation behavior with the current target state quantity during the operation of the vacuum pump. Therefore, it is possible to detect the presence or absence of abnormality derived from the solidified or liquefied products in the target vacuum pump during the operation period before the operation of the vacuum pump stops once. By doing so, it is possible to predict the situation in which the vacuum pump stops due to the abnormality derived from products of the vacuum pump at an arbitrary timing while the vacuum pump is continuously operated and to reduce the possibility of damaging articles during the manufacturing process in the chamber film forming furnace.

An information processing apparatus of a 24th aspect of an embodiment, the information processing apparatus, comprises: a comparison unit configured to refer to a storage unit in which a criterion data for judging a failure arrival possibility determined using a tendency of an abnormality data detected in data of a state quantity of a failed vacuum pump is stored to compare the tendency of the abnormality data detected from the data of a state quantity of an operating vacuum pump with the criterion data stored in the storage unit, and output the comparison result.

According to this configuration, since it is possible to grasp the failure arrival possibility of the vacuum pump, it is possible to reduce the risk that the vacuum pump stops during the manufacturing process and articles are greatly damaged during the manufacturing process.

An information processing apparatus of a 25th aspect of an embodiment, the information processing apparatus according to the 24th aspect, wherein the comparison unit judges the failure arrival possibility of the vacuum pump as the comparison result and outputs the judgment result as the comparison result.

According to this configuration, since it is likely to cause the failure arrival of the vacuum pump, the manager of the vacuum pump can grasp the failure arrival possibility of the vacuum pump.

An information processing apparatus of a 26th aspect of an embodiment, the information processing apparatus according to the 25th aspect, wherein the storage unit stores an attribute of the vacuum pump and the criterion data by associating the attribute of the vacuum pump and the criterion data with each other, and the comparison unit compares the tendency of the abnormality data detected from the state quantity of the operating vacuum pump with the criterion data stored by being associated with the attributes of the operating vacuum pump in the storage unit.

According to this configuration, since it is possible to perform the comparison for each attribute of the vacuum pump, it is possible to improve the judgment accuracy of the failure arrival possibility.

An information processing apparatus of a 27th aspect of an embodiment, information processing apparatus according to the any one of the 24th to the 26th aspect, wherein the storage unit stores a manufacturing process of a semiconductor manufacturing apparatus and the criterion data by associating the manufacturing process of the semiconductor manufacturing apparatus and the criterion data with each other, and the comparison unit compares the tendency of the abnormality data detected from the state quantity of the operating vacuum pump with the criterion data stored by being associated with a current manufacturing process of the semiconductor manufacturing apparatus to which the operating vacuum pump is connected in the storage unit.

According to this configuration, since it is possible to perform the comparison for each manufacturing process of the semiconductor manufacturing apparatus, it is possible to improve the judgment accuracy of the failure arrival possibility.

An information processing apparatus of a 28th aspect of an embodiment, information processing apparatus according to the any one of the 24th to the 27th aspect, wherein the comparison unit compares the state quantity of the operating vacuum pump with a statistical quantity of a value based on the state quantity at the time of the failure of the failed vacuum pump, and performs a control to issue a notification according to the comparison result.

According to this configuration, the notification can be issued when the state quantity of the operating vacuum pump approaches the state quantity at the time of failure of the failed vacuum pump, and the maintenance or replacement of the vacuum pump can be performed before the vacuum pump fails.

An information processing apparatus of a 29th aspect of an embodiment, information processing apparatus according to the any one of the 24th to the 28th aspect, wherein the comparison unit compares the number of times of abnormality occurrence of the state quantity of the operating vacuum pump with a statistical quantity of the number of times of abnormality occurrence of the state quantity until the vacuum pump fails and performs a control to issue a notification according to the comparison result.

According to this configuration, the notification can be issued when the state quantity of the operating vacuum pump approaches the number of times of abnormality occurrence up to failure of the failed vacuum pump, and the maintenance or replacement of the vacuum pump can be performed before the vacuum pump fails.

An information processing apparatus of a 30th aspect of an embodiment, information processing apparatus according to the any one of the 24th to the 29th aspect, wherein the comparison unit compares an abnormality occurrence interval of the state quantity of the operating vacuum pump with a statistical quantity of an interval of an abnormality occurrence of the state quantity before the failure of the vacuum pump and performs a control to issue a notification according to the comparison result.

According to this configuration, the notification can be issued when the state quantity of the operating vacuum pump approaches the abnormality occurrence interval of the state quantity before failure, and the maintenance or replacement of the vacuum pump can be performed before the vacuum pump fails.

An information processing apparatus of a 31st aspect of an embodiment, information processing apparatus according to the any one of the 28th to the 30th aspect, wherein the comparison unit performs processing to change timing when the notification is issued depending on a time of the manufacturing process of the semiconductor manufacturing apparatus to which the operating vacuum pump is connected or the number of times of the manufacturing process.

According to this configuration, it is possible to change the notification timing depending on the time of the production process of the semiconductor manufacturing apparatus to which the operating vacuum pump is connected or the number of times of the f production process. As the time of the film forming process of the semiconductor manufacturing apparatus to which the operating vacuum pump is connected or the number of times of the film forming process is increased, the risk of failure is increased, but the maintenance or replacement of the vacuum pump can be performed before the failure of the vacuum pump by making the notification timing earlier.

A criterion data determination apparatus of a 32nd aspect of an embodiment, the criterion data determination apparatus, comprises: a determination unit configured to refer to a storage unit in which an abnormality data detected in data of a state quantity of a failed vacuum pump is stored to determine a criterion data for judging a failure arrival possibility using a tendency of the abnormality data.

According to this configuration, since the criterion data are created, it is possible to judge the failure arrival possibility of the vacuum pump by comparing the criterion data with the tendency of the abnormality data detected from the data of the state quantity of the operating vacuum pump.

A criterion data determination apparatus of a 33rd aspect of an embodiment, the criterion data determination apparatus according to the 32nd aspect, herein the determination unit determines the criterion data for each attribute of a vacuum pump.

According to this configuration, since the criterion data are created for each attribute of the vacuum pump, when comparing with the tendency of the abnormality data detected from the data of the state quantity of the operating vacuum pump, it is possible to compare the tendency of the abnormality data with the criterion data corresponding to the vacuum pump of the attributes to which the operating vacuum pump belongs. As a result, it is possible to improve the determination accuracy on the failure arrival possibility of the vacuum pump.

A criterion data determination apparatus of a 34th aspect of an embodiment, the criterion data determination apparatus according to the 32nd or 33rd aspect, wherein the determination unit determines the criterion data for each manufacturing process of a semiconductor manufacturing apparatus.

According to this configuration, since the criterion data are created for each film forming process of the semiconductor manufacturing apparatus, when comparing with the tendency of the abnormality data detected from the data of the state quantity of the operating vacuum pump, it is possible to compare the tendency of the abnormality data with the criterion data corresponding to the film forming process of the semiconductor manufacturing apparatus to which the operating vacuum pump is connected. As a result, it is possible to improve the judging accuracy on the failure arrival possibility of the vacuum pump.

An information processing method of a 35th aspect of an embodiment, the information processing method, comprises: referring to a storage unit in which a criterion data for judging a failure arrival possibility determined using a tendency of an abnormality data detected in data of a state quantity of a failed vacuum pump is stored to compare the tendency of the abnormality data detected from data of a state quantity of an operating vacuum pump with the criterion data stored in the storage unit, and output the comparison result.

According to this configuration, since it is possible to grasp the failure arrival possibility of the vacuum pump, it is possible to reduce the risk that the vacuum pump stops during the manufacturing process and articles are greatly damaged during the manufacturing process.

A criterion data determination method of a 36th aspect of an embodiment, the criterion data determination method, comprises: referring to a storage unit in which an abnormality data detected in data of a state quantity of a failed vacuum pump is stored to determine a criterion data for judging a failure arrival possibility using a tendency of the abnormality data.

According to this configuration, since the criterion data are created, it is possible to judge the failure arrival possibility of the vacuum pump by comparing the criterion data with the tendency of the abnormality data detected from the data of the state quantity of the operating vacuum pump.

A program of a 37th aspect of an embodiment, the program allowing a computer to execute: a comparison unit configured to refer to a storage unit in which a criterion data for judging a failure arrival possibility determined using a tendency of an abnormality data detected in data of a state quantity of a failed vacuum pump is stored to compare a tendency of an abnormality data detected from data of a state quantity of an operating vacuum pump with the criterion data stored in the storage unit, and output the comparison result.

According to this configuration, since it is possible to grasp the failure arrival possibility of the vacuum pump, it is possible to reduce the risk that the vacuum pump stops during the manufacturing process and articles are greatly damaged during the manufacturing process.

A program of a 38th aspect of an embodiment, the program allowing a computer to execute: a determination unit configured to refer to a storage unit in which an abnormality data detected in data of a state quantity of a failed vacuum pump is stored to determine a criterion data for judging a failure arrival possibility using a tendency of the abnormality data.

According to this configuration, since the criterion data are created, it is possible to judge the failure arrival possibility of the vacuum pump by comparing the criterion data with the tendency of the abnormality data detected from the data of the state quantity of the operating vacuum pump.

An information processing apparatus of a 39th aspect of an embodiment, the information processing apparatus, comprises: a comparison unit configured to refer to a storage unit in which a criterion data for judging an operation continuation possibility determined using a tendency of an abnormality data detected in data of a state quantity of a continuously operable vacuum pump is stored to compare a tendency of an abnormality data detected from data of a state quantity of an operating vacuum pump with the criterion data stored in the storage unit, and output the comparison result.

According to this configuration, since it is possible to grasp the operation continuation possibility of the vacuum pump, it is possible to reduce the risk that the vacuum pump stops during the manufacturing process and articles are greatly damaged during the manufacturing process.

An information processing apparatus of a 40th aspect of an embodiment, the information processing apparatus according to the 39th aspect, wherein the comparison unit judges the operation continuation possibility of the vacuum pump according to the comparison result and outputs the judgment result as the comparison result.

According to this configuration, since there is no operation continuation possibility of the vacuum pump, the manager of the vacuum pump can grasp the operation continuation possibility of the vacuum pump.

An information processing apparatus of a 41st aspect of an embodiment, the information processing apparatus according to the 39th or 40th aspect, wherein the storage unit stores an attribute of the vacuum pump and the criterion data by associating the attribute of the vacuum pump and the criterion data with each other, and the comparison unit compares the tendency of the abnormality data detected from the state quantity of the operating vacuum pump with the criterion data stored by being associated with the attribute of the operating vacuum pump in the storage unit.

According to this configuration, since it is possible to perform the comparison for each attribute of the vacuum pump, it is possible to improve the judgment accuracy on the operation continuation possibility.

An information processing apparatus of a 42nd aspect of an embodiment, the information processing apparatus according to any one of the 39th to 41th aspect, wherein the storage unit stores a film forming process of a semiconductor manufacturing apparatus and the criterion data by associating the film forming process of the semiconductor manufacturing apparatus and the criterion data with each other, and the comparison unit compares the tendency of the abnormality data detected from the state quantity of the operating vacuum pump with the criterion data stored by being associated with the current film forming process of the semiconductor manufacturing apparatus to which the operating vacuum pump is connected in the storage unit.

According to this configuration, since it is possible to perform the comparison for each film forming process of the semiconductor manufacturing apparatus, it is possible to improve the judgment accuracy on the operation continuation possibility.

An information processing apparatus of a 43rd aspect of an embodiment, the information processing apparatus according to any one of the 39th to 42nd aspect, wherein the comparison unit compares a value based on the state quantity of the operating vacuum pump with a statistical quantity of a value based on a state quantity of a setting period of a continuously operable vacuum pump and performs a control to issue a notification according to the comparison result.

According to this configuration, it is possible to issue a notification when the state quantity of the operating vacuum pump is away from the state quantity of the continuously operable vacuum pump, and maintenance or replacement of the vacuum pump can be made before the vacuum pump fails.

An information processing apparatus of a 44th aspect of an embodiment, the information processing apparatus according to any one of the 39th to 43th aspect, wherein the comparison unit compares the number of times of abnormality occurrence of the state quantity of the operating vacuum pump with a statistical quantity of the number of times of abnormality occurrence of the state quantity of the setting period of the continuously operable vacuum pump and performs a control to issue a notification according to the comparison result.

According to this configuration, it is possible to issue a notification when the state quantity of the operating vacuum pump is away from the state quantity of the continuously operable vacuum pump, and maintenance or replacement of the vacuum pump can be made before the vacuum pump fails.

An information processing apparatus of a 45th aspect of an embodiment, the information processing apparatus according to any one of the 39th to 44th aspect, wherein the comparison unit compares an abnormality occurrence interval of the state quantity of the operating vacuum pump with a statistical quantity of an interval of abnormality occurrence of the state quantity of the setting period of the continuously operable vacuum pump and performs a control to issue a notification according to the comparison result.

According to this configuration, it is possible to issue a notification when the state quantity of the operating vacuum pump is away from the state quantity of the continuously operable vacuum pump, and maintenance or replacement of the vacuum pump can be made before the vacuum pump fails.

An information processing apparatus of a 46th aspect of an embodiment, the information processing apparatus according to any one of the 43th to 45th aspect, wherein the comparison unit performs processing to change timing when the notification is issued depending on a time of the manufacturing process of the semiconductor manufacturing apparatus to which the operating vacuum pump is connected or the number of times of the manufacturing process.

According to this configuration, it is possible to change the notification timing depending on the time of the production process of the semiconductor manufacturing apparatus to which the operating vacuum pump is connected or the number of times of the f production process. As the time of the film forming process of the semiconductor manufacturing apparatus to which the operating vacuum pump is connected or the number of times of the film forming process is increased, the risk of failure is increased, but the maintenance or replacement of the vacuum pump can be performed before the failure of the vacuum pump by making the notification timing earlier.

A criterion data determination apparatus of a 47th aspect of an embodiment, the criterion data determination apparatus comprises: a determination unit configured to refer to a storage unit in which an abnormality data detected in data of a state quantity of a continuously operable vacuum pump is stored to determine a criterion data for judging an operation continuation possibility using a tendency of the abnormality data.

According to this configuration, since the criterion data are created, it is possible to judge the operation continuation possibility of the vacuum pump by comparing the criterion data with the tendency of the abnormality data detected from the data of the state quantity of the operating vacuum pump.

A criterion data determination apparatus of a 48th aspect of an embodiment, the criterion data determination apparatus according to the 47th aspect, wherein the determination unit determines the criterion data for each attribute of a vacuum pump.

According to this configuration, since the criterion data are created for each attribute of the vacuum pump, when comparing with the tendency of the abnormality data detected from the data of the state quantity of the operating vacuum pump, it is possible to compare the tendency of the abnormality data with the criterion data corresponding to the vacuum pump of the attributes to which the operating vacuum pump belongs. As a result, it is possible to improve the determination accuracy on the operation continuation possibility of the vacuum pump.

A criterion data determination apparatus of a 49th aspect of an embodiment, the criterion data determination apparatus according to the 47th or the 48th aspect, wherein the determination unit determines the criterion data for each manufacturing process of a semiconductor manufacturing apparatus.

According to this configuration, since the criterion data are created for each producing process of the semiconductor manufacturing apparatus, when comparing with the tendency of the abnormality data detected from the data of the state quantity of the operating vacuum pump, it is possible to compare the tendency of the abnormality data with the criterion data corresponding to the film forming process of the semiconductor manufacturing apparatus to which the operating vacuum pump is connected. As a result, it is possible to improve the judging accuracy on the operation continuation possibility of the vacuum pump.

An information processing method of a 50th aspect of an embodiment, the information processing method, comprises: referring to a storage unit in which a criterion data for judging an operation continuation possibility determined using a tendency of an abnormality data detected in data of a state quantity of a continuously operable vacuum pump is stored to compare a tendency of an abnormality data detected from data of a state quantity of an operating vacuum pump with the criterion data stored in the storage unit, and output the comparison result.

According to this configuration, since it is possible to grasp the operation continuation possibility of the vacuum pump, it is possible to reduce the risk that the vacuum pump stops during the manufacturing process and articles are greatly damaged during the manufacturing process.

A criterion data determination method of a 51st aspect of an embodiment, the criterion data determination method, comprises: referring to a storage unit in which an abnormality data detected in data of a state quantity of a continuously operable vacuum pump is stored to determine a criterion data for judging an operation continuation possibility using a tendency of the abnormality data.

According to this configuration, since the criterion data are created, it is possible to judge the operation continuation possibility of the vacuum pump by comparing the criterion data with the tendency of the abnormality data detected from the data of the state quantity of the operating vacuum pump.

A program of a 52nd aspect of an embodiment, the program allowing a computer to execute: a comparison unit configured to refer to a storage unit in which a criterion data for judging a failure arrival possibility determined using a tendency of an abnormality data detected in data of a state quantity of a continuously operable vacuum pump is stored to compare a tendency of an abnormality data detected from data of a state quantity of an operating vacuum pump with the criterion data stored in the storage unit, and output the comparison result.

According to this configuration, since it is possible to grasp the operation continuation possibility of the vacuum pump, it is possible to reduce the risk that the vacuum pump stops during the manufacturing process and articles are greatly damaged during the manufacturing process.

A program of a 53rd aspect of an embodiment, the program allowing a computer to execute: a determination unit configured to refer to a storage unit in which an abnormality data detected in data of a state quantity of a continuously operable vacuum pump is stored to determine a criterion data for judging a failure arrival possibility using a tendency of the abnormality data.

According to this configuration, since the criterion data are created, it is possible to judge the operation continuation possibility of the vacuum pump by comparing the criterion data with the tendency of the abnormality data detected from the data of the state quantity of the operating vacuum pump.

An information processing apparatus of a 54th aspect of an embodiment, the information processing apparatus, comprises: a reading unit configured to read a common condition corresponding to a group to which an operating target vacuum pump belongs from a storage apparatus in which the common condition of an occurrence tendency of an abnormality occurrence of a vacuum pump belonging to a setting group determined using an occurrence tendency of a first abnormality data detected from a state quantity of the vacuum pump belonging to the setting group of the vacuum pump is stored for each setting group; a detection unit configured to detect a second abnormality data from data of a state quantity of an operating target vacuum pump; and a comparison unit configured to compare the read common condition with an occurrence tendency of the detected second abnormality data.

According to this configuration, it is possible to compare the occurrence tendency of the abnormal state of the operating target vacuum pump with the common condition based on the occurrence tendency of the abnormal state of the past vacuum pump of the group to which the target vacuum pump belongs. Therefore, it is possible to diagnose the internal state of the pump from the abnormal state of the operating target vacuum pump.

An information processing apparatus of a 55th aspect of an embodiment, the information processing apparatus according to the 54th aspect, wherein a setting group of the vacuum pump is a group of a vacuum pump corresponding to an identical manufacturing number, and the comparison unit compares the common condition corresponding to a group of a vacuum pump of an identical manufacturing number to the operating target vacuum pump with an occurrence tendency of the second abnormality data of the operating target vacuum pump.

According to this configuration, it is possible to compare the occurrence tendency of the abnormal state of the operating target vacuum pump with the common condition based on the occurrence tendency of the abnormal state of the vacuum pump of an identical manufacturing number to the target vacuum pump. Therefore, it is possible to diagnose the internal state of the pump from the abnormal state of the operating target vacuum pump.

An information processing apparatus of a 56th aspect of an embodiment, the information processing apparatus according to the 54th aspect, wherein the setting group of the vacuum pump is a group of a vacuum pump connected to a semiconductor manufacturing apparatus corresponding to an identical manufacturing number, and the comparison unit compares the common condition corresponding to the group of the vacuum pump connected to the semiconductor manufacturing apparatus corresponding to an identical manufacturing number to the semiconductor manufacturing apparatus to which the operating target vacuum pump is connected with the occurrence tendency of the second abnormality data of the operating target vacuum pump.

According to this configuration, it is possible to compare the occurrence tendency of the abnormal state of the operating target vacuum pump with the common condition based on the occurrence tendency of the abnormal state of the vacuum pump connected in the past to the semiconductor manufacturing apparatus to which the target vacuum pump is connected. Therefore, it is possible to diagnose the internal state of the pump from the abnormal state of the operating target vacuum pump.

An information processing apparatus of a 57th aspect of an embodiment, the information processing apparatus according to the 54th aspect, wherein a setting group of the vacuum pump is a group of a vacuum pump used in an identical process, and the comparison unit compares the common condition corresponding to the group of the vacuum pump used in an identical process to the process used in the operating target vacuum pump with the occurrence tendency of the second abnormality data of the operating target vacuum pump.

According to this configuration, it is possible to compare the occurrence tendency of the abnormal state of the operating target vacuum pump with the common condition based on the occurrence tendency of the abnormal state of the vacuum pump used in the past in the identical process to the process in which the target vacuum pump is used. Therefore, it is possible to diagnose the internal state of the pump from the abnormal state of the operating target vacuum pump.

An information processing apparatus of a 58th aspect of an embodiment, the information processing apparatus according to any one of the 54th to the 57th aspect, wherein the common condition is a threshold value set based on the abnormality data detected in the data of the state quantity of the vacuum pump belonging to the setting group, and the comparison unit compares the threshold value with the occurrence tendency of the detected second abnormality data.

According to this configuration, it is possible to improve the diagnostic accuracy of the state inside the pump by performing the comparison with the threshold value set based on the abnormality data detected in the data of the state quantity of the continuously operated vacuum pump without failure for a predetermined period.

An information processing apparatus of a 59th aspect of an embodiment, the information processing apparatus according to the 58th aspect, wherein the threshold value is a threshold value of the number of times that a specific state quantity per unit time deviates from a set range, and the comparison unit compares the threshold value with the number of times that the specific state quantity per unit time detected from the data of the state quantity of the operating vacuum pump deviates from the set range.

According to this configuration, it is possible to improve the diagnostic accuracy of the state inside the pump.

An information processing apparatus of a 60th aspect of an embodiment, the information processing apparatus according to any one of the 54th to the 57th aspect, wherein the common condition is a data indicating a time change in a permissible range of the abnormality detected in the data of the state quantity of the vacuum pump belonging to the setting group, and the comparison unit compares the data indicating the time change in the permissible range of the abnormality with a time series data of the abnormality detected from the data of the state quantity of the operating vacuum pump.

According to this configuration, it is possible to improve the diagnostic accuracy of the state inside the pump.

An information processing apparatus of a 61th aspect of an embodiment, the information processing apparatus according to the 60th aspect, wherein the data indicating the time change in the permissible range of the abnormality is a data indicating the time change in the permissible range of the number of times that a specific state quantity per unit time deviates from the set range, and the comparison unit compares the threshold value with the time series data of the number of times that the specific state quantity per unit time detected from the data of the state quantity of the operating vacuum pump deviates from the set range.

According to this configuration, it is possible to improve the diagnostic accuracy of the state inside the pump.

An information processing apparatus of a 62th aspect of an embodiment, the information processing apparatus according to any one of the 54th to the 57th aspect, wherein the common condition is a first abnormality occurrence rule data indicating an abnormality occurrence rule set based on the abnormality detected in the data of the state quantity of the vacuum pump, and the comparison unit compares the first abnormality occurrence rule data with a second abnormality occurrence rule data indicating an abnormality occurrence rule detected from the data of the state quantity of the operating target vacuum pump.

According to this configuration, it is possible to improve the diagnostic accuracy of the state inside the pump.

An information processing apparatus of a 63th aspect of an embodiment, the information processing apparatus according to the 62th aspect, wherein the first abnormality occurrence rule data is the number of times range set based on the number of times of abnormality occurrence detected in the data of the state quantity of the vacuum pump, and the comparison unit compares the set number of times range with the number of times of abnormality occurrence detected from the data of the state quantity of the operating target vacuum pump to determine a separation degree from the set number of times range.

According to this configuration, it is possible to improve the diagnostic accuracy of the state inside the pump.

An information processing apparatus of a 64th aspect of an embodiment, the information processing apparatus according to the 63th aspect, wherein the comparison unit judges the state of the operating target vacuum pump by dividing the state of the operating target vacuum pump into a normal state, a state requiring attention, and a state requiring replacement depending on the separation degree.

According to this configuration, it is possible to improve the diagnostic accuracy of the state inside the pump.

An information processing apparatus of a 65th aspect of an embodiment, the information processing apparatus according to any one of the 54th to 64th aspect, wherein the comparison unit performs the comparison and the digitalization to output digitalized data as the comparison result.

According to this configuration, it is possible to improve the diagnostic accuracy of the state inside the pump.

An information processing apparatus of a 66th aspect of an embodiment, the information processing apparatus, comprises: a first detection unit configured to detect a first abnormality data from data of a state quantity of a vacuum pump; and a determination unit configured to determine a tendency common to the vacuum pump belonging to a setting group or a common condition for each setting group using an occurrence tendency of the first abnormality data detected from the data of the state quantity of the vacuum pump belonging to the setting group of the vacuum pump.

According to this configuration, It is possible to determine the common condition of occurrence tendency of the abnormal data of the vacuum pump for each setting group of the vacuum pump.

An information processing system of a 67th aspect of an embodiment, the information processing system, comprises: a first detection unit configured to detect a first abnormality data from data of a state quantity of a vacuum pump; a determination unit configured to determine a common condition of an occurrence tendency of an abnormality data of the vacuum pump belonging to the setting group for each setting group using an occurrence tendency of the first abnormality data detected from the data of the state quantity of the vacuum pump belonging to the setting group of the vacuum pump; a second detection unit configured to detect a second abnormality data from data of a state quantity of an operating target vacuum pump; and a comparison unit configured to compare a common condition corresponding to a group belonging to an operating target vacuum pump with an occurrence tendency of the detected second abnormality data.

According to this configuration, it is possible to compare the occurrence tendency of the abnormal state of the operating target vacuum pump with the common condition based on the occurrence tendency of the abnormal state of the past vacuum pump of the group to which the target vacuum pump belongs. Therefore, it is possible to diagnose the internal state of the pump from the abnormal state of the operating target vacuum pump.

An information processing method of a 68th aspect of an embodiment, the information processing method, comprising:

reading a common condition corresponding to a group to which an operating target vacuum pump belongs from a storage apparatus in which the common condition of an occurrence tendency of an abnormality data of a vacuum pump belonging to a setting group determined using an occurrence tendency of a first abnormality data detected from data of a state quantity of the vacuum pump belonging to the setting group of the vacuum pump is stored for each setting group; detecting a second abnormality data from data of a state quantity of an operating target vacuum pump; and comparing the read common condition with an occurrence tendency of the detected second abnormality data.

According to this configuration, it is possible to compare the occurrence tendency of the abnormal state of the operating target vacuum pump with the common condition based on the occurrence tendency of the abnormal state of the past vacuum pump of the group to which the target vacuum pump belongs. Therefore, it is possible to diagnose the internal state of the pump from the abnormal state of the operating target vacuum pump.

A program of a 68th aspect of an embodiment, the program allowing a computer to execute: a reading unit configured to read a common condition corresponding to a group to which an operating target vacuum pump belongs from a storage apparatus in which the common condition of an occurrence tendency of an abnormality data of a vacuum pump belonging to a setting group determined using an occurrence tendency of a first abnormality data detected from data of a state quantity of the vacuum pump belonging to the setting group of the vacuum pump is stored for each setting group; a detection unit configured to detect a second abnormality data from data of a state quantity of an operating target vacuum pump; and a comparison unit configured to compare the read common condition with an occurrence tendency of the detected second abnormality data.

According to this configuration, it is possible to compare the occurrence tendency of the abnormal state of the operating target vacuum pump with the common condition based on the occurrence tendency of the abnormal state of the past vacuum pump of the group to which the target vacuum pump belongs. Therefore, it is possible to diagnose the internal state of the pump from the abnormal state of the operating target vacuum pump.

Hereinafter, each embodiment will be described with reference to the drawings.

However, detailed descriptions more than necessary will be omitted. For example, detailed descriptions of already well-known matters and redundant descriptions on substantially the same configuration may be omitted. This is to avoid the unnecessary redundancy of the following description and to facilitate understanding by those skilled in the art.

First Embodiment

Figure 1:
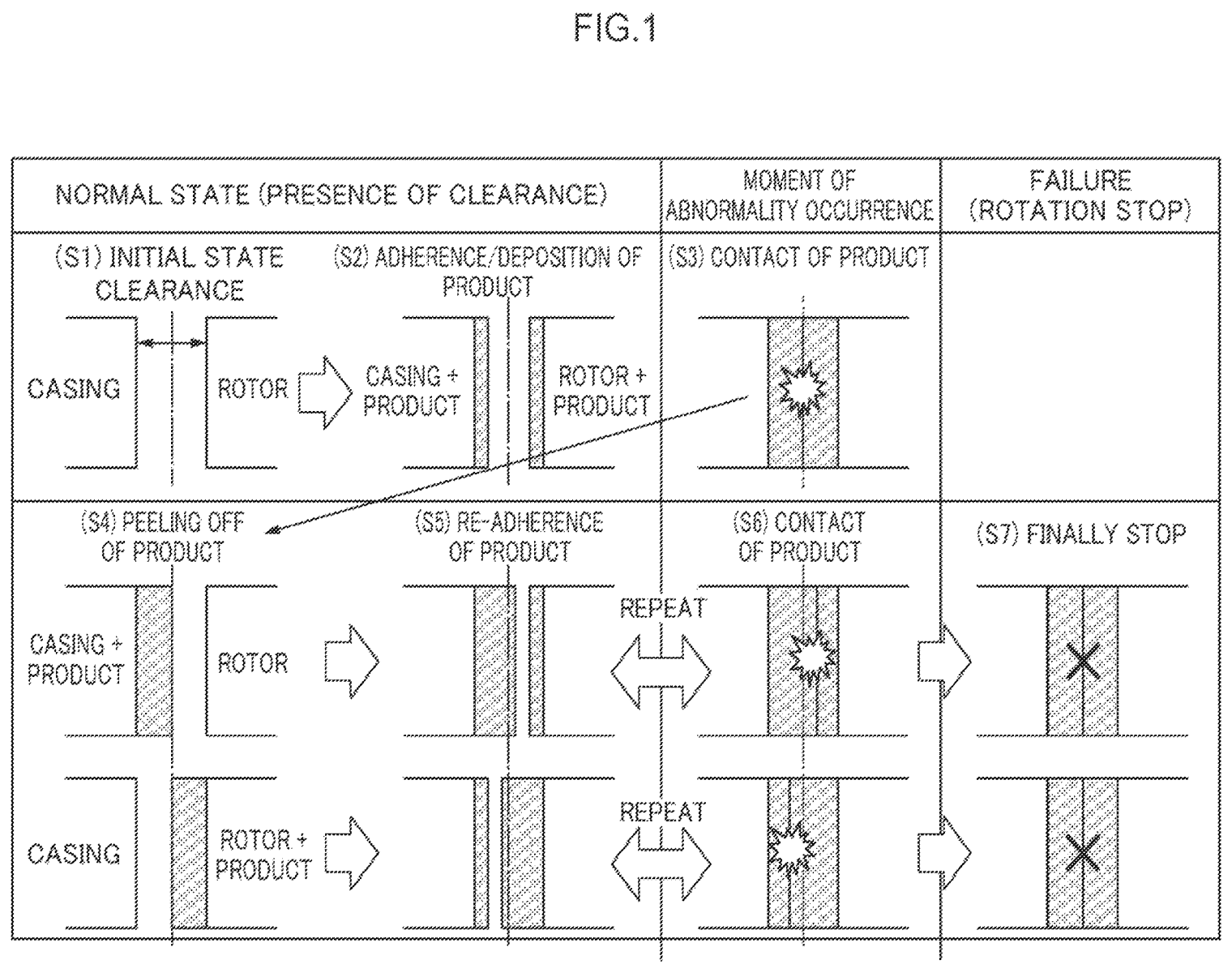

FIG. 1 is a schematic diagram showing an example from a normal state to a failure. As shown in FIG. 1, in an initial state S1, there is a clearance between a casing and a rotor of a vacuum pump. As the vacuum pump is used, products adhere to or are deposited on the casing and the rotor as shown in a state S2. Here, the normal state is a state in which the clearance exists between the casing and the rotor, and includes the initial state S1 and the state S2.

At the moment of abnormality occurrence, the products adhering to the casing and the rotor come into contact with each other as shown in a state S3. Due to the contact of the products, the products of the casing or the rotor are peeled off as shown in a state S4. Thereafter, as the vacuum pump is further used, more products adhere to or are deposited on the casing and the rotor as shown in a state S5. Next, as shown in a state S6, the products adhering to the casing and the rotor come into contact with each other. Thereafter, due to the contact of the products, the products of the casing or the rotor are partially peeled off as shown in the state S5. Thereafter, the state S5 and the state S6 are alternately repeated. Thereafter, even if the products adhering to the casing and the rotor come into contact with each other, when these products are not peeled off, the rotation of the rotor stops as shown in the state S7. When the rotation of the rotor stops, the vacuum pump abnormally stops, and thus it is determined that the vacuum pump has failed.

Figure 2:
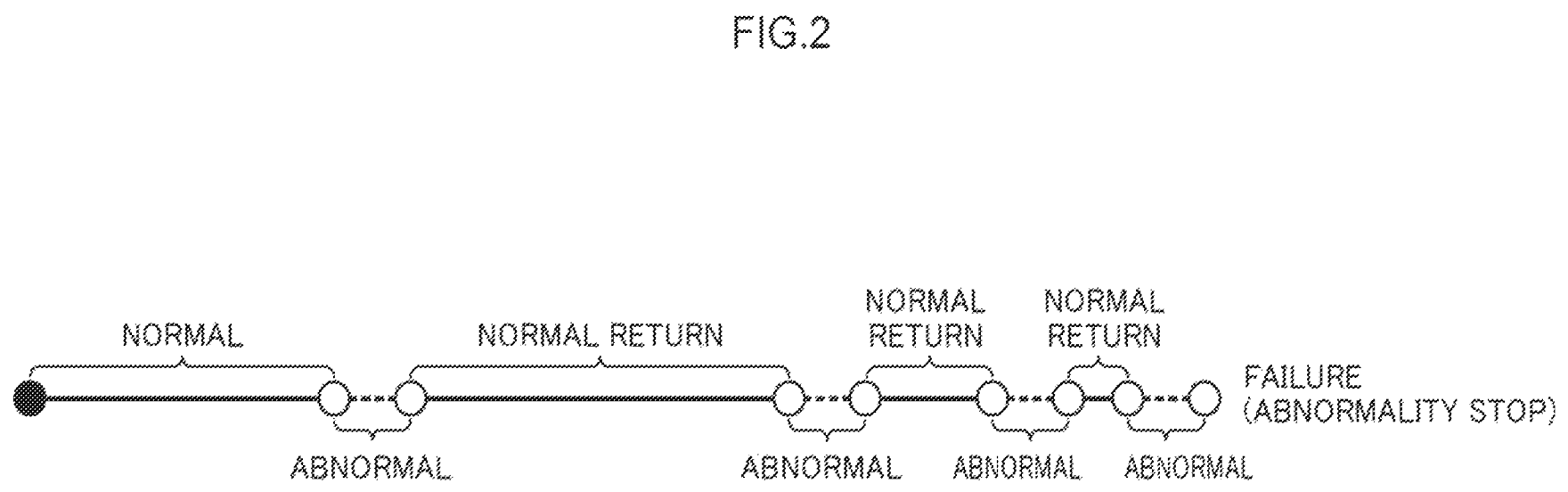

FIG. 2 is a schematic diagram showing a time transition from the normal state to the failure. As shown in FIG. 2, the vacuum pump alternately repeats the normal state and the abnormal state in which the products adhering to the casing and the rotor come into contact with each other while the operation continues. When the products are not peeled off even if the products adhering to the casing and the rotor come in contact with each other, the vacuum pump abnormally stops, and thus it is determined that the vacuum pump has failed.

In order to prevent articles from being damaged during a manufacturing process in a semiconductor manufacturing apparatus due to the stop of the vacuum pump due to the abnormality derived from products of the vacuum pump and, in the present embodiment, it is detected whether there is abnormality of the vacuum pump derived from products (for example, solidified or liquefied) produced within a target vacuum pump using a state quantity while the vacuum pump is continuously operated. Therefore, when the abnormality is detected while the target vacuum pump is continuously operated, the operation of the vacuum pump stops or the operation of the vacuum pump stops after a predetermined allowable period elapses from the detection, and thus maintenance or replacement of the vacuum pump can be made.

In this case, there is a new problem that it is difficult to discriminate a variation (abnormal variation) in the state quantity derived from the products solidified or liquefied in the vacuum pump and a variation (normal variation) in the state quantity due to other factors, while the target vacuum pump is continuously operated.

In order to cope with this problem, the present embodiment determines a normal variation range or a normal time variation behavior of a target state quantity as a target state quantity which is a state quantity varying depending on a load of gas flowing into the vacuum pump, based on at least one of a past target state quantity of the target vacuum pump or another vacuum pump. Here, the target state quantity is a target state quantity among the state quantities varying depending on a load of gas flowing into the vacuum pump. Here, the load of gas is a load varying depending on a gas type and a flow rate of gas. Then, the presence or absence of abnormality derived from the products is detected by comparing the current target state quantity of the target vacuum pump with the normal variation range or the normal time variation behavior. Here, the state quantity is the state quantity of the vacuum pump, and the target state quantity includes, for example, a driving current of a motor included in the vacuum pump, electric power of the motor, a revolutions per minute (RPM) of a rotor, a temperature of the vacuum pump, a pressure in the vacuum pump, a vibration frequency of the vacuum pump, and the like, and these measured values are used. Here, the normal time variation behavior means a normal behavior among temporal variations of the state quantity of the vacuum pump. Here, the current target state quantity is not only a target state quantity most recently obtained at the time of the comparison or the latest target state quantity at the time of the comparison, but also a target state quantity acquired later than the past target state quantity used at the time of determining the normal variation range or the normal time variation behavior of the target state quantity. That is, the past may be a time that is older than at the time of acquiring at least the current target state quantity, and the past target state quantity may be at least a target state quantity acquired at a time older than the current target state quantity.

Figure 3:
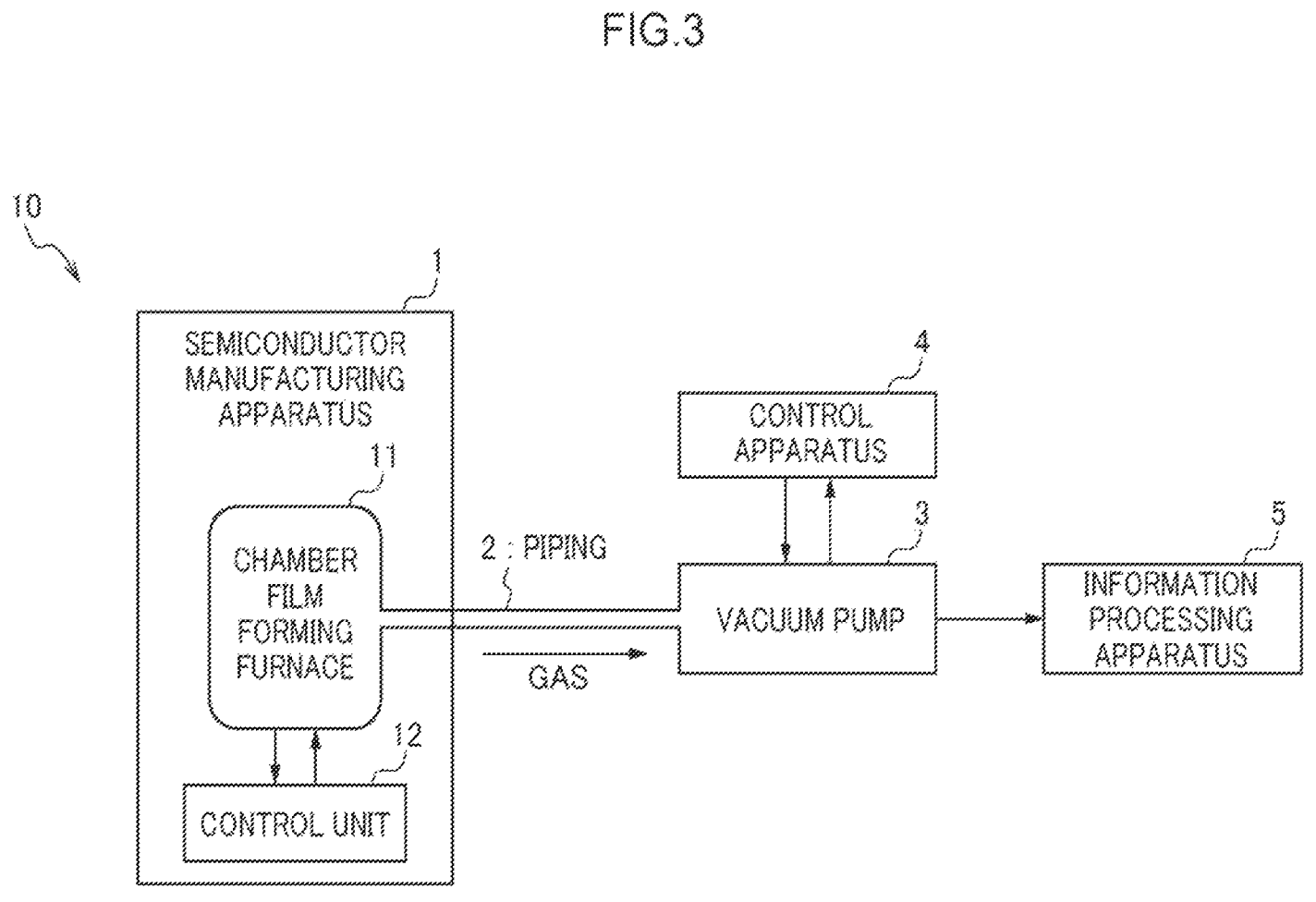

FIG. 3 is a schematic configuration diagram of a semiconductor manufacturing system 10 according to the present embodiment. As shown in FIG. 3, the semiconductor manufacturing system 10 according to the present embodiment includes a semiconductor manufacturing apparatus 1, a vacuum pump 3, a piping 2 connecting between the semiconductor manufacturing apparatus 1 and the vacuum pump 3, a control apparatus 4 controlling the vacuum pump 3, and the information processing apparatus 5. The semiconductor manufacturing apparatus 1 includes a chamber film forming furnace 11 and a control unit 12 controlling the chamber film forming furnace 11. The chamber film forming furnace 11 and the vacuum pump 3 communicate with each other via the piping 2, and gas in the chamber film forming furnace 11 is discharged by the operation of the vacuum pump 3 to make the chamber film forming furnace 11 into substantially a vacuum state. The vacuum pump 3 may include a roots type rotor or may include a screw type rotor. In addition, the vacuum pump 3 may be a claw type or scroll type vacuum pump. In addition, the vacuum pump 3 may be a single-stage pump or may be a multi-stage pump. The information processing apparatus 5 according to the present embodiment detects the presence or absence of abnormality derived from the solidified or liquefied products in the target vacuum pump 3.

FIG. 4 is a schematic structural diagram of the vacuum pump 3 according to the present embodiment. As shown in FIG. 4, the vacuum pump 3 includes a booster pump 31 communicating with the piping 2, a piping 32 communicating with a main pump 33, the booster pump 31, and the main pump 33, a piping 34 communicating with the main pump 33, and a pressure gauge 35 measuring the pressure in the vacuum pump 3. In the present embodiment, as one example, the pressure gauge 35 measures the pressure in the main pump 33.

The pressure gauge 35 may measure the pressure in the vacuum pump 3, and may be provided in the piping 2, the booster pump 31, and the piping 32, and may measure the pressure in the vacuum pump 3 at each position.

Figure 5:
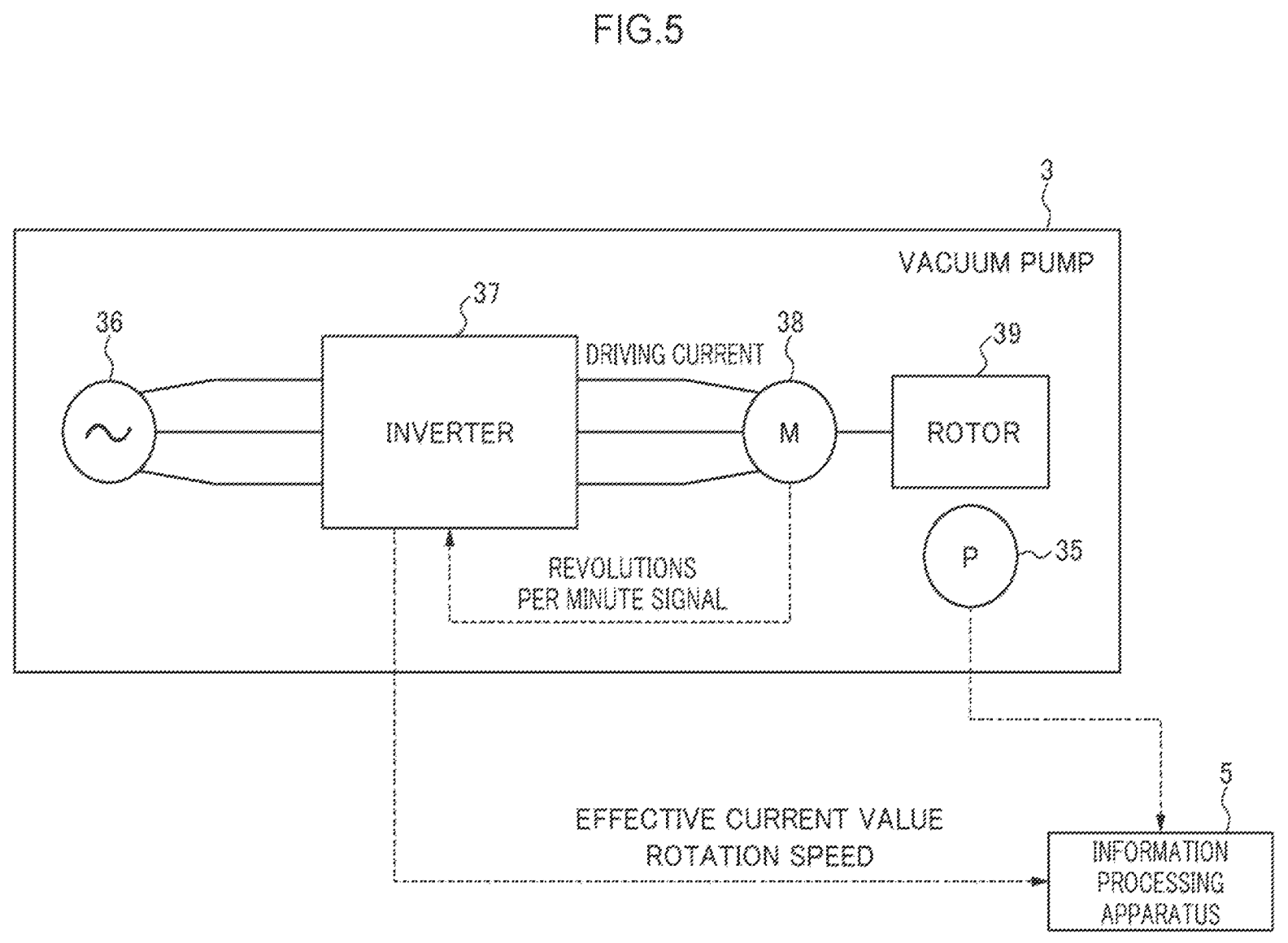

FIG. 5 is a schematic functional configuration diagram of the vacuum pump 3 according to the present embodiment. As shown in FIG. 5, the vacuum pump 3 includes a power supply 36, an inverter 37 whose input is connected to the power supply 36, a motor 38 whose input is connected to an output of the inverter 37, and a rotor 39 connected to a rotating shaft of the motor 38. In addition, as described above, the vacuum pump 3 includes the pressure gauge 35.

The inverter 37 performs a frequency conversion on an alternating current supplied from the power supply 36, and supplies a driving current obtained by the frequency conversion to the motor 38. As a result, the rotating shaft of the motor 38 is rotated by the driving current, and the rotor 39 is rotated accordingly, so that the gas sucked from the piping 2 is transferred to the booster pump 31, the piping 32, the main pump 33 in this order by the rotation of the rotor 39 and is discharged from the piping 34. In this way, by continuously transferring the gas from the piping 2 to the piping 34, the gas in the chamber film forming furnace 11 connected to the piping 2 is evacuated.

The motor 38 outputs an RPM signal indicating the RPM of the motor 38 to the inverter 37. The inverter 37 supplies an effective current value of the driving current and a rotational speed of the motor 38 obtained from the RPM speed signal to the information processing apparatus 5. In addition, the pressure value in the vacuum pump 3 measured by the pressure gauge 35 is supplied to the information processing apparatus 5.

Figure 6:
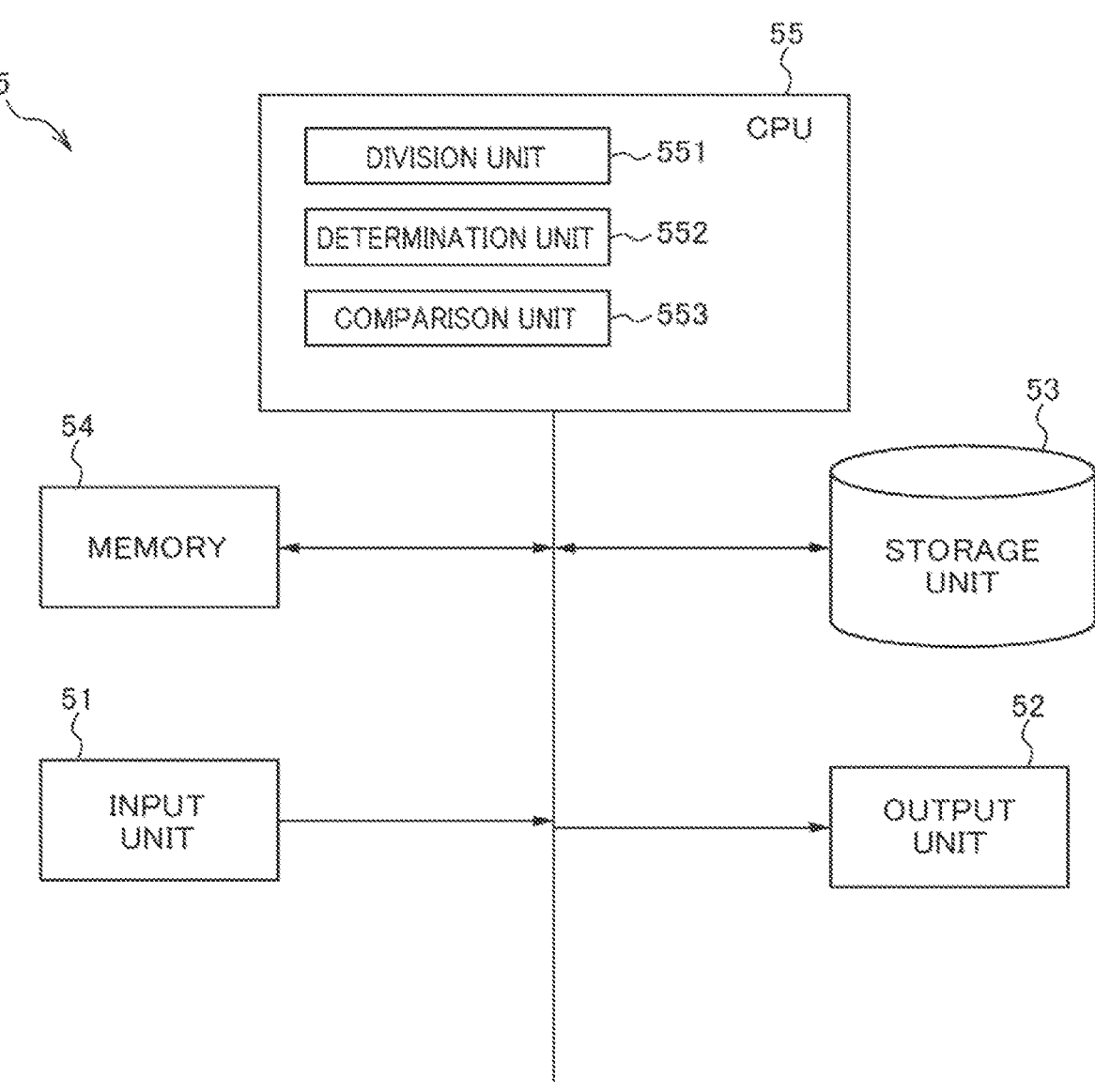
FIG. 6 is a schematic configuration diagram of an information processing apparatus 5 according to the present embodiment.

FIG. 6 is a schematic configuration diagram of the information processing apparatus 5 according to the present embodiment. As shown in FIG. 6, the information processing apparatus 5 includes an input unit 51, an output unit 52, a storage unit 53, a memory 54, and a central processing unit (CPU) 55.

The input unit 51 is connected to the inverter 37 and the pressure gauge 35, and the effective current value of the driving current, the rotation speed of the motor 38, and the pressure value in the vacuum pump 3 are input to the input unit 51. The output unit 52 outputs information according to a command from the CPU 55. A program to be executed by the CPU 55 is stored in the storage unit 53. The memory 54 temporarily stores information. A central processing unit (CPU) 55 reads and executes the program stored in the storage unit 53. Thus, the central processing unit (CPU) 55 functions as a division unit 551, a determination unit 552, and a comparison unit 553.

Figure 7:
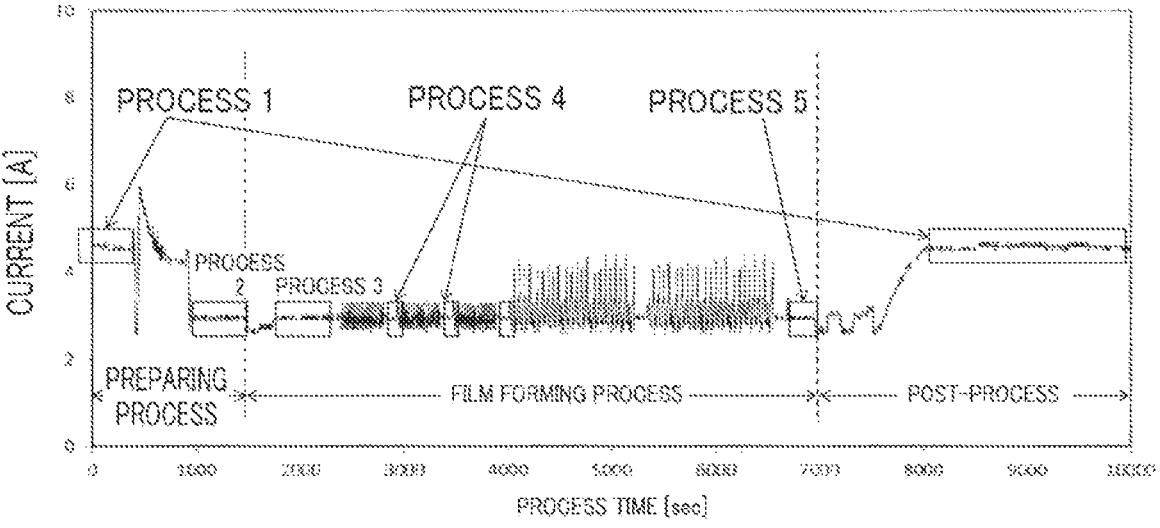
FIG. 7 is a graph showing an example of a time change in an effective current value of a driving current.

FIG. 7 is a graph showing an example of a time change in the effective current value of the driving current. As shown in FIG. 7, the semiconductor manufacturing process includes a preparing process, a film forming process of performing film formation, and post-processes. Among them, the preparing process and the post-processes include process 1, and the preparing process further includes process 2. The film forming process includes processes 3 to 5. In the present embodiment, as an example, a period in which a size of the target state quantity (here, the effective current value of the driving current as an example), a size of the variation, and/or a variation cycle is different is divided into different processes by the division unit 551. According to this configuration, it is possible to automatically divide the processes and to detect the presence or absence of abnormality derived from products for each divided process. Therefore, it is possible to reduce a labor of detecting the presence or absence of abnormality derived from the products.

Figure 8:
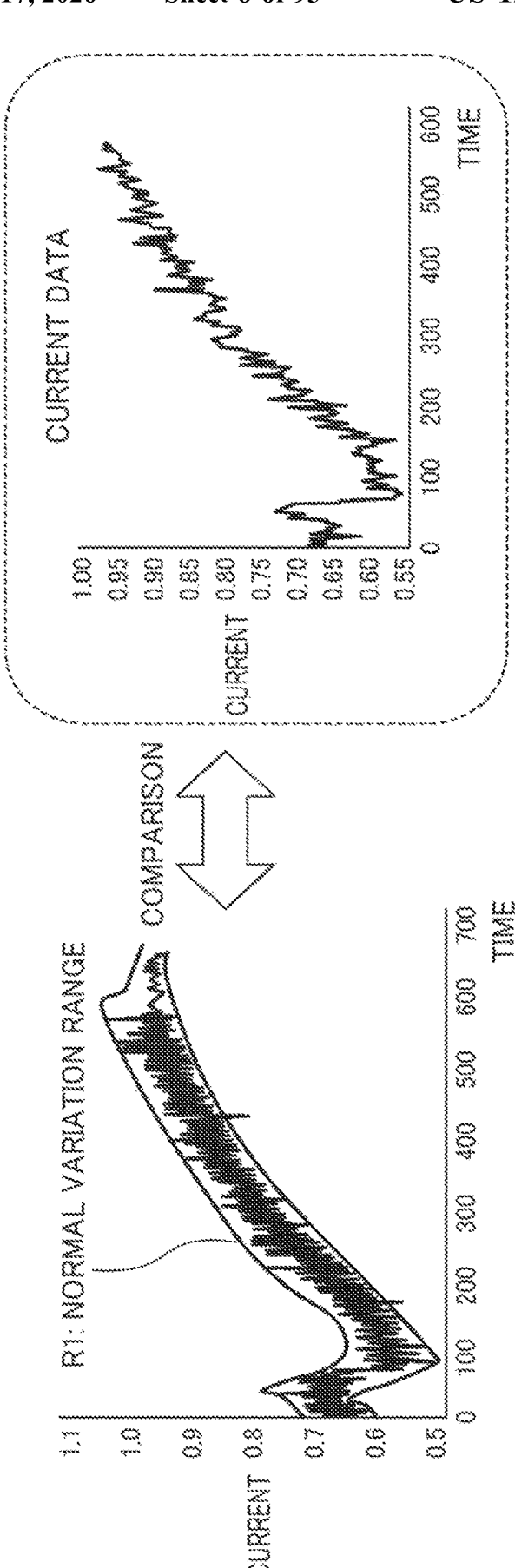
FIG. 8 is a schematic comparison diagram of a normal variation range with a current data in a certain process.

FIG. 8 is a schematic comparison diagram of a normal variation range with a current data in a certain process. On the left side of FIG. 8, a normal variation range R1 of the time change in the effective current value of the driving current in a certain process is represented on a graph. In addition, on the right side of FIG. 8, the graph of the time change in the effective current value of the current driving current is represented as current data.

The determination unit 552 determines the normal variation range or the normal time variation behavior of the target state quantity as the target state quantity (here, the effective current value of the driving current as an example) which is a state quantity varying depending on a load of gas flowing into the vacuum pump 3, based on at least a past target state quantity of the target vacuum pump.

The determination unit 552 determines the normal variation range or the normal time variation behavior of the target state quantity for each process based on the target information amount for each process corresponding to a predetermined number of times (for example, 10 times) after the target vacuum pump is operated. At this time, as shown in FIG. 8, the determination unit 552 determines the normal variation range (for example, normal variation range R1 of FIG. 8) of the time change or the normal time variation behavior (for example, rising, falling, convex shape, concave shape, and the like) of the current target state quantity of the target vacuum pump for each divided process (see FIG. 7).

At this time, the determination unit 552 may correct the past target state quantity based on the pressure in the target vacuum pump 3, and determine the normal variation range or normal time variation behavior using the corrected past target state quantity. At this time, the comparison unit 553 may correct the current target state quantity of the target vacuum pump 3 based on the pressure in the target vacuum pump 3 or the pressure in another vacuum pump, and compare the corrected target state quantity with the normal variation range or the normal time variation behavior. Specifically, since the target state quantity varies according to the load variation due to the amount of gas based on the pressure value in the target vacuum pump 3, the determination unit 552 corrects the past target state quantity to remove the variation. At this time, the comparison unit 553 may correct the current target state quantity of the target vacuum pump 3 based on the pressure value in the target vacuum pump 3, and compare the corrected target state quantity with the corrected normal variation range or the corrected normal time variation behavior. According to this configuration, it is possible to correct the change in the target state quantity (for example, current value) due to the pressure and judge to be abnormal when the corrected target state quantity deviates from the normal variation range or the normal time variation behavior. Therefore, it is possible to improve the judgment accuracy.

The comparison unit 553 compares the current target state quantity of the target vacuum pump with the normal variation range or the normal time variation behavior and outputs the comparison result. In the present embodiment, as an example, the normal variation range is a variation range of the time change in the target state quantity in the normal state, and the comparison unit 553 compares the time change in the current target state quantity of the target vacuum pump 3 with the variation range of the time change in the target state quantity in the normal state. By comparing the time changes with each other in this way, it is possible to detect the presence or absence of abnormality derived from products. Therefore, it is possible to improve the detection accuracy of the presence or absence of abnormality derived from products.

Specifically, for example, as shown in FIG. 8, the comparison unit 553 compares the time change in the current target state quantity of the target vacuum pump 3 with the normal variation range or the normal time variation behavior of the time change in the target state quantity, for each corresponding process. For example, the comparison unit 553 compares the time change in the current target state quantity of the target vacuum pump 3 with the normal variation range of the time change in the target state quantity, for each divided process (see FIG. 7). As shown in FIG. 8, in the present embodiment, the normal variation range of the time change in the target state quantity is, for example, the normal variation range (for example, the normal variation range R1 in FIG. 8) of the time change in the effective value of the driving current, and the comparison unit 553 compares the time change in the current target state quantity of the target vacuum pump 3 with the normal variation range of the time change in the effective value of the driving current.

In the example of FIG. 8, the comparison unit 553 compares the time change in the normal variation range R1 of FIG. 8 with the time change in the effective current value of the current driving current, and determines to be normal when the time change in the effective current value of the current driving current falls within the normal variation range R1. For example, the comparison unit 553 outputs data determined to be abnormal derived from the solidified or liquefied products in the target vacuum pump 3, and stores the data in the storage unit 53. As a result, the manager of the vacuum pump 3 can grasp the data determined to be abnormal.

Figure 9:
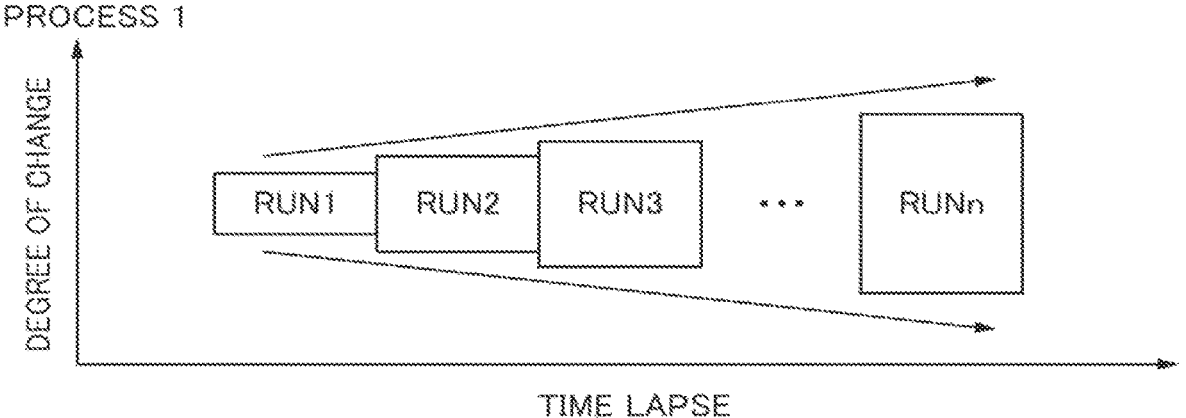
FIG. 9 is a schematic diagram of an example of a time course of a degree of change in the effective current value of the driving current in process 1.

FIG. 9 is a schematic diagram of an example of a time course of a degree of change in the effective current value of the driving current in process 1. Each rectangle in FIG. 9 represents the 1st to n-th processes, and a length in a longitudinal direction of each rectangle is the degree of change in the effective current value of the driving current. In FIG. 9, the degree of change in the effective current value of the driving current is sequentially increased whenever the number of times (the number of times of RUN) in process 1 is passed. At this time, the comparison unit 553 may judge that there is the abnormality derived from products when there is a tendency that the degree of change in the target state quantity (here, as an example, the effective current value of the driving current) repeats for each process. In this way, the comparison unit 553 may judge the presence or absence of abnormality derived from products based on the degree of change in the target state quantity for each process in the semiconductor manufacturing apparatus 1. By doing so, it is possible to detect the presence or absence of abnormality derived from products.

Figure 10:
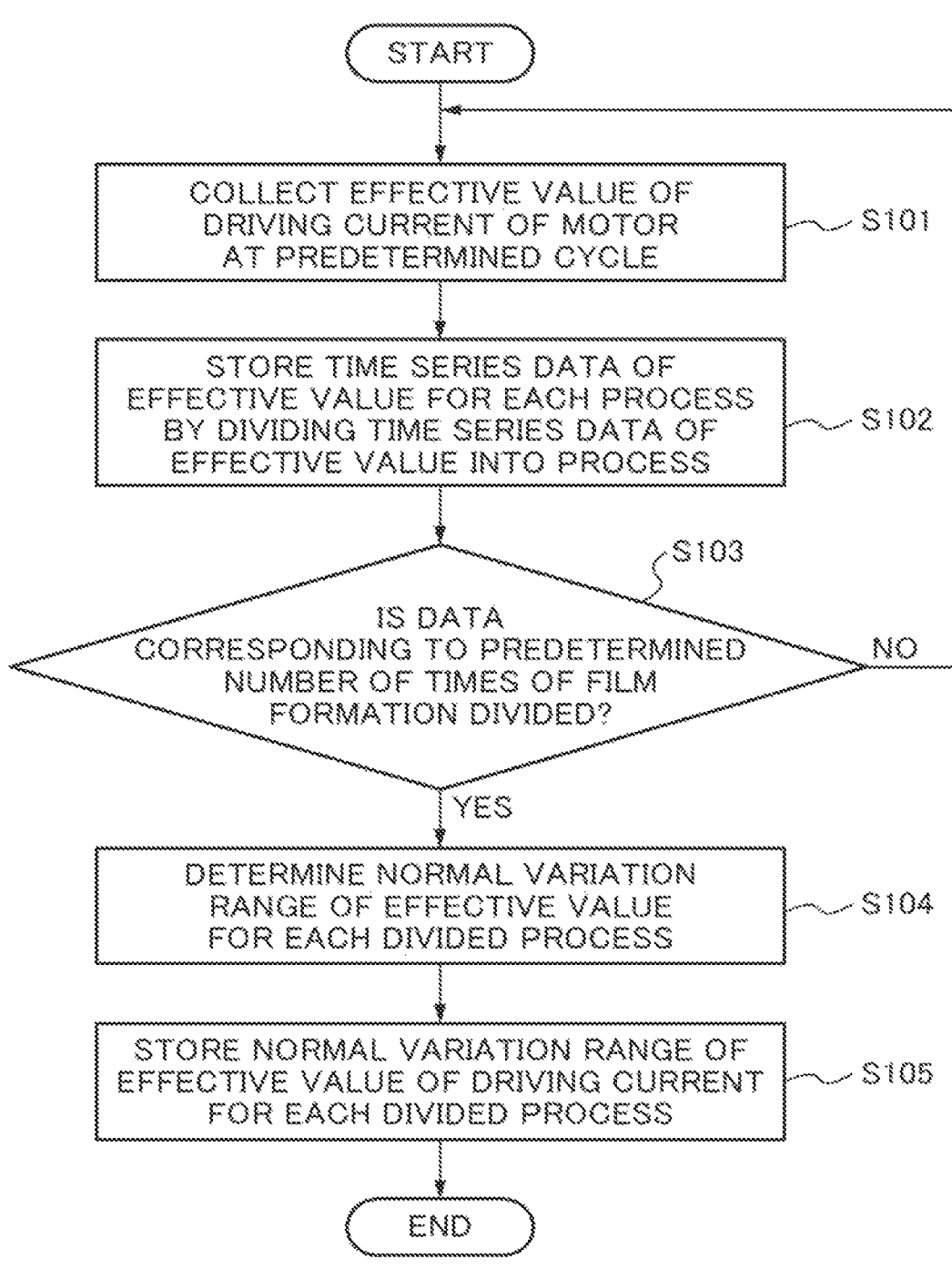
FIG. 10 is a flowchart showing an example of processing of determining a normal variation range.

Subsequently, the processing of detecting the presence or absence of abnormality derived from products will be descried with reference to FIGS. 10 and 11. FIG. 10 is a flowchart showing an example of the processing of determining the normal variation range.

The processing of FIG. 10 is performed automatically, for example, after the operation of the vacuum pump 3.

First, the CPU 55 collects the effective value of the driving current of the motor 38 at the predetermined cycle and stores the collected effective value in the storage unit 53 (step S101).

Next, the division unit 551 divides time series data of the effective value of the driving current into processes and stores the divided data in the storage unit 53 for each process (step S102). At this time, for example, the division unit 551 is divided into processes constituting a film forming process (wafer loading/unloading).

Next, the CPU 55 judges whether to divide data corresponding to the predetermined number of times of film formation (step S103).

In the case where the data corresponding to the predetermined number of times of film formation are divided in step S103, the determination unit 552 performs statistical processing on data for each process and determines the normal variation range for each time of the effective value of the driving current, for each divided process (step S104). Here, the normal variation range includes the normal variation range.

Next, the determination unit 552 stores the normal variation range of the effective value of the driving current in the storage unit 53 for each divided process (step S105).

Figure 11:
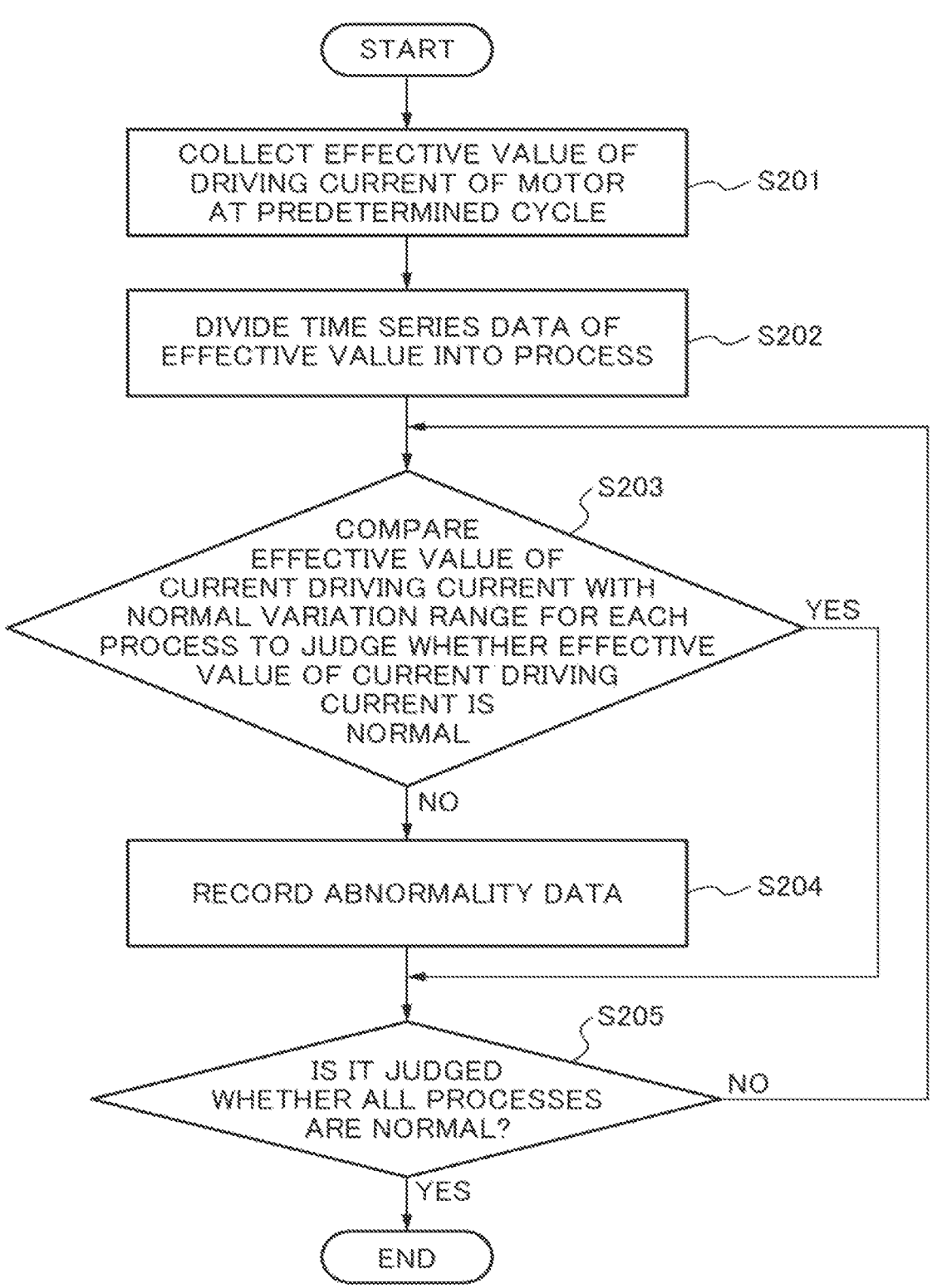
FIG. 11 is a flowchart showing an example of processing of detecting presence or absence of abnormality derived from products.

FIG. 11 is a flowchart showing an example of processing of detecting the presence or absence of abnormality derived from products. The processing in FIG. 11 is performed after the processing in FIG. 10 is completed.

First, the CPU 55 collects the effective value of the driving current of the motor 38 at the predetermined cycle (step S201).

Next, the division unit 551 divides the time series data of the effective value of the driving current into processes (step S202).

Next, the comparison unit 553 compares the effective value of the current driving current with the normal variation range and judges whether the effective value of the current driving current is normal, for each process (step S203). At this time, for example, data deviating from the normal variation range of the time change in the effective value of the driving current, data different from the normal time variation behavior (for example, rising, falling, convex shape, concave shape, or the like) of the effective value of the driving current within the divided processes, and spike data (instantaneous variation data) exceeding the preset normal variation range are judged to be abnormal.

If it is judged in step S203 that the effective value of the current driving current is abnormal (not normal), the comparison unit 553 records abnormality data in the storage unit 53 (step S204).

Next, it is judged whether all processes are normal (step S205). First, if it is not judged for all the processes, processings in steps S203 and S204 are executed for the next process. On the other hand, if it is judged whether or not all the processes are normal, the processing of this flowchart ends.

As described above, the information processing apparatus 5 according to the present embodiment detects the presence or absence of abnormality derived from the solidified or liquefied products in the target vacuum pump 3. The determination unit 552 determines the normal variation range of the target state quantity as the target state quantity which is the state quantity varying depending on the load of gas flowing into the vacuum pump 3, based on at least one past target state quantity of the target vacuum pump 3. The comparison unit 553 compares the current target state quantity of the target vacuum pump 3 with the normal variation range and outputs the comparison result.

According to this configuration, the normal variation range or the normal time variation behavior of the target state quantity due to factors other than the products is determined, so that it is possible to detect the abnormality due to the factors of products by comparing the normal variation range or the normal time variation behavior with the current target state quantity during the operation of the vacuum pump 3. Therefore, it is possible to detect the presence or absence of abnormality derived from the solidified or liquefied products in the target vacuum pump 3 during the operation period before the operation of the vacuum pump 3 stops once. By doing so, it is possible to predict the situation in which the vacuum pump 3 stops due to the abnormality derived from products of the vacuum pump 3 at an arbitrary timing while the vacuum pump 3 is continuously operated and to reduce the possibility of damaging articles during the manufacturing process in the semiconductor manufacturing apparatus 1.

In the present embodiment, the target state quantity, which is the state quantity varying depending on the load of gas flowing into the vacuum pump 3, is the effective value of the driving current driving the motor 38 included in the target vacuum pump 3, but is not limited to the effective value and may be other current values such as a peak value, an average value, and a median value. In addition, the target state quantity is not limited to the current, and may be the measurement values of the RPM of the motor 38, the power of the motor 38, the RPM of the rotor 39, the temperature of the vacuum pump 3, the vibration of the vacuum pump 3, and the like.

In addition, in the present embodiment, the determination unit 552 determines the normal variation range for one target state quantity (for example, the effective value of the driving current), but may determine the normal variation range for a plurality of target state quantities without being limited thereto. In this case, the comparison unit 553 compares each of the plurality of normal variation ranges with the current target state quantity of the target vacuum pump 3 corresponding thereto, and even if the number of current target state quantities of the target vacuum pump 3 is one, may judge to be abnormal when the current target state quantity is not included in the corresponding normal variation range, and output and/or record abnormality data.

In addition, in the present embodiment, the determination unit 552 determines the normal variation range of the target state quantity as the target state quantity which is the state quantity varying depending on the load of gas flowing into the vacuum pump 3, based on at least one past target state quantity of the target vacuum pump 3, but the present embodiment is not limited thereto. The determination unit 552 may determine the normal variation range of the target state quantity using at least one past target state quantity of another vacuum pump. Here, another vacuum pump has substantially the same specification as the target vacuum pump. The fact that the specifications are substantially the same as those of the target vacuum pump means, for example, the same model, and means different models but the same or substantially the same specifications.

In addition, the division unit 551 may divide a period, in which the gas type and the flow rate of gas used during the process in the semiconductor manufacturing apparatus 1 with which the target vacuum pump communicates, into different processes. Even in this case, the determination unit 552 may determine the normal variation range of the current target state quantity of the target vacuum pump for each divided process, and the comparison unit 553 may compare the current target state quantity of the target vacuum pump with the normal variation range for each divided process.

In addition, the determination unit 552 may determine the normal variation range of the target state quantity which is the state quantity varying depending on the load of gas flowing into the vacuum pump 3 based on recipe information on the process of the semiconductor manufacturing apparatus 1 with which the target vacuum pump 3 communicates. Even in this case, the comparison unit 553 may compare the current target state quantity of the target vacuum pump 3 with the normal variation range and output the comparison result.

According to this configuration, it is possible to detect the presence or absence of abnormality derived from the solidified or liquefied products in the target vacuum pump 3 during the operation period before the operation of the vacuum pump 3 stops once. By doing so, it is possible to predict the situation in which the vacuum pump 3 stops due to the abnormality derived from products of the vacuum pump 3 at an arbitrary timing while the vacuum pump 3 is continuously operated and reduce the possibility of damaging articles during the manufacturing process in the semiconductor manufacturing apparatus 1.

It is to be noted that the information processing system including a plurality of apparatuses may process each processing of the information processing apparatus 5 by the plurality of apparatuses in a distributed manner. In addition, in the present embodiment, the control apparatus 4 and the information processing apparatus 5 are described as separate apparatuses, but the control apparatus 4 may be configured to include the information processing apparatus 5. In addition, a program for executing each processing of the information processing apparatus according to the present embodiment is recorded in a computer-readable recording medium, the program recorded on the recording medium is read by the computer system, and the processor is executed to perform the above-described various processes related to the information processing apparatus according to the present embodiment.

Second Embodiment

Next, a second embodiment will be described. FIG. 12 is a schematic configuration diagram of a semiconductor manufacturing system 10b according to the second embodiment. Elements in common with FIG. 1 are denoted by common numbers, and a detailed description thereof will be omitted. Comparing with the semiconductor manufacturing system 10 according to the first embodiment, the semiconductor manufacturing system 10b according to the second embodiment further includes an abatement apparatus 7 for treating an exhaust gas of a vacuum pump 3 and a piping 6 connecting between the vacuum pump 3 and the abatement apparatus 7. The abatement apparatus 7 is connected to the semiconductor manufacturing apparatus 1 via a signal line, and a film formation start signal indicating a film formation start is input from the semiconductor manufacturing apparatus 1. The vacuum pump 2 is connected to the abatement apparatus 7 via the signal line, and the film formation start signal is input from the abatement apparatus 7. In addition, the vacuum pump 3 is provided with a gas sensor 8 which measures a concentration of a specific gas (for example, nitrogen) in the vacuum pump 3. In addition, in the semiconductor manufacturing system 10b according to the second embodiment, the information processing apparatus 5 according to the first embodiment is changed to an information processing apparatus 5b, and the processing contents thereof are different.

The inventors of the present application have found that a pump state judgment criterion for judging a failure possibility or operation continuation possibility is determined using a statistical value (for example, the accumulated value of the number of times of abnormality occurrence or the accumulated value of the abnormality occurrence frequency) of a target parameter (for example, the number of times of abnormality occurrence or an abnormality occurrence frequency) related to the number of times of abnormality occurrence, and a judgment accuracy on the failure possibility or the operation continuation possibility can be improved by comparing the statistic value of the target parameter during operation with the pump state judgment criterion.

Figure 13:
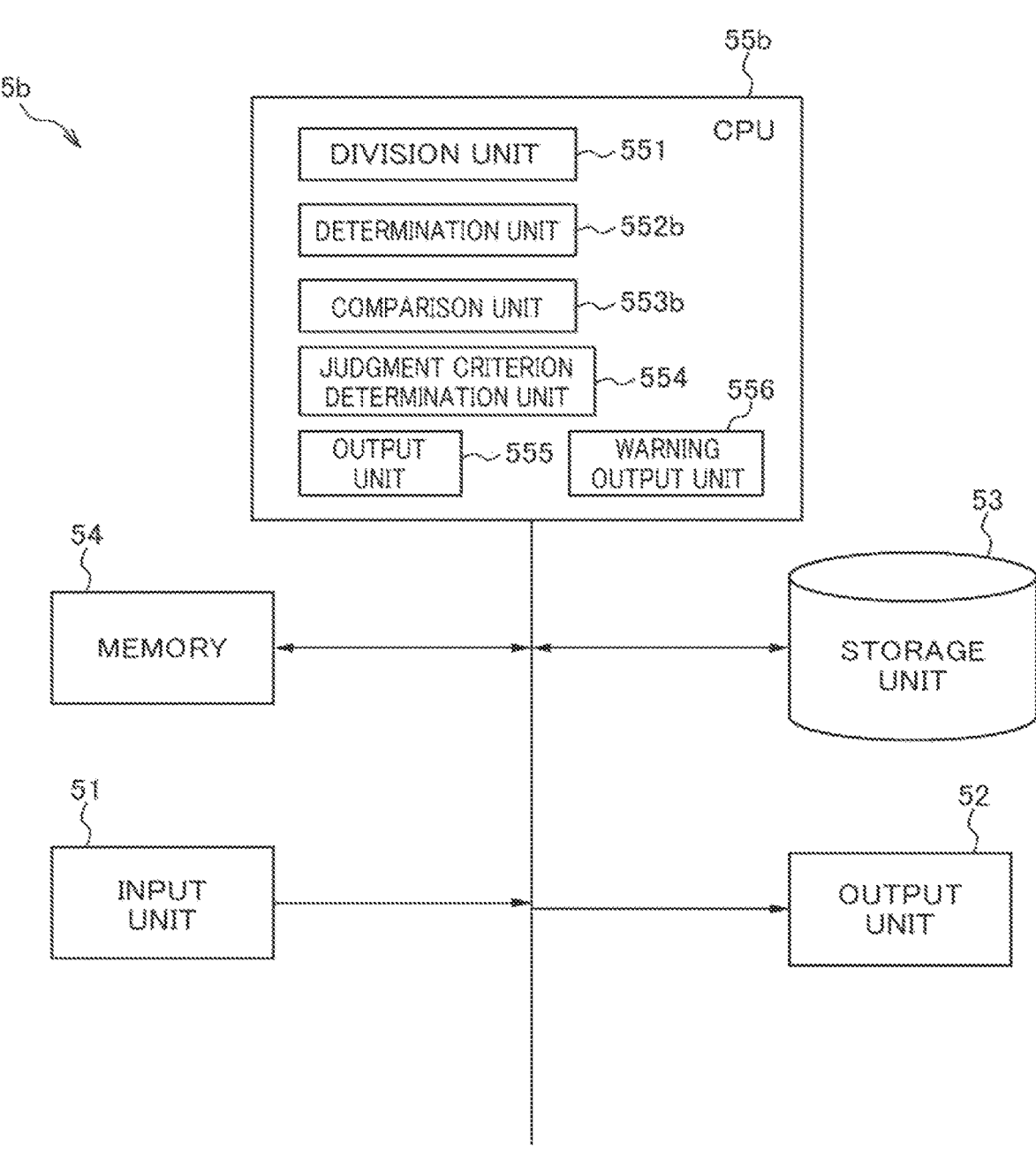
FIG. 13 is a schematic configuration diagram of an information processing apparatus 5b according to the second embodiment.

Hereinafter, the information processing apparatus 5b according to the second embodiment mounted for the processing will be described with reference to FIG. 13. FIG. 13 is a schematic configuration diagram of the information processing apparatus 5b according to the second embodiment. As shown in FIG. 13, the information processing apparatus 5b according to the second embodiment is different from the information processing apparatus 5 according to the first embodiment in that the CPU 55 is changed to a CPU 55b. Specifically, the CPU 55b functions as a division unit 551, a determination unit 552b, a comparison unit 553b, a judgment criterion determination unit 554, an output unit 555, and a warning output unit 556 by reading and executing a program from the storage unit 53.

Figure 14:
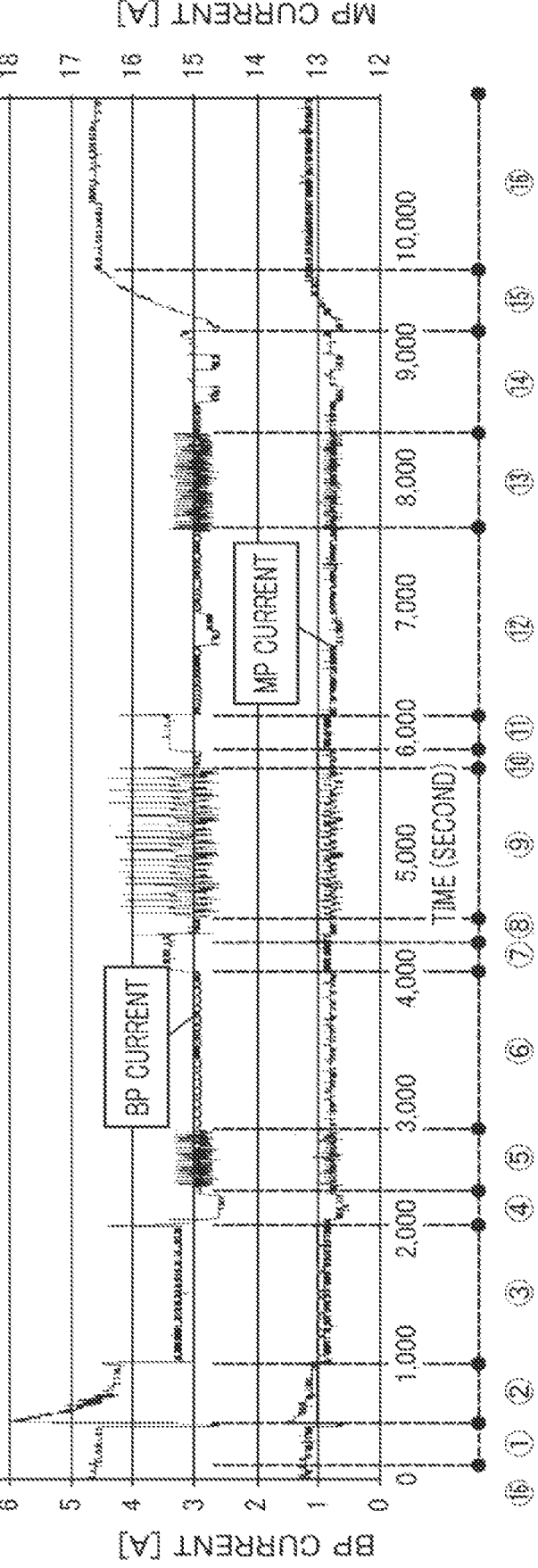
FIG. 14 is a graph showing an example of a time change in a BP current and an MP current.

FIG. 14 is a graph showing an example of a time change in a current (BP current) of a booster pump and a current (MP current) of a main pump. As shown in FIG. 14, the BP current and the MP current are divided into 16 processes by the division unit 551. As described above, a target state quantity is a target state quantity among state quantities varying depending on a load of gas flowing into the vacuum pump. Hereinafter, as an example, the target state quantity will be described as a current of a booster pump in the present embodiment. Here, the load of gas is a load varying depending on a gas type and a flow rate of gas.

Figure 15:
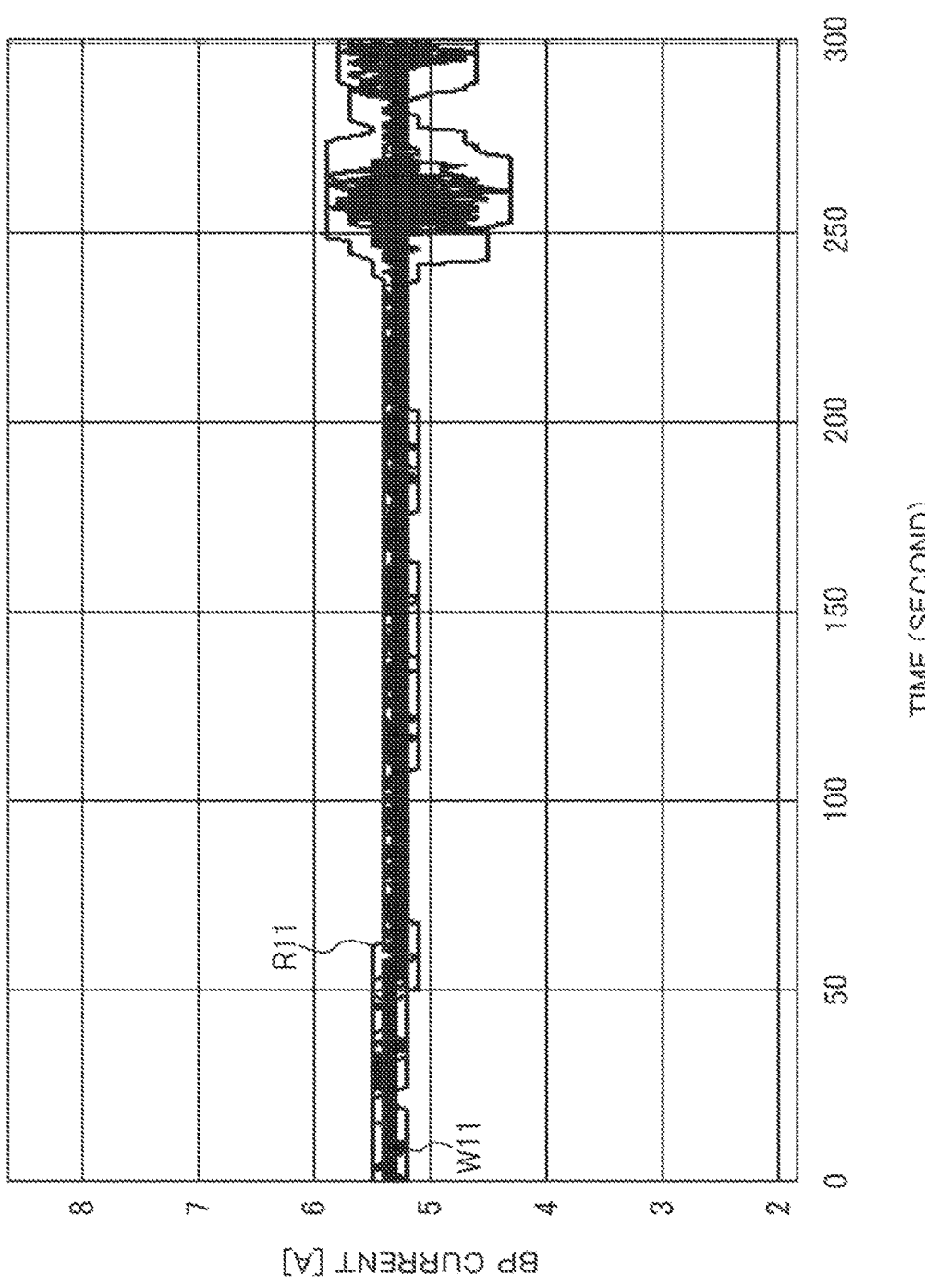
FIG. 15 is a graph showing an example of a time change in a current of a booster pump (BP current) and a current of a main pump (MP current).

FIG. 15 is a graph showing an example of a normal variation range of the BP current in a specific process. FIG. 15 shows a graph W11 showing a time change in the BP current in a specific process after the BP current is divided by the division unit 551 for each process, and a normal variation range R11 of the BP current. The normal variation range R11 is determined by the determination unit 552b.

At this time, the determination unit 552b determines the normal variation range of the target state quantity for each process using a past target state quantity of the target vacuum pump or a past target state quantity of another vacuum pump as the target state quantity which is the state quantity varying depending on the load of gas flowing into the vacuum pump. Here, another vacuum pump has a vacuum pump other than the target vacuum pump.

Figure 16:
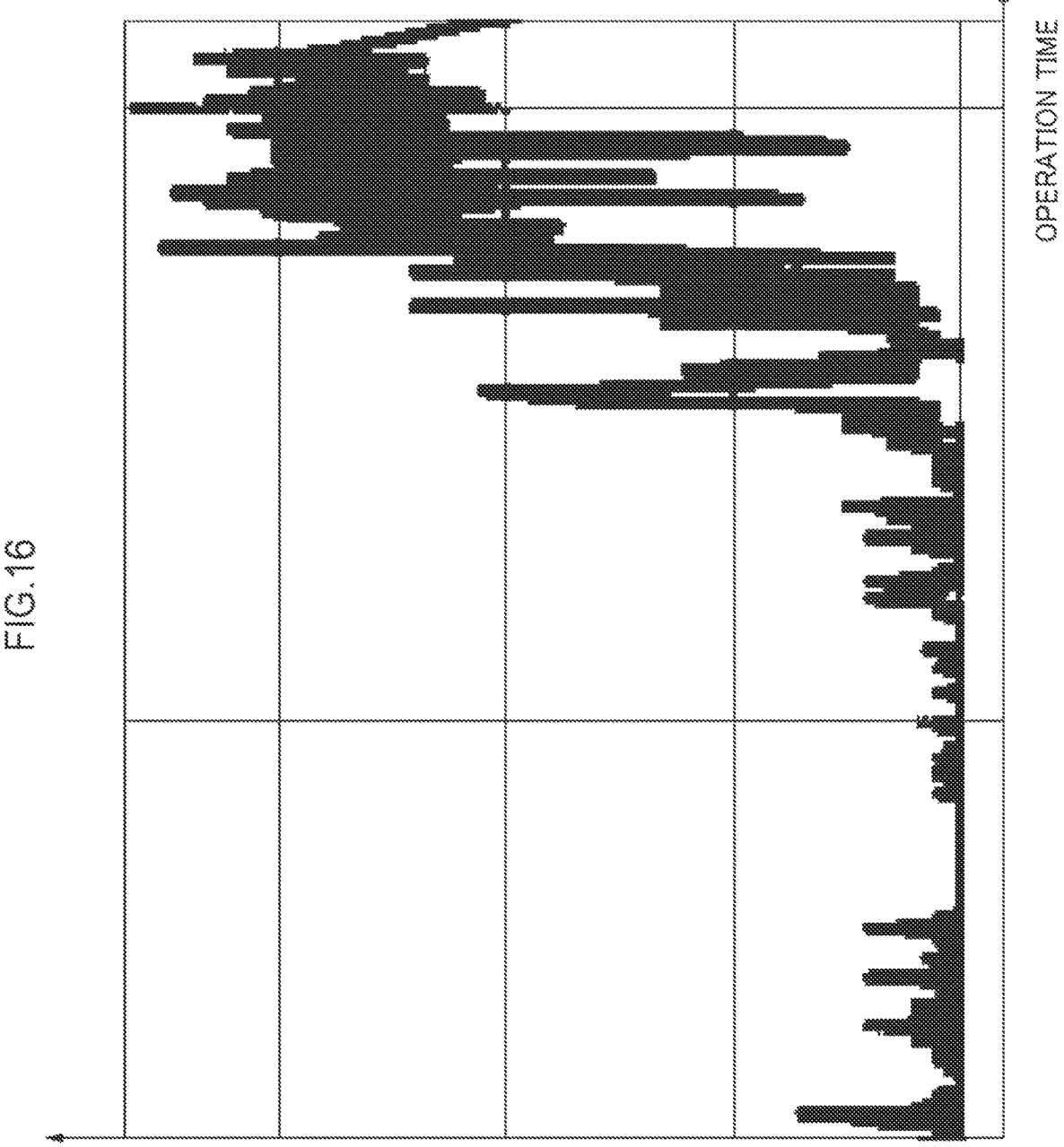
FIG. 16 is a graph showing an example of a time change in the number of times of abnormality occurrence in a specific process of a failed pump.

FIG. 16 is a graph showing an example of a time change in the number of times of abnormality occurrence in a specific process of a failed pump. As shown in FIG. 16, the number of times of abnormality occurrence tends to rapidly increase immediately before failure.

Figure 17:
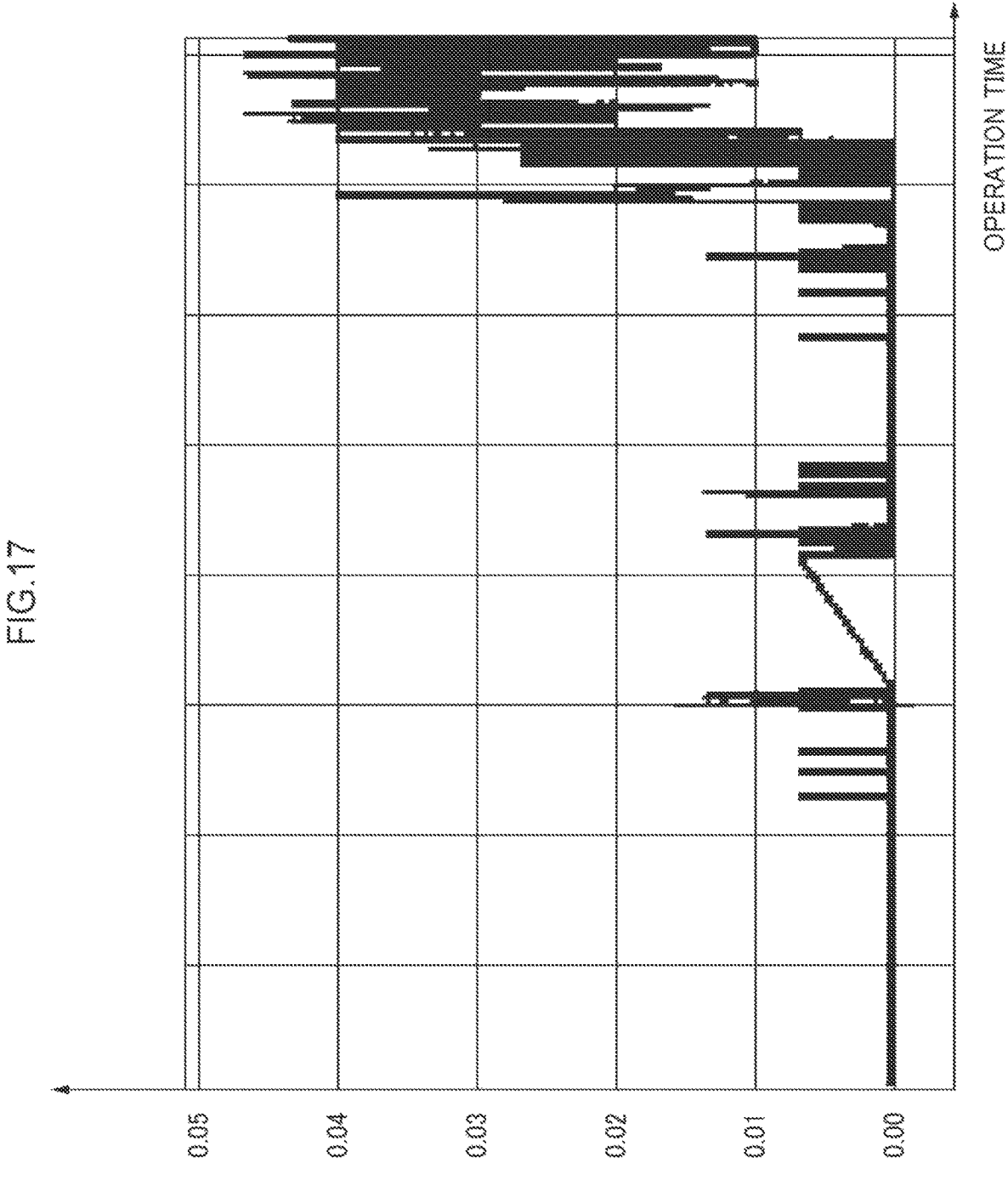
FIG. 17 is a graph showing an example of a time change in the accumulated number of times of abnormality occurrence of the failed pump in all processes.

FIG. 17 is a graph showing an example of a time change in an abnormality occurrence frequency in a specific process of a failed pump. Here, the abnormality occurrence frequency is a value obtained by dividing the number of times of abnormality occurrence in the specific process by a time in the specific process. As shown in FIG. 17, the abnormality occurrence frequency tends to rapidly increase immediately before failure.

Figure 18:
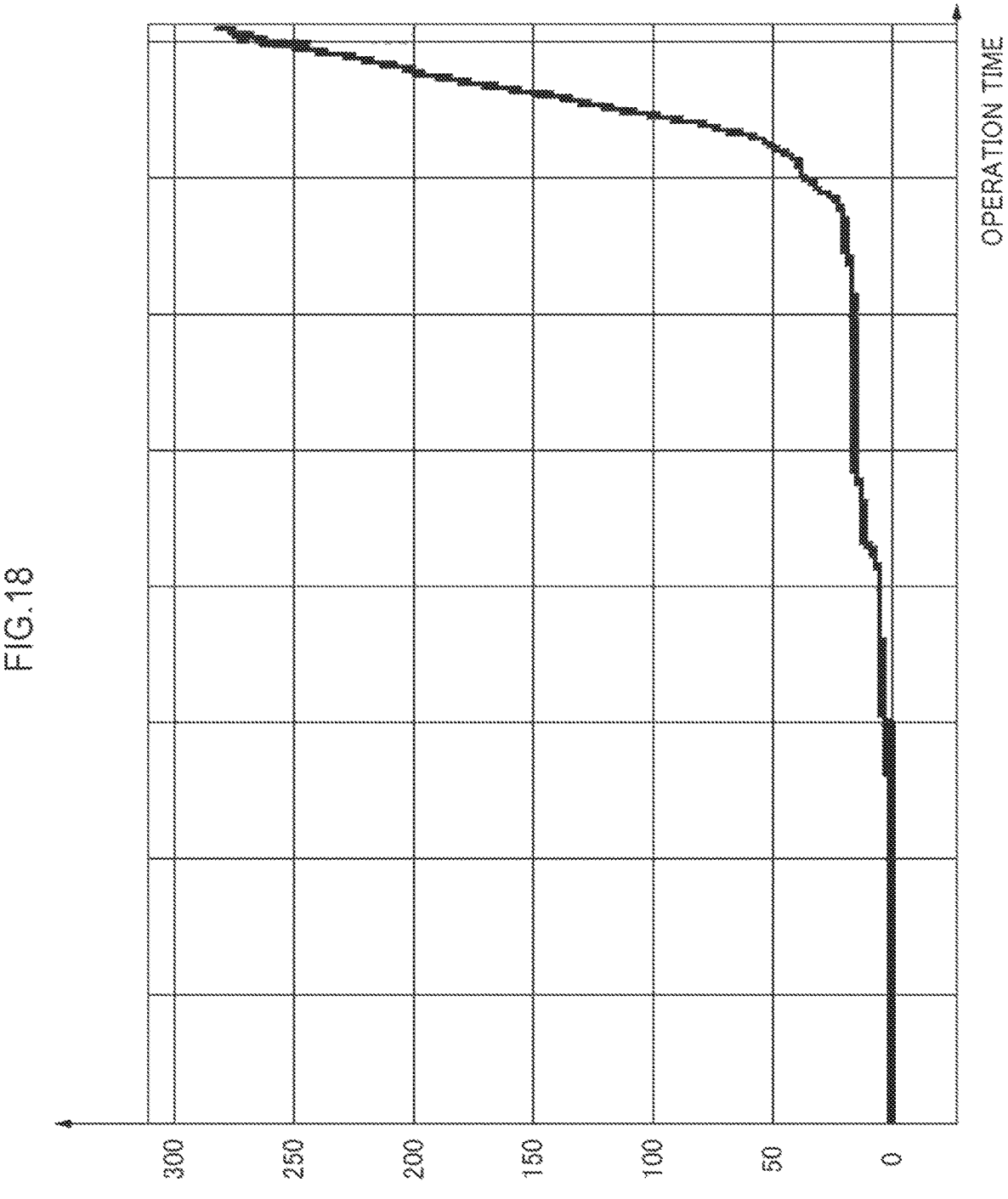
FIG. 18 is a graph showing an example of a time change in the accumulated number of times of abnormality occurrence of the failed pump in all processes.

FIG. 18 is a graph showing an example of a time change in the accumulated number of times of abnormality occurrence of the failed pump in all processes. Here, the accumulated number of times of abnormality occurrence in all the processes is the accumulation of the number of times of abnormality occurrence over all processes. As shown in FIG. 18, the number of times of abnormality occurrence in all processes tends to rapidly increase immediately before failure.

Figure 19:
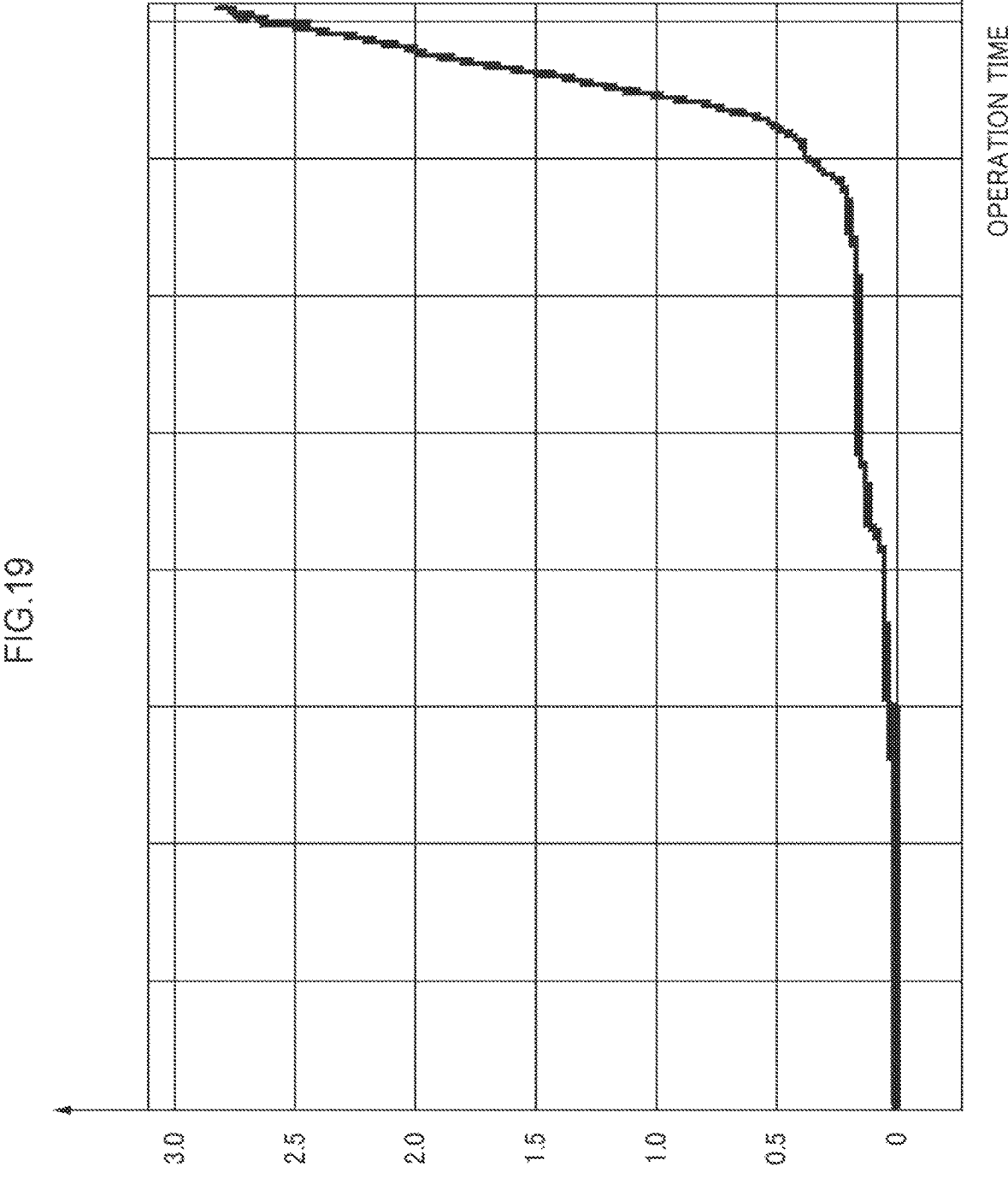
FIG. 19 is a graph showing an example of a time change in an accumulated value of an abnormality occurrence frequency of the failed pump in all processes.

FIG. 19 is a graph showing an example of a time change in the accumulated value of the abnormality occurrence frequency of the failed pump in all processes. Here, the accumulated value of the abnormality occurrence frequency in all the processes is the accumulation of the abnormality occurrence frequency over all processes. As shown in FIG. 19, the accumulated value of the abnormality occurrence frequency in all processes tends to rapidly increase.

Figure 20:
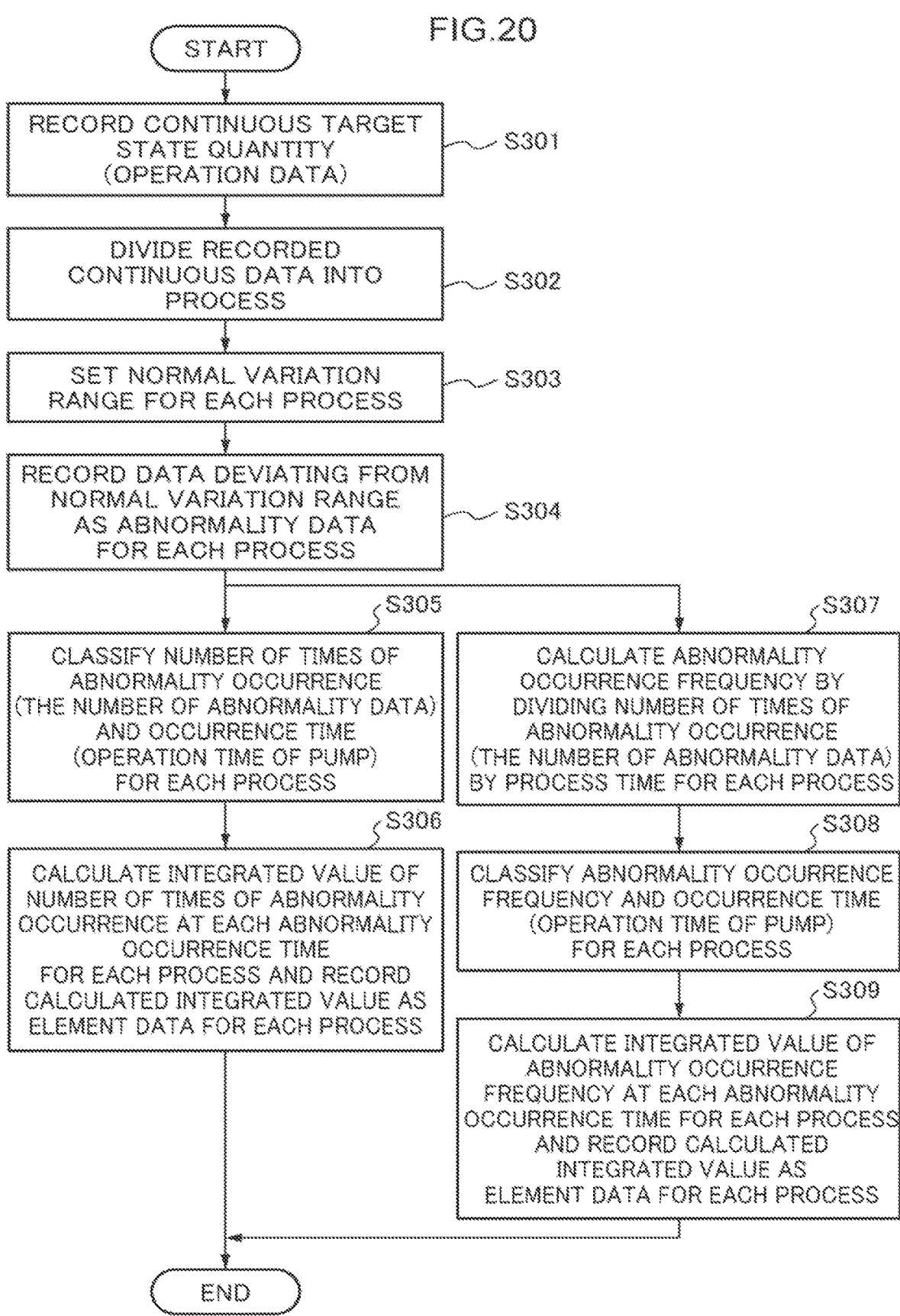
FIG. 20 is a flowchart showing a flow of creation of element data for each process.

Subsequently, a flow of creation of element data for each process will be described with reference to FIG. 20. FIG. 20 is a flowchart showing a flow of creation of the element data for each process.

First, the CPU 55b records a continuous target state quantity (operation data) in the storage unit 53 (step S301).

Next, the division unit 551 divides the recorded continuous data into processes (step S302). In this way, the division unit 551 divides a past target state quantities of another vacuum pump for each process. The division unit 551 divides a past target state quantities of a target vacuum pump for each process.

Next, the determination unit 552b sets a normal variation range for each divided process (step S303).

Next, the comparison unit 553 compares the target state quantity of the operating target vacuum pump with the normal variation range for each process to detect abnormality data deviating from the normal variation range (step S304). The comparison unit 553 records data deviating from the normal variation range as the abnormality data in the storage unit 53 for each process. Hereinafter, steps S105 and S106 and steps S107 to S109 are executed in parallel.

The comparison unit 553 classifies the number of times of abnormality occurrence (the number of abnormality data) and an occurrence time (pump generation time) for each process (step S305).

Next, the comparison unit 553 calculates the integrated value of the number of times of abnormality occurrence at each abnormality occurrence time for each process, and records the calculated integrated value in the storage unit 53 as element data for each process (step S306).

The comparison unit 553 calculates the abnormality occurrence frequency by dividing the number of abnormality occurrences (the number of abnormality data) by the process time for each process (step S307).

Next, the comparison unit 553 classifies the abnormality occurrence frequency and the occurrence time (pump operation time) for each process (step S308).

Next, the comparison unit 553 calculates the integrated value of the abnormality occurrence frequency at each abnormality occurrence time for each process, and records the calculated integrated value in the storage unit 53 as element data for each process (step S309).

In this flowchart, steps S105 and S106 and steps S107 to S109 are executed in parallel, but only one of the steps may be executed.

In addition, the division unit 551 may divide the past target state quantity of the target vacuum pump or the past target state of another vacuum pump into each process based on film formation start timing included in a film formation start signal input from the abatement apparatus 7 as a starting point. According to this configuration, it is possible to certainly divide the target state quantity for each process.

In addition, the division unit 551 may determine the film formation start timing based on a sensor value detected by the gas sensor 8, and may divide the past target state quantity of the target vacuum pump or the past target state quantity of another vacuum pump for each process based on the film formation start timing as a starting point. According to this configuration, it is possible to certainly divide the target state quantity for each process. In the case where the gas sensor 8 measures a nitrogen concentration, the nitrogen concentration is stable at a high value when the vacuum pump 3 is idle, and the nitrogen concentration sharply drops when the vacuum pump 3 is purged. Therefore, the division unit 551 may determine as the film formation start timing a time before the set time rather than the purged time, by setting the time when the nitrogen concentration sharply drops as the purged time. By doing so, the film formation start timing can be determined more accurately, and the target state quantity can be divided for each process with higher accuracy.

In addition, the division unit 551 may determine the film formation start timing by using a set of the load of the motor and the nitrogen concentration. By doing so, the film formation start timing can be determined more accurately, and the target state quantity can be divided for each process with higher accuracy.

Example 1

Next, Example 1 of the second embodiment will be described. The information processing apparatus 5b according to Example 1 determines the pump state judgment criterion for judging the failure possibility by performing statistical processing on the target parameter related to the number of abnormality occurrences in the target process. The information processing apparatus 5b according to Example 1 compares the statistical value of the target parameter related to the number of abnormality occurrences of the operating target pump in the target process with the pump state judgment criterion and outputs a failure index indicating the failure possibility based on a pump state diagnostic value.

Figure 21:
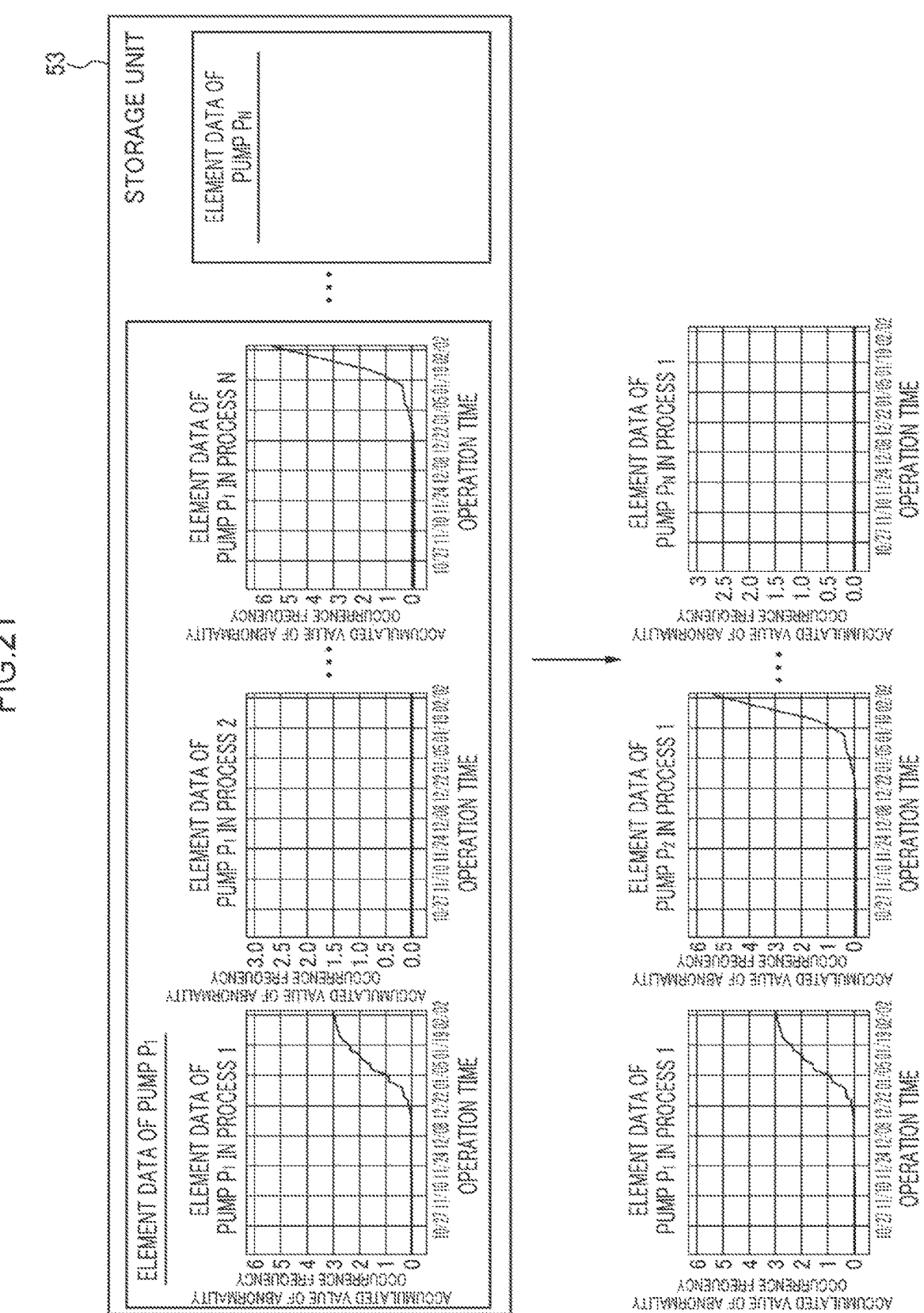
FIG. 21 is a schematic diagram for describing reading element data of each failed pump from a storage unit 53 in a specific process.

FIG. 21 is a schematic diagram for describing reading element data of each failed pump from the storage unit 53 in a specific process. As shown in FIG. 21, by the processing of the flowchart of FIG. 20, the storage unit 53 stores element data of vacuum pumps P1 to PN (N is a positive integer) as element data for each failed vacuum pump (hereinafter, referred to as a failure pump). The element data for each failure pump is composed of element data for each process, that is, element data of processes 1 to n (n is a positive integer). As an example, the element data is information indicating the correspondence relationship between the accumulated value of the abnormality occurrence frequency and the operation time, but here, for ease of understanding, the graph of the accumulated value of the abnormality occurrence frequency with respect to the operation time is shown. As shown in this graph, the correspondence relationship between the accumulated value of the abnormality occurrence frequency and the operation time is different for each process, even in the same failure pump.

For example, when the element data in process 1 of each failure pump is read, the element data in process 1 are read from the element data of the failure pump P1, and the element data in process 1 are read from the element data of the failure pump P2. Similarly, the element data in process 1 are sequentially read from the element data after the failure pump P3, and finally the element data in process 1 is read from the element data of the failure pump PN. As shown in FIG. 21, the correspondence relationship between the accumulated value of the abnormality occurrence frequency and the operation time is different for each failure pump, even in the same process.

Figure 22:
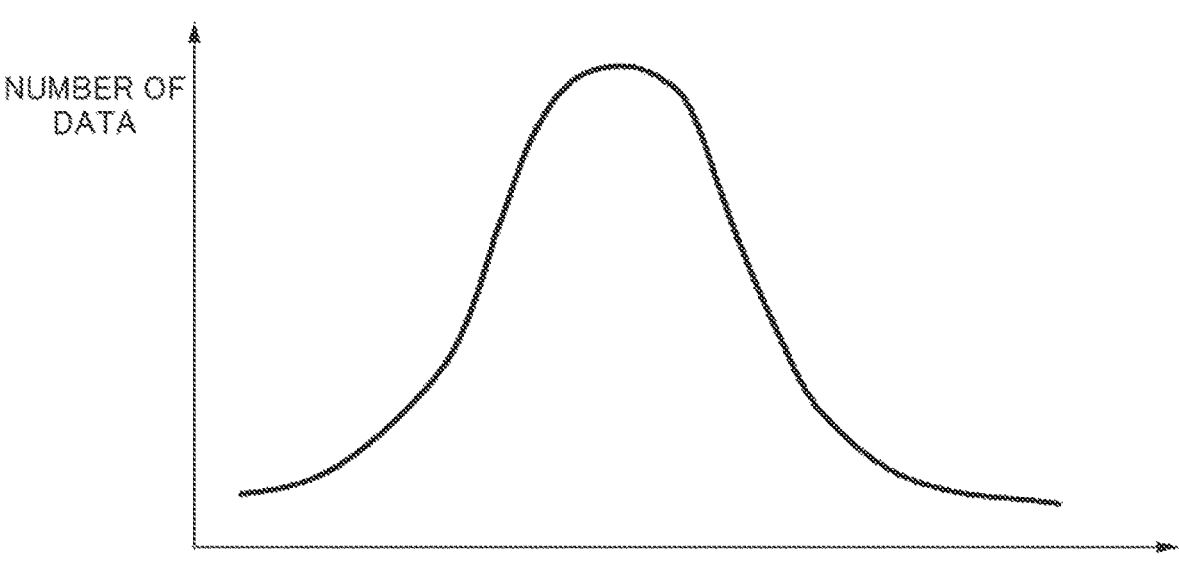
FIG. 22 is a diagram showing an example of a frequency graph of the accumulated value of the abnormality occurrence frequency of the failed pump.

FIG. 22 is a diagram showing an example of a frequency graph of the accumulated value of the abnormality occurrence frequency of the failure pump. In the graph of FIG. 22, a horizontal axis indicates the accumulated value of the abnormality occurrence frequency in process 1 when the pump fails and a vertical axis indicates the number of data. The accumulated value of the abnormality occurrence frequency in process 1 is different for each failure pump, and the number of data shows a normal distribution as shown in FIG. 22. Using this graph, the correspondence relationship between the range of the accumulated value of the abnormality occurrence frequency in process 1 and the failure index (here, as an example, failure probability) indicating the failure possibility is determined as the pump state judgment criterion by the judgment criterion determination unit 554. As described above, the judgment criterion determination unit 554 performs statistical processing on the target parameter (here, as an example, abnormality occurrence frequency) related to the number of abnormality occurrences in the target process with respect to the failed vacuum pump to determine the correspondence relationship between the statistical value (here, as an example, the accumulated value of the abnormality occurrence frequency) of the target parameter and the failure index as the pump state judgment criterion. Then, the determined pump state judgment criterion is stored in the storage unit 53 as a table as shown in the following FIG. 23, for example.

FIG. 23 is a diagram showing an example of a table showing a correspondence relationship between the range of the accumulated value of the abnormality occurrence frequency in process 1 and the failure index corresponding to the range. As shown in FIG. 23, the failure index (here, as an example, failure probability) indicating the failure possibility is set for the range of the accumulated value of the abnormality occurrence frequency in process 1. As shown in FIG. 23, the smaller the accumulated value of the abnormality occurrence frequency in process 1, the lower the failure index is set.

Figure 24:
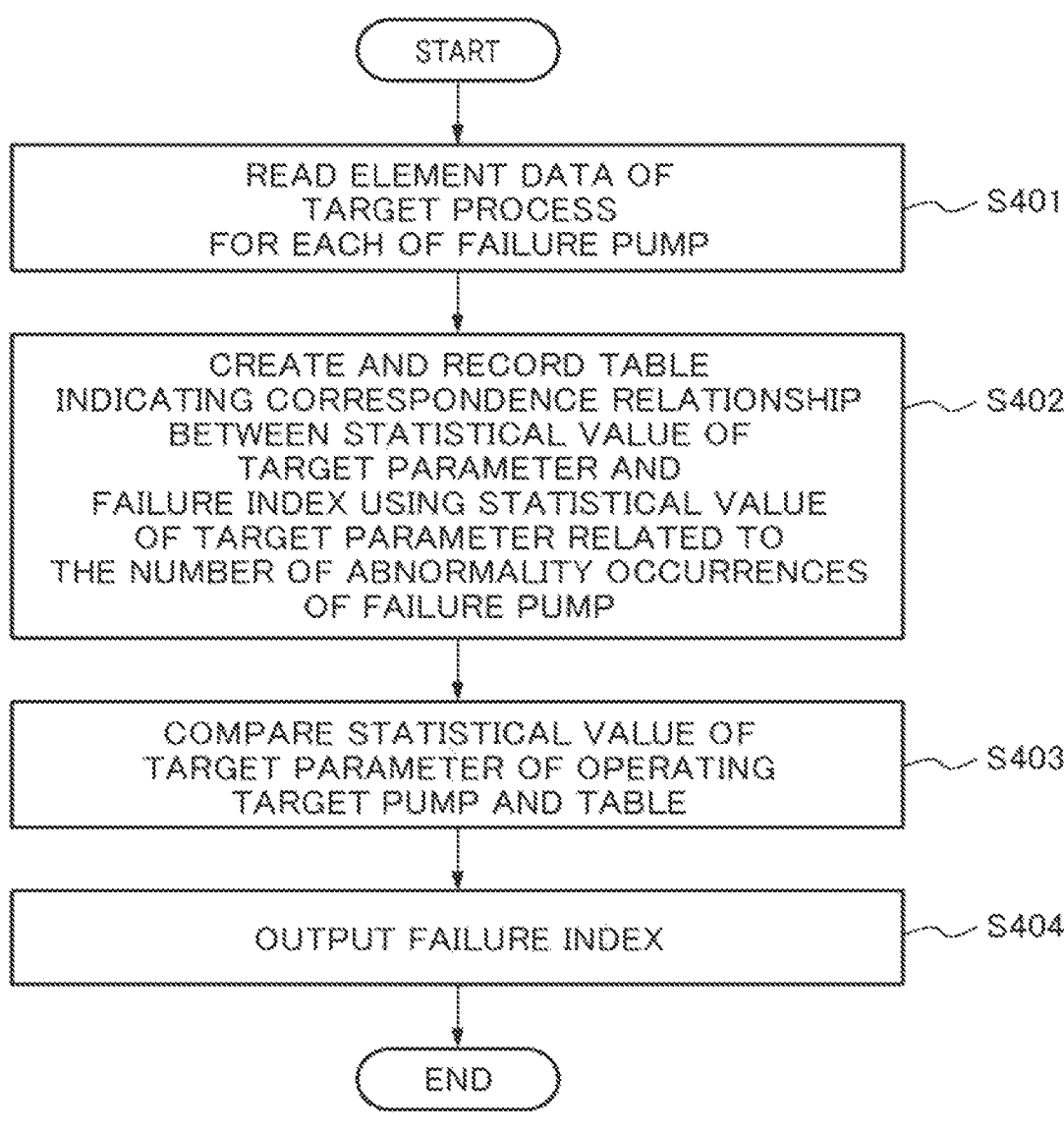
FIG. 24 is a flowchart showing a first example of a flow of failure index output processing.

Next, a flow of the failure index output processing will be described with reference to FIG. 24 while referring to FIGS. 21 to 23. FIG. 24 is a flowchart showing a first example of the flow of the failure index output processing.

First, as shown in FIG. 21, the CPU 55 reads the element data for each failure pump in the target process (for example, the process 1) (step S401).

Next, the judgment criterion determination unit 554 uses the statistical value (for example, the accumulated value of the abnormality occurrence frequency at the time of failure) of the target parameter (for example, the abnormality occurrence frequency) related to the number of abnormality occurrences of the failure pump to create a table showing the correspondence relationship between the statistical value (for example, the accumulated value of the abnormality occurrence frequency at the time of failure) and failure index as an example of the pump state judgment criterion and record the created table in the storage unit 53 (step S402). As a result, for example, the table as shown in FIG. 23 is recorded in the storage unit 53.

Next, the output unit 555 compares the statistical value (for example, the accumulated value of the abnormality occurrence frequency) of the target parameter of the operating target pump with the table created in the previous step (step S403). At this time, the output unit 555 determines the failure index corresponding to the statistical value (for example, the accumulated value of the abnormality occurrence frequency) of the target parameter of the operating target pump in the table.

The output unit 555 outputs the determined failure index (step S404). In this way, the output unit 555 compares the statistical value (for example, the accumulated value of the abnormality occurrence frequency) of the target parameter (for example, the abnormality occurrence frequency) related to the number of abnormality occurrences of the operating target pump in the target process and the pump state judgment criterion (that is, the correspondence relationship between the statistical value of the target parameter and the failure index) determined by the judgment criterion determination unit 554, and outputs the failure index as the pump state diagnostic value.

According to this configuration, the manager of the operating target pump can grasp the failure possibility of the target pump, and it is possible to improve the possibility of performing replacement or maintenance before the target pump fails.

In this embodiment, as an example, the target parameter is described as the abnormality occurrence frequency, but the present embodiment is not limited thereto. The target parameter may be the number of times of abnormality occurrence, and in that case, the statistical value of the target parameter may be the accumulated value of the number of times of abnormality occurrence. In this case, the pump state judgment criterion may be a table as shown in FIG. 25. FIG. 25 is a diagram showing an example of a table showing a correspondence relationship between the range of the accumulated value of the number of times of abnormality occurrence in process 1 and the failure index corresponding to the range. As shown in FIG. 25, the failure index (here, as an example, failure probability) indicating the failure possibility is set for the range of the accumulated value of the number of times of abnormality occurrence in process 1. As shown in FIG. 25, the smaller the accumulated value of the abnormality occurrence frequency in process 1, the lower the failure index is set.

In addition, the statistical value of the target parameter may be the change value of the accumulated value of the abnormality occurrence frequency. In this case, the pump state judgment criterion may be a table as shown in FIG. 26. FIG. 26 is a diagram showing an example of a table showing a correspondence relationship between a change rate of the accumulated value of the abnormality occurrence frequency in process 1 and the failure index corresponding to the range. As shown in FIG. 26, the failure index (here, as an example, failure probability) indicating the failure possibility is set for the range of the accumulated value of the abnormality occurrence frequency in process 1. As shown in FIG. 26, the smaller the change rate of the accumulated value of the abnormality occurrence frequency in process 1, the lower the failure index is set. In addition, the statistical value of the target parameter may be the change value of the accumulated value of the number of times of abnormality occurrence.

In addition, the pump state judgment criterion may be the failure index associated with a set of the change start timing of the accumulated value of the abnormality occurrence frequency and the change value of the accumulated value of the abnormality occurrence frequency. In this case, the pump state judgment criterion may be a table as shown in FIG. 27. FIG. 27 is a diagram showing an example of a table showing a correspondence relationship between a set of a range of a change start timing of the accumulated value of the abnormality occurrence frequency and a range of a change value of the accumulated value of the abnormality occurrence frequency and the failure index corresponding to the set. As shown in FIG. 27, the failure index (here, as an example, failure probability) indicating the failure possibility is the set of the range of the change start timing of the accumulated value of the abnormality occurrence frequency and the change value of the accumulated value of the abnormality occurrence frequency.

In addition, the pump state judgment criterion may be the failure index associated with a set of the change start timing of the accumulated value of the number of times of abnormality occurrence and the change value of the accumulated value of the number of times of abnormality occurrence.

In addition, the statistical value of the target parameter may be an integral value of a curve of the accumulated value of the abnormality occurrence frequency. In this case, the pump state judgment criterion may be a table as shown in FIG. 28. FIG. 28 is a diagram showing an example of a table showing a correspondence relationship between a range of an integrated value of the accumulated value of the curve of the abnormality occurrence frequency in process 1 and the failure index corresponding to the range. As shown in FIG. 28, the failure index (here, as an example, failure probability) indicating the failure possibility is set for a range of the integral value of the curve of the accumulated value of the abnormality occurrence frequency in process 1. As shown in FIG. 28, the smaller the integral value of the curve of the accumulated value of the abnormality occurrence frequency in process 1, the lower the failure index is set. In addition, the statistical value of the target parameter may be the integral value of the curve of the accumulated value of the abnormality occurrence frequency.

Example 2

Next, Example 2 of the second embodiment will be described. In Example 1, the pump state judgment criterion is determined by performing the statistical processing on the target parameter related to the number of abnormality occurrences in the target process, but the information processing apparatus 5b of Example 2 performs the statistical processing on the target parameters related to the number of abnormality occurrence in all processes to determine the pump state judgment criterion for determining the failure possibility. The information processing apparatus 5b according to Example 2 compares the statistical value of the target parameter related to the number of abnormality occurrences of the operating target pump in all processes with the pump state judgment criterion and outputs a failure index indicating the failure possibility based on a pump state diagnostic value.

Figure 29:
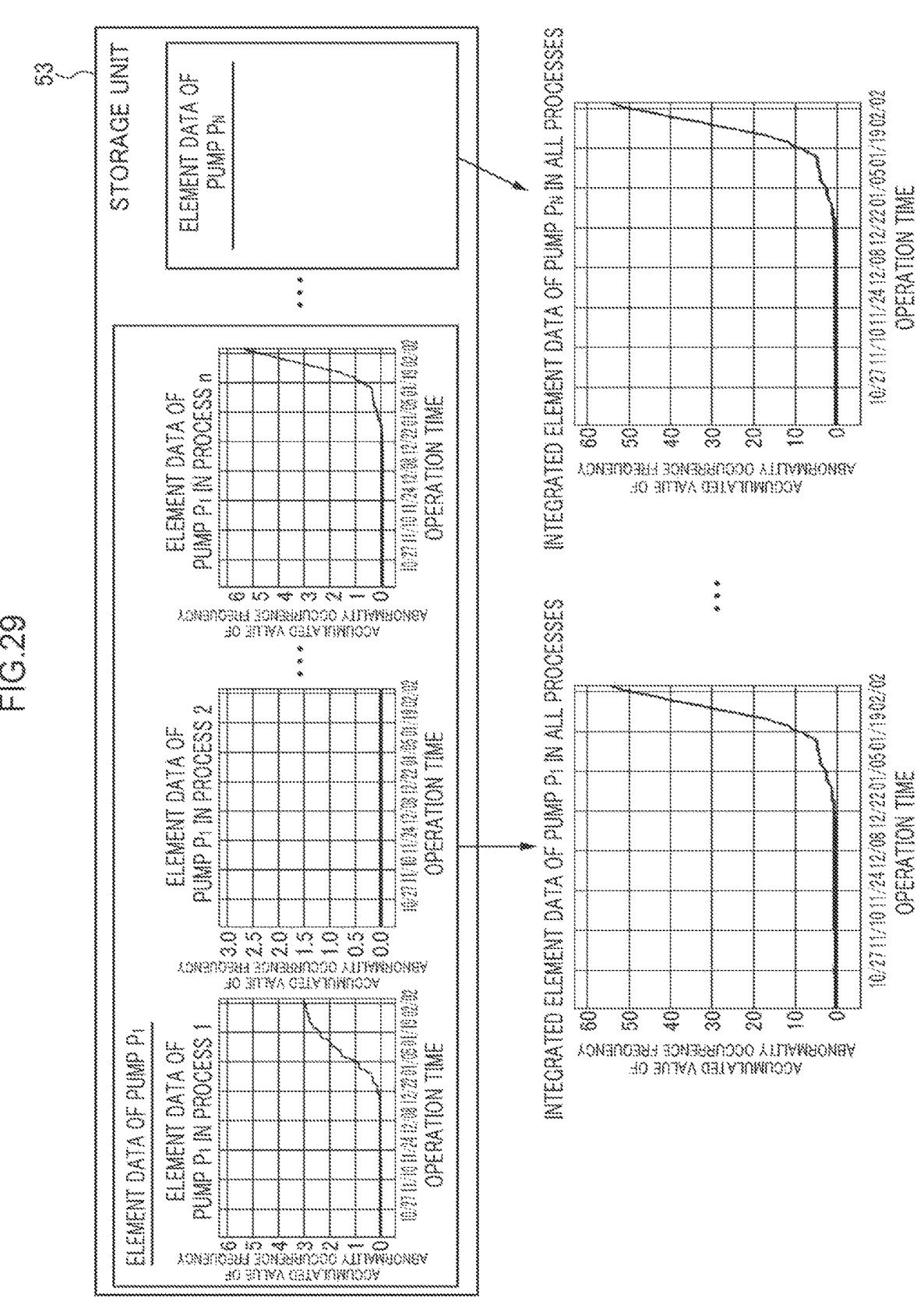
FIG. 29 is a schematic diagram for describing integration element data in all processes.

FIG. 29 is a schematic diagram for describing integration element data in all processes. As shown in FIG. 29, by the processing of the flowchart of FIG. 20, the storage unit 53 stores element data of vacuum pumps P1 to PN (N is a positive integer) as element data for each failed pump (hereinafter, referred to as a failure pump). The element data for each failure pump is composed of element data for each process, that is, element data of processes 1 to n (n is a positive integer). As an example, the element data is information indicating the correspondence relationship between the accumulated value of the abnormality occurrence frequency and the operation time, but here, for ease of understanding, the graph of the accumulated value of the abnormality occurrence frequency with respect to the operation time is shown. As shown in this graph, the correspondence relationship between the accumulated value of the abnormality occurrence frequency and the operation time is different for each process, even in the same failure pump.

For example, integration element data of a vacuum pump P1 in all processes is represented by a value obtained by integrating the accumulated value of the abnormality occurrence frequency in process 1, process 2, . . . , process n of the vacuum pump P1. The same goes for integration element data in all processes after a vacuum pump P2, and integration element data of a vacuum pump PN in all processes are represented by a value obtained by integrating the accumulated value of the abnormality occurrence frequency of the vacuum pump PN in process 1, process 2, . . . , process n.

Figure 30:
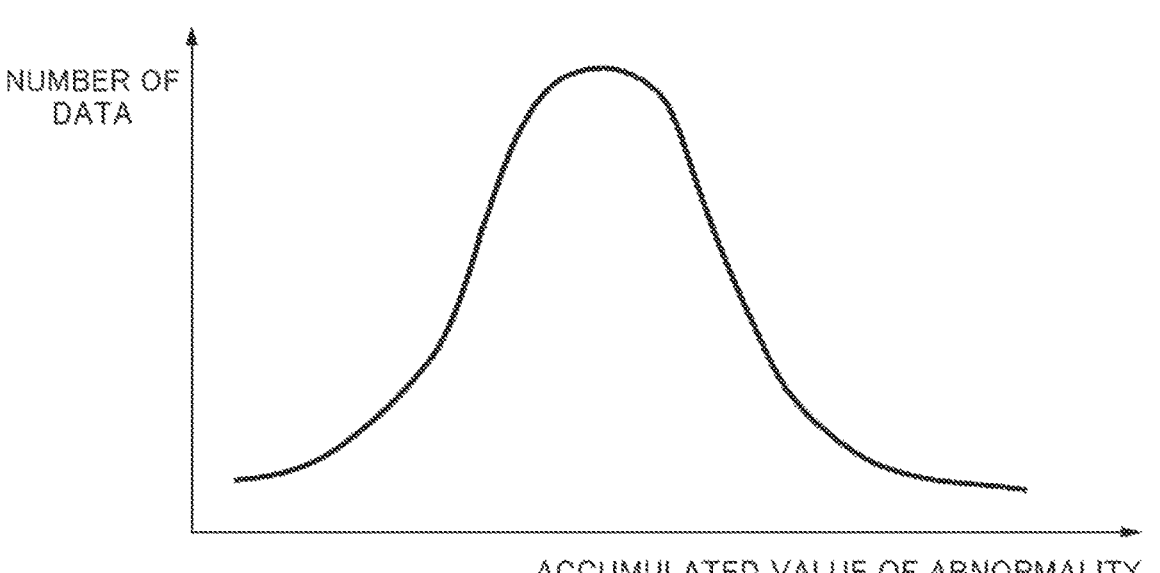
FIG. 30 is a diagram showing an example of a frequency graph of the accumulated value of the abnormality occurrence frequency of the failure pump in all processes.

FIG. 30 is a diagram showing an example of a frequency graph of the accumulated value of the abnormality occurrence frequency of the failure pump in all processes. In the graph of FIG. 30, a horizontal axis indicates the accumulated value of the abnormality occurrence frequency and a vertical axis indicates the number of data in all processes when the pump fails. The accumulated value of the abnormality occurrence frequency in all processes is different for each failure pump, and the number of data shows a normal distribution as shown in FIG. 30. Using this graph, the correspondence relationship between the range of the accumulated value of the abnormality occurrence frequency in all processes and the failure index (here, as an example, failure probability) indicating the failure possibility is determined as the pump state judgment criterion by the judgment criterion determination unit 554. As described above, the judgment criterion determination unit 554 performs the statistical processing on the target parameter (here, as an example, abnormality occurrence frequency in all processes) related to the number of abnormality occurrences in all processes with respect to the failed vacuum pump to determine the correspondence relationship between the statistical value (here, as an example, the accumulated value of the abnormality occurrence frequency in all processes) of the target parameter and the failure index as the pump state judgment criterion. Then, the determined pump state judgment criterion is stored in the storage unit 53 as a table as shown in the following FIG. 31, for example.

FIG. 31 is a diagram showing an example of a table showing a correspondence relationship between the range of the accumulated value of the abnormality occurrence frequency in all processes and the failure index corresponding to the range. As shown in FIG. 31, the failure index (here, as an example, failure probability) indicating the failure possibility is set for the range of the accumulated value of the abnormality occurrence frequency in all processes. As shown in FIG. 31, the smaller the accumulated value of the abnormality occurrence frequency in all processes, the lower the failure index is set.

Figure 32:
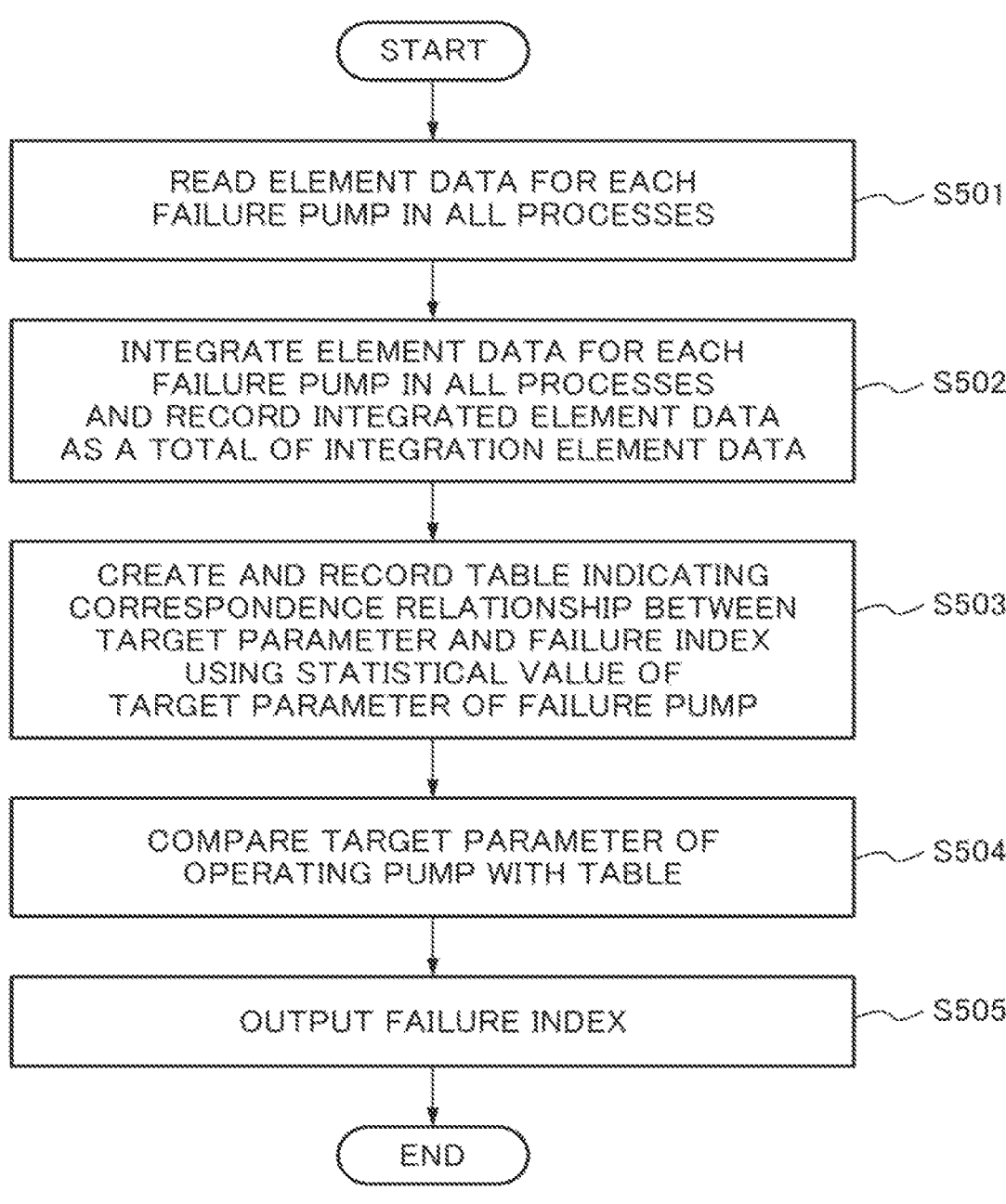
FIG. 32 is a flowchart showing a second example of a flow of failure index output processing.

Next, a flow of the failure index output processing will be described with reference to FIG. 32 while referring to FIGS. 29 to 31. FIG. 32 is a flowchart showing the second example of the flow of the failure index output processing.

First, as shown in FIG. 29, the CPU 55 reads the element data for each failure pump in all processes (step S501).

Next, the CPU 55 integrates element data for each failure pump in all processes and records the integrated element data in the storage unit 53 as a total of integration element data (step S502).

Next, the judgment criterion determination unit 554 uses the statistical value (here, as an example, the accumulated value of the abnormality occurrence frequency over all processes) of the target parameter (for example, the abnormality occurrence frequency) related to the number of abnormality occurrences of the failure pump in all processes to create a table showing the correspondence relationship between the statistical value of the target parameter (for example, the accumulated value of the abnormality occurrence frequency over all processes) and failure index as an example of the pump state judgment criterion and record the created table in the storage unit 53 (step S503). As a result, for example, the table as shown in FIG. 31 is recorded in the storage unit 53.

Next, the output unit 555 compares the statistical value (for example, the accumulated value of the abnormality occurrence frequency over all processes) of the target parameter of the operating target pump with the table created in the previous step (step S504). At this time, the output unit 555 determines the failure index corresponding to the statistical value (for example, the accumulated value of the abnormality occurrence frequency over all processes) of the target parameter of the operating target pump in the table.

The output unit 555 outputs the determined failure index (step S505). In this way, the output unit 555 compares the statistical value (for example, the abnormality occurrence frequency over all processes) of the target parameter (for example, the abnormality occurrence frequency) related to the number of abnormality occurrences of the operating target pump in all processes and the pump state judgment criterion (that is, the correspondence relationship between the statistical value of the target parameter and the failure index) determined by the judgment criterion determination unit 554, and outputs the failure index as the pump state diagnostic value.

According to this configuration, the manager of the operating target pump can grasp the failure possibility of the target pump, and it is possible to improve the possibility of performing replacement or maintenance before the target pump fails.

Example 3

Next, Example 3 of the second embodiment will be described. The information processing apparatus 5b according to Examples 1 and 2 outputs the failure index indicating the failure possibility as the pump state diagnostic value, but in Example 3, outputs an operation continuation index indicating the operation continuation possibility as the pump state diagnostic value.

Specifically, the information processing apparatus 5b of Example 3 performs the statistical processing on the target parameter related to the number of abnormality occurrences in the target process for the vacuum pump continuously operated without failure to determine the correspondence relationship between the statistical value of the target parameter and the operation continuation index. The information processing apparatus 5b of Example 3 compares the statistical value of the target parameter related to the number of abnormality occurrences of the operating target pump in the target process with the correspondence relationship to output the operation continuation index.

Figure 33:
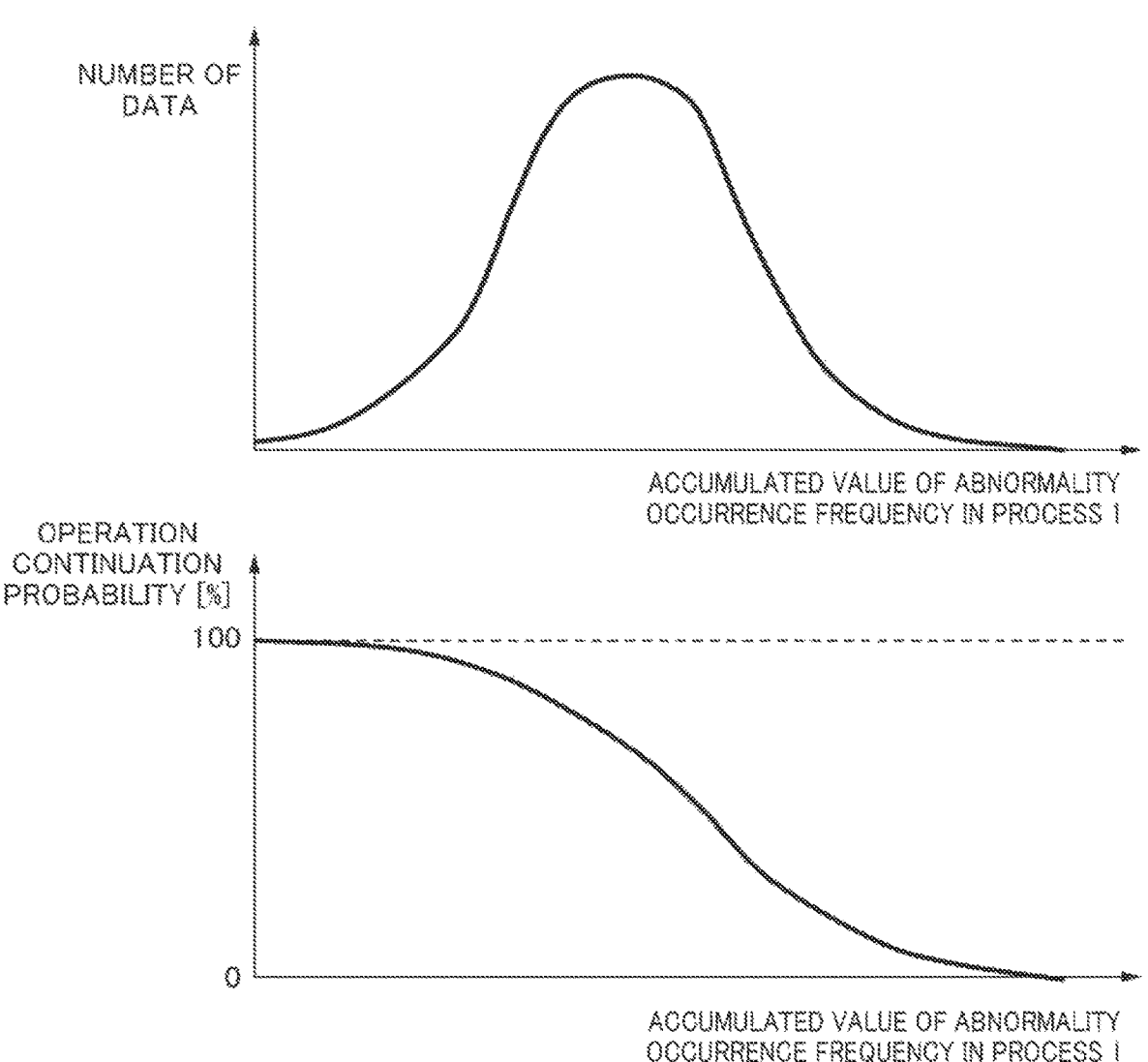
FIG. 33 shows diagrams showing an example of the frequency graph of the accumulated value of the number of times of abnormality occurrence in process 1 and a graph showing a relationship between the accumulated value of the number of times of abnormality occurrence in process 1 and an operation continuation probability.

FIG. 33 shows diagrams showing an example of the frequency graph of the accumulated value of the number of times of abnormality occurrence in process 1 and a graph showing a relationship between the accumulated value of the number of times of abnormality occurrence in process 1 and an operation continuation probability. An upper graph in FIG. 33 is a frequency graph of the accumulated value of the number of times of abnormality occurrence in process 1, in which a horizontal axis indicates the accumulated value of the number of times of abnormality occurrence in process 1 and a vertical axis indicates the number of data. A lower graph in FIG. 33 is a graph showing the relationship between the accumulated value of the number of times of abnormality occurrence in process 1 and the operation continuation probability, in which a horizontal axis indicates the accumulated value of the number of times of abnormality occurrence in process 1 and a vertical axis indicates the operation continuation probability, which is determined from a frequency graph of an upper part of FIG. 33. That is, the smaller the accumulated value of the number of times of abnormality occurrence in process 1, the higher the operation continuation probability.

Using the graph showing the relationship between the accumulated value of the number of times of abnormality occurrence and the operation continuation probability in process 1, the correspondence relationship between the range of the accumulated value of the abnormality occurrence frequency in process 1 and the operation continuation index (here, as an example, operation continuation probability) indicating the operation continuation possibility is determined as the pump state judgment criterion by the judgment criterion determination unit 554. As described above, the judgment criterion determination unit 554 performs the statistical processing on the target parameter (here, as an example, the abnormality occurrence frequency) related to the number of abnormality occurrences in the target process with respect to the vacuum pump continuously operated without failure (the returned vacuum pump without failure) to determine the correspondence relationship between the statistical value (here, as an example, the accumulated value of the abnormality occurrence frequency) of the target parameter and the operation continuation index as the pump state judgment criterion. Then, the determined pump state judgment criterion is stored in the storage unit 53 as a table as shown in the following FIG. 34, for example.

FIG. 34 is a diagram showing an example of a table showing a correspondence relationship between the range of the accumulated value of the abnormality occurrence frequency in process 1 and the operation continuation index corresponding to the range. As shown in FIG. 34, the operation continuation index (here, as an example, operation continuation probability) indicating the operation continuation possibility is set for the range of the accumulated value of the abnormality occurrence frequency in process 1. As shown in FIG. 34, the smaller the accumulated value of the abnormality occurrence frequency in process 1, the higher the operation continuation index is set.

Figure 35:
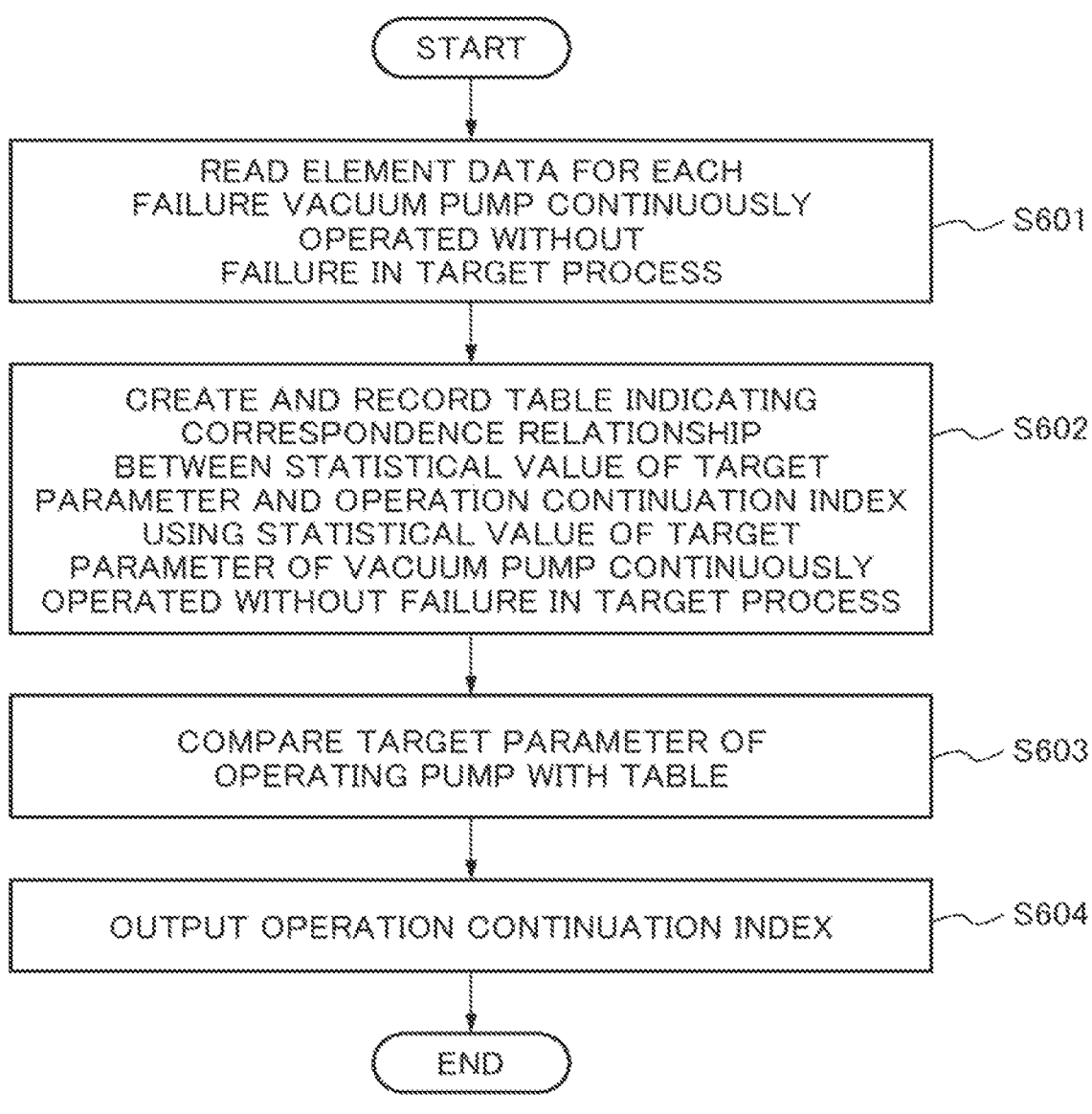
FIG. 35 is a flowchart showing a first example of a flow of operation continuation index output processing.

Next, a flow of the operation continuation index output processing will be described with reference to FIG. 35 while referring to FIG. 34. FIG. 35 is a flowchart showing a first example of the flow of the operation continuation index output processing.

First, the CPU 55 reads the element data in the target process for each of the vacuum pumps continuously operated without failure (step S601).

Next, the CPU 55 uses the statistical value (for example, the accumulated value of the abnormality occurrence frequency) of the target parameter (for example, the abnormality occurrence frequency) of the vacuum pump continuously operated without failure in the target process (for example, the process 1) to create the table showing the correspondence relationship between the statistical value (for example, the accumulated value of the abnormality occurrence frequency) of the target parameter and the operation continuation index as shown in FIG. 34 and record the created table in the storage unit 53 (step S602).

Next, the output unit 555 compares the statistical value (for example, the accumulated value of the abnormality occurrence frequency) of the target parameter of the operating target pump with the table created in the previous step (step S603). At this time, the output unit 555 determines the operation continuation index corresponding to the statistical value (for example, the accumulated value of the abnormality occurrence frequency) of the target parameter of the operating target pump in the table.

The output unit 555 outputs the determined failure index (step S604). In this way, the output unit 555 compares the statistical value (for example, the accumulated value of the abnormality occurrence frequency) of the target parameter (for example, the abnormality occurrence frequency) related to the number of abnormality occurrences of the operating target pump in the target process and the pump state judgment criterion (that is, the correspondence relationship between the statistical value of the target parameter and the operation continuation index) determined by the judgment criterion determination unit 554, and outputs the operation continuation index as the pump state diagnostic value.

According to this configuration, the manager of the operating target pump can grasp the operation continuation possibility of the target pump, and it is possible to improve the possibility of performing replacement or maintenance before the target pump fails.

Example 4

Next, Example 4 of the second embodiment will be described. The information processing apparatus 5b according to Example 3 performs the statistical processing on the target parameter related to the number of abnormality occurrences in the target process, whereas Example 4 performs the statistical processing on the target parameter related to the number of abnormality occurrences in all processes.

Specifically, the information processing apparatus 5b of Example 4 performs the statistical processing on the target parameter related to the number of abnormality occurrences in all processes to determine the correspondence relationship between the statistical value of the target parameter and the operation continuation index as the judgment criterion. The information processing apparatus 5b of Example 4 compares the statistical value of the target parameter related to the number of abnormality occurrences of the operating target pump in all processes with the correspondence relationship to output the operation continuation index.

Figure 36:
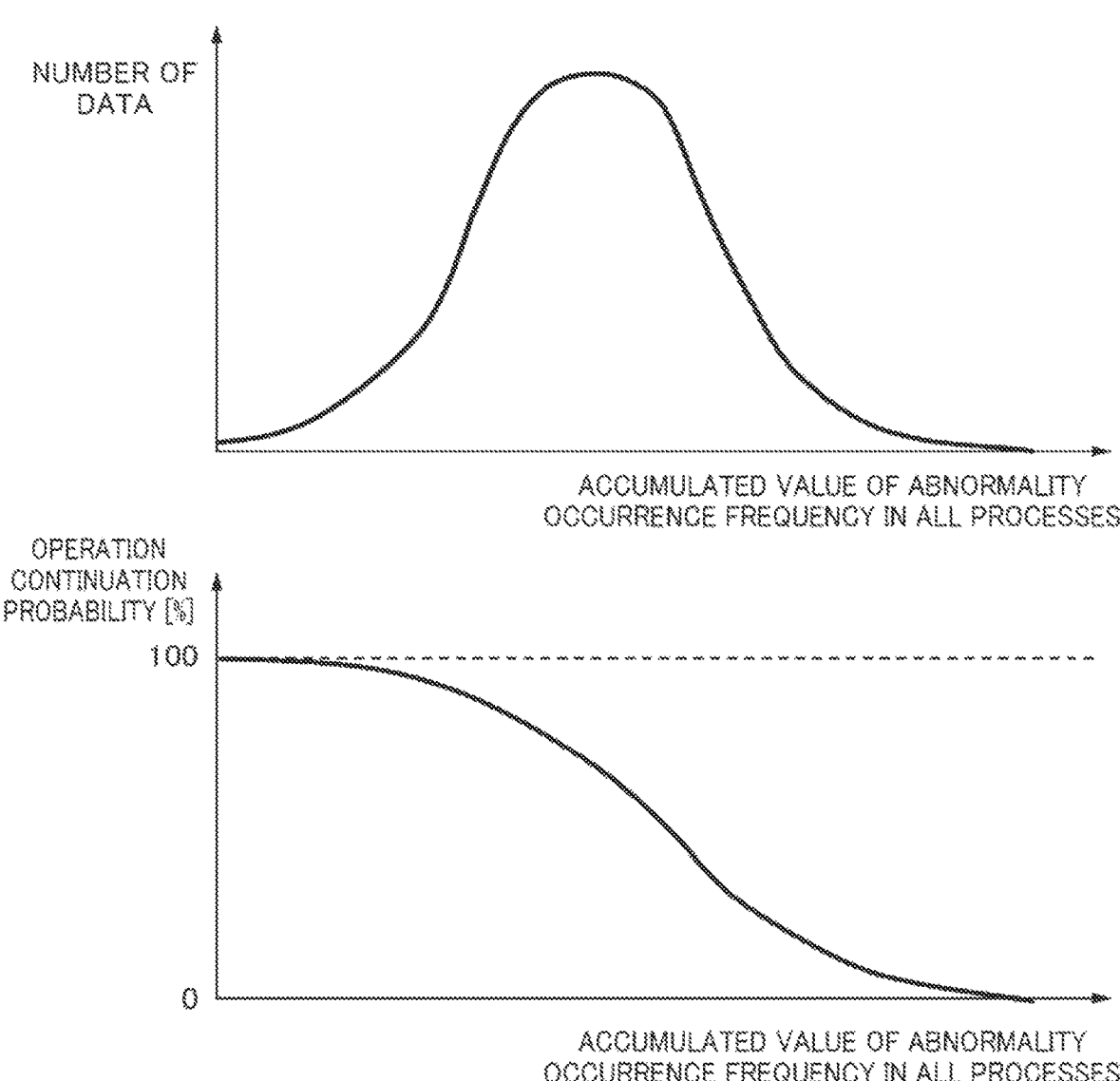
FIG. 36 shows diagrams showing an example of the frequency graph of the accumulated value of the number of times of abnormality occurrence in all processes and a graph showing a relationship between the accumulated value of the number of times of abnormality occurrence frequency in all processes and the operation continuation probability.

FIG. 36 shows diagrams showing an example of the frequency graph of the accumulated value of the number of times of abnormality occurrence in all processes and a graph showing a relationship between the accumulated value of the abnormality occurrence frequency in all processes and the operation continuation probability. An upper graph in FIG. 36 is a frequency graph of the accumulated value of the number of times of abnormality occurrence in all processes, in which a horizontal axis indicates the accumulated value of the number of times of abnormality occurrence in all processes and a vertical axis indicates the number of data. A lower graph in FIG. 36 is a graph showing the relationship between the accumulated value of the number of times of abnormality occurrence in all processes and the operation continuation probability, in which a horizontal axis indicates the accumulated value of the number of times of abnormality occurrence in all processes and a vertical axis indicates the operation continuation probability, which is determined from a frequency graph of an upper part of FIG. 36. That is, the smaller the accumulated value of the number of times of abnormality occurrence in all processes, the higher the operation continuation probability.

Using the graph showing the relationship between the accumulated value of the number of times of abnormality occurrence and the operation continuation probability in all processes, the correspondence relationship between the range of the accumulate value of the abnormality occurrence frequency in all processes and the operation continuation index (here, as an example, operation continuation probability) indicating the operation continuation possibility is determined as the pump state judgment criterion by the judgment criterion determination unit 554. As described above, the judgment criterion determination unit 554 performs the statistical processing on the target parameter (here, as an example, the abnormality occurrence frequency) related to the number of abnormality occurrences in all processes with respect to the vacuum pump continuously operated without failure (the returned vacuum pump without failure) to determine the correspondence relationship between the statistical value (here, as an example, the accumulated value of the abnormality occurrence frequency) of the target parameter and the operation continuation index as the pump state judgment criterion. Then, the determined pump state judgment criterion is stored in the storage unit 53 as a table as shown in the following FIG. 37, for example.

FIG. 37 is a diagram showing an example of a table showing a correspondence relationship between the range of the accumulated value of the abnormality occurrence frequency in all processes and the operation continuation index corresponding to the range. As shown in FIG. 37, the operation continuation index (here, as an example, operation continuation probability) indicating the operation continuation possibility is set for the range of the accumulated value of the abnormality occurrence frequency in all processes. As shown in FIG. 37, the smaller the accumulated value of the abnormality occurrence frequency in all processes, the higher the operation continuation index is set.

Figure 38:
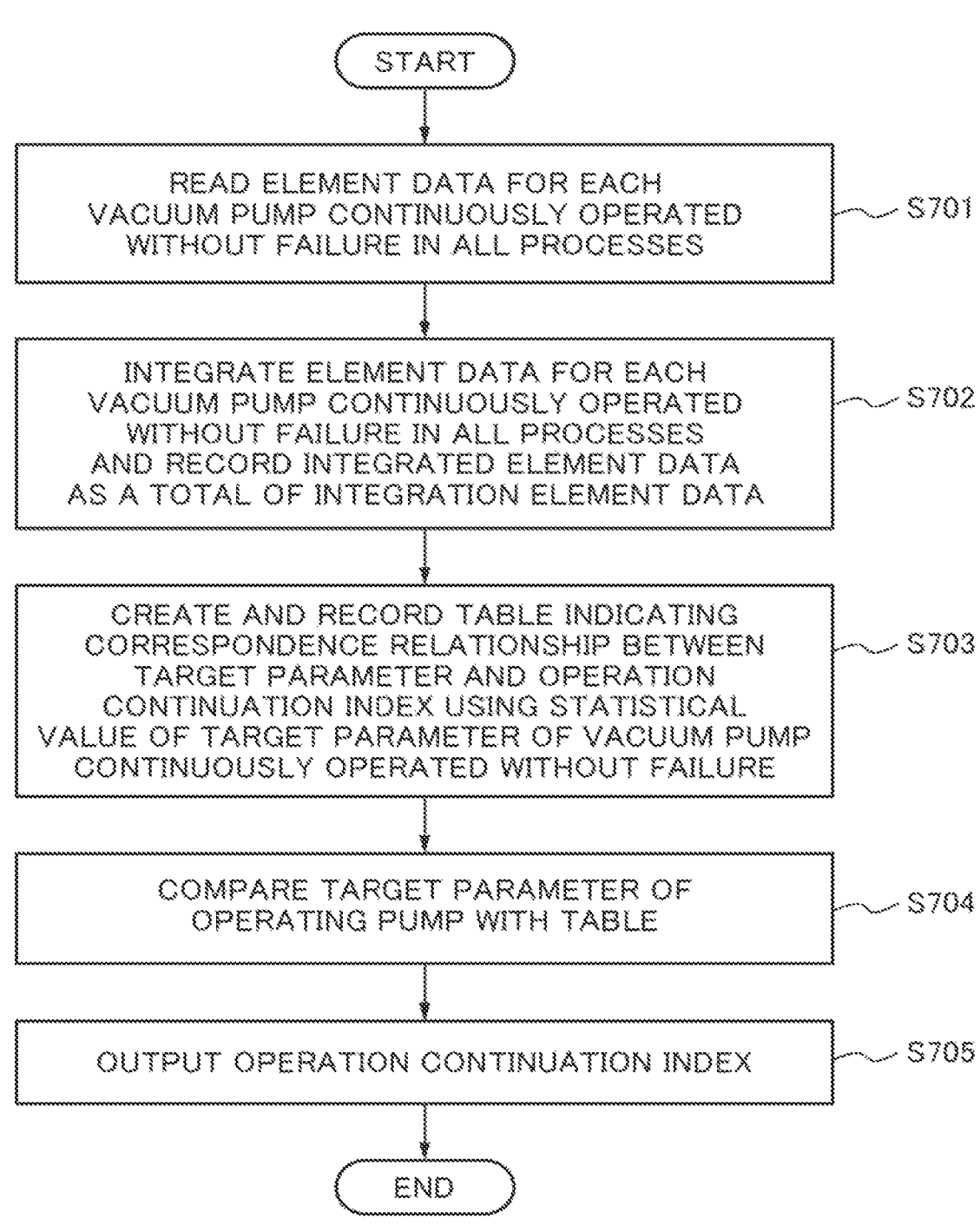
FIG. 38 is a flowchart showing a second example of a flow of operation continuation index output processing.

Next, a flow of the operation continuation index output processing will be described with reference to FIG. 38 while referring to FIG. 37. FIG. 38 is a flowchart showing a second example of the flow of the operation continuation index output processing.

First, the CPU 55 reads the element data of all processes for each of the vacuum pumps continuously operated without failure (step S701).

Next, the CPU 55 integrates element data for each vacuum pump continuously operated without failure in all processes and records the integrated element data in the storage unit 53 as a total of integration element data (step S702).

Next, the judgment criterion determination unit 554 uses the statistical value (here, as an example, the accumulated value of the abnormality occurrence frequency over all processes) of the target parameter (for example, the abnormality occurrence frequency) related to the number of abnormality occurrences of the vacuum pump continuously operated without failure in all processes to create a table showing the correspondence relationship between the statistical value of the parameter (for example, the accumulated value of the abnormality occurrence frequency over all processes) and the failure index as an example of the pump state judgment criterion and record the created table in the storage unit 53 (step S703). As a result, for example, the table as shown in FIG. 37 is recorded in the storage unit 53.

Next, the output unit 555 compares the statistical value (for example, the accumulated value of the abnormality occurrence frequency over all processes) of the target parameter of the operating target pump with the table created in the previous step (step S704). At this time, the output unit 555 determines the operation continuation index corresponding to the statistical value (for example, the accumulated value of the abnormality occurrence frequency over all processes) of the target parameter of the operating target pump in the table.

The output unit 555 outputs the determined operation continuation index (step S705). In this way, the output unit 555 compares the statistical value (for example, the abnormality occurrence frequency over all processes) of the target parameter (for example, the accumulated value of the abnormality occurrence) related to the number of abnormality occurrences of the operating target pump in all processes and the pump state judgment criterion (that is, the correspondence relationship between the statistical value of the target parameter and the operation continuation index) determined by the judgment criterion determination unit 554, and outputs the operation continuation index as the pump state diagnostic value.

According to this configuration, the manager of the operating target pump can grasp the operation continuation possibility of the target pump, and it is possible to improve the possibility of performing replacement or maintenance before the target pump fails.

The judgment criterion determination unit 554 may determine a warning determination criterion for determining whether to output a warning by using the target parameter related to the number of abnormality occurrences in the target process or in all processes depending on whether the vacuum pump fails. Specifically, for example, the judgment criterion determination unit 554 may determine, as the warning determination criterion, a threshold value (for example, a threshold value of the accumulated value of the abnormality occurrence frequency) by performing the statistical processing on the target parameter related to the number of abnormality occurrences in the target process or all processes for the failed vacuum pump.

The warning output unit 556 compares the statistical value (for example, the accumulated value of the abnormality occurrence frequency) of the target parameter related to the number of abnormality occurrences in the target process or all processes of the target pump with the warning determination criterion determined by the judgment criterion determination unit 554 for determining whether to output a warning, and outputs a warning according to the comparison result. For example, when the warning determination criterion for determining whether to output a warning is a threshold value, the warning output unit 556 may output a warning when the statistical value (for example, the accumulated value of the abnormality occurrence frequency) of the target parameter related to the number of abnormality occurrences in the target process or all processes of the target pump exceeds the threshold value and may not output a warning when the statistical value does not exceed the threshold value. According to this configuration, the manager of the operating target pump can grasp the operation continuation possibility of the target pump, and it is possible to improve the possibility of performing replacement or maintenance before the target pump fails.

As described above, in the information processing apparatus 5b according to the second embodiment, the determination unit 552b determines the normal variation range of the target state quantity for each process using a past target state quantity of the target vacuum pump or a past target state quantity of another vacuum pump as the target state quantity which is the state quantity varying depending on the load of gas flowing into the vacuum pump. The comparison unit 553b compares the target state quantity of the operating target vacuum pump with the normal variation range for each process to detect abnormality data deviating from the normal variation range. The judgment criterion determination unit 554 may determine the warning determination criterion for determining whether to output the pump state judgment criterion for judging the failure possibility or the operation continuation possibility or a warning by using the statistical value of the target parameter related to the number of abnormality occurrences in the target process or in all processes depending on whether the vacuum pump fails.

According to this configuration, the information processing apparatus 5b can use the pump state judgment criterion to judge the failure possibility or the operation continuation possibility of the operating target vacuum pump or can use the determination criterion for the operating target vacuum pump to determine whether to output a warning.

Here, the target parameter related to the number of abnormality occurrences is, for example, the abnormality occurrence frequency obtained by dividing the number of times of abnormality occurrence or the number of times of abnormality occurrence in a period of a specific process. According to this configuration, the pump state judgment criterion is determined using the number of abnormality occurrences or the statistical value of the abnormality occurrence frequency (for example, the accumulated value of the number of times of abnormality occurrence or the accumulated value of the abnormality occurrence frequency), so that it is possible to improve the judgment accuracy on the failure probability or the operation continuation possibility.

In addition, the output unit 555 compares the statistical value of the target parameter related to the number of abnormality occurrences of the operating target pump in the target process or all processes with the pump state judgment criterion determined by the judgment criterion determination unit 554 to output the pump state diagnostic value. Here, the pump state diagnostic value includes the failure index indicating the failure probability or the operation continuation index indicating the operation continuation possibility. According to this configuration, the manager of the operating target pump can grasp the failure possibility or the operation continuation possibility, so that it is possible to improve the possibility of performing the replacement or maintenance of the vacuum pump before failure.

It is to be noted that the information processing system including the plurality of apparatuses may process each processing of the information processing apparatus 5b by the plurality of apparatuses in a distributed manner. In addition, in the present embodiment, the control apparatus 4 and the information processing apparatus 5b are described as separate apparatuses, but the control apparatus 4 may be configured to include the information processing apparatus 5b. In addition, a program for executing each processing of the information processing apparatus according to the present embodiment is recorded in a computer-readable recording medium, the program recorded on the recording medium is read by the computer system, and the processor is executed to perform the above-described various processes related to the information processing apparatus according to the present embodiment.

In addition, in the present embodiment, the accumulated value (integrated value) of the target parameter is used as the statistical value of the target parameter, but the present embodiment is not limited thereto, and as the data processing method, there may be a comparison of an integral value, a differential value, and an integral value of the target parameter, an average value, a median value, or the like. In addition, after the target parameter is filtered by a predetermined filter, the comparison of the accumulated value (integrated value), the integral value, the differential value, and the integral value, the average value, the median value and the like may be calculated. The output unit 555 may make the determination using these indices.

In addition, the processing in the information processing apparatus according to each embodiment may use a neural network such as quantum computing and deep learning or artificial intelligence (AI) such as machine learning, and the like. For example, in supervised learning, the number of data may be smaller if the data of the vacuum pump continuously operated without failure is used as training data.

Further, for example, a set of time series data of the target state quantity for each process and the process corresponding to the time series data as shown in FIG. 7 is given to the information processing apparatus, and the information processing apparatus may perform learning with AI in advance and predict in which process the time series data of the operating target state quantity is.

The processing in the information processing apparatus according to each embodiment may be processed in a cloud or may be processed by a terminal apparatus (so-called edge) connected to an information processing apparatus such as a server via a communication network.

For example, as an edge terminal in which logic for performing the information processing according to each embodiment is mounted, a controller adopting a field path (standard for performing transmission/reception of a signal between a field equipment and a controller operating in a factory and the like using digital communication) capable of performing a high-speed communication by an open architecture (logical structure of a computer system), and more specifically, a controller corresponding to PLC5 language or C language compliant with IEC 61131-3 (as a standard specification issued by International Electrotechnical Commission (IEC) in December 1993, one defining a program language for a programmable logic controller (PLC)) can be used.

Figure 39:
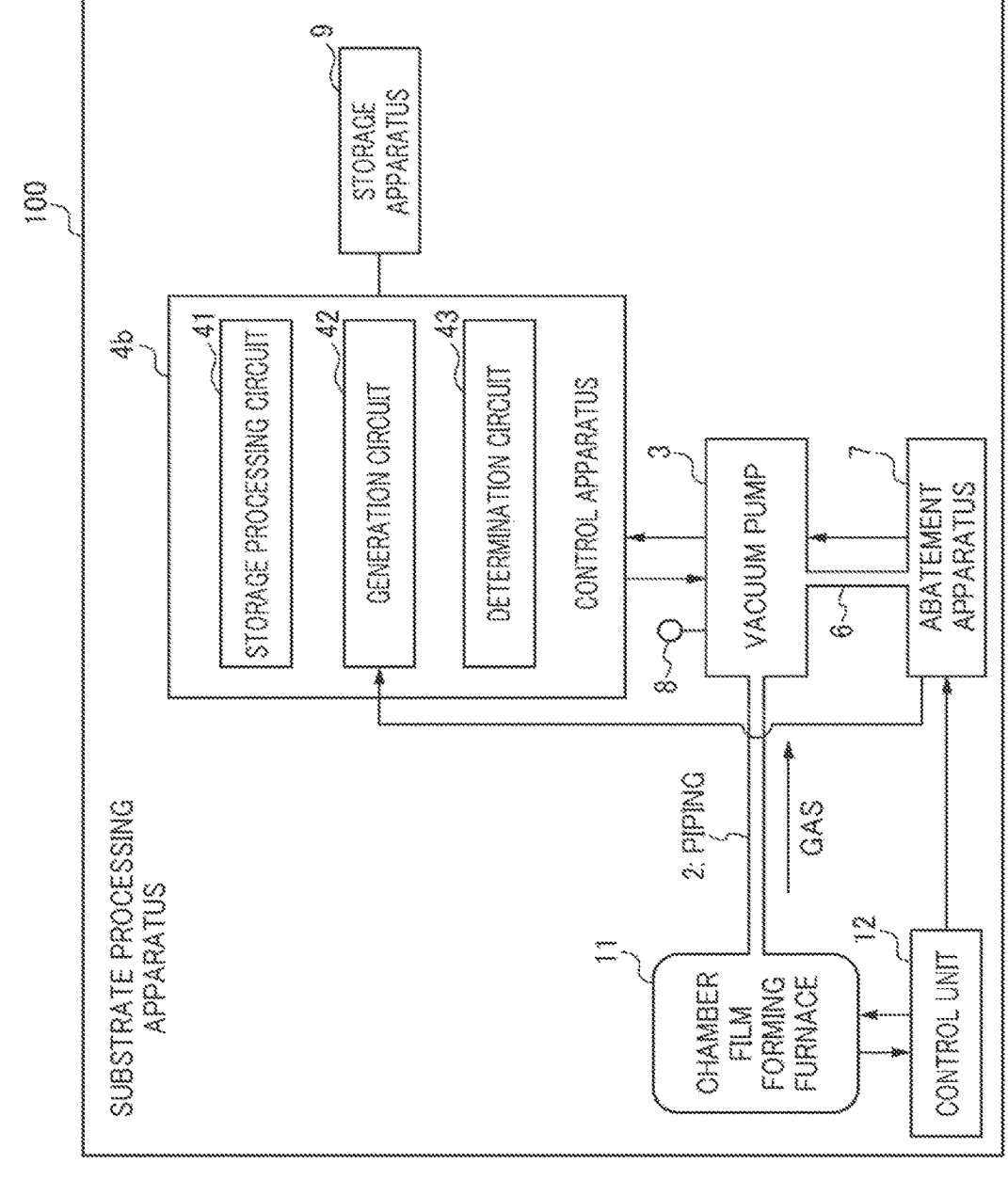
FIG. 39 is a diagram showing a substrate processing apparatus 100 according to a modified example of the second embodiment.

In the above embodiment, the semiconductor manufacturing system is described, but as shown in FIG. 39, may be configured as one apparatus such as a substrate processing apparatus that continuously processes a plurality of substrates. FIG. 39 is a diagram showing a substrate processing apparatus 100 according to a modified example of the second embodiment. As shown in FIG. 39, the substrate processing apparatus 100 may have a chamber film forming furnace 11 which introduces a gas for film formation and forms a substrate, a vacuum pump apparatus 3 which communicates with the chamber film forming furnace 11, an abatement apparatus 7 which processes an exhaust gas of the vacuum pump 3, a control apparatus 4b which controls the vacuum pump 3, and a storage apparatus 9. The control apparatus 4b may have the storage apparatus 9 built therein. The substrate processing apparatus 100 further has a control unit 12 which controls the chamber film forming furnace 11, and the control unit 12 outputs a film formation start signal including film formation start timing to the abatement apparatus 7. As a result, the abatement apparatus 7 can output the film formation start signal including the film formation start timing to a generation circuit 42 to be described later of the control apparatus 4b. Examples of the processing in the abatement apparatus 7 include processing for removing the exhaust gas using a burner for combustion or processing for removing the exhaust gas by oxidation and thermal decomposition using plasma. The control apparatus 4b has a circuit for realizing the function of the information processing apparatus 5 or 5b of the above-described embodiment.

In this case, for example, when processing including at least one of film forming processing and cleaning processing on one substrate using the chamber film forming furnace 11 is continuously performed on a plurality of substrates, the control apparatus 4b has a storage processing circuit 41 which associates at least one of a gas type or a flow rate of gas used in each processing with each processing, and associates at least one of the gas type or the flow rate of gas as a set of data sets to store at least one of the gas type or the flow rate in the storage apparatus 9.

In addition, after starting the vacuum pump 3 to make the chamber film forming furnace 11 into a predetermined vacuum degree, the control apparatus 4b divides the past target state quantity of the target vacuum pump or the past target state quantity of another vacuum pump read from the storage apparatus 9 or the past target state quantity into each process based on the film formation start timing included in the film formation start signal input from the abatement apparatus 7 as a starting point and has the generation circuit 42 generating the divided target state quantity.

Furthermore, the control apparatus 4b has a determination circuit 43 which determines the normal variation range of the target state quantity which is the state quantity varying depending on the load of gas flowing into the vacuum pump 3 for each divided target state quantity.

Here, the storage processing circuit 41, the generation circuit 42, and the determination circuit 43 have been described as hardware, but the present embodiment is not limited thereto, and the control apparatus may have a processor (for example, a microprocessor), and the processor may read and execute the program from a memory device such as a read only memory (ROM) to realize the storage processing circuit 41, the generation circuit 42, and the determination circuit 43.

Third Embodiment

In a semiconductor manufacturing apparatus, a vacuum pump that exhausts a gas used in a semiconductor manufacturing process from an inside of a chamber is in widespread use for the purpose of creating a vacuum environment in the chamber. As such a vacuum pump, a displacement type vacuum pump having a roots type or screw type pump rotor is known.

Generally, the displacement type vacuum pump includes a pair of pump rotors disposed in a casing, and a motor for rotationally driving the pump rotors. A minute clearance is formed between the pair of pump rotors and between the pump rotor and an inner surface of the casing, and the pump rotor is configured to rotate while being in non-contact with the casing. As the pair of pump rotors rotates in an opposite direction to each other while synchronizing, the gas in the casing is transferred from a suction side to a discharge side and is exhausted from the chamber or the like connected to a suction port.

A gas used in the semiconductor manufacturing process or a substance generated by a chemical reaction of the gas used contains components which are solidified or liquefied as temperature drops. Normally, since the vacuum pump described above generates a compression heat during the transfer of the gas, the temperature of the operating vacuum pump rises to some extent. In the case where the temperature of the vacuum pump rising by the compression heat is not higher than the solidification or liquefaction temperature of the components or products in the gas, the temperature of the vacuum pump is maintained by heating a pump main body from the outside or heating an inflowing gas. Even when the gas containing the above-described components is exhausted by using the vacuum pump, good evacuation is performed without solidifying or liquefying the components or products in the gas.

However, there is a semiconductor manufacturing process that cannot prevent the liquefaction and solidification of the gas used or the products from the gas used in increasing the temperature of the vacuum pump as described above. When the operation of the vacuum pump is continued in this process, the solidified products (reaction products) are deposited in a clearance between the pump rotors and a clearance between the pump rotor and the casing. As the products are deposited, an excessive load is applied to the vacuum pump during the operation of the vacuum pump, such that the vacuum pump stops during the manufacturing process and articles are severely damaged during the manufacturing process.

In order to prevent such damage, Patent Literature 3 discloses generating a warning when an integral value or an average value of a motor current exceeds a threshold value. Patent Literature 4 discloses analyzing and diagnosing a signal from a sensor unit including at least an acoustic emission (AE) sensor which detects AE generated by a vacuum pump.

However, there is a need for a technique of reducing the risk that the vacuum pump stops during the manufacturing process and articles are greatly damaged during the manufacturing process.

First, a third embodiment will be described. The third embodiment is described on the premise that a failure arrival common condition extracted from the tendency of abnormality data detected in data of a state quantity of a failed vacuum pump is stored in an information processing apparatus 205 as criterion data. The information processing apparatus 205 according to the third embodiment compares the tendency of abnormality data detected from the data of the state quantity of the operating vacuum pump with the criterion data, and outputs the comparison result.

Figure 40:
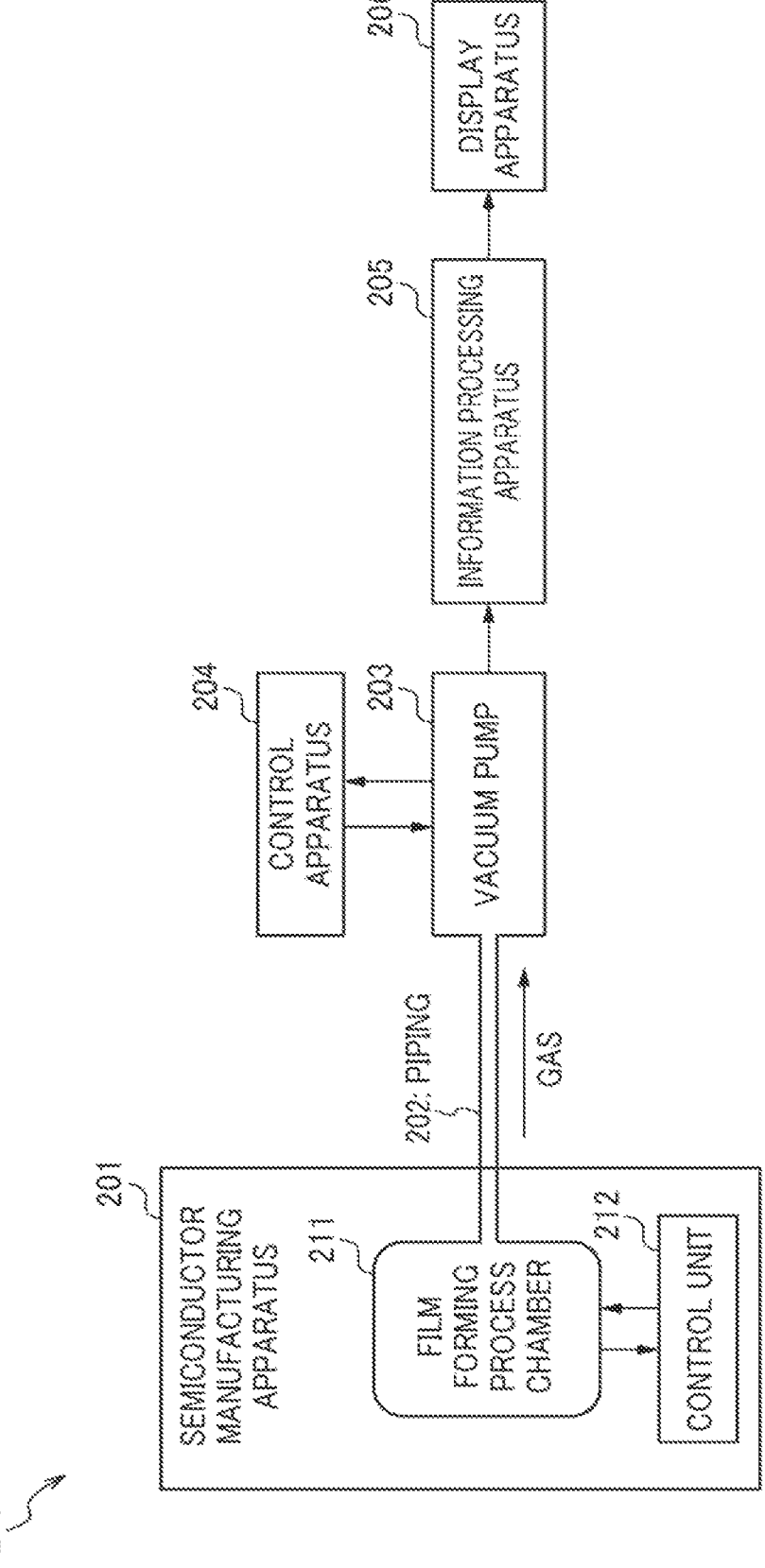
FIG. 40 is a schematic configuration diagram of a semiconductor manufacturing system 210 according to a third embodiment.

FIG. 40 is a schematic configuration diagram of the semiconductor manufacturing system 210 according to the third embodiment. As shown in FIG. 40, the semiconductor manufacturing system 210 according to the present embodiment includes a semiconductor manufacturing apparatus 201, a vacuum pump 203, a piping 202 connecting between the semiconductor manufacturing apparatus 201 and the vacuum pump 203, a control apparatus 204 controlling the vacuum pump 203, an information processing apparatus 205, and a display apparatus 206 connected to the information processing apparatus 205. The semiconductor manufacturing apparatus 201 includes a film forming process chamber 211 and a control unit 212 controlling the film forming process chamber 211. The film forming process chamber 211 and the vacuum pump 203 communicate with each other via the piping 202, and a gas in the film forming process chamber 211 is discharged by the operation of the vacuum pump 203 to make the film forming process chamber 211 into substantially a vacuum state. As a type of film formation in the film forming process chamber 211, there are chemical vapor deposition (CVD), physical vapor deposition (PVD), atomic layer deposition (ALD), deposition, and sputtering film formation.

The vacuum pump 203 may include a roots type rotor or may include a screw type rotor. In addition, the vacuum pump 203 may be a claw type or scroll type vacuum pump. In addition, the vacuum pump 203 may be a single-stage pump or may be a multi-stage pump. An exhaust gas processing apparatus is connected to a rear stage of an exhaust side of the vacuum pump 203. The information processing apparatus 205 according to the present embodiment compares the tendency of abnormality data detected from the data of the state quantity of the operating vacuum pump with a criterion data, and outputs the comparison result to, for example, the display apparatus 206.

FIG. 41 is a schematic functional configuration diagram of the vacuum pump 203 according to the third embodiment. As shown in FIG. 41, the vacuum pump 203 includes a power supply 236, an inverter 237 whose input is connected to the power supply 236, a motor 238 whose input is connected to an output of the inverter 237, and a rotor 239 connected to a rotating shaft of the motor 238. In addition, the vacuum pump 203 includes a pressure gauge 235.

The inverter 237 performs a frequency conversion on an alternating current supplied from the power supply 236, and supplies a driving current obtained by the frequency conversion to the motor 238. As a result, the rotating shaft of the motor 238 is rotated by the driving current, and the rotor 239 rotates accordingly, so that the gas sucked from the piping 202 is discharged. In this way, by continuously transferring the gas from the piping 202, the gas in the film forming process chamber 211 connected to the piping 202 is evacuated.

The motor 238 outputs an RPM signal indicating the RPM of the motor 238 to the inverter 237. The inverter 237 supplies, for example, an effective current value of the driving current and a rotational speed of the motor 238 obtained from the RPM speed signal to the information processing apparatus 205. In addition, the pressure value in the vacuum pump 203 measured by the pressure gauge 235 is supplied to the information processing apparatus 205.

Figure 42:
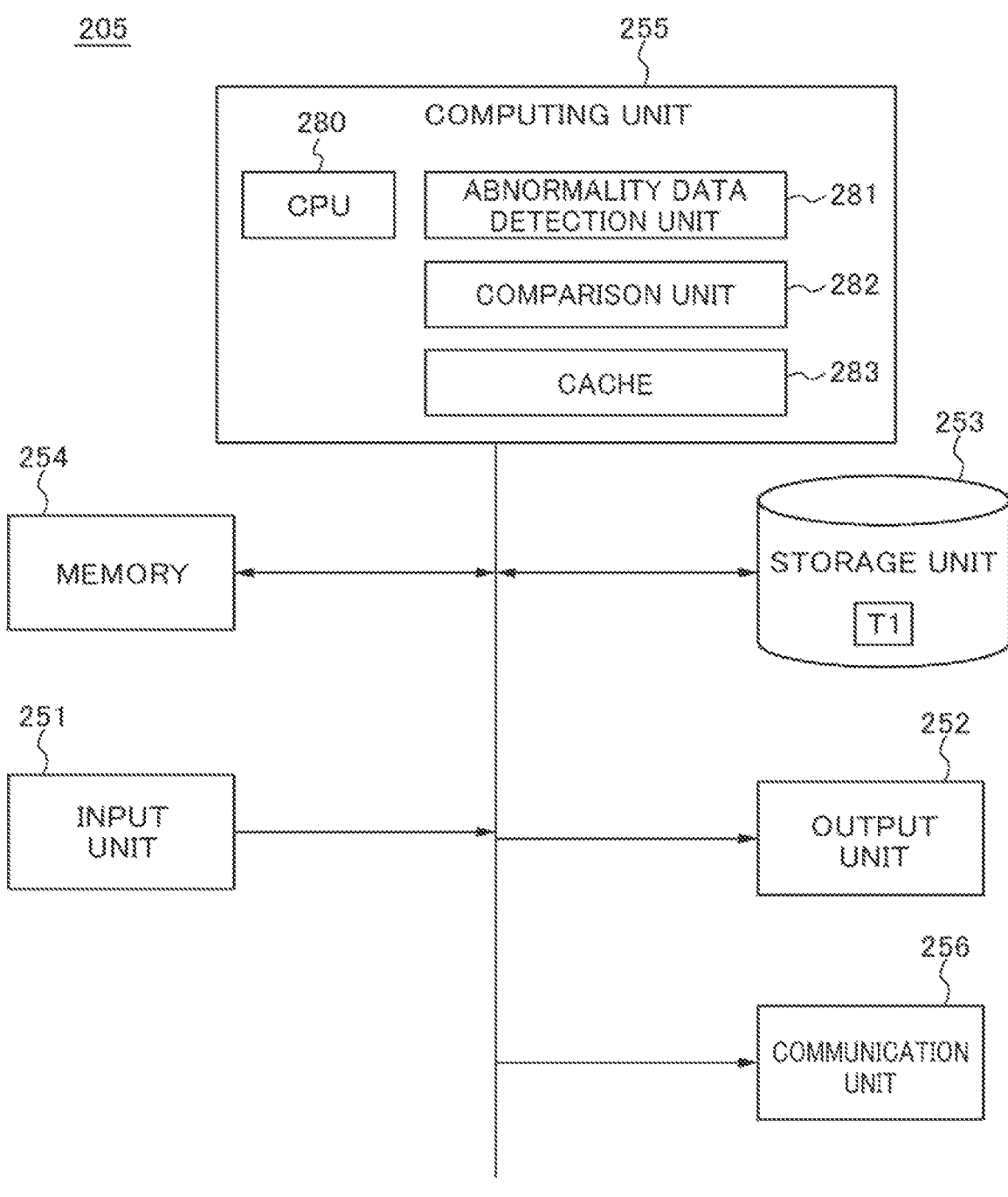
FIG. 42 is a schematic configuration diagram of an information processing apparatus 205 according to the third embodiment.

FIG. 42 is a schematic configuration diagram of the information processing apparatus 205 according to the third embodiment. As shown in FIG. 42, the information processing apparatus 205 includes an input unit 251, an output unit 252, a storage unit 253, a memory 254, a computing unit 255, and a communication unit 256.

The input unit 251 is connected to the inverter 237 and the pressure gauge 235, and the effective current value of the driving current, the rotation speed of the motor 238, and the pressure value in the vacuum pump 203 are input to the input unit 251. The output unit 252 outputs a signal including information to the display apparatus 206 according to a command from the computing unit 255. Operation data are stored in the storage unit 253. The computing unit 255 has a central processing unit (CPU) 280, an abnormality data detection unit 281, a comparison unit 282, and a cache 283 in which a program is stored.

In addition, criterion data for judging the failure arrival possibility is stored in the storage unit 253. This criterion data is determined using the tendency of abnormality data detected in the data of the state quantity of the failed vacuum pump. In the present embodiment, as an example, as shown in FIG. 43, attributes of the vacuum pump 203 and the criterion data are stored in the storage unit 253 by being associated with each other. FIG. 43 is a diagram showing an example of a table T1 stored in the storage unit 253. In the table T1, a set of the attributes of the vacuum pump and the criterion data is stored. Here, the attributes of the vacuum pump are, for example, the type of the vacuum pump, the model and/or the type or model of the semiconductor manufacturing apparatus connected to the vacuum pump, the serial number of the vacuum pump, or a part number of parts constituting the vacuum pump.

The memory 254 temporarily stores information. The communication unit 256 communicates with an external terminal apparatus via a communication network. This communication may be wired or wireless. The CPU 280 reads and executes the program stored in the cache 283.

The abnormality data detection unit 281 detects the abnormality data from the data of the state quantity of the operating vacuum pump. Here, the abnormality data are, for example, a value deviated from a normal range defined for each divided process, a spike value not related to the process, abnormality (for example, instantaneously deviated data, the whole increase tendency of a division section for a certain period, or the like) of a change tendency over time in all processes of each divided process, or the like.

The comparison unit 282 compares the tendency of the abnormality data detected from the data of the state quantity of the operating vacuum pump detected by the abnormality data detection unit 281 with the criterion data stored in the storage unit 253, and outputs the comparison result. Specifically, for example, the comparison unit 282 judges the failure arrival possibility of the vacuum pump as the comparison result, and outputs the judgment result as the comparison result. Here, the tendency of the abnormality data is, for example, (1) the number of times of occurrence of abnormality data, (2) the time change in the interval of abnormality data occurrence (decrease in the interval), (3) the increase or decrease tendency in the abnormality data value, (4) the time change in an abnormality occurrence duration or the time change in duration, (5) the tendency (deviation) of a process in which the abnormality data occurs, and (6) the conditions (1) to (4) (for example, (1) to (4) in a certain process) in the process in which the abnormality occurs or the situation in which a combination (set) of (7) and (2) to (4) occurs. The processing in the comparison unit 282 may be performed by the CPU 280. In addition, the comparison unit 282 may be separately realized by a field-programmable gate array (FPGA) or a dedicated board.

In addition, as described above, in the present embodiment, as an example, the attributes of the vacuum pump and the criterion data are stored in the storage unit 253 by being associated with each other. The comparison unit 282 may compare the tendency of the abnormality data detected from the state quantity of the operating vacuum pump 203 with the criterion data stored by being associated with the attributes of the operating vacuum pump 203 in the storage unit 253.

Figure 44:
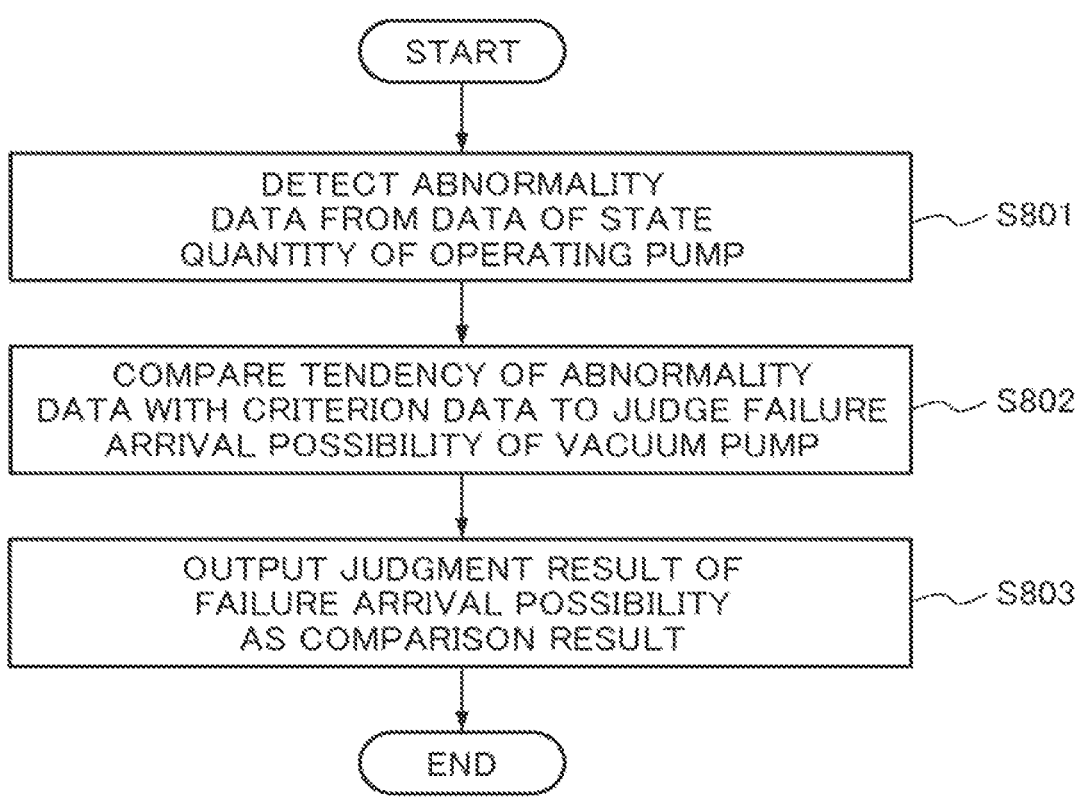
FIG. 44 is a flowchart showing an example of a flow of comparison processing according to the third embodiment.

Subsequently, the flow of the comparison processing according to the third embodiment will be described with reference to FIG. 44. FIG. 44 is a flowchart showing an example of a flow of comparison processing according to the third embodiment.

First, the abnormality data detection unit 281 detects the abnormality data from the data of the state quantity of the operating pump (step S101).

Next, the comparison unit 282 compares the tendency of the abnormality data with the criterion data, and judges the failure arrival possibility of the vacuum pump 203 (step S102).

Next, the comparison unit 282 outputs the judgment result of the failure arrival possibility to, for example, the display apparatus 206 as the comparison result (step S103).

Hereinafter, an example of a comparison method in the comparison unit 282 will be described below.
(Comparative Method 1)

For example, when the threshold value is stored in the storage unit 253 as the criterion data, the comparison unit 282 may compare the threshold value which is the criterion data with the number of times of occurrence of abnormality data of the operating vacuum pump, and make a judgment. Here, the threshold value is set using, for example, the number of times of occurrence of abnormality data of a plurality of failed vacuum pumps. Specifically, the threshold value may be an average value, a median value, a minimum value, a maximum value, a representative value, or the like of the number of times of occurrence of abnormality data of the failed vacuum pump. Specifically, the comparison unit 282 judges whether the number of times of occurrence of abnormality data of the operating vacuum pump exceeds the threshold value, and when the number of times of occurrence of abnormality data exceeds the threshold value, it is judged that there is the failure arrival possibility of the vacuum pump 203.
(Comparative Method 2)

For example, in the case where a plurality of sets of parameters (for example, state quantity, the number of times of occurrence, occurrence frequency, and occurrence interval) related to abnormality data and failure occurrence probability are stored in the storage unit 253 as criterion data, the comparison unit 282 may compare the parameters related to the abnormality data stored in the storage unit 253 with the number of times of occurrence of abnormality data of the operating vacuum pump to output the corresponding failure occurrence probability in the storage unit 253 to the number of times of occurrence of abnormality data of the operating vacuum pump.

(Comparative Method 3)

For example, in the case where a plurality of parameters (for example, the state quantity, the number of times of occurrence, the occurrence frequency, and the occurrence interval) related to abnormality data and the failure occurrence probability are stored in the storage unit 253 as the criterion data, the comparison unit 282 may compare the plurality of parameters stored in the storage unit 253 with the plurality of parameters of the operating vacuum pump to output the corresponding failure occurrence probability in the storage unit 253 to a set of the plurality of parameters of the operating vacuum pump.
(Comparative Method 4)

For example, it is assumed that the criterion values are stored in the storage unit 253 as the criterion data by being associated with the parameters (for example, the state quantity, the number of times of occurrence, the occurrence frequency, and the occurrence interval) related to abnormality data, and the failure occurrence probability is stored as the criterion data by being associated with a set of parameters (for example, the state quantity, the number of times of occurrence, the occurrence frequency, and the occurrence interval) related to a divergence value and the abnormality data. The comparison unit 282 may compare the parameter related to the abnormality data stored in the storage unit 253 with the corresponding parameter of the operating vacuum pump to determine the deviation value (or matching tendency degree) from the criterion value of the corresponding parameter of the operating vacuum pump. The comparison unit 282 may output the corresponding failure occurrence probability in the storage unit 253 to the set of the divergence value and the parameter related to the abnormality data.

Next, the comparison unit 282 outputs the judgment result of the failure arrival possibility as the comparison result (output data) (step S103). Here, the comparison unit 282 may output the comparison result (output data) to the display apparatus 206 to display the comparison result (output data) on the display apparatus 206, or may transmit the comparison result (output data) to the external terminal apparatus from the communication unit 56 via the communication network.

The comparison result (output data) includes an alarm signal alarming the failure arrival possibility, a notification signal indicating that the probability of failure arrival is high, the failure occurrence probability, and the like. Here, the failure occurrence probability is, for example, the probability that a failure occurs within a predetermined time.

As described above, the information processing apparatus 205 according to the present embodiment includes the comparison unit 282. The comparison unit 282 refers to the storage unit 253 in which the failure arrival common condition extracted from the tendency of the abnormality data detected in the data of the state quantity of the failed vacuum pump is stored as the criterion data to compare the tendency of the abnormality data detected from the data of the state quantity of the operating vacuum pump with the criterion data stored in the storage unit 253 and outputs the comparison result.

According to this configuration, since it is possible to grasp the failure arrival possibility of the vacuum pump, it is possible to reduce the risk that the vacuum pump stops during the manufacturing process and articles are greatly damaged during the manufacturing process.

The film forming process of the semiconductor manufacturing apparatus and the criterion data may be stored in the storage unit 253 by being associated with each other. In this case, the comparison unit 282 may compare the tendency of the abnormality data detected from the state quantity of the operating vacuum pump with the criterion data which are stored in the storage unit 253 by being associated with the current film forming process of the semiconductor manufacturing apparatus 201 connected to the operating vacuum pump. According to this configuration, the comparison unit 282 can accurately estimate the failure arrival possibility of the vacuum pump 203 by comparing with criterion data for each film forming process of the semiconductor manufacturing apparatus 201, so that it is possible to reduce the risk that the vacuum pump stops and articles are greatly damaged during the manufacturing process.

In the example described above, the film forming process of the semiconductor manufacturing apparatus and the criterion data may be stored in the storage unit 253 by being associated with each other, but the present invention is not limited thereto, and another manufacturing process of the semiconductor manufacturing apparatus and the criterion data may be stored by being associated with each other. Here, other manufacturing processes other than the film forming process are, for example, an implant process, an etching process, an ashing process, a heating process, and the like. In this case, the comparison unit 282 may compare the tendency of the abnormality data detected from the state quantity of the operating vacuum pump with the criterion data which are stored in the storage unit 253 by being associated with the current manufacturing process the semiconductor manufacturing apparatus 201 connected to the operating vacuum pump.

Modified Example

In the present embodiment, a person such as a manufacturer of a vacuum pump determines a failure arrival common condition as criterion data from a tendency of abnormality data detected in data of a state quantity of a failed vacuum pump in advance, but the present embodiment is not limited thereto. The criterion data determination apparatus 220 may extract parameters of interest from the tendency of the abnormality data detected in the data of the state quantity of the failed vacuum pump and set a failure arrival common condition corresponding to the extracted parameters as the criterion data.

Hereinafter, a configuration of the criterion data determination apparatus 220 will be described. For example, the abnormality data detected in the data of the state quantity of the failed vacuum pump are collected by manufacturing companies of the vacuum pump together with the data of the state quantity of the failed vacuum pump. Here, as an example, a description is made under the assumption that the criterion data determination apparatus 220 is installed in the manufacturing companies.

Here, the abnormality data are, for example, a value deviated from a normal range defined for each divided process, a spike value not related to the process, and/or abnormality (for example, there are no instantaneously deviated data, but the abnormality that the whole division section for a certain period tends to increase) of a change tendency over time in all processes for each divided process, or the like.

Figure 45:
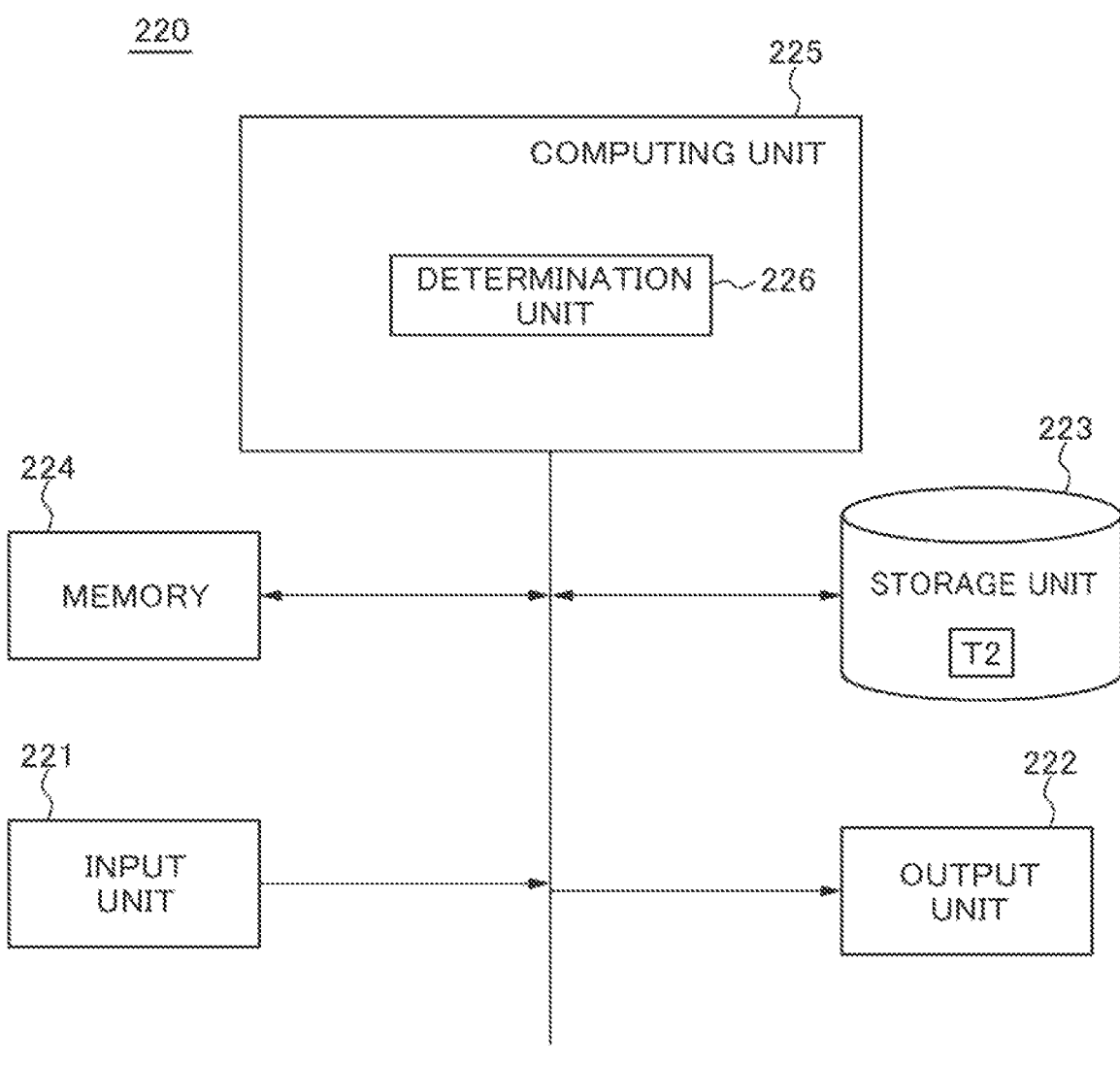
FIG. 45 is a schematic configuration diagram showing a criterion data determination apparatus 220 according to a modified example of the third embodiment.

FIG. 45 is a schematic configuration diagram showing a criterion data determination apparatus 220 according to a modified example of the third embodiment. As shown in FIG. 45, the criterion data determination apparatus 220 includes an input unit 221, an output unit 222, a storage unit

223, a memory 224, and a computing unit 225 having a central processing unit (CPU). Each unit is connected to each other by a bus.

The input unit 221 receives an input from an operator. The output unit 52 outputs information according to a command from the computing unit 225. The storage unit 223 stores a program to be executed by the computing unit 225. In addition, every time the abnormality data detected in the data of the state quantity of the failed vacuum pump is collected, this abnormality data are added to the storage unit 223 by the operation of the operator.

In this embodiment, as an example, a set of attributes of the vacuum pump and the abnormality data is added to the storage unit 223 by the operation of the operator. Here, as described above, the attributes of the vacuum pump is, for example, the type or model of the vacuum pump and/or the type or model of the semiconductor manufacturing apparatus connected to the vacuum pump. As a result, as shown in FIG. 46, a set of the attributes of the vacuum pump and the abnormality data is accumulated. FIG. 46 shows an example of a table T2 stored in the storage unit 223. In the table T2, a set of the attributes of the vacuum pump and a file name of the abnormality data is stored, and the abnormality data itself are also stored in the storage unit 223. As a result, the computing unit 225 can refer to the abnormality data from the file name of the abnormality data.

The memory 224 temporarily stores information. The computing unit 225 reads and executes the program stored in the storage unit 223. As a result, the computing unit functions as the determination unit 226.

The abnormality data detected in the data of the state quantity of the failed vacuum pump is stored in the storage unit 223. The determination unit 226 refers to the storage unit 223 to determine the criterion data for judging the failure arrival possibility using the tendency of the abnormality data. Specifically, the determination unit 226 determines the tendency of interest by learning using artificial intelligence, for example, deep learning using a deep neural network, or the like from the tendency of the abnormality data detected in the data of the state quantity of the failed vacuum pump. The determination unit 226 may set the criterion data (for example, a threshold value) according to the extracted tendency of interest. For example, the determination unit 226 may determine the failure arrival common condition, which is a condition common to the failed vacuum pump, as the criterion data for the parameters of interest.

Here, the tendency of interest is, for example, (1) the number of times of occurrence of abnormality data, (2) the time change in an abnormality data occurrence interval (decrease in the interval), (3) the increase or decrease tendency in the abnormality data value, (4) the time change in an abnormality occurrence duration or the time change in duration, (5) the tendency (deviation) of a process in which the abnormality data occurs, and (6) the conditions (1) to (4) (for example, (1) to (4) in a certain process) in the process in which the abnormality occurs or the situation in which a combination (set) of (7) and (2) to (4) occurs.

The criterion data may be a threshold value. For example, when the failure arrival common condition is the number of times of occurrence of abnormality data, the criterion data is a threshold value. For example, when it is common that the number of times of occurrences of abnormality data for the failed vacuum pump is 10 times, 10 is set as the criterion data.

In addition, the criterion data may be the plurality of sets of parameters (for example, the number of times of occurrence of abnormality data) related to the abnormality data and the failure occurrence probability. The number of times of occurrence of abnormality data may be consecutive integers or discontinuous integers.

In addition, the criterion data may be a set of the parameters related to the abnormality data and the criterion value, a set of the divergence value and the parameters related to the abnormality data, and the failure occurrence probability corresponding to the set.

In addition, the criterion data may be the plurality of parameters related to the abnormality data and the failure occurrence probability corresponding to the plurality of sets of parameters.

As an example of the criterion data extraction processing, the determination unit 226 may determine the criterion data for each attribute of the vacuum pump. According to this configuration, since the criterion data are created for each attribute of the vacuum pump, when comparing with the tendency of the abnormality data detected from the data of the state quantity of the operating vacuum pump, it is possible to compare the tendency of the abnormality data with the criterion data corresponding to the vacuum pump of the attributes to which the operating vacuum pump belongs. As a result, it is possible to improve the determination accuracy on the failure arrival possibility of the vacuum pump.

Figure 47:
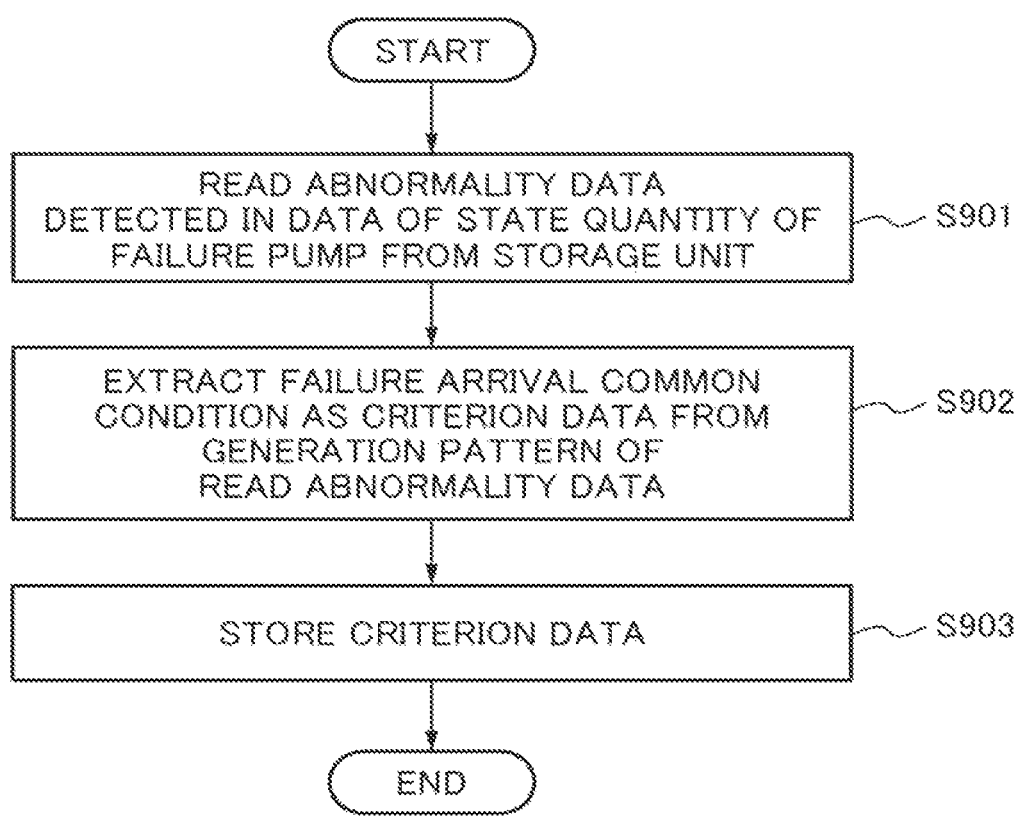
FIG. 47 is a flowchart showing an example of criterion data extraction processing according to a modified example of the third embodiment.

Subsequently, the flow of the extraction processing of the criterion data according to the modified example of the third embodiment will be described with reference to FIG. 47. FIG. 47 is a flowchart showing an example of criterion data extraction processing according to a modified example of the third embodiment.

First, the abnormality data detected in the data of the state quantity of the failure pump is read from the storage unit 223 (step S201).

Next, the determination unit 226 extracts the failure arrival common condition as the criterion data from the tendency of the read abnormality data (step S202).

Next, the determination unit 226 stores the extracted criterion data in the storage unit 223 (step S203).

The determination unit 226 may extract the criterion data for each film forming process of the semiconductor manufacturing apparatus or the determination unit 226 may extract the criterion data for each set of the attributes of the vacuum pump and the film forming process of the semiconductor manufacturing apparatus. According to this configuration, since the criterion data are created for each film forming process of the semiconductor manufacturing apparatus, when comparing with the tendency of the abnormality data detected from the data of the state quantity of the operating vacuum pump 203, it is possible to compare the tendency of the abnormality data with the criterion data corresponding to the film forming process of the semiconductor manufacturing apparatus 201 to which the operating vacuum pump 203 is connected. As a result, it is possible to improve the judging accuracy on the failure arrival possibility of the vacuum pump. According to this configuration, it is preferable that the set of the attributes of the vacuum pump, the film forming process of the semiconductor manufacturing apparatus, and the abnormality data is added to the storage unit 223 every time the abnormality data are collected so that the determination unit 226 refers to the storage unit 223 to extract the criterion data.

The determination unit 226 may extract the criterion data for each film forming process of the semiconductor manufacturing apparatus, but the present modified embodiment is not limited thereto, and the criterion data may be extracted for each other manufacturing process of the semiconductor manufacturing apparatus.

In the present modified example, the criterion data determination apparatus 220 determines the tendency of interest from the tendency of the abnormality data detected in the data of the state quantity of the failed vacuum pump and determines the failure arrival common condition corresponding to the tendency as the criterion data, but the present modified example is not limited thereto. A person such as a designer or a manufacturer may set the tendency (for example, the number of times of occurrence of abnormality data) of interest from the tendency of the abnormality data detected in the data of the state quantity of the vacuum pump that has failed in advance, and the criterion data determination apparatus 220 may set the criterion data (for example, a threshold value) corresponding to the set parameters (for example, the number of times of occurrence of abnormality data). For example, when the failure arrival common condition is the number of times of occurrence of abnormality data, the criterion data determination apparatus 220 may set the statistical quantity (for example, the minimum value, the median value, and the average value) of the number of times of occurrence of abnormality data in a plurality of abnormality data to the threshold value.

(As to Notification Processing)

Figure 48:
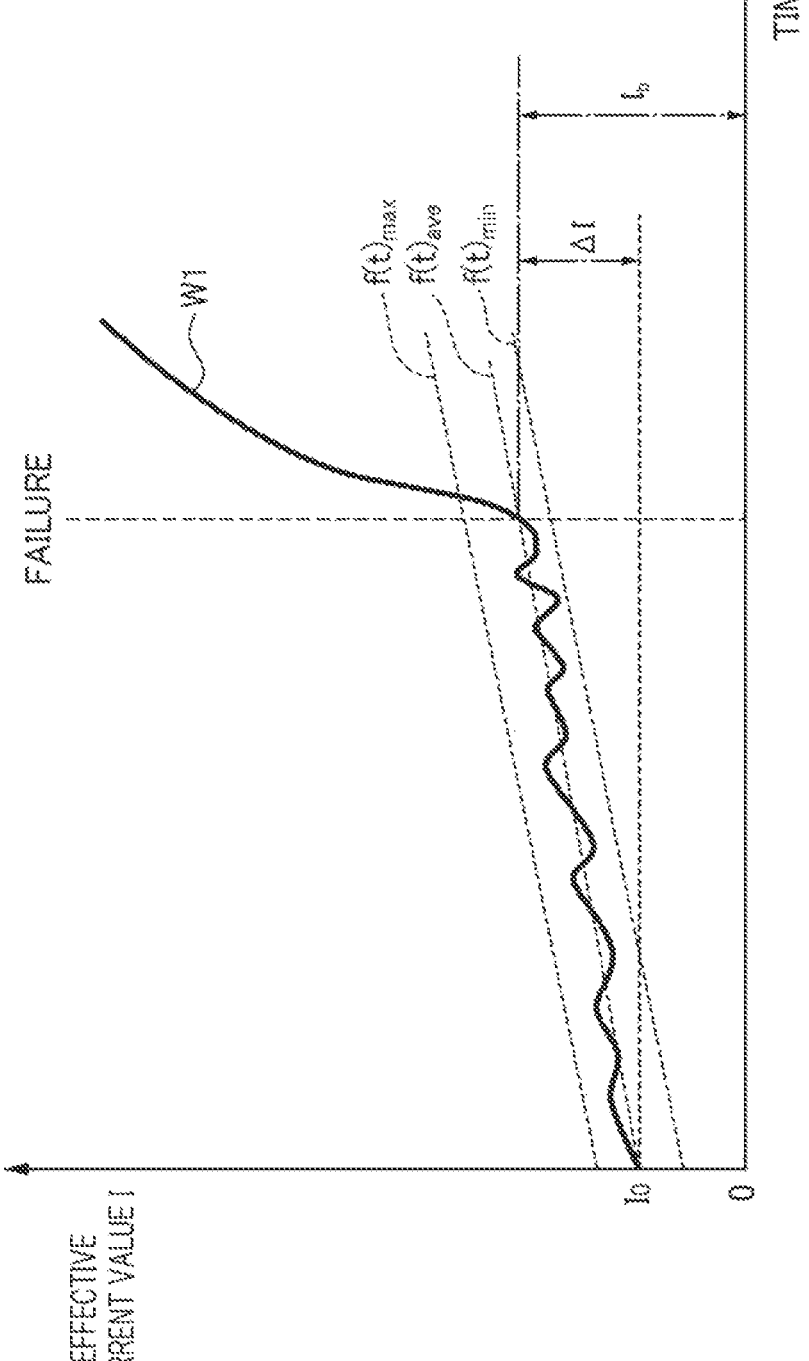
FIG. 48 is a graph showing an example of a relationship between an effective current value I of a motor 238 and a time in a certain failed vacuum pump.

Subsequently, an example of the notification process of the comparison unit 282 of the information processing apparatus 205 will be described with reference to FIGS. 48 to 55. FIG. 48 is a graph showing an example of a relationship between an effective current value I of a motor 238 and a time in a certain failed vacuum pump. A curve W1 is a time change in the effective current value I of the motor 238 in a certain failed vacuum pump. A straight line $f(t)_{ave}$ is an average time change in the effective current value I of the motor 238 in the normal vacuum pump. A straight line $f(t)_{max}$ is a time change in a maximum value of the normal range of the effective current value I of the motor 238 in the vacuum pump. The straight line $f(t)_{min}$ is a time change in a minimum value of the normal range of the effective current value I of the motor 238 in the vacuum pump. For example, the comparison unit 282 issues an alert when the effective current value I of the currently operating motor 238 exceeds $f(t)_{max}$.

Figure 49:
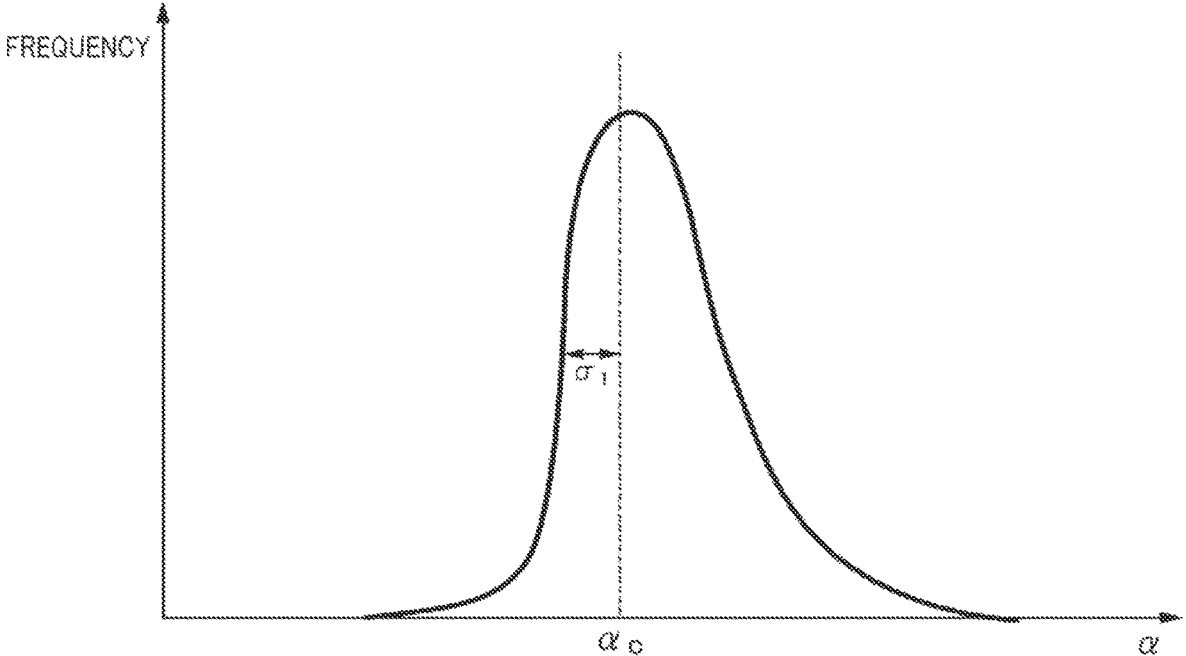
FIG. 49 is a diagram showing an example of a frequency graph of a parameter α when aggregated for the failed vacuum pump.

As shown in FIG. 48, it is assumed that the effective current value at the time of failure is set to be $I_b$, and $\Delta I$ is set to be a value ($I\Delta = I_b - I_0$) obtained from subtracting an initial value $I_0$ of the effective current value from effective current value $I_b$ at the time of failure. FIG. 49 shows, for example, a frequency graph of the parameter $\alpha$ when the operation data of the failed pump aggregates with a parameter $\alpha$ ($=\Delta I/I_b$) obtained by dividing the difference value $\Delta I$ by the effective current value $I_b$ at the time of failure.

FIG. 49 is a diagram showing an example of a frequency graph of a parameter $\alpha$ when aggregated for the failed vacuum pump. A median value of the parameter $\alpha$ is set to be $\alpha_c$ and a standard deviation of the parameter $\alpha$ is set to be $\sigma_1$. At this time, the comparison unit 282 may issue a first alarm (alert) when the parameter $\alpha$ of the operating vacuum pump 203 is ($\alpha_c - 3\sigma_1$), a second alert when the parameter $\alpha$ is ($\alpha_c - 2\sigma_1$), a third alert when the parameter $\alpha$ is ($\alpha_c - \sigma_1$) (for example, an alert is displayed on the display apparatus 206).

As described above, during the operation of the pump 3, the comparison unit 282 compares the value (here, as an example, the parameter $\alpha$ during operation) based on the state quantity of the operating vacuum pump 203 with a statistical quantity (here, as an example, $\alpha_c - \sigma_1$, $\alpha_c - 2\sigma_1$, or $\alpha_c$-3$\sigma_1$) of the value (here, as an example, the parameter $\alpha$) based on the state quantity (here, as an example, the effective current value) at the time of failure of the failed vacuum pump and performs a control to issue a notification according to the comparison result. As a result, the notification can be issued when the state quantity of the operating vacuum pump 203 approaches the state quantity at the time of failure of the failed vacuum pump, and the maintenance or replacement of the vacuum pump 203 can be performed before the vacuum pump 203 fails.

Figure 50:
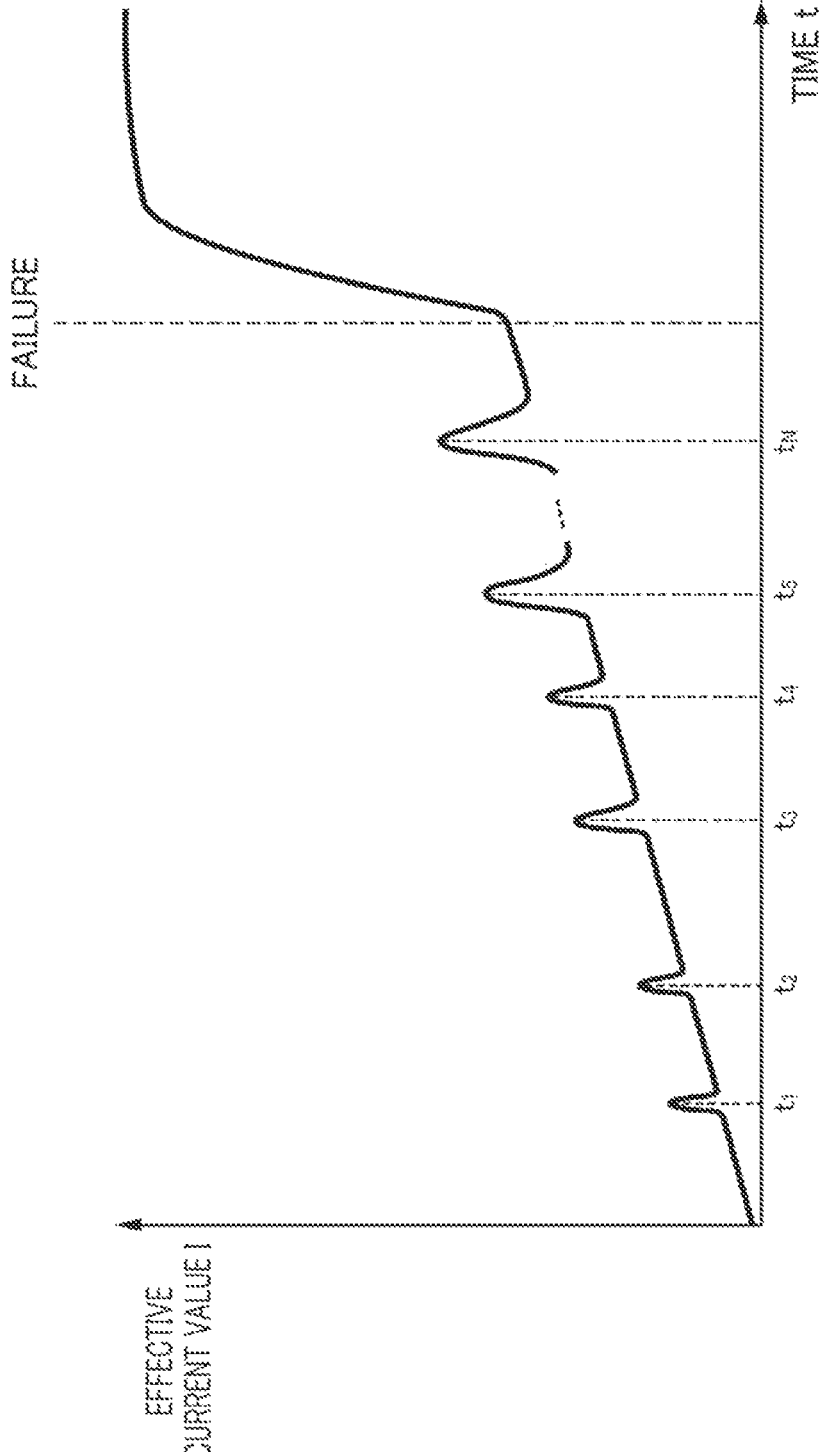
FIG. 50 is a graph showing another example of the relationship between the effective current value I of the motor 238 and a time in the certain failed vacuum pump.
Figure 51A:
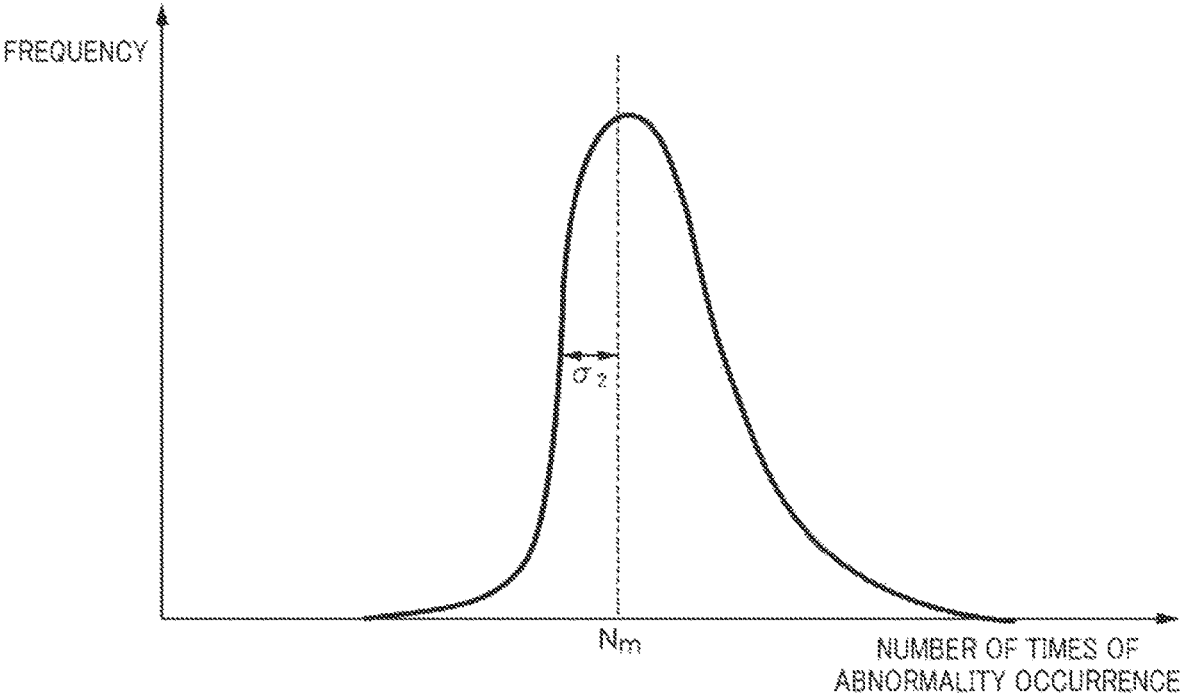
FIG. 51A is a diagram showing an example of a frequency graph of the number of times of abnormality occurrence when the number of times of abnormality occurrence aggregates up to failure for the failed vacuum pump.

FIG. 50 is a graph showing another example of the relationship between the effective current value I of the motor 238 and a time in the certain failed vacuum pump. As shown in FIG. 50, in the failed pump, an abnormality occurs at time $t_1$, $t_2$, $t_3$, $t_4$, $t_5$, . . . $t_N$ (N is a positive integer), and the number of times of abnormality occurrence up to failure is N times. FIG. 51A shows, for example, a frequency graph of the number of times of abnormality occurrence when the number of times of abnormality occurrence aggregates up to failure for the failed vacuum pump.

FIG. 51A is a diagram showing an example of a frequency graph of the number of times of abnormality occurrence when the number of times of abnormality occurrence aggregates up to failure for the failed vacuum pump. An average value of the number of times of abnormality occurrence up to failure is set to be $N_m$, and the standard deviation of the number of times of abnormality occurrence up to failure is set to be $\sigma_2$. At this time, the comparison unit 282 may issue a first alert when the number of times of abnormality occurrence of the operating vacuum pump is ($N_m$−3$\sigma_2$) and a first maintenance warning between ($N_m$−3$\sigma_2$) and ($N_m$−2$\sigma_2$) (for example, the alert is displayed on the display apparatus 6). In addition, the comparison unit 282 may issue a second alert at the time of ($N_m$−2$\sigma_2$) and a second maintenance warning between ($N_m$−2$\sigma_2$) and ($N_m$−3$\sigma_2$).

Here, the maintenance warning means that for example, the maintenance is recommended or the maintenance time is reached.

In this way, the comparison unit 282 compares the number of times of abnormality occurrence of the state quantity (here, as an example, the effective current value I) of the operating vacuum pump with the statistical quantity (here, as an example, $N_m$−3$\sigma_2$, $N_m$−2$\sigma_2$, and $N_m$−$\sigma_2$) of the number of times of abnormality occurrence of the state quantity (here, as an example, the effective current value I) up to the time of failure of the failed vacuum pump, and performs a control to issue a notification according to the comparison result. As a result, the notification can be issued when the state quantity of the operating vacuum pump 203 approaches the number of times of abnormality occurrence up to failure of the failed vacuum pump, and the maintenance or replacement of the vacuum pump 203 can be performed before the vacuum pump 203 fails.

Figure 51B:
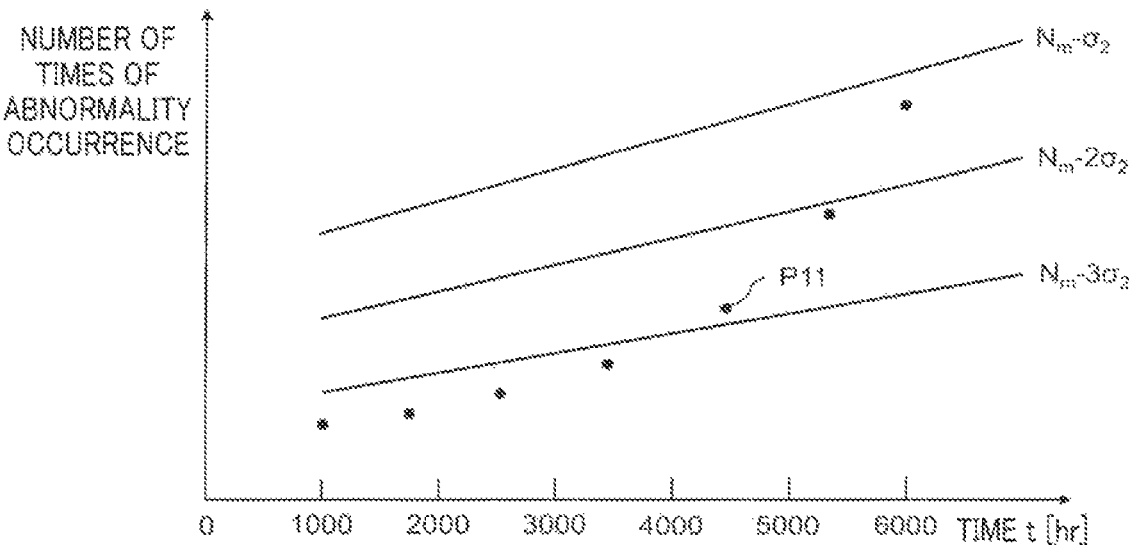
FIG. 51B is a diagram showing an example of a graph in which a time change in a statistical quantity of the number of times of abnormality occurrence of the failed vacuum pump and the number of times of abnormality occurrence of the currently operating pump are plotted.

FIG. 51B is a diagram showing an example of a graph in which a time change in a statistical quantity of the number of times of abnormality occurrence of the failed vacuum pump and the number of times of abnormality occurrence of the currently operating pump are plotted. FIG. 51B shows the time changes in the statistical quantity $N_m$−3$\sigma_2$, $N_m$−2$\sigma_2$, and $N_m$−$\sigma_2$, respectively. Point P11 is a point where the number of times of abnormality occurrence of the operating vacuum pump exceeds the statistical quantity $N_m$−3$\sigma_2$ for the first time. In this way, when the number of times of abnormality occurrence of the operating vacuum pump exceeds the statistical quantity $N_m$−3$\sigma_2$ for the first time, the comparison unit 552 may issue an alert.

Figure 52:
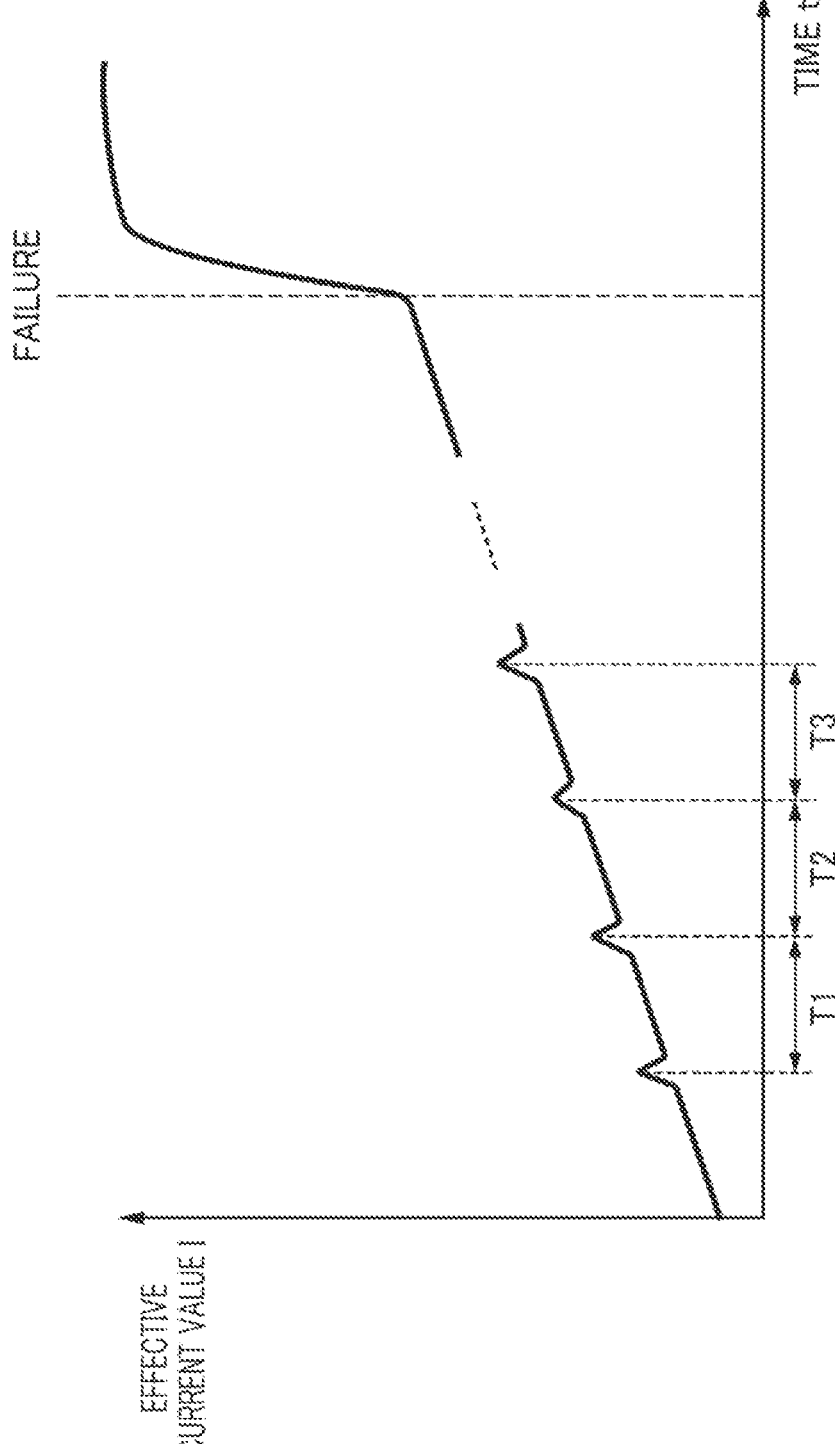
FIG. 52 is a graph showing a third example of the relationship between the effective current value I of the motor 238 and a time in the failed vacuum pump.
Figure 53:
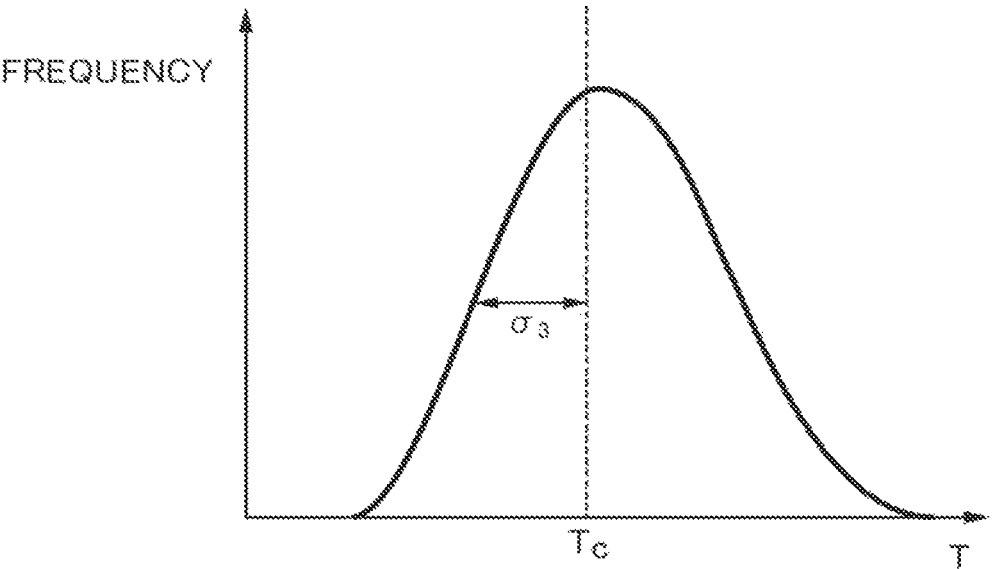
FIG. 53 is a diagram showing an example of a frequency graph of intervals of abnormality occurrence immediately before failure when the abnormality occurrence intervals in a predetermined period immediately before failure aggregate for the failed vacuum pump.

FIG. 52 is a graph showing a third example of the relationship between the effective current value I of the motor 238 and a time in the failed vacuum pump. As shown in FIG. 52, the abnormality occurrence intervals in the failed vacuum pump are T1, T2, and T3. FIG. 53 shows, for example, a frequency graph of the abnormality occurrence interval T when the abnormality occurrence interval T in a predetermined period immediately before failure aggregates for the failed vacuum pump. The predetermined period immediately before failure is, for example, 200 hours immediately before failure.

FIG. 53 is a diagram showing an example of a frequency graph of the abnormality occurrence intervals immediately before failure when the abnormality occurrence intervals in a predetermined period immediately before failure aggregate for the failed vacuum pump. A median value of the abnormality occurrence interval T immediately before failure is set to be $T_c$ and a standard deviation of the abnormality occurrence interval T is set to be $\sigma_3$. Here, as an example, $T_c$ is set to be the median value, but may be an average value instead of the median value.

Figure 54A:
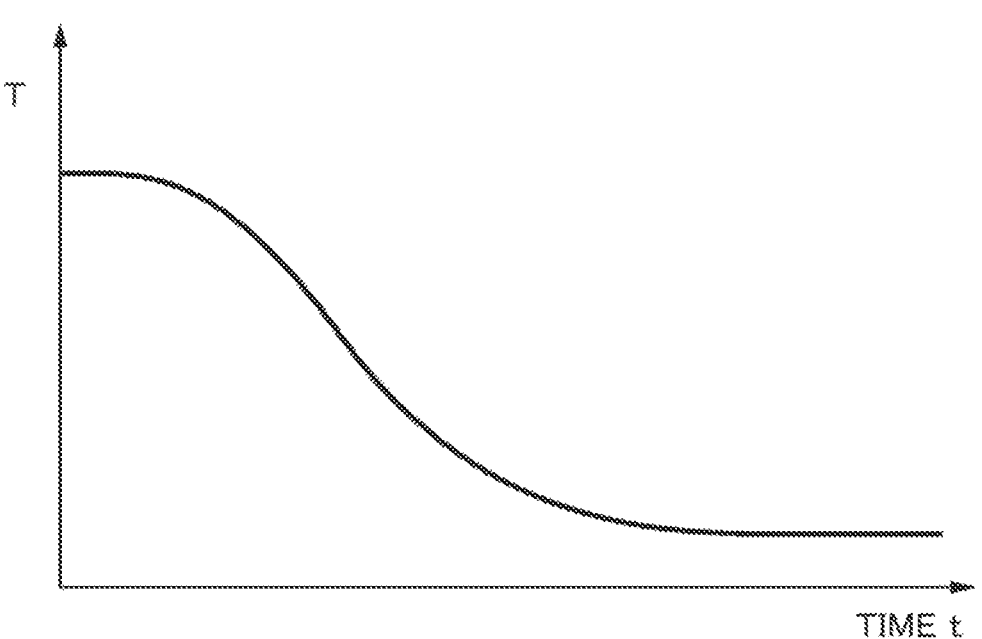
FIG. 54A is a diagram showing an example of the time change in the abnormality occurrence intervals for the operating vacuum pump.
Figure 54B:
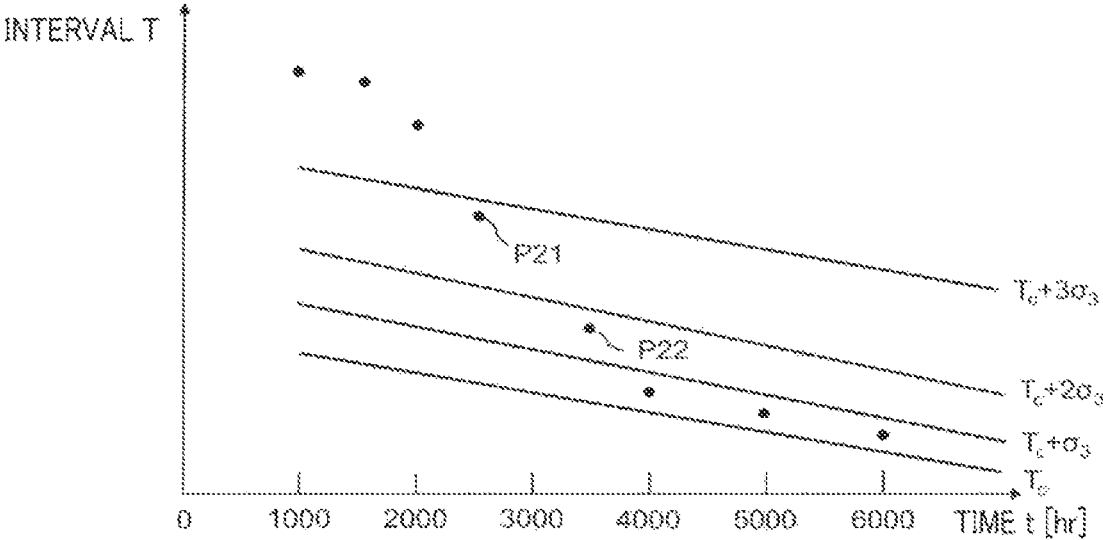
FIG. 54B is a diagram showing an example of a graph in which a time change in a statistical quantity of intervals of the failed vacuum pump and the number of times of abnormality occurrence of the currently operating pump are plotted.

FIG. 54A is a diagram showing an example of the time change in the abnormality occurrence interval T for the operating vacuum pump. The abnormality occurrence interval T is gradually shortened as time t passes. FIG. 54B is an example of a graph in which a time change in a statistical quantity of the interval of the failed vacuum pump and the number of times of abnormality occurrence of the currently operating pump are plotted. FIG. 54B shows the time changes of the statistical quantity $T_c$+3$\sigma_3$, $T_c$+2$\sigma_3$, and $T_c$+$\sigma_3$. Point P21 is a point where the interval of the operating vacuum pump becomes a statistical quantity $T_c$+3$\sigma_3$ or less for the first time, and point P22 is a point where the interval of the operating vacuum pump becomes the statistical quantity $T_c$+2$\sigma_3$ or less for the first time. In this way, the comparison unit 282 may issue the first alert when the interval T of the abnormality occurrence of the operating vacuum pump is ($T_c$+3$\sigma_3$) or less and the second alert when the interval T is ($T_c$+2$\sigma_3$) or less (for example, the alert may be displayed on the display apparatus 206).

In addition, the comparison unit 282 may output the maintenance warning at timing (see FIG. 54B) when the interval T of the abnormality occurrence of the operating vacuum pump is between ($T_c$+3$\sigma_3$) and ($T_c$+2$\sigma_3$) (for example, the maintenance warning is displayed on the display apparatus 206). The maintenance warning means that for example, the maintenance is recommended or the maintenance time is reached.

Here, as an example, although a description is given focusing on the predetermined period immediately before failure, the present embodiment is not limited thereto, and the predetermined period may be immediately before as long as it is a period before failure. For example, a description may be given focusing on a period between 400 hours before failure and 200 hours before failure.

In this way, the comparison unit 282 compares the abnormality occurrence interval of the state quantity (here, as an example, the effective current value I) of the operating vacuum pump 203 with the statistical quantity (here, as an example, $T_c$+3$\sigma_3$, $T_c$+2$\sigma_3$) of the abnormality occurrence interval of the state quantity (here, as an example, the effective current value I) before the failure of the vacuum pump, and performs a control to issue a notification according to the comparison result. As a result, the notification can be issued when the state quantity of the operating vacuum pump 203 approaches the abnormality occurrence interval of the state quantity before failure, and the maintenance or replacement of the vacuum pump 203 can be performed before the vacuum pump 203 fails.

The comparison unit 282 may make the maintenance or replacement timing earlier depending on the ratio of the time of the film forming process to the operation time of the vacuum pump 203. For example, the comparison unit 282 may use a coefficient η to make the alert or maintenance warning timing earlier. For example, the comparison unit 282 may add or subtract the median value $α_c$ of the parameter α, the average value $N_m$ of the number of times of abnormality occurrence up to failure, and the median value $T_c$ of the abnormality occurrence interval using the coefficient η. For example, the comparison unit 282 may correct the median value lac of the parameter α to $α_c$-η×$σ_1$.

Here, the coefficient η is represented by η=kL=k$T_{SP}$/$T_w$ using an influence coefficient k and a ratio L (=$T_{SP}$/$T_w$) of time $T_{SP}$ of the film forming process with respect to an operation time $T_w$ of the vacuum pump 203. Here, the influence coefficient k represents the influence of the film forming process on the failure of the vacuum pump, and an initial value thereof is, for example, a value of 1.0 to 2.0. The influence coefficient k may be updated by learning using the artificial intelligence, for example, the deep learning using the deep neural network, or the like. As a result, the influence coefficient k is optimized. Alternatively, the selection of the period of the film forming process may be performed by the learning using the artificial intelligence, for example, the deep learning using the deep neural network or the like. At this time, for the learning, a set of the period of the film forming process and the sensor signal extracted by a person in advance may be used as a training data set. Here, the sensor signal is a signal detected by a particle sensor (laser counter), a micro film forming sensor, a sound wave/vibration sensor or the like. Here, the micro film sensor monitors the increase in the film thickness by changing a natural frequency. As a result, since the period of the film forming process is automatically selected, the time $T_{SP}$ of the film forming process is automatically determined. When calculating the coefficient η, the number of times of the film forming process may be used instead of the time $T_{SP}$ of the film forming process.

Figure 54C:
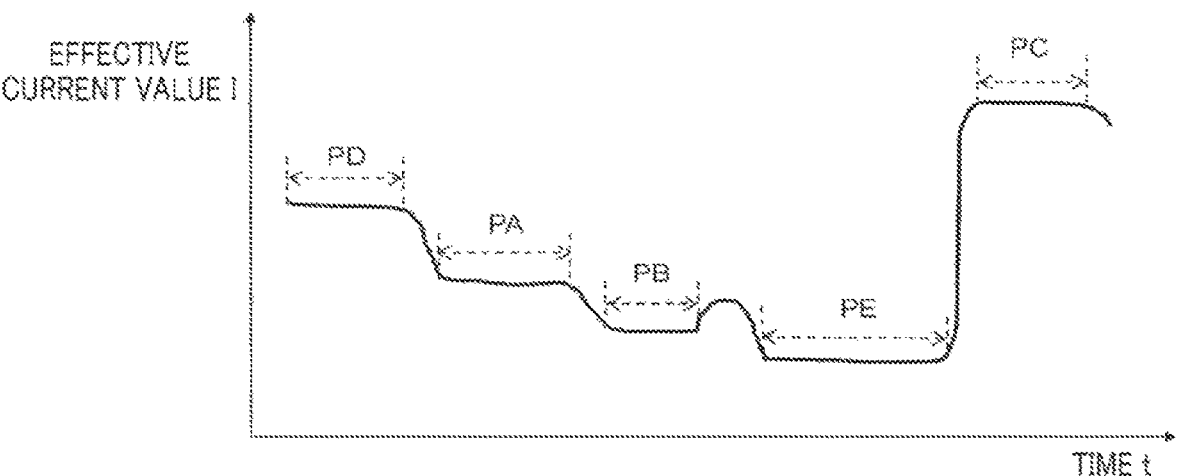
FIG. 54C is a graph showing a fourth example of the relationship between the effective current value I of the motor 238 and an operation time.

In FIGS. 48, 50, and 52, the idling period is also included in the operation time on the horizontal axis, but in FIGS. 48, 50, and 52, the comparison unit 282 multiplies the coefficient η corresponding to the process by the operation time for each process, thereby correcting the operation time. FIG. 54C is a graph showing a fourth example of the relationship between the effective current value I of the motor 238 and the operation time. In FIG. 54C, processes PA, PB, PC, PD, and PE are shown, and it is assumed that the process PE is an idling period, for example. In this case, for example, when the coefficients η of 1.5, 1.5, 2, 2, and 1 are allocated to each of the processes PA, PB, PC, PD, and PE (each operation time is $t_{PA}$, $t_{PB}$, $t_{PC}$, $t_{PD}$, and $t_{PE}$), respectively, the comparison unit 282 may calculate a corrected operation time $t_r$ depending on a calculation formula $t_r$=1.5$t_{PA}$+1.5$t_{PB}$+2$t_{PC}$+2$t_{PD}$+$t_{PE}$. By correcting the operation time as described above, it can be converted into the time during which the load is actually applied to the vacuum pump.

In this way, the comparison unit 282 performs processing of changing the notification timing according to the time of the film forming process or the number of times of the film forming process of the semiconductor manufacturing apparatus 201 to which the operating vacuum pump 203 is connected. Specifically, for example, the comparison unit 282 corrects the operation time depending on the time of the film forming process or the number of times of the film forming process, and issues a notification based on the corrected operation time. According to this configuration, it is possible to change the notification timing depending on the time of the film forming process of the semiconductor manufacturing apparatus to which the operating vacuum pump is connected or the number of times of the film forming process. As the time of the film forming process of the semiconductor manufacturing apparatus 201 to which the operating vacuum pump 203 is connected or the number of times of the film forming process is increased, the risk of failure is increased, but the maintenance or replacement of the vacuum pump 203 can be performed before the failure of the vacuum pump 203 by making the notification timing earlier.

Here, the comparison unit 282 performs the processing of changing the notification timing depending on the time of the film forming process or the number of times of the film forming process, and the present embodiment is not limited thereto and may perform the processing of changing the notification timing depending on the time or the number of times of manufacturing processes other than the idling.

The comparison unit 282 uses the sensor signal of the particle sensor (laser counter) and the training data of the film forming amount set in advance by a person to perform the learning using the artificial intelligence, for example, the deep learning using the deep neural network, or the like. As a result, the comparison unit 282 may judge the film forming amount from the sensor signal of the operating particle sensor (laser counter), and may also update the influence coefficient k using the judged film forming amount.

Alternatively, the comparison unit 282 uses the sensor signal of the micro film forming sensor and the training data of the film forming amount set in advance by a person to perform the learning using the artificial intelligence, for example, the deep learning using the deep neural network, or the like. As a result, the comparison unit 282 may judge the film forming amount from the sensor signal of the operating micro film forming sensor, and may also update the influence coefficient k using the judged film forming amount.

Alternatively, the comparison unit 282 uses the sensor signal of the sound wave/vibration sensor and the training data of the film forming amount set in advance by a person to perform the learning using the artificial intelligence, for example, the deep learning using the deep neural network, or the like. As a result, the comparison unit 282 may judge the film forming amount from the sensor signal of the operating sound wave/vibration sensor, and may also update the influence coefficient k using the judged film forming amount.

Fourth Embodiment

Next, a fourth embodiment will be described. In the fourth embodiment, abnormality diagnosis, abnormality prediction, and/or stability control of a vacuum pump is executed using a plurality of sensors.

Figure 55:
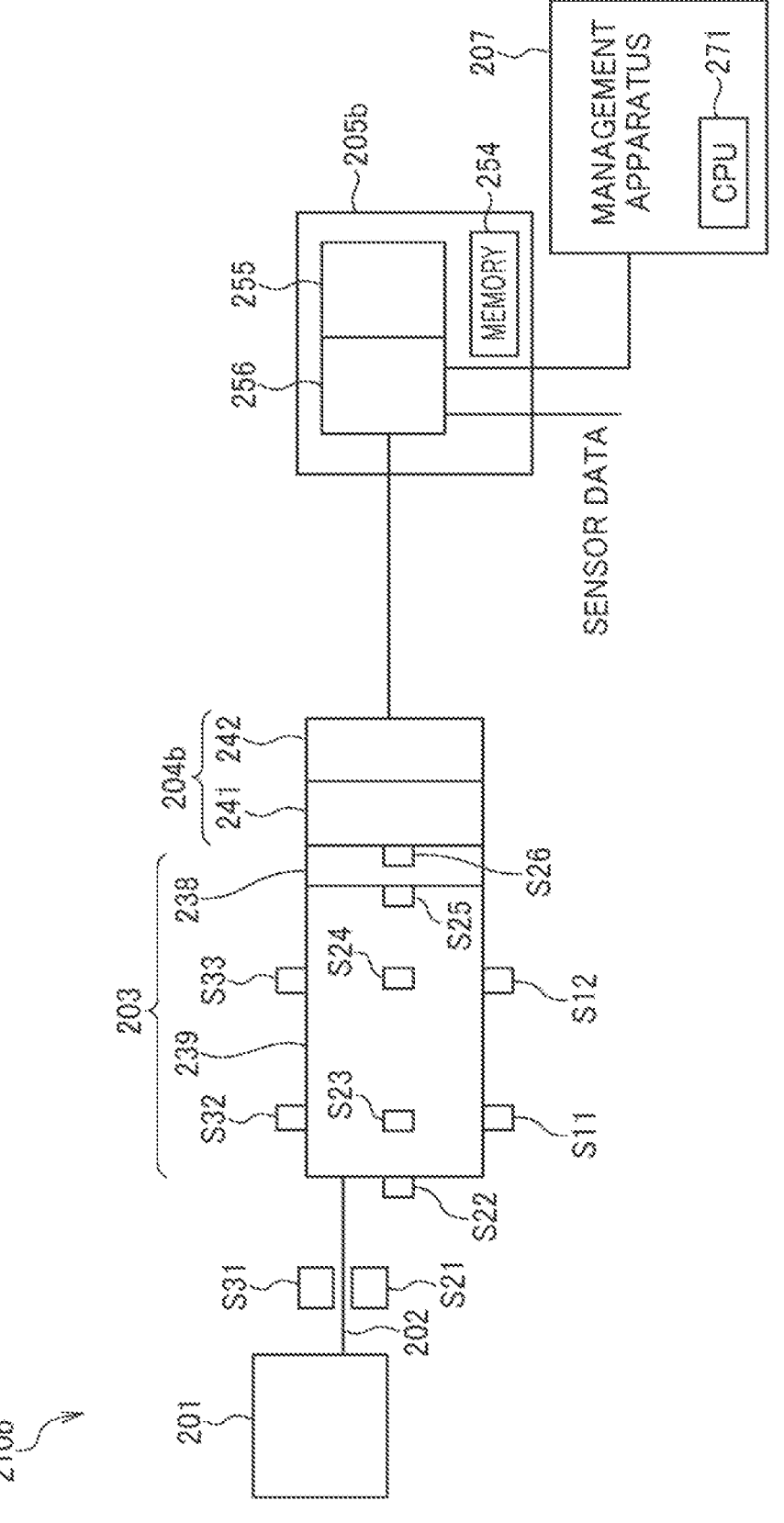
FIG. 55 is a schematic configuration diagram of a semiconductor manufacturing system 210b according to a fourth embodiment.

FIG. 55 is a schematic configuration diagram of a semiconductor manufacturing system 210b according to the fourth embodiment. Elements in common with FIG. 40 are denoted by common numbers, and a detailed description thereof will be omitted.

As shown in FIG. 55, the semiconductor manufacturing system 210b according to the fourth embodiment includes a semiconductor manufacturing apparatus 201, a vacuum pump 203, a piping 202 connecting between the semiconductor manufacturing apparatus 201 and the vacuum pump 203, a control apparatus 204b controlling the vacuum pump 203, an information processing apparatus 205b, and a management apparatus 207 connected to the information processing apparatus 205b.

As an example, the semiconductor manufacturing system 210b according to the fourth embodiment further includes acceleration sensors S31 to S33, current monitor sensors S11 and S12, and temperature sensors S21 to S26. The acceleration sensors S31 to S33 are, for example, five-axis acceleration sensors. In this way, the semiconductor manufacturing system 210b has a plurality of sensors.

The control apparatus 204b has a control unit 241 controlling a motor 238 and a communication unit 242 communicating with the information processing apparatus.

The information processing apparatus 205b has a memory 254, a computing unit 255, and a communication unit 56. The communication unit 56 communicates with the communication unit 242 of the control apparatus 204b. In addition, the communication unit 56 communicates with the management apparatus 207. In addition, the communication unit 56 receives sensor data from the acceleration sensors S31 to S33, the current monitor sensors S11 and S12, and the temperature sensors S21 to S26.

The management apparatus 207 can communicate with the information processing apparatus 205b. The management apparatus 207 has a CPU 271.

The acceleration sensors S31 to S33, the current monitor sensors S11 and S12, and the temperature sensors S21 to S26 have a communication function, for example, Wi-Fi (registered trademark), Bluetooth (registered trademark), or the like, and the sensor signals detected by these sensors are collected by the communication unit 242 therearound. The sensor signal is transmitted from the communication unit 242 to the communication unit 56 via a wiring, subjected to data processing by the computing unit 255 as necessary, and stored in the memory 254. The information processing apparatus 205b may be a gateway (for example, a router or the like). In addition, the information processing apparatus 205b may also have an artificial intelligence (AI) function.

By using a plurality of sensors, it is possible to obtain highly accurate management information. For example, when a part of a rotor is increased in a reactive force due to foreign matters, a variation of a rotation speed, a variation of an inclination of a rotor shaft, and a variation of a motor control current occur. By simultaneously performing comparison processing not only on one change but also on the rotation speed, the inclination of the rotor shaft, and the motor control current, it is possible to reliably and accurately take the abnormal variation.

The acceleration sensors S31 to S33 may have a MEMS type vibration oscillator. The acceleration sensor is wideband/inexpensive/compact, and is small and effective when being mounted on the substrate.

In addition, the operation situations of the plurality of vacuum pumps may be acquired as data.

The operation situation of the vacuum pump attached to each equipment (for example, semiconductor manufacturing apparatus) upstream of the vacuum pump may be managed. It is possible to compare the operation situation and the number of times of failure/replacement of part frequency of the vacuum pump for each attribute (for example, model) of the semiconductor manufacturing apparatus to define the number of times of failure/replacement of part frequency for each attribute (for example, model) of the semiconductor manufacturing apparatus.

In the present embodiment, three acceleration sensors are provided, but the number of acceleration sensors is not limited thereto, and two or less acceleration sensors or four or more (for example, ten or more) acceleration sensors may be provided. The acceleration sensor may have two axes in an opposite direction (for example, left/right) to each other from the center of the rotor shaft of the vacuum pump, one axis or more in the rotor shaft direction, and two or more axes in the case of multiple stages.

In the present embodiment, two current monitor sensors are provided, but the present invention is not limited thereto, and one current monitor sensor may be provided or three or more current monitor sensors may be provided. The current monitor sensor may be installed for measuring the motor driving current for logging data of the motor driving current variation. In the case of the plurality of motors, the number of current monitor sensors may be increased accordingly. For example, in the case of a two-stage motor, two or more current monitor sensors may be provided.

In the present embodiment, six temperature sensors are provided, but the present invention is not limited thereto, and five or less temperature sensors may be provided or seven or more temperature sensors may be provided. A multipoint temperature (for example, the temperature at positions in an opposite direction to each other from the center) of the rotor, the temperature of the motor, the temperature of the motor shaft, the temperature of the gas input unit, the temperature of the rotor output unit, the temperature of the rotor input unit, and the temperature of the rotor output unit may be detected. In addition, when the number of vacuum pumps is multistage, the temperature of the rotor output unit of the preceding stage and the temperature of the input unit of the next stage may be detected.

The semiconductor manufacturing system 210b may further be provided with a plurality of (for example, five or more) pressure sensors. The pressure sensor may detect a multipoint pressure (for example, the pressure at positions in an opposite direction to each other from the center) of the rotor, the pressure of the motor shaft, the pressure of the gas input unit, the pressure of the gas output unit, the pressure of the rotor input unit, and the pressure of the rotor output unit. In addition, when the number of vacuum pumps is multistage, the pressure sensor may detect the pressure of the rotor output unit of the preceding stage and the pressure of the input unit of the next stage.

The semiconductor manufacturing system 210b may further be provided with the rotation sensor of the rotor or the motor shaft. For example, three or more rotation sensors may be provided for one set of a rotor and one motor. As the number of rotors and motors is increased, the number of rotation sensors may be increased accordingly. The sensors can be combined as described above, and the semiconductor manufacturing system 210b may be provided with a total of 10 or more sensors.

(Effect of Using Plurality of Sensors)

By using a plurality of sensors, the computing unit 255 of the information processing apparatus 205b can perform the following processing.

In the case of using the multiaxial acceleration sensor, the computing unit 255 can perform a comparison of acceleration variations on that axis, for example, a comparison of differential waveforms with each other, a comparison of fast Fourier transform (FFT) waveforms, and the like. In this example, the computing unit 255 can analyze a comparison of two axes (x, y) at a position separated from the rotor shaft and a variation of a parallel axis (z) with the rotor. Since the computing unit 255 can compare variation vector components when the two axes at the separated position can be compared with each other, it is possible to accurately judge in which direction an overload occurs relative to a twist of the shaft. In addition, the computing unit 255 can compare the variation of the motor current near the time, and specify the overload on the rotor, the overload of the motor accordingly, and the time zone thereof.

In addition, when the sensor detection of the abnormal operation occurs in the lapse after the time of the judgment, the computing unit 255 can perform the detection and the warning/display. In this case, the comparison data are normally registered in the memory 254 as the SD condition, and the computing unit 255 can perform a judgment by making the comparison therewith.

It should be noted that the CPU 271 of the management apparatus 207 at the subsequent stage can also execute some or all of these processings.

Fifth Embodiment

Figure 56:
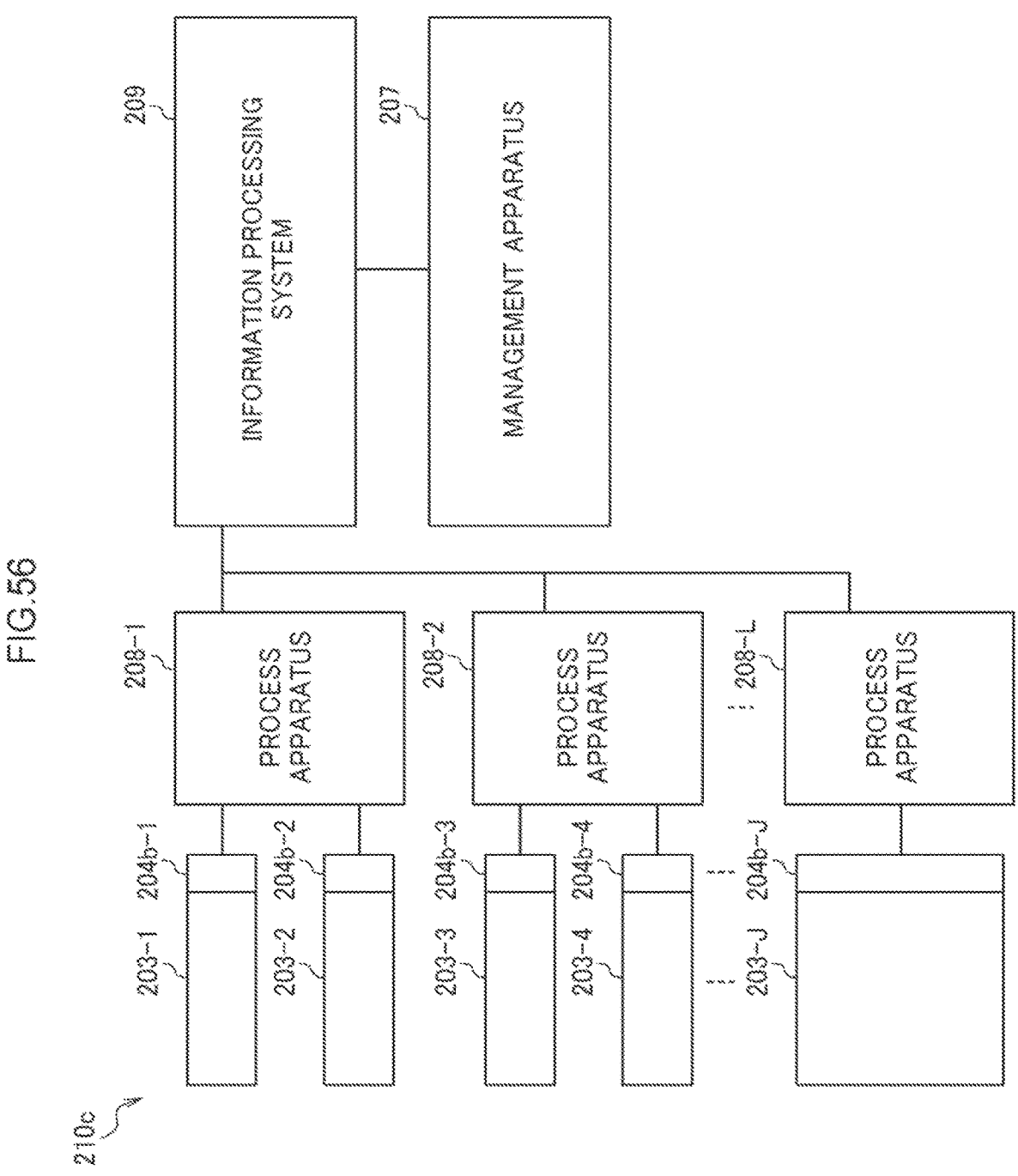
FIG. 56 is a schematic configuration diagram of a semiconductor manufacturing system 210c according to a fifth embodiment.

Next, a fifth embodiment will be described. FIG. 56 is a schematic configuration diagram of a semiconductor manufacturing system 10*c* according to the fifth embodiment. Elements in common with FIGS. 40 and 55 are denoted by common numbers, and a detailed description thereof will be omitted. As shown in FIG. 56, a semiconductor manufacturing system 210*c* includes vacuum pumps 203-1 to 203-J (J is a positive integer), control apparatuses 204*b*-1 to 204*b*-J controlling the vacuum pumps 203-1 to 3-J, process apparatuses 208-1 to 208-L (L is a positive integer), an information processing system 209, and a management apparatus 207.

Each of the vacuum pumps 203-1 to 203-J is provided with a plurality of sensors (not shown) as in the fourth embodiment. Since the configuration of each of the vacuum pumps 203-1 to 203-J is the same as that of the third embodiment, a description thereof will be omitted. Since the configuration of the control apparatuses 204*b*-1 to 204*b*-J is the same as that of the control apparatus 204*b* according to the fourth embodiment, a description thereof will be omitted.

The process apparatuses 208-1 to 208-L are etching apparatuses or film forming apparatuses. The process apparatus 208-1 is connected to the vacuum pumps 203-1 and 203-2. The process apparatus 208-2 is connected to the vacuum pumps 203-3 and 203-4. The process apparatus 208-L is connected to the vacuum pump 203-J. For example, the information processing system 209 has equipment and/or information gathering apparatuses (for example, a server or a personal computer (PC)) in a factory. The information processing system 209 may be a cloud or a mini cloud.

Sensor signals from the plurality of sensors are input to the control apparatuses 204*b*-1 to 204*b*-J. The control apparatuses 204*b*-1 to 204*b*-J acquire sensor values from the sensor signals and output sensor data indicating the sensor values to the process apparatuses 208-1 to 208-L to which the control apparatuses 204*b*-1 to 204*b*-J are connected.

In addition, the sensor data are transmitted from each process apparatus 208-1 to 208-L to the information processing system 209 and accumulated. The information processing system 209 processes the sensor data. The information processing system 209 is connected to the management apparatus 207. The management apparatus 207 executes various kinds of determination processings and updates the next-stage operation parameters. In addition, the management apparatus 207 updates the maintenance and replacement timing of parts. These updated values are fed back to each process apparatus 208-1 to 208-L and the control apparatuses 204*b*-1 to 204*b*-J via the information processing system 209. Each process apparatus 208-1 to 208-L and the control apparatuses 204*b*-1 to 204*b*-J perform an operation corresponding to the operation parameters.

The communication unit 242 of the control apparatuses 204*b*-1 to 204*b*-J may be installed in the vacuum pumps 203-1 to 203-J. In addition, the communication unit 242 of the control apparatuses 204*b*-1 to 204*b*-J may be installed outside in a form of a controller or an adapter.

Sixth Embodiment

Figure 57:
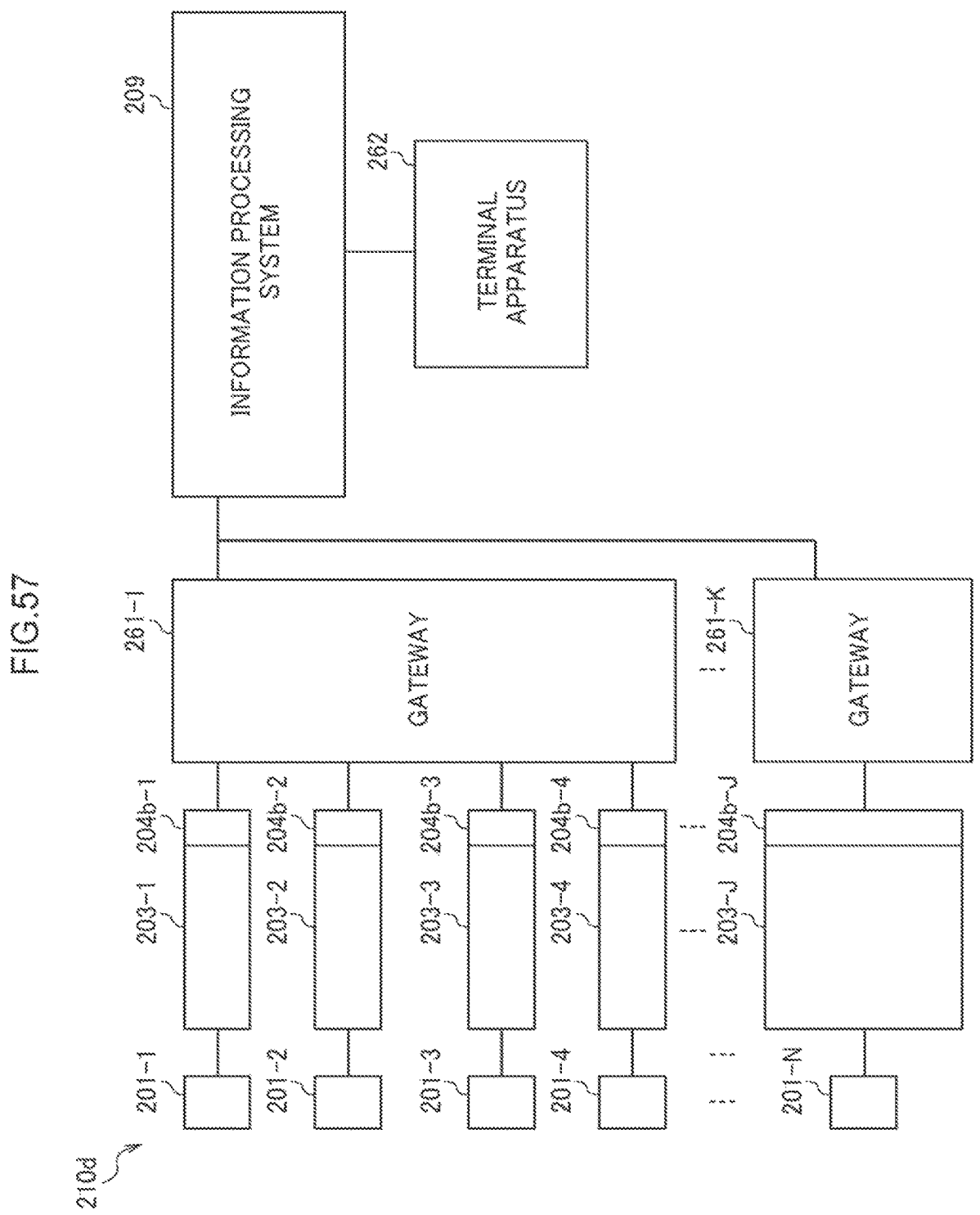
FIG. 57 is a schematic configuration diagram of a semiconductor manufacturing system 210d according to a sixth embodiment.

Next, a sixth embodiment will be described. FIG. 57 is a schematic configuration diagram of a semiconductor manufacturing system 10*d* according to the sixth embodiment. Elements in common with FIGS. 45 and 56 are denoted by common numbers, and a detailed description thereof will be omitted. As shown in FIG. 57, the semiconductor manufacturing system 10*d* includes semiconductor manufacturing apparatuses 201-1 to 201-J (J is a positive integer), vacuum pumps 203-1 to 203-J, control apparatuses 204*b*-1 to 204*b*-J controlling the vacuum pumps 203-1 to 203-J, gateways 261-1 to 261-K (K is a positive integer), an information processing system 209, and a terminal apparatus 262.

Each of the vacuum pumps 203-1 to 203-J is provided with a plurality of sensors (not shown) as in the fourth embodiment. Since the configuration of each of the vacuum pumps 203-1 to 203-J is the same as that of the third embodiment, a description thereof will be omitted. Since the configuration of the control apparatuses 204*b*-1 to 204*b*-J is the same as that of the control apparatus 204*b* according to the fourth embodiment, a description thereof will be omitted.

The gateways 261-1 to 261-K transmit sensor signals, control signals, status signals, and the like transmitted from the control apparatuses 204*b*-1 to 420*b*-J to the information processing system 209. High speed optical communication is used between the gateways 261-1 to 261-K and the control apparatuses 204*b*-1 to 204*b*-J, and thus a signal transmission speed is fast. As a result, by transmitting and receiving a signal at high speed, it is possible to collect a large number of sensor signals in a short time.

It should be noted that the gateways 261-1 to 261-K may have some data processing functions. In this case, the gateways 261-1 to 261-K may perform necessary data processing, update operation parameters of the next stage, and transmit a signal to the corresponding control apparatuses 204*b*-1 to 204*b*-J and feed back the signal. At this time, the status data such as the operation state of the vacuum pumps 203-1 to 203-J can be transmitted to the information processing system 209. The information processing system 209 may judge the management of the operation state of the semiconductor manufacturing apparatuses 201-1 to 201-J and the vacuum pumps 203-1 to 203-J, and change the operation parameters of the next stage, change the status, and update the replacement or maintenance timing of the parts. The information processing system 209 may notify the terminal apparatus 262 of the changed or updated information. Accordingly, the operator of the terminal apparatus 262 can grasp the change in the operation parameters or the change in the status. Alternatively, the operator of the terminal apparatus 262 can grasp the replacement or maintenance timing of parts after the update.

The gateways 261-1 to 261-K have functions of an adapter for communication, a router, and a controller in combination. In addition, the gateways 261-1 to 261-K may automatically incorporate (update) a data processing method which accumulates data in the information processing system 209 and is updated by automatic learning, and may create a data set which selects necessary data groups and unnecessary data groups. As a result, the gateways 261-1 to 261-K can improve the computing processing efficiency in the gateway 261-1 to 261-K.

A part of data processed (temporally thinned out) by the gateways 261-1 to 261-K is accumulated in the information processing system 209. The information processing system 209 creates the data set for the automatic learning using the accumulated data, determines more efficient and stable operation parameters, judges the replacement timing of parts, or judges the maintenance timing by the automatic learning. When the number of accumulated data is increased (for example, when the number of accumulated data becomes 5000 to 10000 cases or more), it is possible to make a judgment with high reliability or high accuracy.

It is to be noted that the information processing system including the plurality of apparatuses may process each processing of the information processing apparatuses 205 and 205b according to the third or fourth embodiment by the plurality of apparatuses in the distributed manner. In addition, in the second and fourth embodiments, the control apparatus 204 and the information processing apparatus 205 are described as separate apparatuses, but the control apparatus 204 may be configured to include the information processing apparatus 205. In addition, in the fourth embodiment, the information processing apparatus 205b and the management apparatus 207 are described as separate apparatuses, but the information processing apparatus 205b may be configured to include the management apparatus 207. In addition, the program for executing each processing of the information processing apparatuses 205 and 205b, the management apparatus 207, and the information processing system 209 according to each embodiment is recorded in the computer-readable recording medium, the program recorded on the recording medium is read by the computer system, and the processor is executed to perform the above-described various processes related to the information processing apparatus according to the present embodiment.

Seventh Embodiment

In a semiconductor manufacturing apparatus, a vacuum pump that exhausts a gas used in a semiconductor manufacturing process from an inside of a chamber is in widespread use for the purpose of creating a vacuum environment in the chamber. As such a vacuum pump, a displacement type vacuum pump having a roots type or screw type pump rotor is known.

Generally, the displacement type vacuum pump includes a pair of pump rotors disposed in a casing, and a motor for rotationally driving the pump rotors. A minute clearance is formed between the pair of pump rotors and between the pump rotor and an inner surface of the casing, and the pump rotor is configured to rotate while being in non-contact with the casing. As the pair of pump rotors rotates in an opposite direction to each other while synchronizing, the gas in the casing is transferred from a suction side to a discharge side and is exhausted from the chamber or the like connected to a suction port.

A gas used in the semiconductor manufacturing process or a substance generated by a chemical reaction of the gas used contains components which are solidified or liquefied as temperature drops. Normally, since the vacuum pump described above generates a compression heat during the transfer of the gas, the temperature of the operating vacuum pump rises to some extent. In the case where the temperature of the vacuum pump rising by the compression heat is not higher than the solidification or liquefaction temperature of the components or products in the gas, the temperature of the vacuum pump is maintained by heating a pump main body from the outside or heating an inflowing gas. Even when the gas containing the above-described components is exhausted by using the vacuum pump, good evacuation is performed without solidifying or liquefying the components or products in the gas.

However, there is a semiconductor manufacturing process that cannot prevent the liquefaction and solidification of the gas used or the products from the gas used in increasing the temperature of the vacuum pump as described above. When the operation of the vacuum pump is continued in this process, the solidified products (reaction products) are deposited in a clearance between the pump rotors and a clearance between the pump rotor and the casing. As the products are deposited, an excessive load is applied to the vacuum pump during the operation of the vacuum pump, such that the vacuum pump stops during the manufacturing process and articles are severely damaged during the manufacturing process.

In order to prevent such damage, Patent Literature 3 discloses generating a warning when an integral value or an average value of a motor current exceeds a threshold value. Patent Literature 4 discloses analyzing and diagnosing a signal from a sensor unit including at least an acoustic emission (AE) sensor which detects AE generated by a vacuum pump.

However, there is a need for a technique of reducing the risk that the vacuum pump stops during the manufacturing process and articles are greatly damaged during the manufacturing process.

It is preferable to provide the information processing apparatus, the criterion data determination apparatus, the information processing method, the criterion data determination method, and the program that can reduce the risk that the vacuum pump stops during the manufacturing process and articles are greatly damaged during the manufacturing process.

First, a seventh embodiment will be described. The seventh embodiment is described on the premise that an operation continuation common condition extracted from the tendency of abnormality data detected in data of a state quantity of a continuously operable vacuum pump is stored in an information processing apparatus 305 as criterion data. Here, the tendency of the abnormality data includes the occurrence tendency of the abnormality data and the number of times of occurrence of abnormality data. The information processing apparatus 305 according to the seventh embodiment compares the tendency of abnormality data detected from the data of the state quantity of the operating vacuum pump with the criterion data, and outputs the comparison result.

Figure 58:
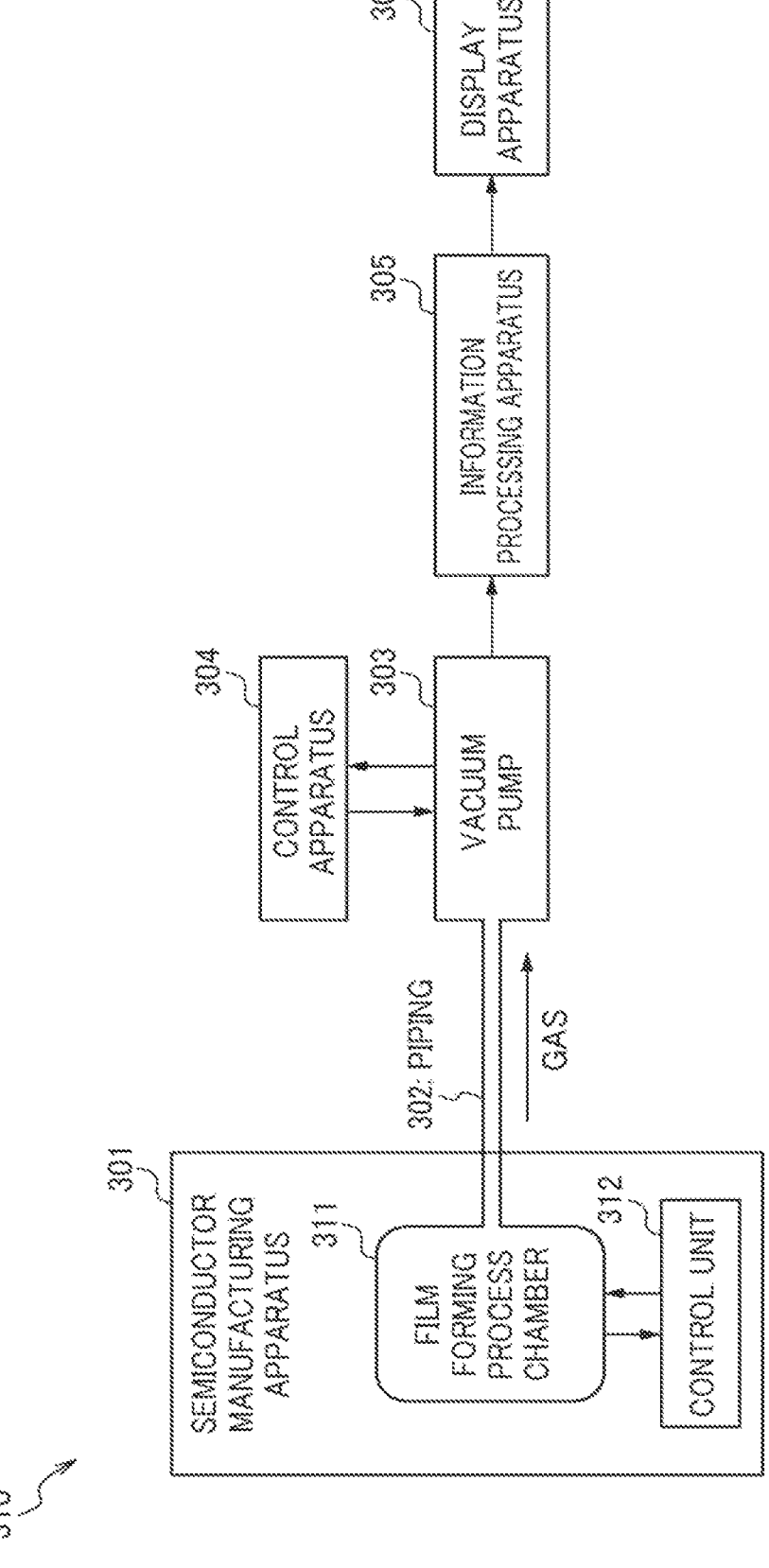
FIG. 58 is a schematic configuration diagram of a semiconductor manufacturing system 310 according to a seventh embodiment.

FIG. 58 is a schematic configuration diagram of a semiconductor manufacturing system 310 according to the seventh embodiment. As shown in FIG. 58, the semiconductor manufacturing system 310 according to the present embodiment includes a semiconductor manufacturing apparatus 301, a vacuum pump 303, a piping 302 connecting between the semiconductor manufacturing apparatus 301 and the vacuum pump 303, a control apparatus 304 controlling the vacuum pump 303, an information processing apparatus 305, and a display apparatus 306 connected to the information processing apparatus 305. The semiconductor manufacturing apparatus 301 includes a film forming process chamber 311 and a control unit 312 controlling the film forming process chamber 311. The film forming process chamber 311 and the vacuum pump 303 communicate with each other via the piping 302, and a gas in the film forming process chamber 311 is discharged by the operation of the vacuum pump 303 to make the film forming process chamber 311 into substantially a vacuum state. As a type of film formation in the film forming process chamber 311, there are chemical vapor deposition (CVD), physical vapor deposition (PVD), atomic layer deposition (ALD), deposition, and sputtering film formation.

The vacuum pump 303 may include a roots type rotor or may include a screw type rotor. In addition, the vacuum pump 303 may be a claw type or scroll type vacuum pump. In addition, the vacuum pump 303 may be a single-stage pump or may be a multi-stage pump. An exhaust gas processing apparatus is connected to a rear stage of an exhaust side of the vacuum pump 303. The information processing apparatus 305 according to the present embodiment compares the tendency of abnormality data detected from the data of the state quantity of the operating vacuum pump with a criterion data, and outputs the comparison result to, for example, the display apparatus 306.

Figure 59:
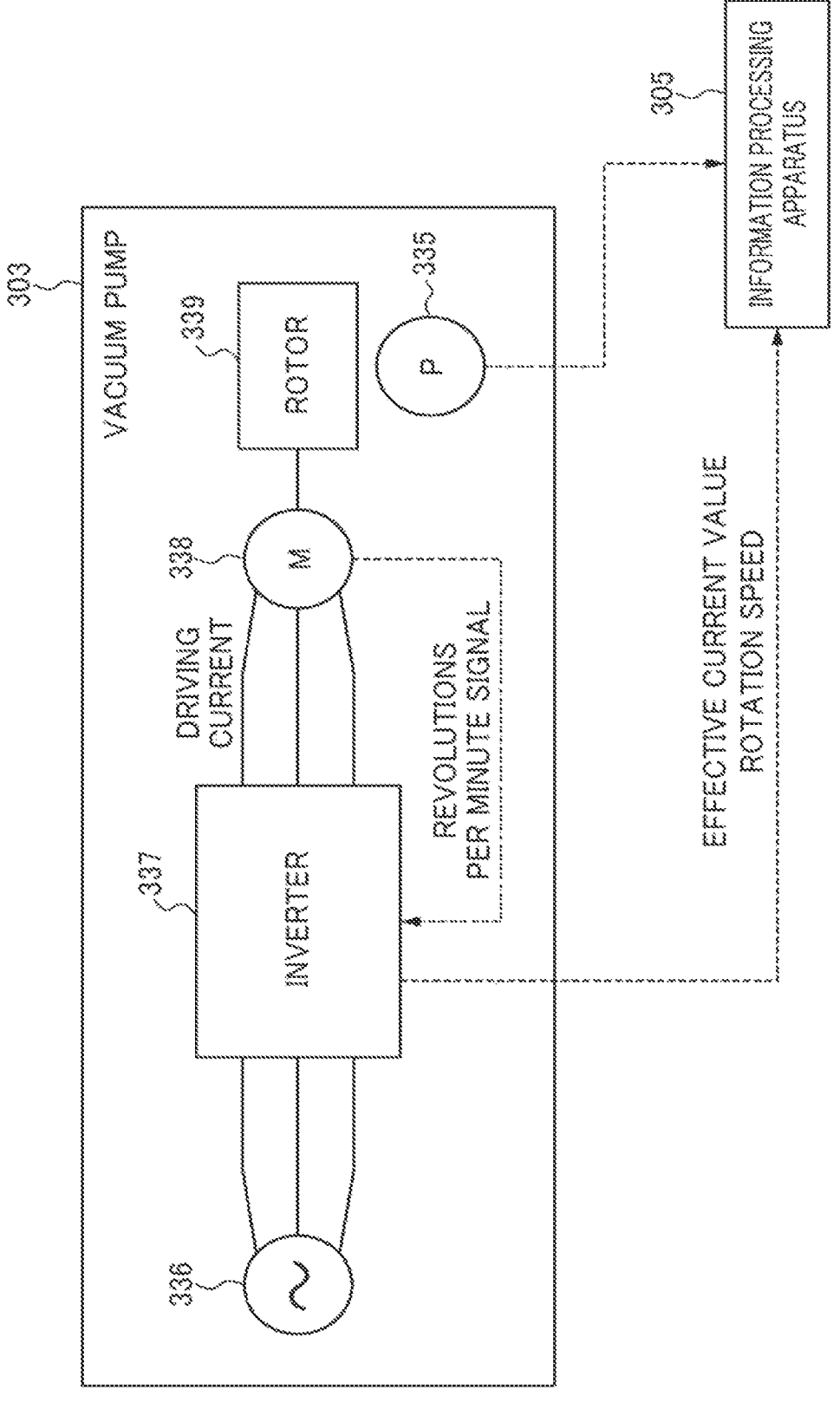
FIG. 59 is a schematic functional configuration diagram of a vacuum pump 30303 according to the seventh embodiment.

FIG. 59 is a schematic functional configuration diagram of the vacuum pump 303 according to the seventh embodiment. As shown in FIG. 59, the vacuum pump 303 includes a power supply 336, an inverter 337 whose input is connected to the power supply 336, a motor 338 whose input is connected to an output of the inverter 337, and a rotor 339 connected to a rotating shaft of the motor 338. In addition, the vacuum pump 303 includes a pressure gauge 335.

The inverter 337 performs a frequency conversion on an alternating current supplied from the power supply 336, and supplies a driving current obtained by the frequency conversion to the motor 338. As a result, the rotating shaft of the motor 338 is rotated by the driving current, and the rotor 339 rotates accordingly, so that the gas sucked from the piping 302 is discharged. In this way, by continuously transferring the gas from the piping 302, the gas in the film forming process chamber 311 connected to the piping 302 is evacuated.

The motor 338 outputs an RPM signal indicating the RPM of the motor 338 to the inverter 337. The inverter 337 supplies, for example, an effective current value of the driving current and a rotational speed of the motor 338 obtained from the RPM speed signal to the information processing apparatus 305. In addition, the pressure value in the vacuum pump 303 measured by the pressure gauge 335 is supplied to the information processing apparatus 305.

Figure 60:
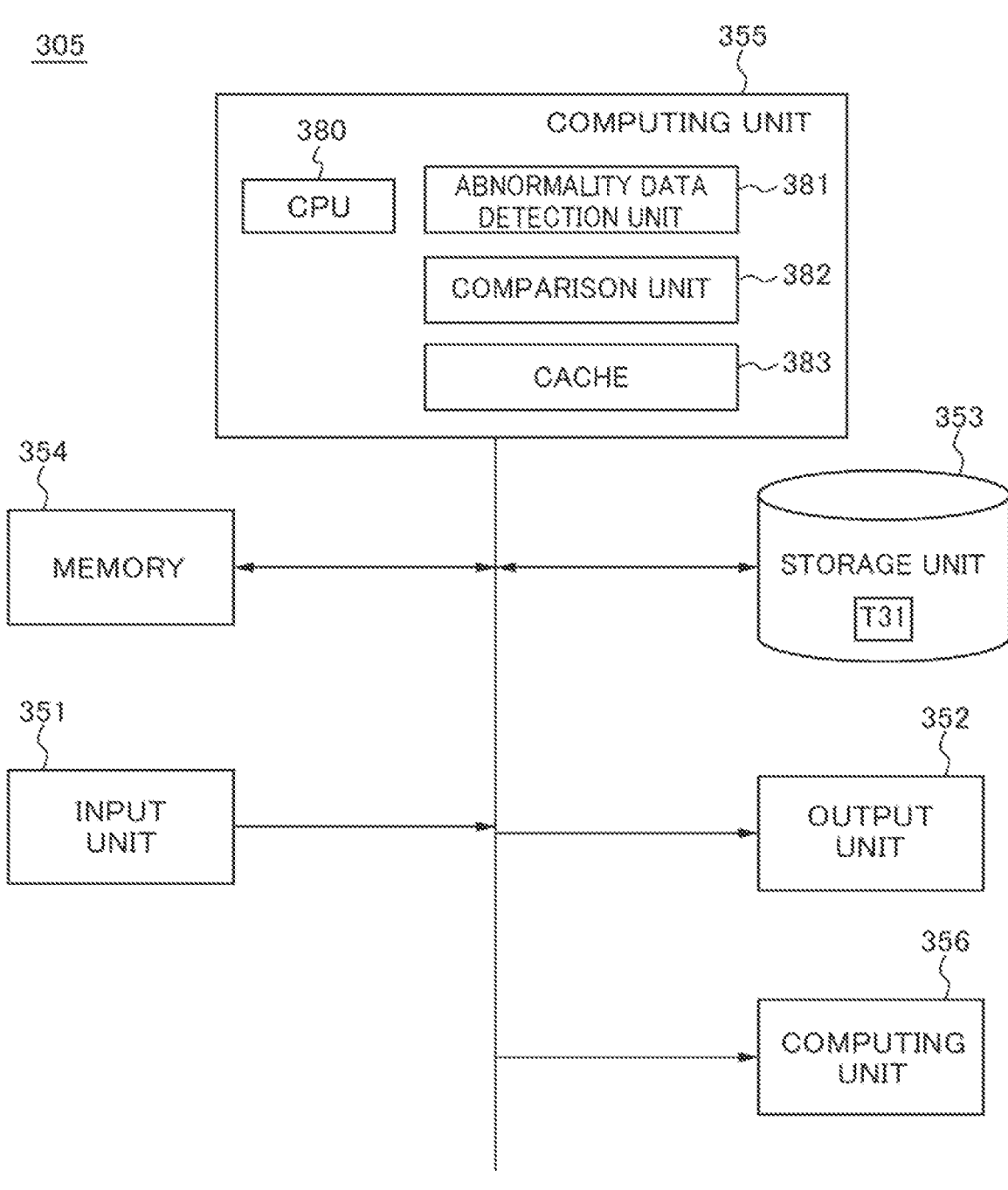
FIG. 60 is a schematic configuration diagram of an information processing apparatus 305 according to the seventh embodiment.

FIG. 60 is a schematic configuration diagram of the information processing apparatus 305 according to the seventh embodiment. As shown in FIG. 60, the information processing apparatus 305 includes an input unit 351, an output unit 352, a storage unit 353, a memory 354, a computing unit 355, and a communication unit 356.

The input unit 351 is connected to the inverter 337 and the pressure gauge 335, and the effective current value of the driving current, the rotation speed of the motor 338, and the pressure value in the vacuum pump 303 are input to the input unit 351. The output unit 352 outputs a signal including information to the display apparatus 306 according to a command from the computing unit 355. Operation data are stored in the storage unit 353. The computing unit 355 has a central processing unit (CPU) 380, an abnormality data detection unit 381, a comparison unit 382, and a cache 383 in which a program is stored.

In addition, criterion data for judging the operation continuation possibility is stored in the storage unit 353. Here, this criterion data are determined using the tendency of abnormality data detected in the data of the state quantity of the continuously operable vacuum pump. In the present embodiment, as an example, as shown in FIG. 61, attributes of the vacuum pump 303 and the criterion data are stored in the storage unit 353 by being associated with each other. FIG. 61 shows an example of a table T31 stored in the storage unit 353. In the table T31, a set of the attributes of the vacuum pump and the criterion data is stored. Here, the attributes of the vacuum pump are, for example, the type of the vacuum pump, the model and/or the type or model of the semiconductor manufacturing apparatus connected to the vacuum pump, the serial number of the vacuum pump, or a part number of parts constituting the vacuum pump.

The memory 354 temporarily stores information. The communication unit 356 communicates with an external terminal apparatus via a communication network. This communication may be wired or wireless. The CPU 380 reads and executes the program stored in the cache 383.

The abnormality data detection unit 381 detects the abnormality data from the data of the state quantity of the operating vacuum pump. Here, the abnormality data are, for example, a value deviated from a normal range defined for each divided process, a spike value not related to the process, abnormality (for example, there are no instantaneously deviated data, but the whole division section for a certain period tends to increase, or the like) of a change tendency over time in all processes of each divided process, or the like.

The comparison unit 382 compares the tendency of the abnormality data detected from the data of the state quantity of the operating vacuum pump detected by the abnormality data detection unit 381 with the criterion data stored in the storage unit 353, and outputs the comparison result. Specifically, for example, the comparison unit 382 judges the operation continuation possibility of the vacuum pump as the comparison result, and outputs the judgment result as the comparison result. The processing in the comparison unit 382 may be performed by the CPU 380. In addition, the comparison unit 382 may be separately realized by a field-programmable gate array (FPGA) or a dedicated board.

In addition, as described above, in the present embodiment, as an example, the attributes of the vacuum pump and the criterion data are stored in the storage unit 353 by being associated with each other. The comparison unit 382 may compare the tendency of the abnormality data detected from the state quantity of the operating vacuum pump 303 with the criterion data stored by being associated with the attributes of the operating vacuum pump 303 in the storage unit 353.

Figure 62:
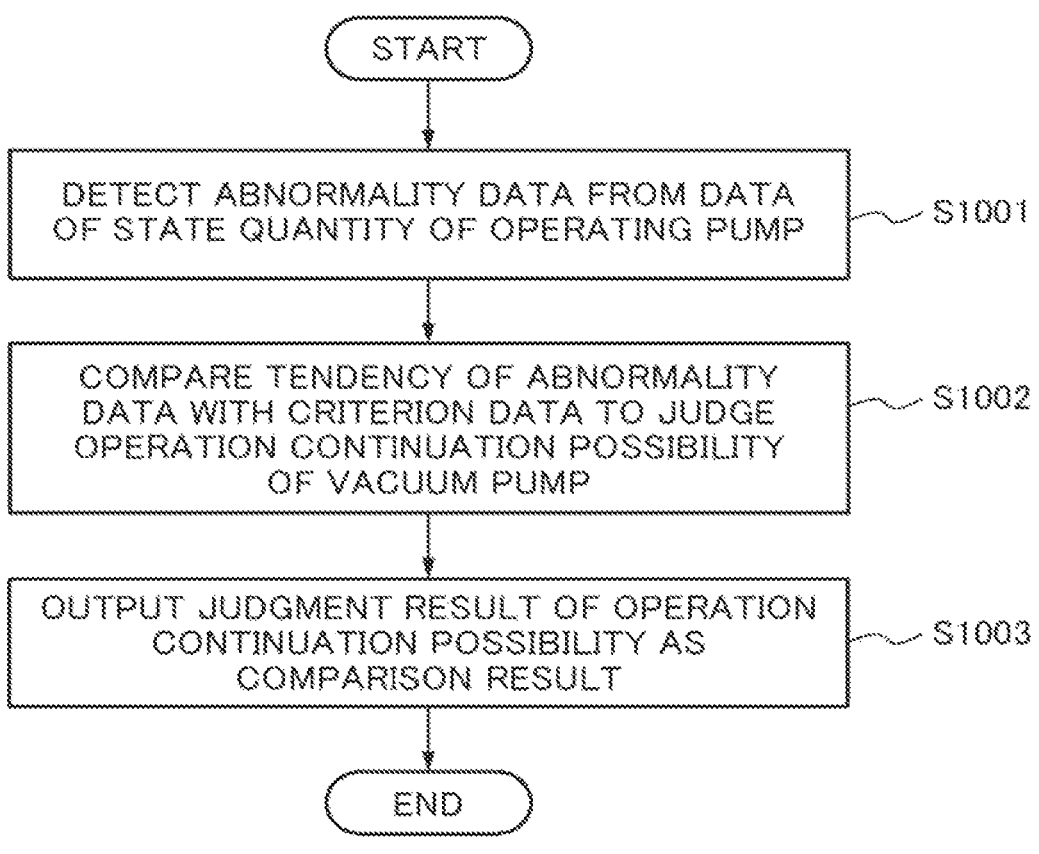
FIG. 62 is a flowchart showing an example of a flow of comparison processing according to the seventh embodiment.

Subsequently, the flow of the comparison processing according to the seventh embodiment will be described with reference to FIG. 62. FIG. 62 is a flowchart showing an example of a flow of comparison processing according to the seventh embodiment.

First, the abnormality data detection unit 381 detects the abnormality data from the data of the state quantity of the operating pump (step S1001).

Next, the comparison unit 382 compares the tendency of the abnormality data with the criterion data, and judges the operation continuation possibility of the vacuum pump 303 (step S1002).

Next, the comparison unit 382 outputs the judgment result of the operation continuation possibility to, for example, the display apparatus 306 as the comparison result (step S1003).

Hereinafter, an example of a comparison method in the comparison unit 382 will be described below.

(Comparative Method 1)

For example, when the threshold value is stored in the storage unit 353 as the criterion data, the comparison unit 382 may compare the threshold value which is the criterion data with the number of times of occurrences of abnormality data of the operating vacuum pump, and make a judgment. Here, the threshold value is set using, for example, the number of times of occurrence of abnormality data of the plurality of vacuum pumps which can continuously be operated after the set period elapses. Specifically, the threshold value may be an average value, a median value, a minimum value, a maximum value, a representative value, or the like of the number of times of occurrence of abnormality data of the vacuum pump which can continuously be operated after the set period elapses. Specifically, the comparison unit 382 judges whether the number of times of occurrence of abnormality data of the operating vacuum pump falls within the threshold value, and when the number of times of occurrence of abnormality data falls within the threshold value, it is judged that there is the operation continuation possibility of the vacuum pump 303.

(Comparative Method 2)

For example, in the case where a plurality of sets of parameters (for example, state quantity, the number of times of occurrence, occurrence frequency, and occurrence interval) related to abnormality data and operation continuation probability are stored in the storage unit 353 as criterion data, the comparison unit 382 may compare the parameters related to the abnormality data stored in the storage unit 353 with the number of times of occurrence of abnormality data of the operating vacuum pump to output the corresponding operation continuation probability in the storage unit 353 to the number of times of occurrence of abnormality data of the operating vacuum pump.

(Comparative Method 3)

For example, in the case where a plurality of parameters (for example, the state quantity, the number of times of occurrence, the occurrence frequency, and the occurrence interval) related to abnormality data and the operation continuation probability are stored in the storage unit 353 as the criterion data, the comparison unit 382 may compare the plurality of parameters stored in the storage unit 353 with the plurality of parameters of the operating vacuum pump to output the corresponding operation continuation probability in the storage unit 353 to a set of the plurality of parameters of the operating vacuum pump.

(Comparative Method 4)

For example, it is assumed that the criterion values are stored in the storage unit 353 as the criterion data by being associated with the parameters (for example, the state quantity, the number of times of occurrence, the occurrence frequency, and the occurrence interval) related to abnormality data, and the operation continuation probability is stored as the criterion data by being associated with a set of parameters (for example, the state quantity, the number of times of occurrence, the occurrence frequency, and the occurrence interval) related to a divergence value and the abnormality data. The comparison unit 382 may compare the parameter related to the abnormality data stored in the storage unit 353 with the corresponding parameter of the operating vacuum pump to determine the deviation value (or matching tendency degree) from the criterion value of the corresponding parameter of the operating vacuum pump. The comparison unit 382 may output the corresponding operation continuation probability in the storage unit 353 to the set of the divergence value and the parameter related to the abnormality data.

Next, the comparison unit 382 outputs the judgment result of the failure arrival possibility as the comparison result (output data) (step S1003). Here, the comparison unit 382 may output the comparison result (output data) to the display apparatus 306 to display the comparison result (output data) on the display apparatus 306, or may transmit the comparison result (output data) to the external terminal apparatus from the communication unit 356 via the communication network.

The comparison result (output data) includes an alarm signal alarming the failure arrival possibility, a notification signal indicating that the probability of failure arrival is high, the operation continuation probability, and the like. Here, the operation continuation probability is, for example, the probability that a failure occurs within a predetermined time.

As described above, the information processing apparatus 305 according to the present embodiment includes the comparison unit 382. The comparison unit 382 refers to the storage unit 353 in which the operation continuation common condition extracted from the tendency of the abnormality data detected in the data of the state quantity of the continuously operable vacuum pump is stored as the criterion data, compares the tendency of the abnormality data detected from the data of the state quantity of the operating vacuum pump with the criterion data stored in the storage unit 353 and outputs the comparison result.

According to this configuration, since it is possible to grasp the failure arrival possibility of the vacuum pump, it is possible to reduce the risk that the vacuum pump stops during the manufacturing process and articles are greatly damaged during the manufacturing process.

The film forming process of the semiconductor manufacturing apparatus and the criterion data may be stored in the storage unit 353 by being associated with each other. In this case, the comparison unit 382 may compare the tendency of the abnormality data detected from the state quantity of the operating vacuum pump with the criterion data which are stored in the storage unit 353 by being associated with the current film forming process of the semiconductor manufacturing apparatus 301 connected to the operating vacuum pump. According to this configuration, the comparison unit 382 can accurately estimate the failure arrival possibility of the vacuum pump 303 by comparing with criterion data for each film forming process of the semiconductor manufacturing apparatus 301, so that it is possible to reduce the risk that the vacuum pump stops and articles are greatly damaged during the manufacturing process.

In the example described above, the film forming process of the semiconductor manufacturing apparatus and the criterion data may be stored in the storage unit 353 by being associated with each other, but the present invention is not limited thereto, and another manufacturing process of the semiconductor manufacturing apparatus and the criterion data may be stored by being associated with each other. Here, other manufacturing processes other than the film forming process are, for example, an implant process, an etching process, an ashing process, a heating process, and the like. In this case, the comparison unit 382 may compare the tendency of the abnormality data detected from the state quantity of the operating vacuum pump with the criterion data which are stored in the storage unit 353 by being associated with the current manufacturing process of the semiconductor manufacturing apparatus 301 connected to the operating vacuum pump.

Modified Example

In the present embodiment, a person such as a manufacturer of a vacuum pump determines an operation continuation common condition as criterion data from a tendency of abnormality data detected in data of a state quantity of a continuously operable vacuum pump in advance, but the present embodiment is not limited thereto. The criterion data determination apparatus 320 may extract parameters of interest from the tendency of the abnormality data detected in the data of the state quantity of the continuously operable vacuum pump and set an operation continuation common condition corresponding to the extracted parameters as the criterion data.

Hereinafter, a configuration of the criterion data determination apparatus 320 will be described. For example, the abnormality data detected in the data of the state quantity of the continuously operable vacuum pump are collected by manufacturing companies of the vacuum pump together with the data of the state quantity of the continuously operable vacuum pump. Here, as an example, a description is made under the assumption that the criterion data determination apparatus 320 is installed in the manufacturing companies.

Here, the abnormality data are, for example, a value deviated from a normal range defined for each divided process, a spike value not related to the process, and/or abnormality (for example, there are no instantaneously deviated data, but the abnormality that the whole division section for a certain period tends to increase) of a change tendency over time in all processes for each divided process, or the like.

Figure 63:
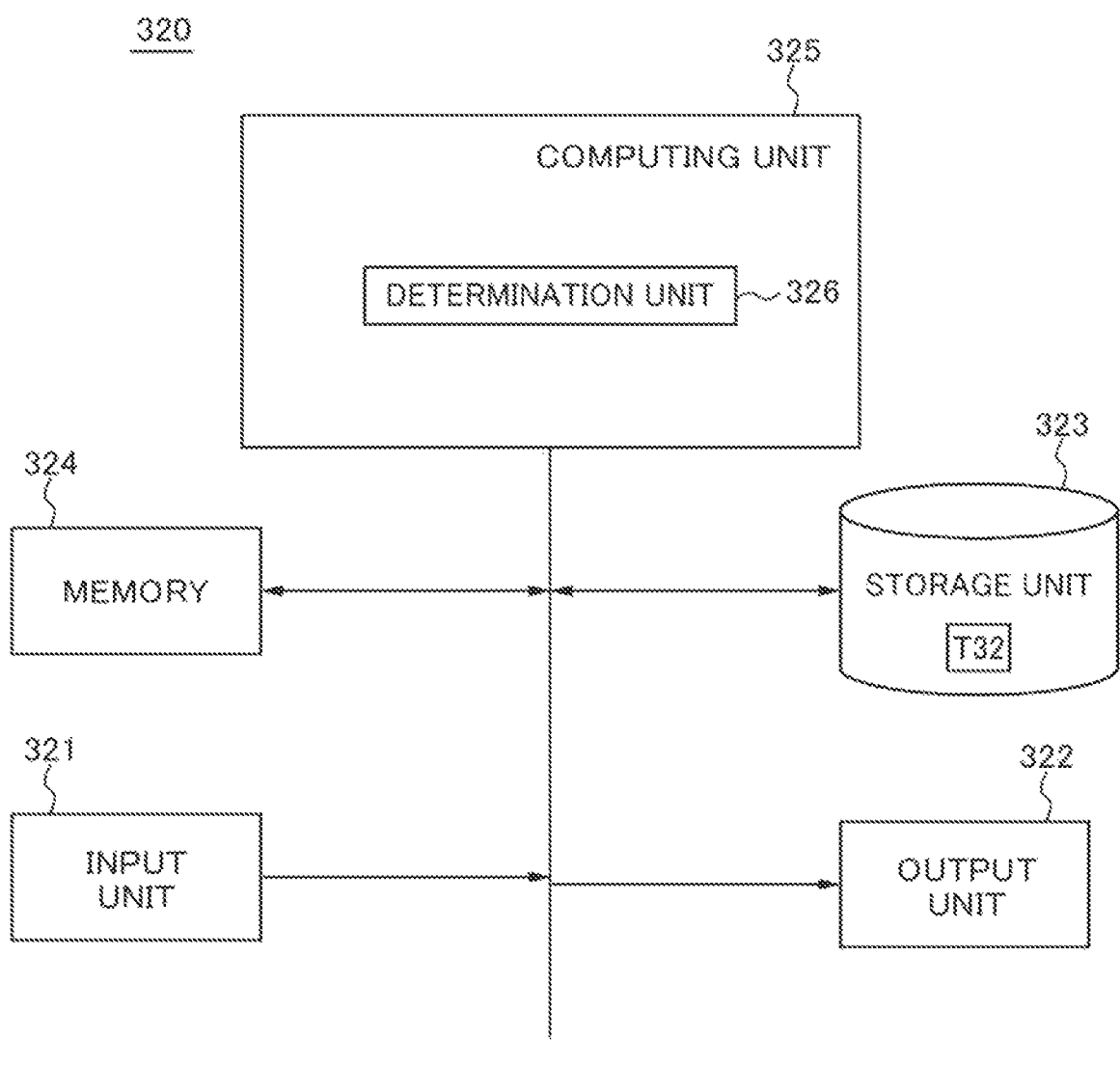
FIG. 63 is a schematic configuration diagram showing a criterion data determination apparatus 320 according to a modified example of the seventh embodiment.

FIG. 63 is a schematic configuration diagram showing a criterion data determination apparatus 320 according to a modified example of the seventh embodiment. As shown in FIG. 63, the criterion data determination apparatus 320 includes an input unit 321, an output unit 322, a storage unit 323, a memory 324, and a computing unit 325 having a central processing unit (CPU). Each unit is connected to each other by a bus.

The input unit 321 receives an input from an operator. The output unit 352 outputs information according to a command from the computing unit 325. The storage unit 323 stores a program to be executed by the computing unit 325. In addition, every time the abnormality data detected in the data of the state quantity of the continuously operable vacuum pump is collected, these abnormality data are added to the storage unit 323 by the operation of the operator.

In this embodiment, as an example, a set of attributes of the vacuum pump and the abnormality data is added to the storage unit 323 by the operation of the operator. Here, as described above, the attributes of the vacuum pump is, for example, the type or model of the vacuum pump and/or the type or model of the semiconductor manufacturing apparatus connected to the vacuum pump. As a result, as shown in FIG. 59, a set of the attributes of the vacuum pump and the abnormality data is accumulated. FIG. 64 is a diagram showing an example of a table T32 stored in the storage unit 323. In the table T32, a set of the attributes of the vacuum pump and a file name of the abnormality data is stored, and the abnormality data itself are also stored in the storage unit 323. As a result, the computing unit 325 can refer to the abnormality data from the file name of the abnormality data.

The memory 324 temporarily stores information. The computing unit 325 reads and executes the program stored in the storage unit 323. As a result, the computing unit 325 functions as the determination unit 326.

The determination unit 326 refers to the storage unit 323 to determine the criterion data for judging the operation continuation possibility using the tendency of the abnormality data. Specifically, for example, the determination unit

326 determines the tendency of interest by learning using artificial intelligence, for example, deep learning using a deep neural network, or the like from the tendency of the abnormality data detected in the data of the state quantity of the continuously operable vacuum pump. The determination unit 326 may set the criterion data (for example, a threshold value) according to the extracted tendency of interest. For example, the determination unit 326 may determine the failure arrival common condition, which is a condition common to the failed vacuum pump, as the criterion data for the parameters of interest.

Here, the tendency of interest is, for example, (1) the number of times of occurrence of abnormality data, (2) the time change in an abnormality data occurrence interval (decrease in the interval), (3) the increase or decrease tendency in the abnormality data value, (4) the time change in an abnormality occurrence duration or the time change in duration, (5) the tendency (deviation) of a process in which the abnormality data occurs, and (6) the conditions (1) to (4) (for example, focused on (1) to (4) in a certain process) in the process in which the abnormality occurs or the situation in which a combination (set) of (7) and (2) to (4) occurs.

The criterion data may be a threshold value. For example, when the operation continuation common condition is the number of times of occurrence of abnormality data, the criterion data is a threshold value. For example, when it is common that the number of times of occurrences of abnormality data for the continuously operable vacuum pump after the set time elapses is 10 times, 10 is set as the criterion data.

In addition, the criterion data may be the plurality of sets of parameters (for example, the number of times of occurrence of abnormality data) related to the abnormality data and the operation continuation probability. The number of times of occurrence of abnormality data may be consecutive integers or discontinuous integers.

In addition, the criterion data may be a set of the parameters related to the abnormality data and the criterion value, a set of the divergence value and the parameters related to the abnormality data, and the operation continuation probability corresponding to the set.

In addition, the criterion data may be the plurality of parameters related to an abnormality data occurrence tendency and the operation continuation occurrence probability corresponding to the plurality of sets of parameters.

As an example of the criterion data extraction processing, the determination unit 326 may determine the criterion data for each attribute of the vacuum pump. According to this configuration, since the criterion data are created for each attribute of the vacuum pump, when comparing with the tendency of the abnormality data detected from the data of the state quantity of the operating vacuum pump, it is possible to compare the tendency of the abnormality data with the criterion data corresponding to the vacuum pump of the attributes to which the operating vacuum pump belongs. As a result, it is possible to improve the determination accuracy on the failure arrival possibility of the vacuum pump.

Figure 65:
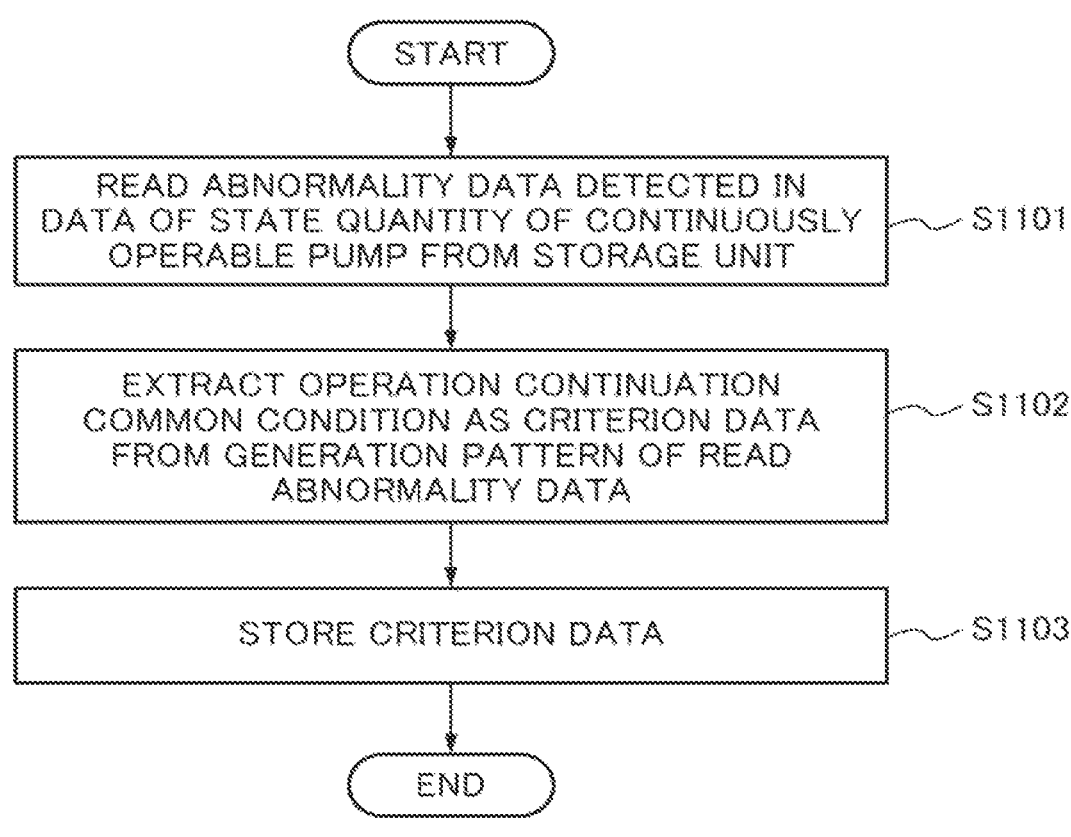
FIG. 65 is a flowchart showing an example of criterion data extraction processing according to a modified example of the seventh embodiment.

Subsequently, the flow of the extraction processing of the criterion data according to the modified example of the seventh embodiment will be described with reference to FIG. 65. FIG. 65 is a flowchart showing an example of criterion data extraction processing according to a modified example of the seventh embodiment.

First, the abnormality data detected in the data of the state quantity of the failure pump is read from the storage unit 323 (step S1101).

Next, the determination unit 326 extracts the operation continuation common condition as the criterion data from the tendency of the read abnormality data (step S1102).

Next, the determination unit 326 stores the extracted criterion data in the storage unit 323 (step S1103).

The determination unit 326 may extract the criterion data for each film forming process of the semiconductor manufacturing apparatus or the determination unit 326 may extract the criterion data for each set of the attributes of the vacuum pump and the film forming process of the semiconductor manufacturing apparatus. According to this configuration, since the criterion data are created for each film forming process of the semiconductor manufacturing apparatus, when comparing with the tendency of the abnormality data detected from the data of the state quantity of the operating vacuum pump 303, it is possible to compare the tendency of the abnormality data with the criterion data corresponding to the film forming process of the semiconductor manufacturing apparatus 301 to which the operating vacuum pump 303 is connected. As a result, it is possible to improve the determination accuracy on the failure arrival possibility of the vacuum pump. According to this configuration, it is preferable that the set of the attributes of the vacuum pump, the film forming process of the semiconductor manufacturing apparatus, and the abnormality data is added to the storage unit 323 every time the abnormality data are collected so that the determination unit 326 refers to the storage unit 323 to extract the criterion data.

The determination unit 326 may extract the criterion data for each film forming process of the semiconductor manufacturing apparatus, but the present modified embodiment is not limited thereto, and the criterion data may be extracted for each other manufacturing process of the semiconductor manufacturing apparatus.

In the present modified example, the criterion data determination apparatus 320 determines the tendency of interest from the tendency of the abnormality data detected in the data of the state quantity of the continuously operable vacuum pump and determines the operation continuation common condition corresponding to the tendency as the criterion data, but the present modified example is not limited thereto. A person such as a designer or a manufacturer may set the tendency (for example, the number of times of occurrence of abnormality data) of interest from the tendency of the abnormality data detected in the data of the state quantity of the continuously operable vacuum pump that has failed in advance, and the criterion data determination apparatus 320 may set the criterion data (for example, a threshold value) corresponding to the set operation continuation common condition (for example, the number of times of occurrence of abnormality data). For example, when the operation continuation common condition is the number of times of occurrence of abnormality data, the criterion data determination apparatus 320 may set the statistical quantity (for example, the minimum value, the median value, the average value) of the number of times of occurrence of abnormality data in a plurality of abnormality data to the threshold value.

(As to Notification Processing)

Figure 66:
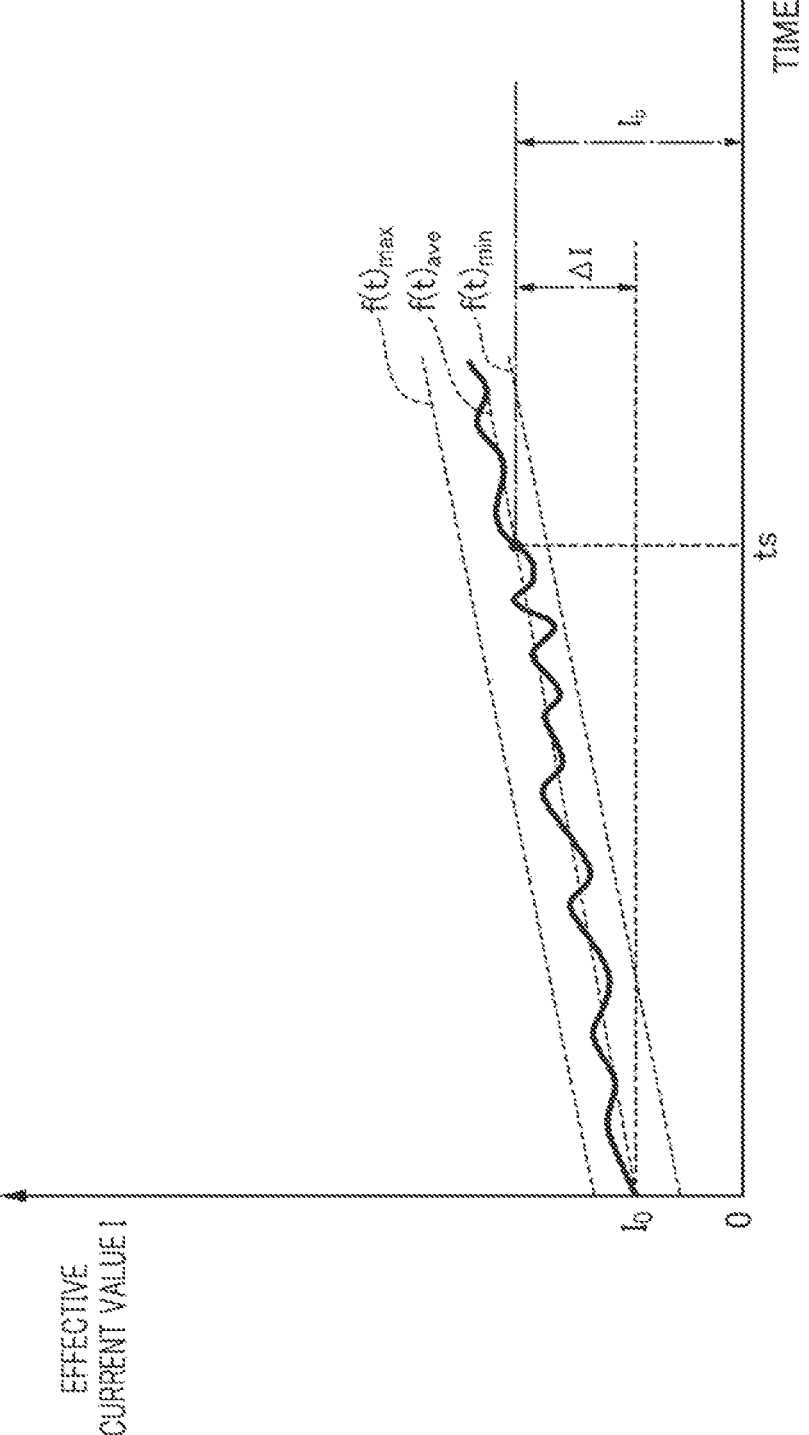
FIG. 66 is a graph showing an example of a relationship between an effective current value I of a motor 338 and an operation time in a certain continuously operable vacuum pump.

Subsequently, an example of the notification process of the comparison unit 382 of the information processing apparatus 305 will be described with reference to FIGS. 66 to 73. FIG. 66 is a graph showing an example of a relationship between an effective current value I of a motor 338 and an operation time in a certain continuously operable vacuum pump. A curve W1 is a time change in the effective current value I of the motor 338 in a certain continuously operable vacuum pump. A straight line $f(t)_{ave}$ is an average time change in the effective current value I of the motor 338 in the normal vacuum pump. A straight line $f(t)_{max}$ is a time change in a maximum value of the normal range of the effective current value I of the motor 338 in the vacuum pump. The straight line $f(t)_{min}$ is a time change in a minimum value of the normal range of the effective current value I of the motor 338 in the vacuum pump. For example, the comparison unit 382 issues an alert when the effective current value I of the currently operating motor 338 exceeds $f(t)_{max}$.

Figure 67:
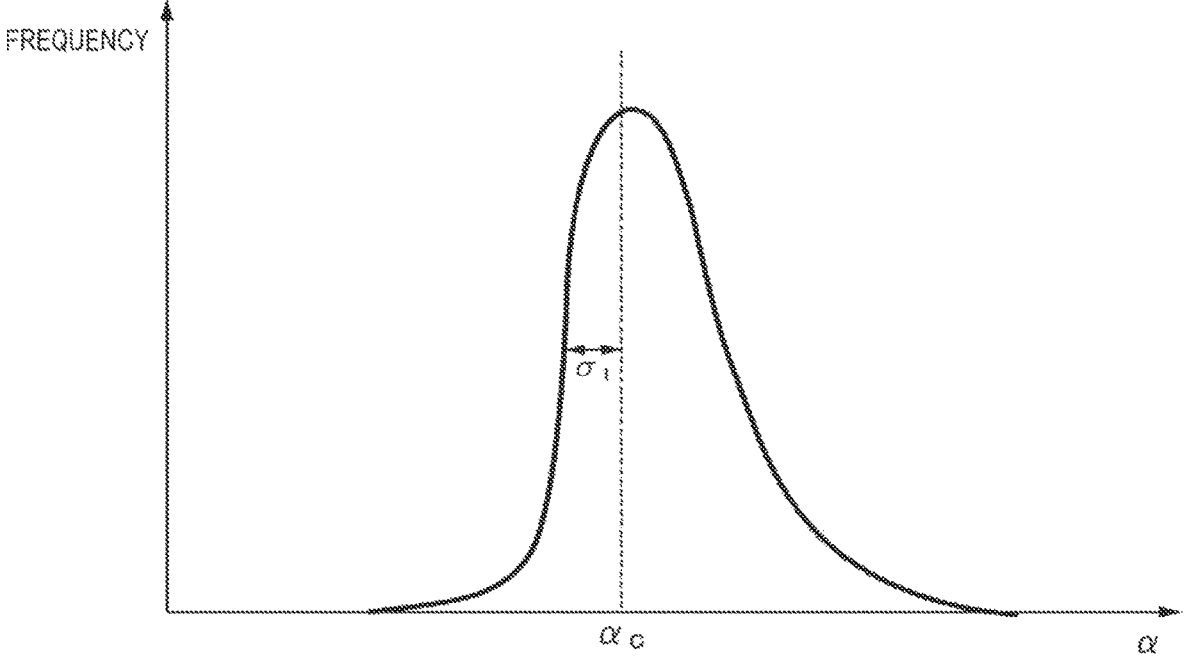
FIG. 67 is an example of a frequency graph of a parameter α when aggregated for the continuously operable vacuum pump when a set time is elapses.

As shown in FIG. 66, it is assumed that the effective current value at the time of the elapse of the set time $t_s$ is set to be $I_b$, and $\Delta I$ is set to be a value ($I\Delta=I_b-I_0$) obtained from subtracting an initial value $I_0$ of the effective current value from effective current value $I_b$ at the time of the elapse of the set time $t_s$. FIG. 67 shows, for example, a frequency graph of the parameter $\alpha$ when the operation data of the pump returning without failure aggregates with a parameter $\alpha$ ($=\Delta I/I_b$) obtained by dividing the difference value $\Delta I$ by the effective current value $I_b$ at the time of the elapse of the set time $t_s$.

FIG. 67 is an example of a frequency graph of a parameter $\alpha$ when aggregated for the continuously operable vacuum pump when the set time $t_s$ elapses. A median value of the parameter $\alpha$ is set to be ac and a standard deviation of the parameter $\alpha$ is set to be $\sigma_1$. At this time, the comparison unit 382 may issue a first alarm (alert) when the parameter $\alpha$ of the operating vacuum pump 303 is ($\alpha_c+\sigma_1$), a second alert when the parameter $\alpha$ is ($\alpha_c+2\sigma_1$), a third alert when the parameter $\alpha$ is ($\alpha_c+3\sigma_1$) (for example, an alert is displayed on the display apparatus 306).

As described above, during the operation of the pump 3, the comparison unit 382 compares the value (here, as an example, the parameter $\alpha$ during operation) based on the state quantity of the operating vacuum pump 303 with a statistical quantity (here, as an example, $\alpha_c+\sigma_1$, $\alpha_c+2\sigma_1$, or $\alpha_c+3\sigma_1$) of the value (here, as an example, the parameter $\alpha$) based on the state quantity (here, as an example, the effective current value) of the pump returning without failure and performs a control to issue a notification according to the comparison result. As a result, the notification can be issued when the state quantity of the operating vacuum pump 303 approaches the state quantity at the time of failure of the continuously operable vacuum pump, and the maintenance or replacement of the vacuum pump 303 can be performed before the vacuum pump 303 fails. In addition, the comparison unit 382 can also perform data processing by comparing the current data with the statistical quantity before the operating current timing. For example, when the current time is the elapse of 10010 hr, the comparison unit 382 may perform data processing by comparing the statistical quantity at the time of 10000 hr with the current data.

Figure 68:
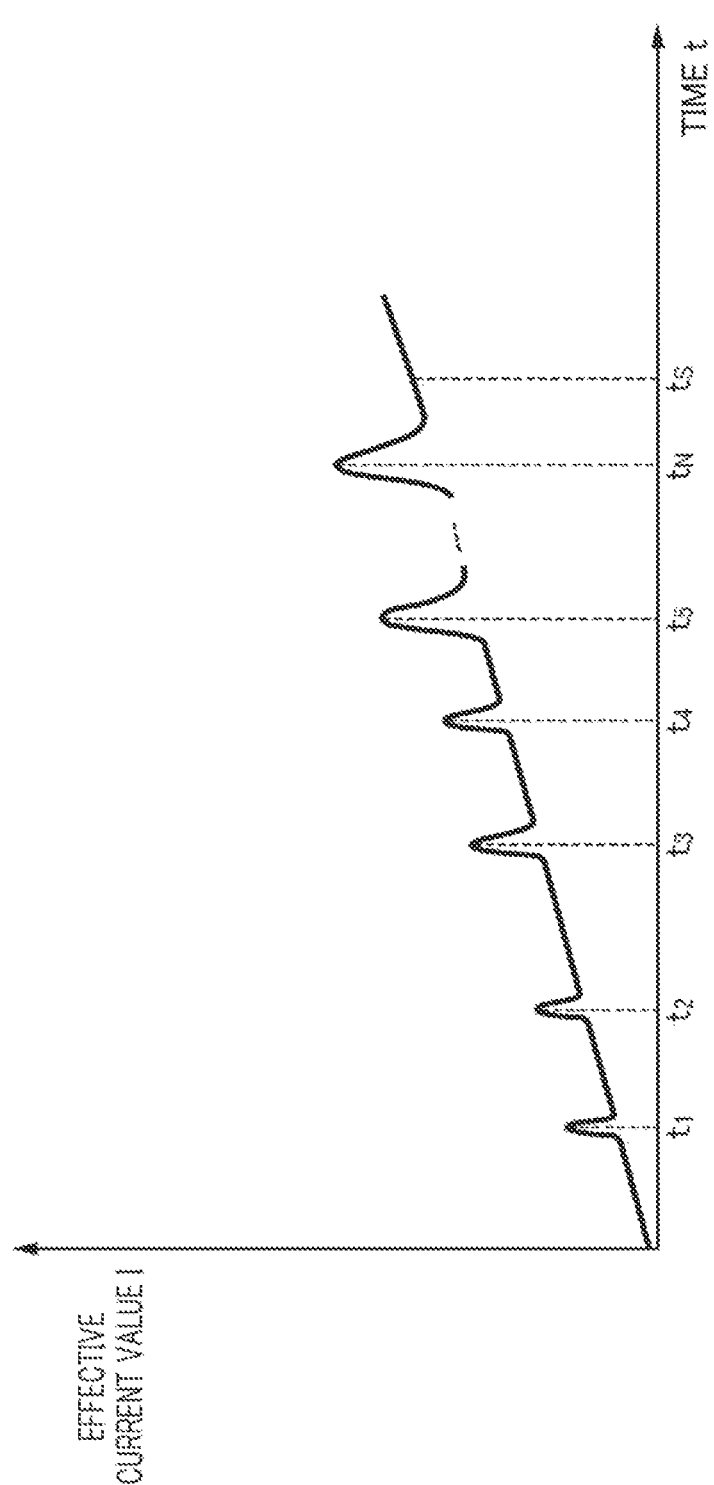
FIG. 68 is a graph showing an example of a relationship between the effective current value I of the motor 338 and the operation time in the certain continuously operable vacuum pump.
Figure 69A:
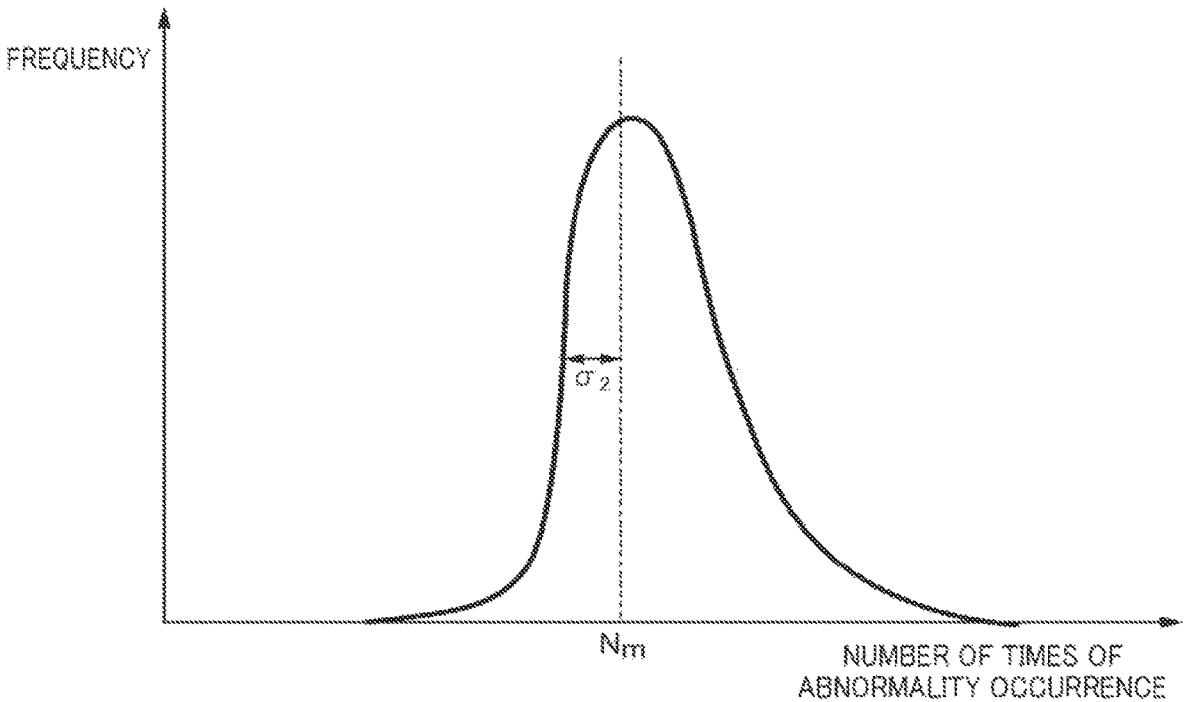
FIG. 69A is a diagram showing an example of a frequency graph of the number of times of abnormality occurrence when the number of times of abnormality occurrence aggregates up to failure for the continuously operable vacuum pump until the set time $t_s$ elapses.

FIG. 68 is a graph showing an example of a relationship between the effective current value I of the motor 338 and the operation time in the certain continuously operable vacuum pump. As shown in FIG. 68, in the pump returning without failure, an abnormality occurs at time $t_1$, $t_2$, $t_3$, $t_4$, $t_5$, . . . , $t_N$ (N is a positive integer), and the number of times of abnormality occurrence until the set time $t_s$ elapses is N times. FIG. 69A shows the frequency graph of the number of times of abnormality occurrence when the number of times of abnormality occurrence up to the set time $t_s$ aggregates for the continuously operable vacuum pump until the set time $t_s$ elapses.

FIG. 69A is a diagram showing an example of a frequency graph of the number of times of abnormality occurrence when the number of times of abnormality occurrence aggregates up to the set time $t_s$ for the continuously operable vacuum pump until the set time $t_s$ elapses. The average value of the number of times of abnormality occurrence until the set time $t_s$ elapses is set to be $N_m$, and the standard deviation of the number of times of abnormality occurrence until the set time $t_s$ elapses is set to be az. At this time, the comparison unit 382 may issue a first alert when the number of times of abnormality occurrence of the operating vacuum pump is $(N_m+\sigma_2)$ and a first maintenance warning between $(N_m+\sigma_z)$ and $(N_m+2\sigma_2)$ (for example, the alert is displayed on the display apparatus 306). In addition, the comparison unit 382 may issue a second alert at the time of $(N_m+2\sigma_2)$ and a second maintenance warning between $(N_m+2\sigma_2)$ and $(N_m+3\sigma_2)$.

Here, the maintenance warning means that for example, the maintenance is recommended or the maintenance time is reached.

In this way, the comparison unit 382 compares the number of times of abnormality occurrence of the state quantity (here, as an example, the effective current value I) of the operating vacuum pump with the statistical quantity (here, as an example, $N_m+3\sigma_2$, $N_m+2\sigma_2$, $N_m+\sigma_2$) of the number of times of abnormality occurrence of the state quantity (here, as an example, the effective current value I) until the set time $t_s$ of the continuously operable vacuum pump elapses, and performs a control to issue a notification according to the comparison result. As a result, the notification can be issued when the state quantity of the operating vacuum pump 303 is separated from the number of times of abnormality occurrence until the set time $t_s$ of the continuously operable vacuum pump elapses, and the maintenance or replacement of the vacuum pump 303 can be performed before the vacuum pump 303 fails.

Figure 69B:
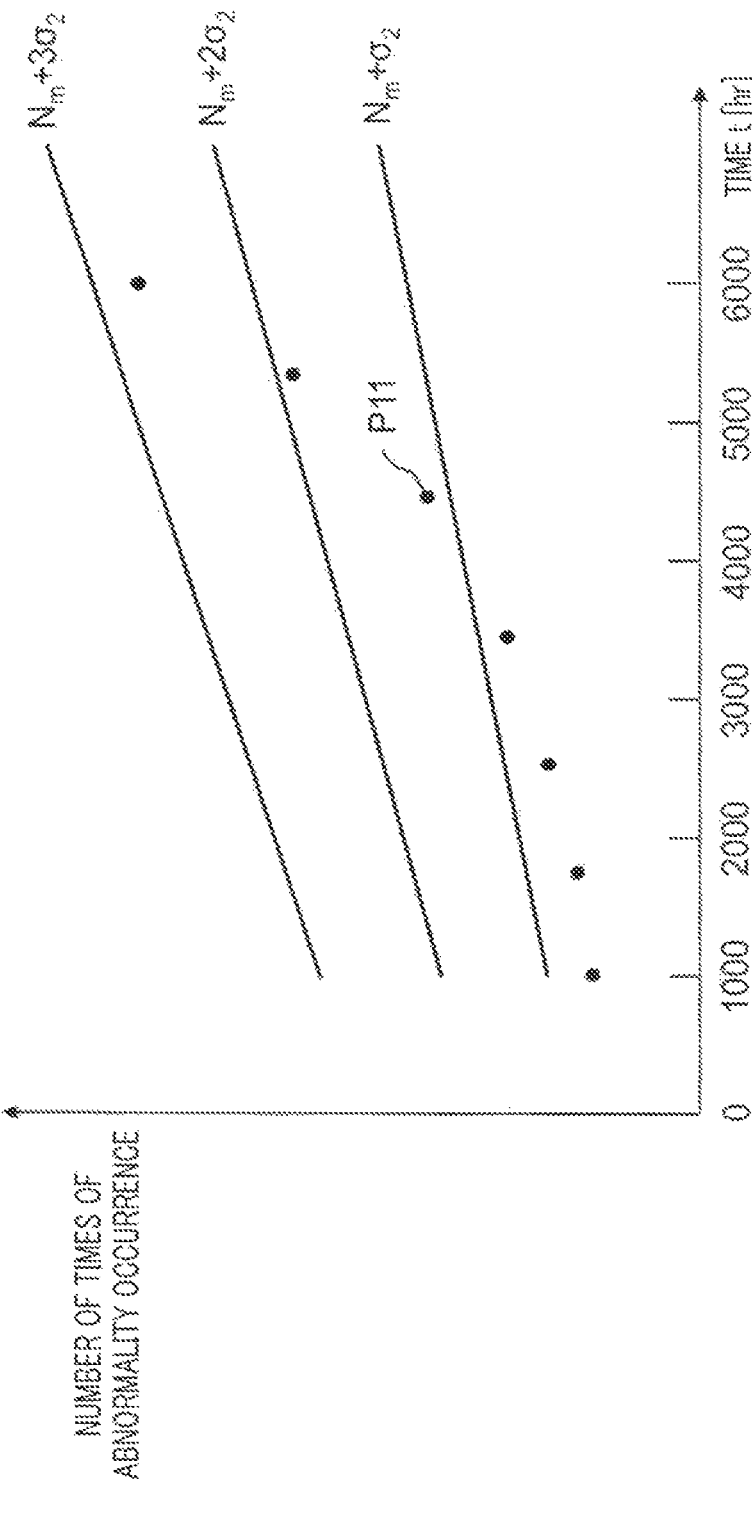
FIG. 69B is a diagram showing an example of a graph in which a time change in a statistical quantity of the number of times of abnormality occurrence of the vacuum pump returning without a failure and the number of times of abnormality occurrence of the current operated pump are plotted.

FIG. 69B is a diagram showing an example of a graph in which a time change in a statistical quantity of the number of times of abnormality occurrence of the vacuum pump returning without a failure and the number of times of abnormality occurrence of the currently operating pump are plotted. FIG. 69B shows the time changes in the statistical quantity $N_m+3\sigma_2$, $N_m+2\sigma_2$, and $N_m+\sigma_z$, respectively. Point P11 is a point where the number of times of abnormality occurrence of the operating vacuum pump exceeds the statistical quantity $N_m+\sigma_2$ for the first time. In this way, when the number of times of abnormality occurrence of the operating vacuum pump exceeds the statistical quantity $N_m+\sigma_2$ for the first time, the comparison unit 382 may issue an alert.

Figure 70:
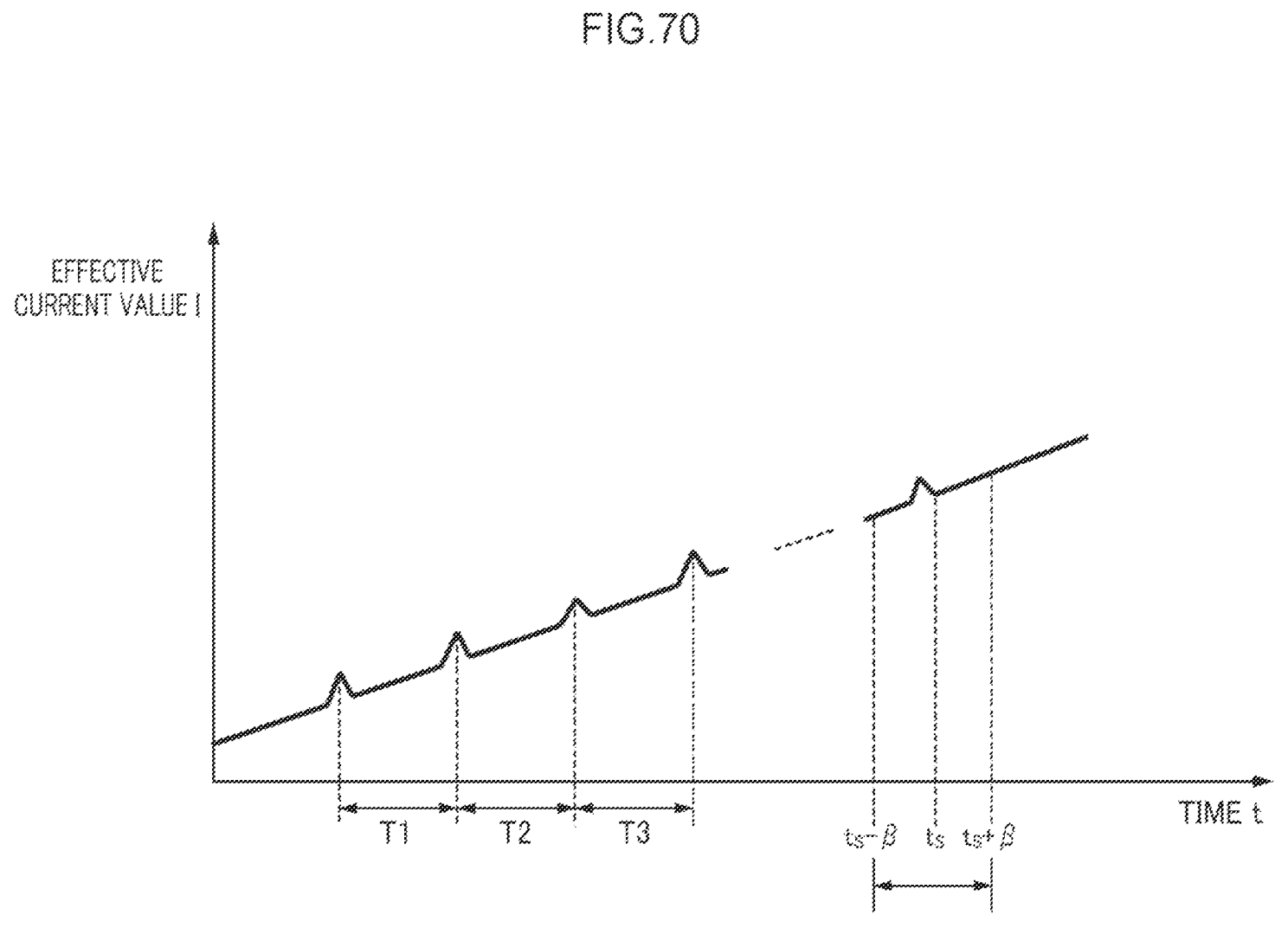
Figure 71:
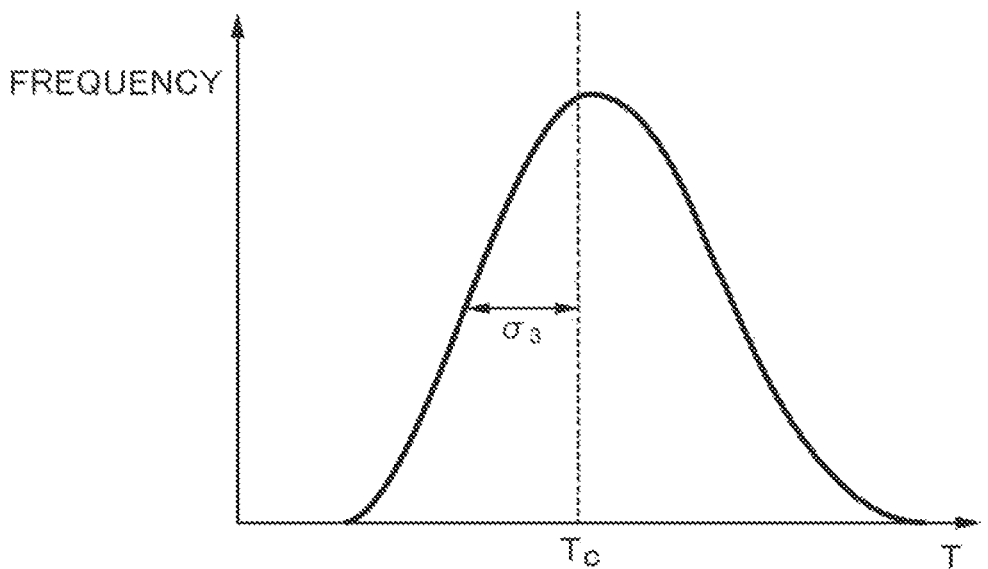
FIG. 71 is a diagram showing an example of a frequency graph of intervals of abnormality occurrence immediately before the set time $t_s$ elapses when the abnormality occurrence intervals in a predetermined period immediately before the set time $t_s$ elapses aggregate for the continuously operable vacuum pump.

FIG. 70 is a graph showing a third example of the relationship between the effective current value I of the motor 338 and the operation time in the certain continuously operable vacuum pump. As shown in FIG. 70, intervals of abnormality occurrence in the continuously operable vacuum pump are T1, T2, and T3. For the continuously operable vacuum pump, when the interval T of the abnormality occurrence in the set period from time $t_s$–β (β is a predetermined time) to time $t_s$+β aggregates based on the set time $t_s$, the frequency graph of the interval T of the abnormality occurrence is expressed as shown in FIG. 71, for example. For example, if the set time $t_s$ is 10000 h and the predetermined time β is 100 h, the set period is (10000−100) h to (10000+100).

FIG. 71 is a diagram showing an example of a frequency graph of intervals of abnormality occurrence immediately before the set time $t_s$ elapses when the abnormality occurrence intervals in a predetermined period immediately before the set time $t_s$ elapses aggregate for the continuously operable vacuum pump. The median value of the interval T of the abnormality occurrence immediately before the set time $t_s$ elapses is set to be $T_c$ and the standard deviation of the interval T of the abnormality occurrence is set to be $\sigma_3$. Here, as an example, $T_c$ is set to be the median value, but may be an average value instead of the median value.

Figure 72A:
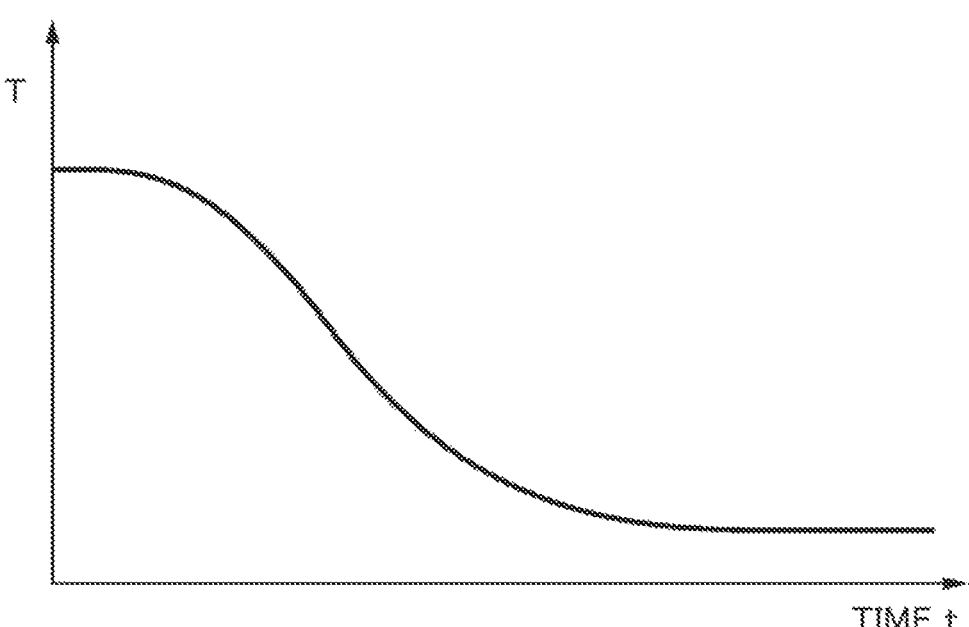
FIG. 72A is a diagram showing an example of the time change in the abnormality occurrence intervals for the operating vacuum pump.
Figure 72B:
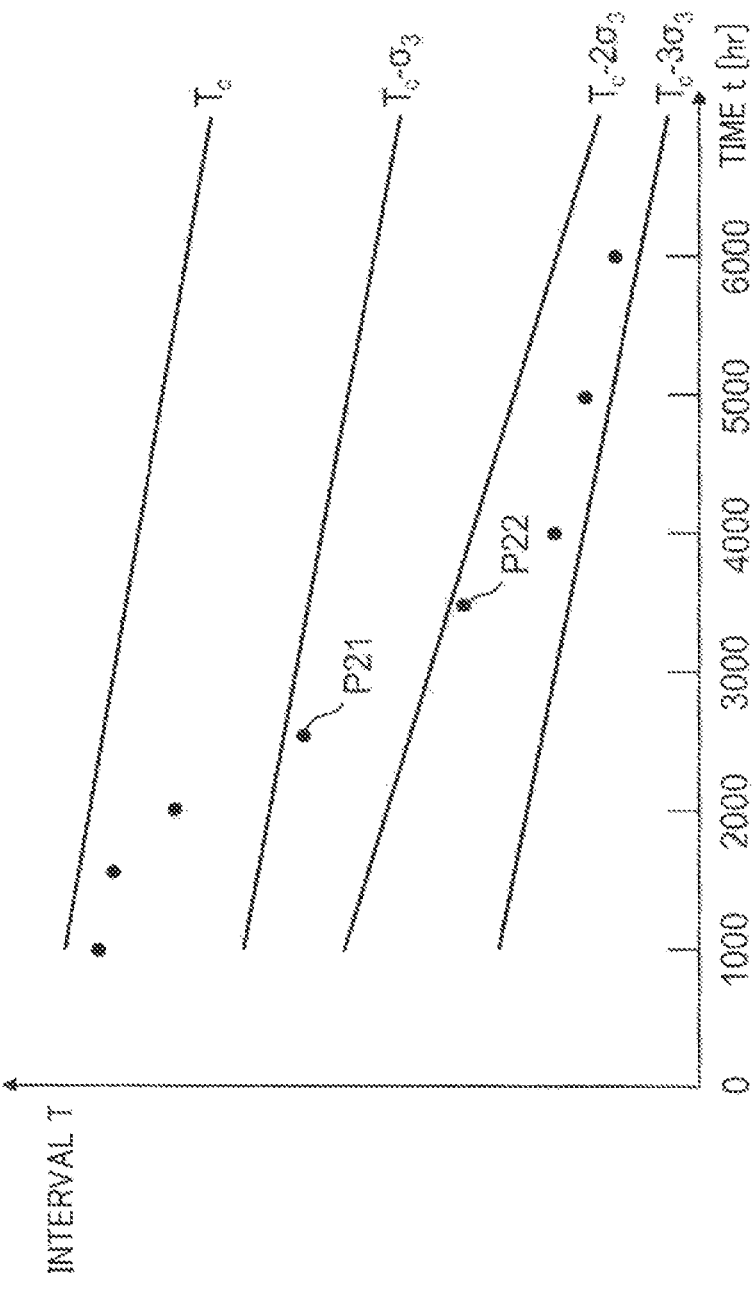
FIG. 72B is a diagram showing an example of a graph in which the time change in the statistical quantity of the intervals of the vacuum pump returning without a failure and the number of times of abnormality occurrence of the currently operating pump are plotted.

FIG. 72A is a diagram showing an example of the time change in the abnormality occurrence interval T for the operating vacuum pump. The abnormality occurrence interval T is gradually shortened as time t passes. FIG. 72B is a diagram showing an example of a graph in which a time change in the statistical quantity of the interval of the vacuum pump returning without failure and the number of times of abnormality occurrence of the currently operating pump are plotted. FIG. 72B shows the time changes of the statistical quantity $T_c$−$3\sigma_3$, $T_c$−$2\sigma_3$, and $T_c$−$\sigma_3$, respectively. Point P21 is a point where the interval of the operating vacuum pump becomes a statistical quantity $T_c$−$\sigma_3$ or less for the first time, and point P22 is a point where the interval of the operating vacuum pump becomes the statistical quantity $T_c$−$2\sigma_3$ or less for the first time. In this way, the comparison unit 382 may issue the first alert when the interval T of the abnormality occurrence of the operating vacuum pump is $(T_c$−$\sigma_3)$ or less and the second alert when the interval T is $(T_c$−$2\sigma_3)$ or less (for example, the alert may be displayed on the display apparatus 306).

In addition, the comparison unit 382 may output the maintenance warning at timing when the interval T of the abnormality occurrence of the operating vacuum pump is between $(T_c$−$\sigma_3)$ and $(T_c$−$2\sigma_3)$ (for example, the maintenance warning is displayed on the display apparatus 306). The maintenance warning means that for example, the maintenance is recommended or the maintenance time is reached.

Here, as an example, although a description is given focusing on the predetermined period immediately before the set time $t_s$ elapses, the present embodiment is not limited thereto, and the predetermined period may be immediately before as long as it is a period before the set time $t_s$ elapses. For example, a description may be given focusing on a period between 400 hours before the set time $t_s$ elapses and 200 hours before the set time $t_s$ elapses.

In this way, the comparison unit 382 compares the abnormality occurrence interval of the state quantity (here, as an example, the effective current value I) of the operating vacuum pump 303 with the statistical quantity (here, as an example, $T_c$−$\sigma_3$, $T_c$−$2\sigma_3$) of the abnormality occurrence interval of the state quantity (here, as an example, the effective current value I) before the set time $t_s$ of the continuously operable pump elapses, and performs a control to issue a notification according to the comparison result. As a result, the notification can be issued when the state quantity of the operating vacuum pump 303 is separated from the abnormality occurrence interval of the state quantity before the set time $t_s$ elapses, and the maintenance or replacement of the vacuum pump 303 can be performed before the vacuum pump 303 fails.

The comparison unit 382 may make the maintenance or replacement timing earlier depending on the ratio of the time of the film forming process to the operation time of the vacuum pump 303. For example, the comparison unit 382 may use a coefficient η to make the alert or maintenance warning timing earlier.

For example, the comparison unit 382 may add or subtract the median value $\alpha_c$ of the parameter α, the average value $N_m$ of the number of times of abnormality occurrence before the set time $t_s$ elapses, and the median value $T_c$ of the abnormality occurrence interval using the coefficient η. For example, the comparison unit 382 may correct the median value $\alpha_c$ of the parameter $\alpha$ to $\alpha_c - \eta \times \sigma_1$.

Here, the coefficient $\eta$ is represented by $\eta = kL = kT_{SP}/T_w$ using an influence coefficient k and a ratio L $(=T_{SP}/T_w)$ of time $T_{SP}$ of the film forming process with respect to an operation time $T_w$ of the vacuum pump 303. Here, the influence coefficient k represents the influence of the film forming process on the failure of the vacuum pump, and an initial value thereof is, for example, a value of 1.0 to 2.0. The influence coefficient k may be updated by learning using the artificial intelligence, for example, the deep learning using the deep neural network, or the like. As a result, the influence coefficient k is optimized. Alternatively, the selection of the period of the film forming process may be performed by the learning using the artificial intelligence, for example, the deep learning using the deep neural network or the like. At this time, for the learning, a set of the period of the film forming process and the sensor signal extracted by a person in advance may be used as a training data set.

Here, the sensor signal is a signal detected by a particle sensor (laser counter), a micro film forming sensor, a sound wave/vibration sensor or the like. Here, the micro film sensor monitors the increase in the film thickness by changing a natural frequency. As a result, since the period of the film forming process is automatically selected, the time $T_{SP}$ of the film forming process is automatically determined. When calculating the coefficient the number of times of the film forming process may be used instead of the time $T_{SP}$ of the film forming process.

Figure 72C:
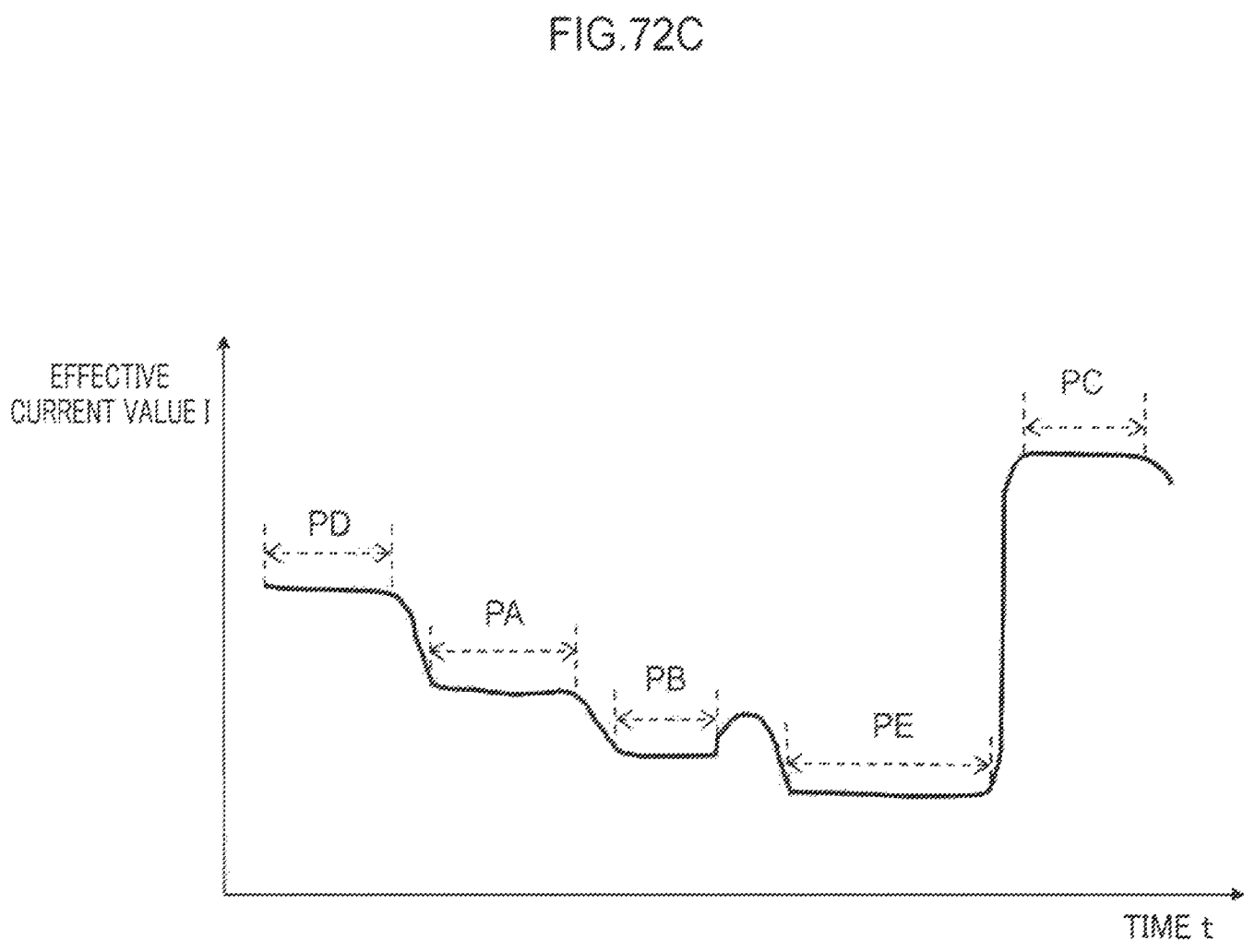

In FIGS. 66, 68, and 70, the idling period is also included in the operation time on the horizontal axis, but in FIGS. 66, 68, and 70, the comparison unit 382 multiplies the coefficient $\eta$ corresponding to the process by the operation time for each process, thereby correcting the operation time. FIG. 72C is a graph showing a fourth example of the relationship between the effective current value I of the motor 338 and the operation time. In FIG. 72C, processes PA, PB, PC, PD, and PE are shown, and it is assumed that the process PE is an idling period, for example. In this case, for example, when the coefficients $\eta$ of 1.5, 1.5, 2, 2, and 1 are allocated to each of the processes PA, PB, PC, PD, and PE (each operation time is $t_{PA}$, $t_{PB}$, $t_{PC}$, $t_{PD}$, and $t_{PE}$), the comparison unit 382 may calculate a corrected operation time $t_r$ depending on a calculation formula $t_r = 1.5t_{PA} + 1.5t_{PB} + 2t_{PC} + 2t_{PD} + t_{PE}$. By correcting the operation time as described above, it can be converted into the time during which the load is actually applied to the vacuum pump.

In this way, the comparison unit 382 performs processing of changing the notification timing according to the time of the film forming process or the number of times of the film forming process of the semiconductor manufacturing apparatus 301 to which the operating vacuum pump 303 is connected. Specifically, for example, the comparison unit 382 corrects the operation time depending on the time of the film forming process or the number of times of the film forming process, and issues a notification based on the corrected operation time. According to this configuration, it is possible to change the notification timing depending on the time of the film forming process of the semiconductor manufacturing apparatus to which the operating vacuum pump is connected or the number of times of the film forming process. As the time of the film forming process of the semiconductor manufacturing apparatus 301 to which the operating vacuum pump 303 is connected or the number of times of the film forming process is increased, the risk of failure is increased, but the maintenance or replacement of the vacuum pump 303 can be performed before the failure of the vacuum pump 303 by making the notification timing earlier.

Here, the comparison unit 382 performs the processing of changing the notification timing depending on the time of the film forming process or the number of times of the film forming process, and the present embodiment is not limited thereto and may perform the processing of changing the notification timing depending on the time or the number of times of manufacturing processes other than the idling.

The comparison unit 382 uses the sensor signal of the particle sensor (laser counter) and the training data of the film forming amount set in advance by a person to perform the learning using the artificial intelligence, for example, the deep learning using the deep neural network, or the like. As a result, the comparison unit 382 may judge the film forming amount from the sensor signal of the operating particle sensor (laser counter), and may also update the influence coefficient k using the judged film forming amount.

Alternatively, the comparison unit 382 uses the sensor signal of the micro film forming sensor and the training data of the film forming amount set in advance by a person to perform the learning using the artificial intelligence, for example, the deep learning using the deep neural network, or the like. As a result, the comparison unit 382 may judge the film forming amount from the sensor signal of the operating micro film forming sensor, and may also update the influence coefficient k using the judged film forming amount.

Alternatively, the comparison unit 382 uses the sensor signal of the sound wave/vibration sensor and the training data of the film forming amount set in advance by a person to perform the learning using the artificial intelligence, for example, the deep learning using the deep neural network, or the like. As a result, the comparison unit 382 may judge the film forming amount from the sensor signal of the operating sound wave/vibration sensor, and may also update the influence coefficient k using the judged film forming amount.

Eighth Embodiment

Next, an eighth embodiment will be described. In the eighth embodiment, abnormality diagnosis, abnormality prediction, and/or stability control of a vacuum pump is executed using a plurality of sensors.

Figure 73:
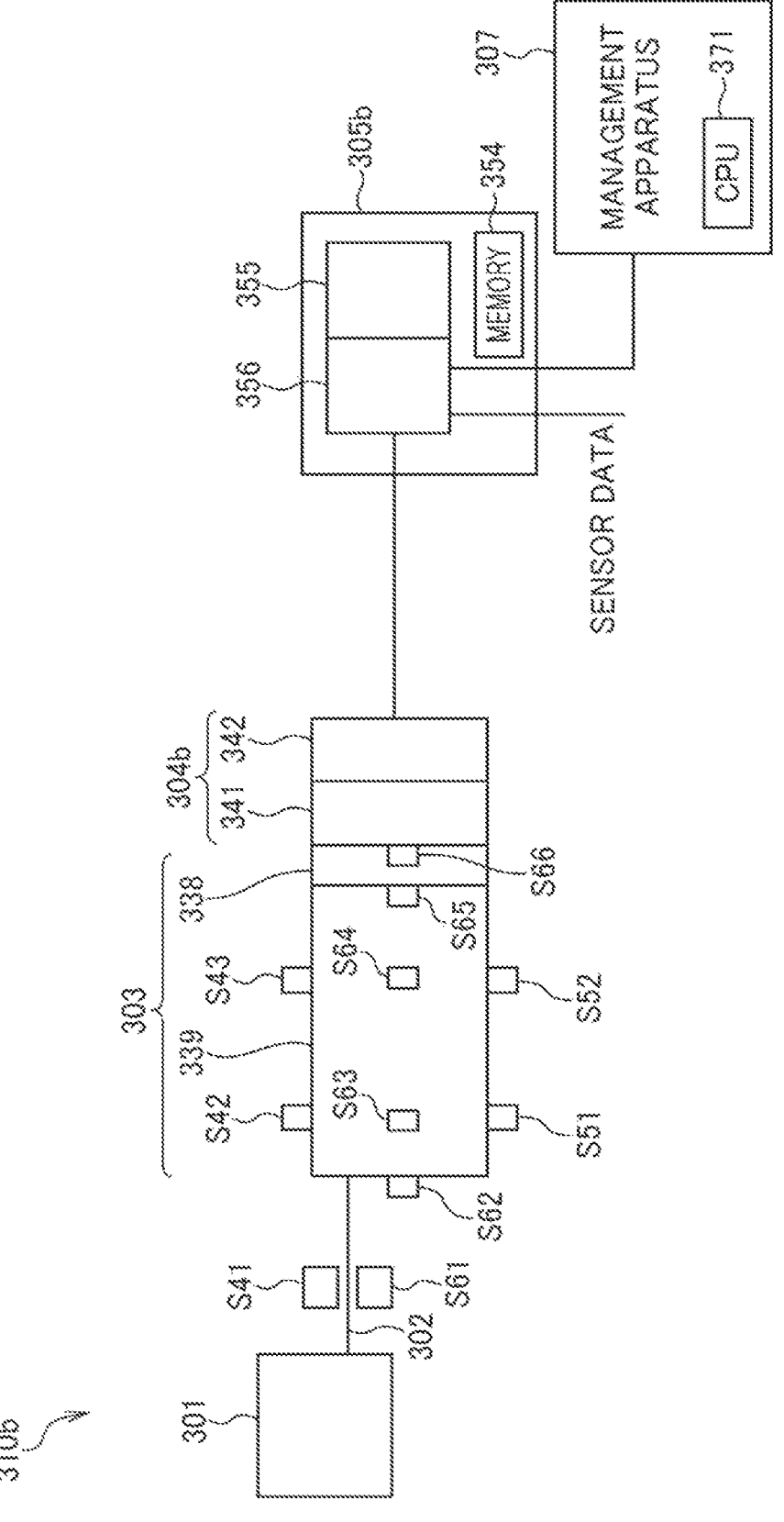
FIG. 73 is a schematic configuration diagram of a semiconductor manufacturing system 310b according to an eighth embodiment.

FIG. 73 is a schematic configuration diagram of a semiconductor manufacturing system 310b according to the eighth embodiment. Elements in common with FIG. 58 are denoted by common numbers, and a detailed description thereof will be omitted.

As shown in FIG. 73, a semiconductor manufacturing system 310b according to the eighth embodiment includes a semiconductor manufacturing apparatus 301, a vacuum pump 303, a piping 302 connecting between the semiconductor manufacturing apparatus 301 and the vacuum pump 303, a control apparatus 304b controlling the vacuum pump 303, an information processing apparatus 305b, and a management apparatus 307 connected to the information processing apparatus 305b.

As an example, the semiconductor manufacturing system 310b according to the eighth embodiment further includes acceleration sensors S41 to S43, current monitor sensors S51 and S52, and temperature sensors S61 to S66. The acceleration sensors S31 to S33 are, for example, five-axis acceleration sensors. In this way, the semiconductor manufacturing system 310b has a plurality of sensors.

The control apparatus 304*b* has a control unit 341 controlling a motor 338 and a communication unit 342 communicating with the information processing apparatus 305*b*.

The information processing apparatus 305*b* has a memory 354, a computing unit 355, and a communication unit 356. The communication unit 356 communicates with the communication unit 342 of the control apparatus 304*b*. In addition, the communication unit 356 communicates with the management apparatus 307. In addition, the communication unit 356 receives sensor data from the acceleration sensors S41 to S43, the current monitor sensors S51 and S52, and the temperature sensors S61 to S66.

The management apparatus 307 can communicate with the information processing apparatus 305*b*. The management apparatus 307 has a CPU 371.

The acceleration sensors S41 to S43, the current monitor sensors S51 and S52, and the temperature sensors S61 to S66 have a communication function, for example, Wi-Fi (registered trademark), Bluetooth (registered trademark), or the like, and the sensor signals detected by these sensors are collected by the communication unit 342 therearound. The sensor signal is transmitted from the communication unit 342 to the communication unit 356 via a wiring, subjected to data processing by the computing unit 355 as necessary, and stored in the memory 354. The information processing apparatus 305*b* may be a gateway (for example, a router or the like). In addition, the information processing apparatus 305*b* may also have an artificial intelligence (AI) function.

By using a plurality of sensors, it is possible to obtain highly accurate management information. For example, when a part of a rotor is increased in a reactive force due to foreign matters, a variation of a rotation speed, a variation of an inclination of a rotor shaft and a variation of a motor control current occur. By simultaneously performing comparison processing not only on one change but also on the rotation speed, the inclination of the rotor shaft, and the motor control current, it is possible to reliably and accurately take the abnormal variation.

The acceleration sensors S41 to S43 may have a MEMS type vibration oscillator. The acceleration sensor is wideband/inexpensive/compact, and is small and effective when being mounted on the substrate.

In addition, the operation situations of the plurality of vacuum pumps may be acquired as data.

The operation situation of the vacuum pump attached to each equipment (for example, semiconductor manufacturing apparatus) upstream of the vacuum pump may be managed. It is possible to compare the operation situation and the number of times of failure/replacement of part frequency of the vacuum pump, the number of times failure, and the frequency of replacement of parts for each attribute (for example, model) of the semiconductor manufacturing apparatus to define the number of times of failure/replacement of part frequency for each attribute (for example, model) of the semiconductor manufacturing apparatus.

In the present embodiment, three acceleration sensors are provided, but the number of acceleration sensors is not limited thereto, and two or less acceleration sensors or four or more (for example, ten or more) acceleration sensors may be provided. The acceleration sensor may have two axes in an opposite direction (for example, left/right) to each other from the center of the rotor shaft of the vacuum pump, one axis or more in the rotor shaft direction, and two or more axes in the case of multiple stages.

In the present embodiment, two current monitor sensors are provided, but the present invention is not limited thereto, and one current monitor sensor may be provided or three or more current monitor sensors may be provided. The current monitor sensor may be installed for measuring the motor driving current for logging data of the motor driving current variation. In the case of the plurality of motors, the number of current monitor sensors may be increased accordingly. For example, in the case of a two-stage motor, two or more current monitor sensors may be provided.

In the present embodiment, six temperature sensors are provided, but the present invention is not limited thereto, and five or less temperature sensors may be provided or seven or more temperature sensors may be provided. A multipoint temperature (for example, the temperature at positions in an opposite direction to each other from the center) of the rotor, the temperature of the motor, the temperature of the motor shaft, the temperature of the gas input unit, the temperature of the gas output unit, the temperature of the rotor input unit, and the temperature of the rotor output unit may be detected. In addition, when the number of vacuum pumps is multistage, the temperature of the rotor output unit of the preceding stage and the temperature of the input unit of the next stage may be detected.

The semiconductor manufacturing system 310*b* may further be provided with a plurality of (for example, five or more) pressure sensors. The pressure sensor may detect a multipoint pressure (for example, the pressure at positions in an opposite direction to each other from the center) of the rotor, the pressure of the motor shaft, the pressure of the gas input unit, the pressure of the gas output unit, the pressure of the rotor input unit, and the pressure of the rotor output unit. In addition, when the number of vacuum pumps is multistage, the pressure sensor may detect the pressure of the rotor output unit of the preceding stage and the pressure of the input unit of the next stage.

The semiconductor manufacturing system 310*b* may further be provided with the rotation sensor of the rotor or the motor shaft. For example, three or more rotation sensors may be provided for one set of a rotor and one motor. As the number of rotors and motors is increased, the number of rotation sensors may be increased accordingly. The sensors can be combined as described above, and the semiconductor manufacturing system 310*b* may be provided with a total of 10 or more sensors.

(Effect of Using Plurality of Sensors)

By using a plurality of sensors, the computing unit 355 of the information processing apparatus 305*b* can perform the following processing.

In the case of using the multiaxial acceleration sensor, the computing unit 355 can perform a comparison of acceleration variations on that axis, for example, a comparison of differential waveforms with each other, a comparison of fast Fourier transform (FFT) waveforms, and the like. In this example, the computing unit 355 can analyze a comparison of two axes (x, y) at a position separated from the rotor shaft and a variation of a parallel axis (z) with the rotor. Since the computing unit 355 can compare variation vector components when the two axes at the separated position can be compared with each other, it is possible to accurately judge in which direction an overload occurs relative to a twist of the shaft. In addition, the computing unit 355 can compare the variation of the motor current near the time, and specify the overload on the rotor, the overload of the motor accordingly, and the time zone thereof.

In addition, when the sensor detection of the abnormal operation occurs in the lapse after the time of the judgment, the computing unit 355 can perform the detection and the warning/display. In this case, the comparison data are normally registered in the memory 354 as the SD condition, and the computing unit 355 can perform a judgment by making the comparison therewith.

It should be noted that the CPU 371 of the management apparatus 307 at the subsequent stage can also execute some or all of these processings.

Ninth Embodiment

Figure 74:
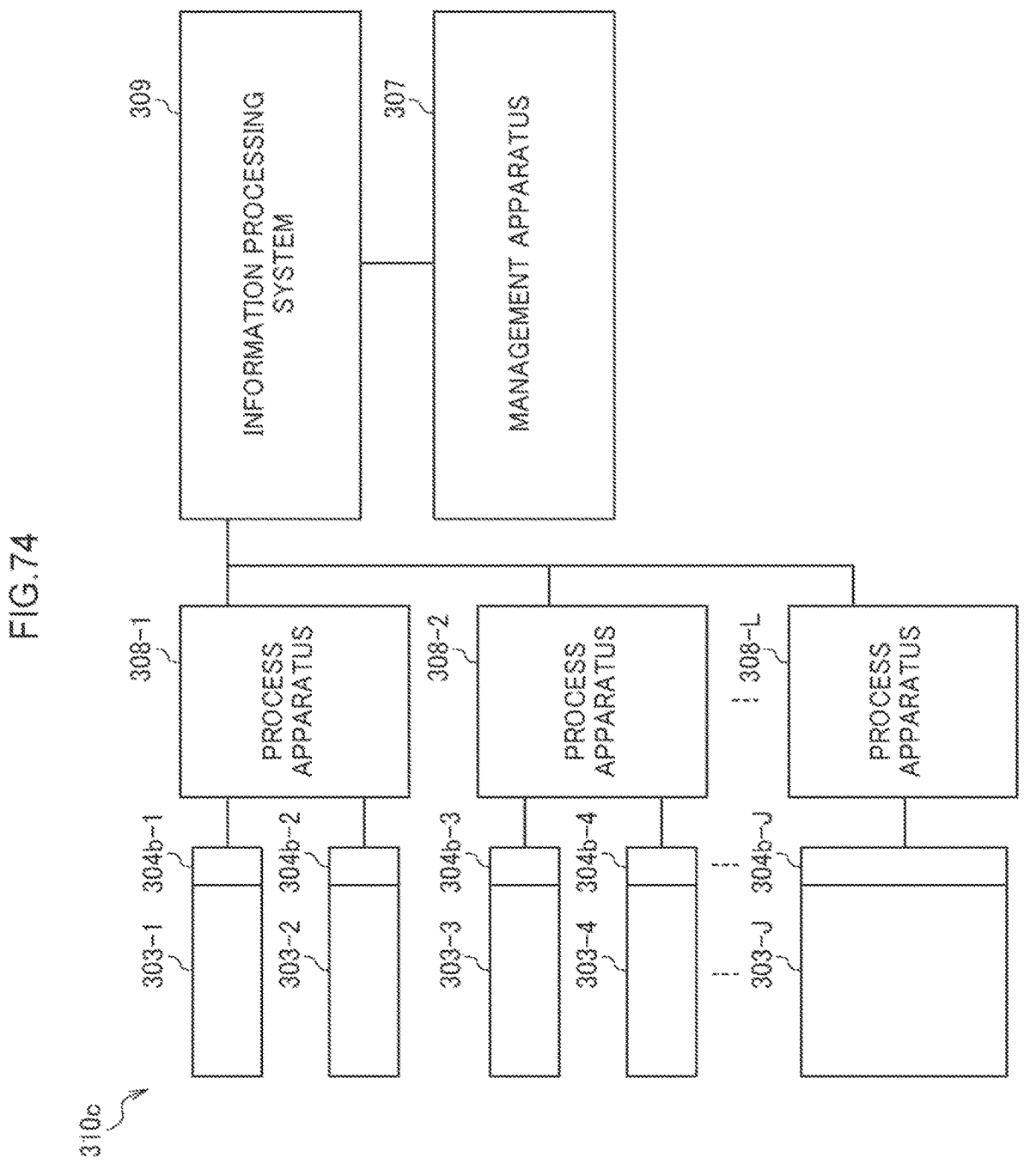
FIG. 74 is a schematic configuration diagram of a semiconductor manufacturing system 310c according to a ninth embodiment.

Next, a ninth embodiment will be described. FIG. 74 is a schematic configuration diagram of a semiconductor manufacturing system 310c according to the ninth embodiment. Elements in common with FIGS. 58 and 73 are denoted by common numbers, and a detailed description thereof will be omitted. As shown in FIG. 74, a semiconductor manufacturing system 310c includes vacuum pumps 303-1 to 303-J (J is a positive integer), control apparatuses 304b-1 to 304b-J controlling the vacuum pumps 303-1 to 303-J, process apparatuses 308-1 to 308-L (L is a positive integer), an information processing system 309, and a management apparatus 307.

Each of the vacuum pumps 303-1 to 303-J is provided with a plurality of sensors (not shown) as in the eighth embodiment. Since the configuration of each of the vacuum pumps 303-1 to 303-J is the same as that of the seventh embodiment, a description thereof will be omitted. Since the configuration of the control apparatuses 304b-1 to 304b-J is the same as that of the control apparatus 304b according to the eighth embodiment, a description thereof will be omitted.

The process apparatuses 308-1 to 308-L are etching apparatuses or film forming apparatuses. The process apparatus 308-1 is connected to the vacuum pumps 303-1 and 303-2. The process apparatus 8-2 is connected to the vacuum pumps 303-3 and 303-4. The process apparatus 308-L is connected to the vacuum pump 303-J. For example, the information processing system 309 has equipment and/or information gathering apparatuses (for example, a server or a personal computer (PC)) in a factory. The information processing system 309 may be a cloud or a mini cloud.

Sensor signals from the plurality of sensors are input to the control apparatuses 304b-1 to 304b-J. The control apparatuses 304b-1 to 304b-J acquire sensor values from the sensor signals and output sensor data indicating the sensor values to the process apparatuses 308-1 to 308-L to which the control apparatuses 304b-1 to 304b-J are connected.

In addition, the sensor data are transmitted from each process apparatus 308-1 to 308-L to the information processing system 309 and accumulated. The information processing system 309 processes the sensor data. The information processing system 309 is connected to the management apparatus 307. The management apparatus 307 executes various kinds of determination processings and updates the next-stage operation parameters. In addition, the management apparatus 307 updates the maintenance and replacement timing of parts. These updated values are fed back to each process apparatus 308-1 to 308-L and the control apparatuses 304b-1 to 304b-J via the information processing system 309. Each process apparatus 308-1 to 308-L and the control apparatuses 304b-1 to 304b-J perform an operation corresponding to the operation parameters.

The communication unit 342 of the control apparatuses 304b-1 to 304b-J may be installed in the vacuum pumps 303-1 to 303-J. In addition, the communication unit 342 of the control apparatuses 304b-1 to 304b-J may be installed outside in a form of a controller or an adapter.

Tenth Embodiment

Figure 75:
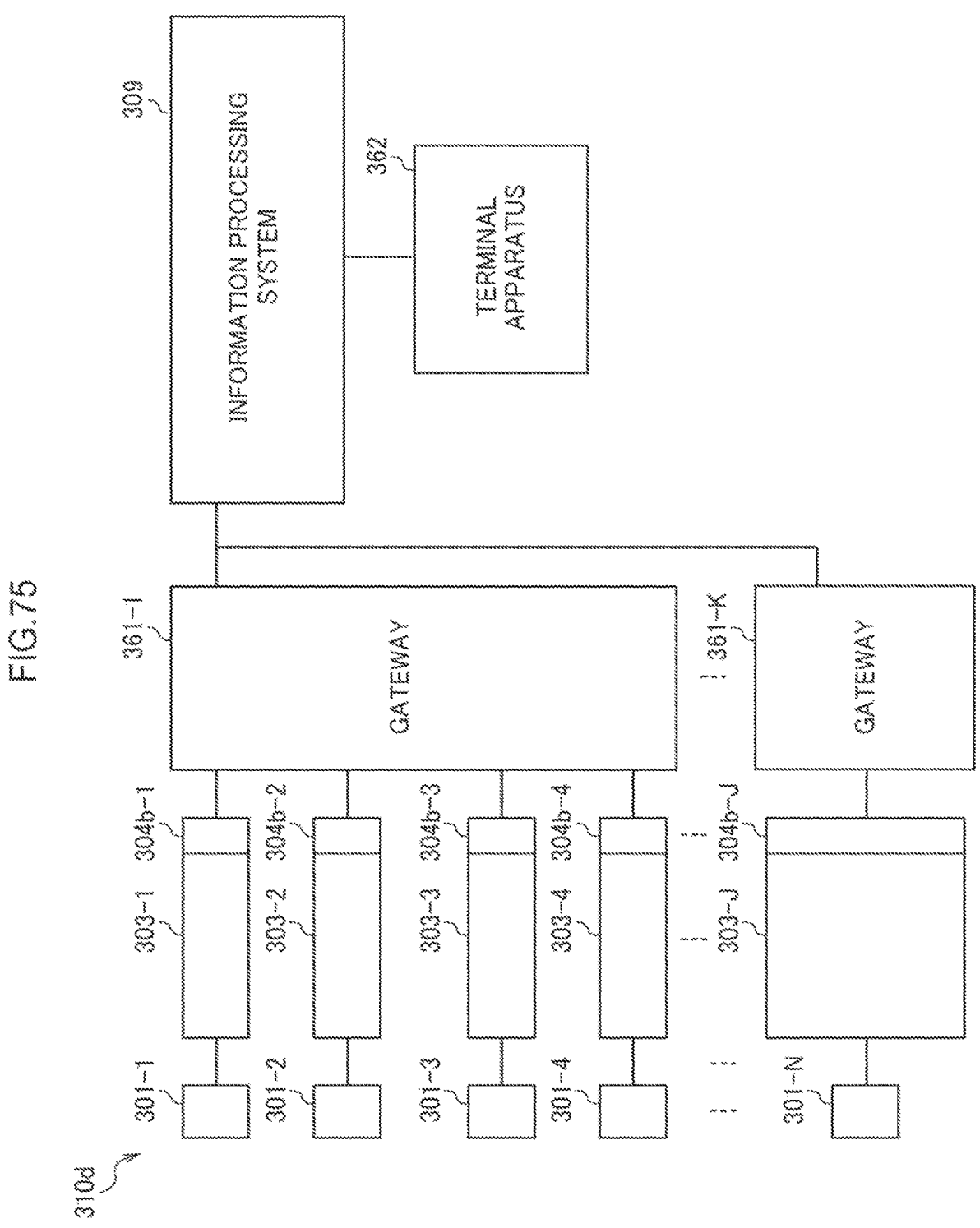
FIG. 75 is a schematic configuration diagram of a semiconductor manufacturing system 310d according to a tenth embodiment.

Next, a tenth embodiment will be described. FIG. 75 is a schematic configuration diagram of a semiconductor manufacturing system 310d according to the tenth embodiment. Elements in common with FIGS. 58, 73, and 74 are denoted by common numbers, and a detailed description thereof will be omitted. As shown in FIG. 75, the semiconductor manufacturing system 310d includes semiconductor manufacturing apparatuses 301-1 to 301-J (J is a positive integer), vacuum pumps 303-1 to 303-J, control apparatuses 304b-1 to 304b-J controlling the vacuum pumps 303-1 to 303-J, gateways 361-1 to 361-K (K is a positive integer), an information processing system 309, and a terminal apparatus 362.

Each of the vacuum pumps 303-1 to 303-J is provided with a plurality of sensors (not shown) as in the eighth embodiment. Since the configuration of each of the vacuum pumps 303-1 to 303-J is the same as that of the seventh embodiment, a description thereof will be omitted. Since the configuration of the control apparatuses 304b-1 to 304b-J is the same as that of the control apparatus 304b according to the eighth embodiment, a description thereof will be omitted.

The gateways 361-1 to 361-K transmit sensor signals, control signals, status signals, and the like transmitted from the control apparatuses 304b-1 to 304b-J to the information processing system 309. High speed optical communication is used between the gateways 361-1 to 361-K and the control apparatuses 304b-1 to 304b-J, and thus a signal transmission speed is fast. As a result, by transmitting and receiving a signal at high speed, it is possible to collect a large number of sensor signals in a short time.

It should be noted that the gateways 361-1 to 361-K may have some data processing functions. In this case, the gateways 361-1 to 361-K may perform necessary data processing, update operation parameters of the next stage, and transmit a signal to the corresponding control apparatuses 304b-1 to 304b-J and feed back the signal. At this time, the status data such as the operation state of the vacuum pumps 303-1 to 303-J can be transmitted to the information processing system 309. The information processing system 309 may judge the management of the operation state of the semiconductor manufacturing apparatuses 301-1 to 301-J and the vacuum pumps 303-1 to 303-J, and change the operation parameters of the next stage, change the status, and update the replacement or maintenance timing of the parts. The information processing system 309 may notify the terminal apparatus 362 of the changed or updated information. Accordingly, the operator of the terminal apparatus 362 can grasp the change in the operation parameters or the change in the status. Alternatively, the operator of the terminal apparatus 362 can grasp the replacement or maintenance timing of parts after the update.

The gateways 361-1 to 361-K have functions of an adapter for communication, a router, and a controller in combination. In addition, the gateways 361-1 to 361-K may automatically incorporate (update) a data processing method which accumulates data in the information processing system 309 and is updated by automatic learning, and may create a data set which selects necessary data groups and unnecessary data groups. As a result, the gateways 361-1 to 361-K can improve the computing processing efficiency in the gateway 361-1 to 361-K.

A part of data processed (temporally thinned out) by the gateways 361-1 to 361-K is accumulated in the information processing system 309. The information processing system 309 creates the data set for the automatic learning using the accumulated data, determines more efficient and stable operation parameters, judges the replacement timing of parts, or judges the maintenance timing by the automatic learning. When the number of accumulated data is increased (for example, when the number of accumulated data becomes 5000 to 10000 cases or more), it is possible to make a judgment with high reliability or high accuracy.

It is to be noted that the information processing system including the plurality of apparatuses may process each processing of the information processing apparatuses 305 and 305*b* according to the first or eighth embodiment by the plurality of apparatuses in the distributed manner. In addition, in the first and eighth embodiments, the control apparatus 304 and the information processing apparatus 305 are described as separate apparatuses, but the control apparatus 304 may be configured to include the information processing apparatus 305. In addition, in the eighth embodiment, the information processing apparatus 305*b* and the management apparatus 307 are described as separate apparatuses, but the information processing apparatus 305*b* may be configured to include the management apparatus 307. In addition, the program for executing each processing of the information processing apparatuses 305 and 305*b*, the management apparatus 307, and the information processing system 309 according to each embodiment is recorded in the computer-readable recording medium, the program recorded on the recording medium is read by the computer system, and the processor is executed to perform the above-described various processes related to the information processing apparatus according to the present embodiment.

Eleventh Embodiment

In a semiconductor manufacturing apparatus, a vacuum pump that exhausts a gas used in a semiconductor manufacturing process from an inside of a chamber is in widespread use for the purpose of creating a vacuum environment in the chamber. As such a vacuum pump, a displacement type vacuum pump having a roots type or screw type pump rotor is known.

Generally, the displacement type vacuum pump includes a pair of pump rotors disposed in a casing, and a motor for rotationally driving the pump rotors. A minute clearance is formed between the pair of pump rotors and between the pump rotor and an inner surface of the casing, and the pump rotor is configured to rotate while being in non-contact with the casing. As the pair of pump rotors rotates in an opposite direction to each other while synchronizing, the gas in the casing is transferred from a suction side to a discharge side and is exhausted from the chamber or the like connected to a suction port.

A gas used in the semiconductor manufacturing process or a substance generated by a chemical reaction of the gas used contains components which are solidified or liquefied as temperature drops. Normally, since the vacuum pump described above generates a compression heat during the transfer of the gas, the temperature of the operating vacuum pump rises to some extent. In the case where the temperature of the vacuum pump rising by the compression heat is not higher than the solidification or liquefaction temperature of the components or products in the gas, the temperature of the vacuum pump is maintained by heating a pump main body from the outside or heating inflowing gas. Even when the gas containing the above-described components is exhausted by using the vacuum pump, good evacuation is performed without solidifying or liquefying the components or products in the gas.

However, there is a semiconductor manufacturing process that cannot prevent the liquefaction and solidification of the gas used or the products from the gas used in increasing temperature of the vacuum pump as described above. When the operation of the vacuum pump is continued in this process, the solidified products (reaction products) are deposited in a clearance between the pump rotors and a clearance between the pump rotor and the casing. As the deposition of products is progressed, the vacuum pump may stop during the manufacturing process due to an excessive load applied to the vacuum pump during the operation of the vacuum pump. In this case, articles are lost during the manufacturing process, and the unexpected time is required for restoration to deteriorate the operation rate of the apparatus.

In order to prevent such damage, Patent Literature 3 discloses generating a warning when an integral value or an average value of a motor current exceeds a threshold value. Patent Literature 4 discloses analyzing and diagnosing a signal from a sensor unit including at least an acoustic emission (AE) sensor which detects AE generated by a vacuum pump.

The vacuum pump repeats the normal state and the abnormal state and eventually becomes a failure. However, the detection means of the abnormal state and the method of processing data after the detection of the abnormal state have not yet been devised. There is a problem that it is not possible to diagnose the internal state of the pump from the abnormal state of the operating target vacuum pump.

It is preferable to provide the information processing apparatus, the information processing system, the information processing method, and the program capable of diagnosing the internal state of the pump from the abnormal state of the operating target vacuum pump.

The information processing apparatus according to each of the following embodiments compares the occurrence tendency of the abnormal state of the operating target vacuum pump with the common condition based on the occurrence tendency of the past abnormality state of the vacuum pump of the group (for example, a group of vacuum pumps corresponding to the same manufacturing number, a group of vacuum pumps connected to a semiconductor manufacturing apparatus corresponding to the same manufacturing number, or a group of vacuum pumps used in the same process) to which the target vacuum pump belongs. Here, the past vacuum pump may be a vacuum pump (for example, a vacuum pump that is continuously operated without failure up to the regular inspection and returns to a manufacturer for overhaul) which is continuously operated without failure in a start period or a vacuum pump which is collected due to failure.

As a result, for example, it is possible to compare the abnormal state of the operating target vacuum pump with the abnormal state of the past vacuum pump of the same manufacturing number. Alternatively, it is possible to compare the abnormal state of the operating target vacuum pump with the past vacuum pump connected to the semiconductor manufacturing apparatus corresponding to the same manufacturing number as the semiconductor manufacturing apparatus to which the target vacuum pump is connected. Alternatively, it is possible to compare the abnormal state of the operating target vacuum pump with the past vacuum pump used in the same process as the process in which the target vacuum pump is used.

Therefore, it is possible to diagnose the internal state of the pump from the abnormal state of the operating target vacuum pump.

First, a first information processing apparatus common to eleventh to thirteenth embodiments will be described. The first information processing apparatus outputs a common condition of the occurrence tendency of the abnormality data of the vacuum pump belonging to the preset setting group.

Figure 76:
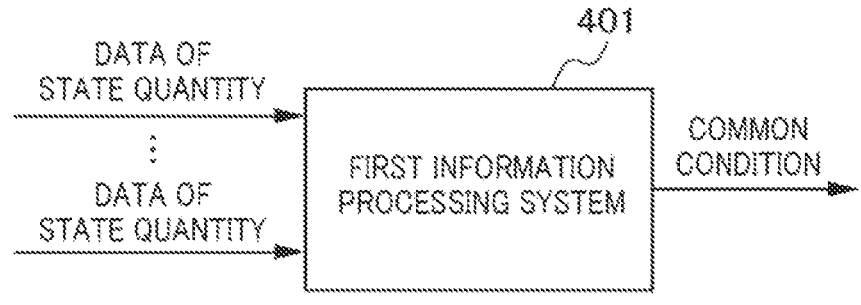
FIG. 76 is a block diagram showing an input/output relationship of a first information processing apparatus according to an eleventh embodiment.

FIG. 76 is a block diagram showing an input/output relationship of a first information processing apparatus according to an eleventh embodiment. As shown in FIG. 76, each data of state quantities recorded in each log is input to a first information processing apparatus 401.

In addition, as shown in FIG. 76, the first information processing apparatus 401 outputs the common condition of the occurrence tendency of the abnormality data of the vacuum pump belonging to the preset setting group.

Figure 77:
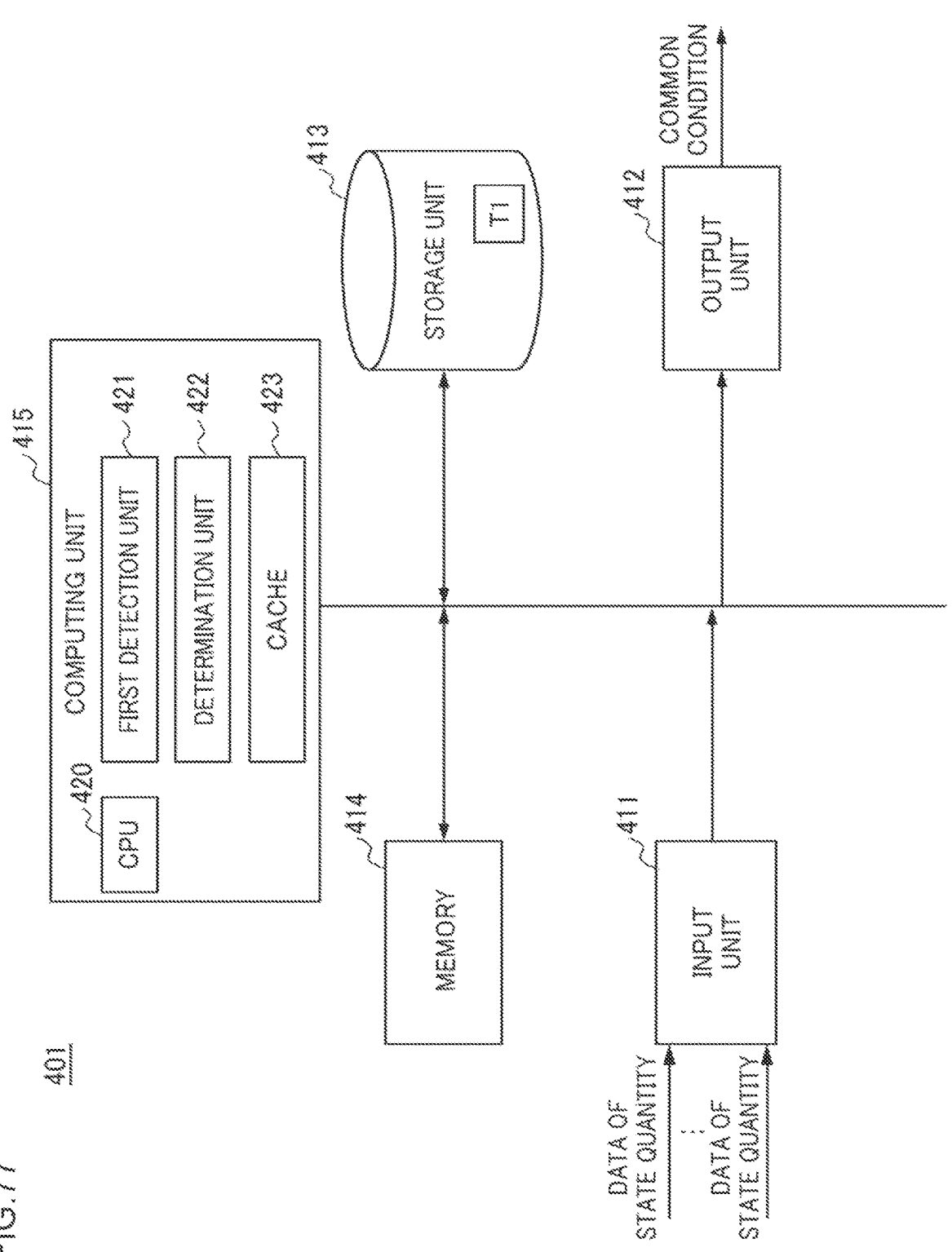
FIG. 77 is a block diagram showing a schematic configuration of the first information processing apparatus according to an eleventh embodiment.

FIG. 77 is a block diagram showing a schematic configuration of the first information processing apparatus according to the eleventh embodiment. As shown in FIG. 77, the first information processing apparatus 401 includes an input unit 411, an output unit 412, a storage unit 413, a memory 414, a central processing unit (CPU) 420, and a computing unit 415 having a cache 423. Each unit is connected to each other by a bus.

Each data of state quantities recorded in each log of the vacuum pump is input to the input unit 411.

The output unit 412 outputs the common condition of the occurrence tendency of the abnormality data of the vacuum pump belonging to the preset setting group according to the instruction of the computing unit 415.

The storage unit 413 stores the data of the state quantity input from the input unit 411.

The memory 414 temporarily stores information. The computing unit 415 stores the data of the state quantity data input from the input unit 411 in the storage unit 413. The computing unit 415 has a central processing unit (CPU) 420, a first detection unit 421, a determination unit 422, and a cache 423 in which a program is stored.

The first detection unit 421 detects first abnormality data from the data of the state quantity of the vacuum pump. Here, the first abnormality data and second abnormality data to be described later are collectively referred to as abnormality data. Here, the abnormality data may be a value deviating from the state quantity from the normal range of the state quantity defined for each divided process, or a value (hereinafter, referred to as a spike value) when the state quantity (for example, current value) exceeds the set range regardless of the process. Further, the abnormality data may be the abnormality (for example, which is not the instantaneous deviated value but may be a case where the entire division section of a certain period tends to increase, or the like) of the change tendency in all processes over time for each divided process over time.

Figure 78A:
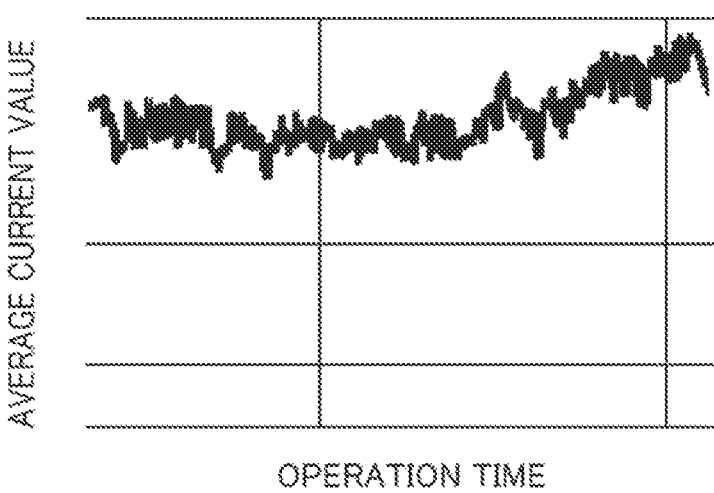
FIG. 78A is a graph showing an example of a relationship between an operation time and an average current value of the vacuum pump.
Figure 78B:
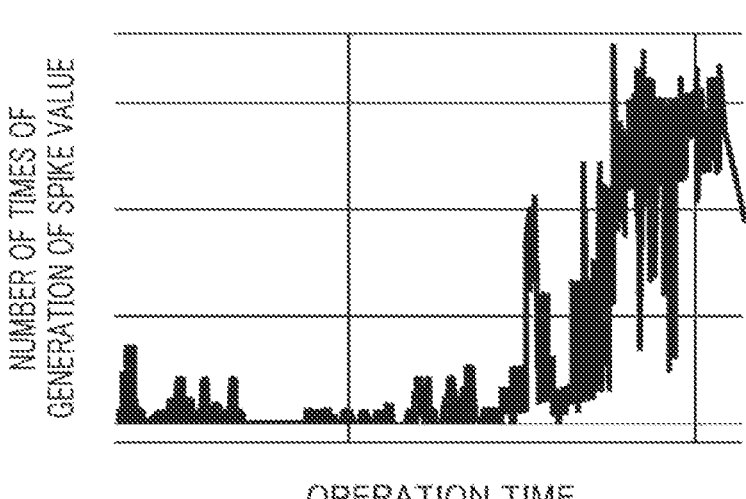
FIG. 78B is a graph showing an example of a relationship between the operation time and the number of times of generation of a spike value.

The state quantity includes the current value of the vacuum pump. FIG. 78A is a graph showing an example of a relationship between an operation time and an average current value of the vacuum pump. Here, the average current value of the vacuum pump is the average current value of the vacuum pump at each set time. FIG. 78B is a graph showing an example of a relationship between the operation time and the number of times of generation of a spike value. Here, the number of times of generation of the spike value is the number of times that the current value exceeds the set range, and represents the occurrence tendency of the first abnormality data.

Figure 79:
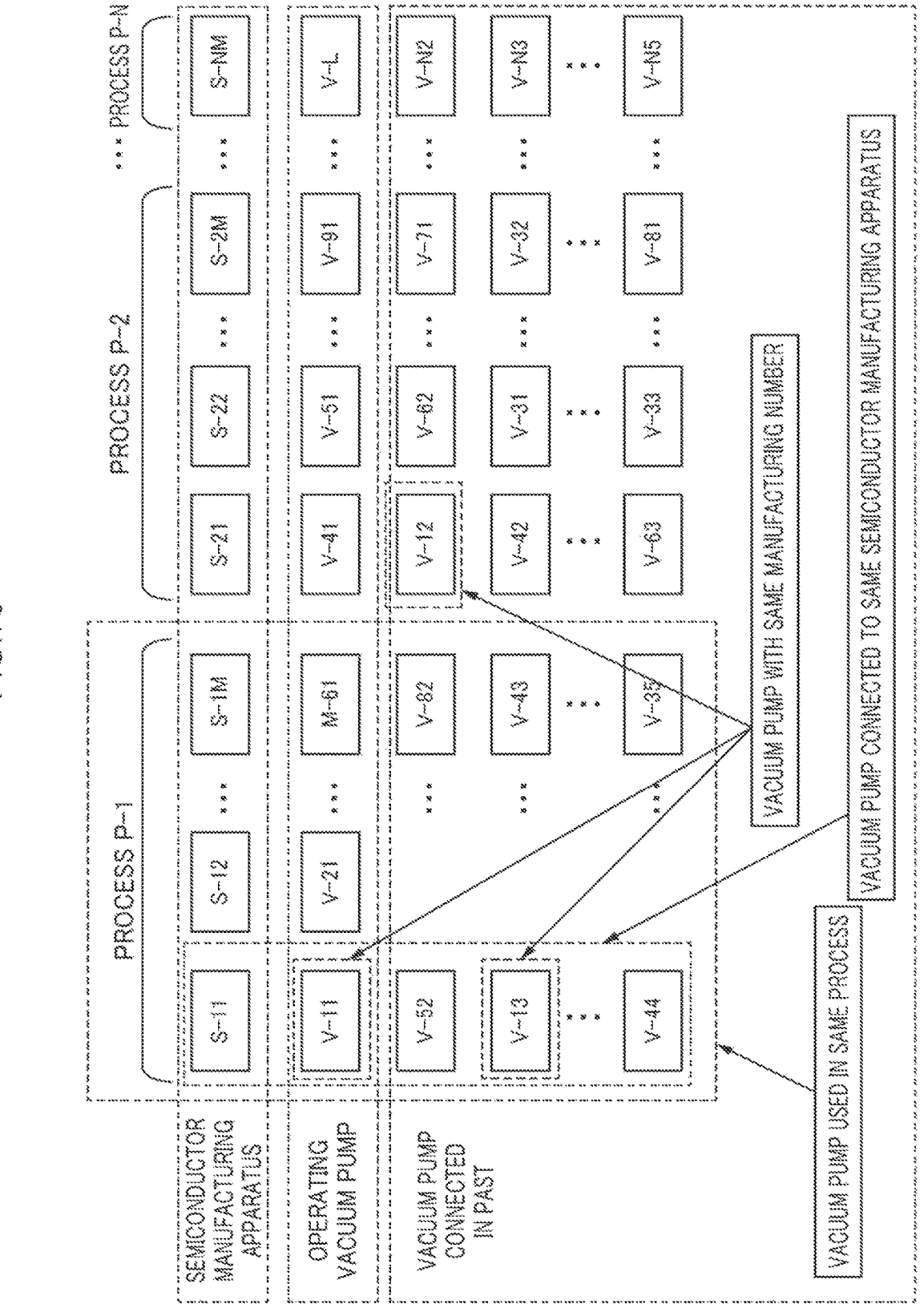
FIG. 79 is a diagram for describing a group of the vacuum pump.

FIG. 79 is a diagram for describing a group of the vacuum pump. As shown in FIG. 79, the semiconductor apparatus is divided into each process P-1, P-2, . . . , P-N (N is an integer of 1 or more). For example, the semiconductor apparatuses S-11, S-12, . . . , S-1M execute the process P-1, and therefore belong to the group of the process P-1. There are vacuum pumps V-11, V-21, . . . , V-61 that are currently connected to the semiconductor apparatuses S-11, S-12, . . . , S-1M executing these processes P-1 and is being operated and vacuum pumps V-52, V-13, . . . , V-44, . . . , V-82, V-43, . . . , V-35 connected in the past. In this way, the vacuum pumps are grouped by process.

In addition, the vacuum pump V-11 that is currently being operated is connected to the semiconductor apparatus S-11, but in the past, the vacuum pumps V-52, V-13, . . . , V-44 are connected. In this way, the vacuum pumps are grouped by connected semiconductor apparatus.

In addition, the vacuum pumps V-11, V-12 and V-13 have the same manufacturing number. In this way, the vacuum pumps are grouped by manufacturing number.

FIG. 80 is a diagram showing an example of a table related to a state quantity stored in the storage unit. As shown in FIG. 80, a set of vacuum pump identification information, process identification information, semiconductor apparatus identification information, manufacturing number, and data of a state quantity is stored in the table T41.

Here, the vacuum pump identification information is information for identifying the vacuum pump, and the process identification information is information (for example, process number) for identifying a process to be executed by the semiconductor manufacturing apparatus to which the vacuum pump of the record is connected. The semiconductor apparatus identification information is information for identifying the semiconductor apparatus to which the vacuum pump of the record is connected, and the manufacturing number is the manufacturing number of the vacuum pump of the record.

The data of the state quantity is, for example, a file name of a file in which the data of the state quantity (for example, current value) of the vacuum pump of the record is stored, and the data of the state quantity is stored in the storage unit 413 as the file. As a result, the computing unit 415 can refer to the data of the state amount from the file name.

Figure 81:
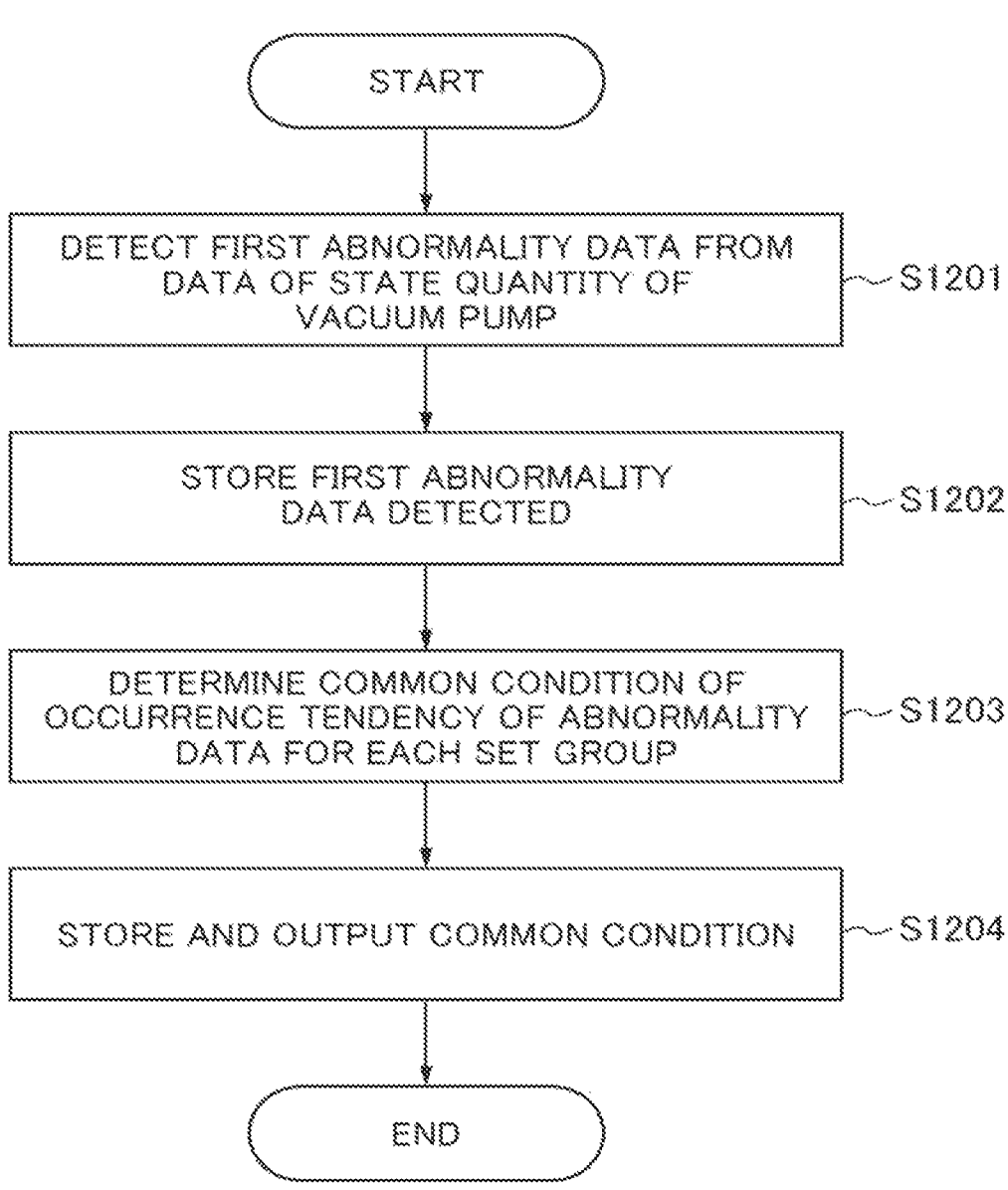
FIG. 81 is a flowchart showing an example of processing of the first information processing apparatus.

FIG. 81 is a flowchart showing an example of processing of the first information processing apparatus.

First, the first detection unit 421 detects the first abnormality data from the data of the state quantity of the vacuum pump (step S1201).

Next, the first detection unit 421 stores the detected first abnormality data in the storage unit 413 (step S1202).

Next, the determination unit 422 uses the occurrence tendency of the first abnormality data detected from the data of the state quantity of the vacuum pump belonging to the setting group of vacuum pumps to determine the common condition of the occurrence tendency of the abnormality data of the vacuum pump belonging to the setting group for each setting group (step S1203).

For example, the setting group of vacuum pumps is the group of vacuum pumps corresponding to the same manufacturing number, and in this case, the determination unit 422 uses the occurrence tendency of the detected first abnormality data from the data of the state quantity of the vacuum pump belonging to the group of vacuum pumps corresponding to the same manufacturing number to determine the common condition of the occurrence tendency of the abnormality data of the vacuum pump belonging to the setting group for each setting group.

For example, the setting group of vacuum pumps is the group of vacuum pumps connected to the semiconductor manufacturing apparatus corresponding to the same manufacturing number, and in this case, the determination unit 422 uses the occurrence tendency of the detected first abnormality data from the data of the state quantity of the vacuum pump belonging to the group of vacuum pumps connected to the semiconductor manufacturing apparatus corresponding to the same manufacturing number to determine the common condition of the occurrence tendency of the abnormality data of the vacuum pump belonging to the setting group for each setting group.

For example, the setting group of vacuum pumps is the group of vacuum pumps used in the same process, and in this case, the determination unit 422 uses the occurrence tendency of the detected first abnormality data from the data of the state quantity of the vacuum pump belonging to the group of vacuum pumps used in the same process to determine the common condition of the occurrence tendency of the abnormality data of the vacuum pump belonging to the setting group for each setting group.

Here, the common condition of the occurrence tendency of the abnormality data of the vacuum pump belonging to the setting group is, for example, (1) the number of times of occurrence of abnormality data, (2) the time change in an abnormality data occurrence interval (decrease in the interval), (3) the increase/decrease tendency in the abnormality data value, (4) an abnormality occurrence duration or the time change in duration, (5) the tendency (deviation) of a process in which the abnormality data occurs, and (7) the conditions (1) to (4) (for example, tendencies or conditions of (1) to (4) in process A) in the process in which the abnormality occurs or the situation in which a combination (set) of (7) and (2) to (4) occurs.

In addition, for example, (1) a threshold (for example, a threshold value is set to 10 times when the operation can be continued without failure within a predetermined period up to 10 times of abnormality occurrence and the like), (2) one in which an operation continuation degree (operation continuation probability) corresponding to a continuous numerical value (or numerical value section) such as the number of times of abnormality occurrence is defined, or (3) one in which abnormality occurrence pattern (for example, the increase tendency of the occurrence frequency, the change tendency of the state quantity) are defined and the operation continuation degree (operation continuation probability) is defined for each abnormality occurrence pattern is defined.

Next, the determination unit 422 stores the determined common condition in the storage unit 413 for each group, and outputs the set of the group identification information and the common condition from the output unit 412 (step S1204). The group identification information is the information for identifying a group, and is, for example, the process identification information, the semiconductor manufacturing apparatus identification information, the manufacturing number or the like.

As described above, the first information processing apparatus 401 according to the eleventh embodiment includes the first detection unit 421 detecting the first abnormality data from the data of the state quantity of the vacuum pump and the determination unit 422 determining the common condition related to the vacuum pump belonging to the setting group for each setting group using the occurrence tendency of the first abnormality data detected from the data of the state quantity of the vacuum pump belonging to the setting group of the vacuum pump.

According to this configuration, it is possible to output the common condition regarding the internal state of the pump for each setting group of the vacuum pump.

Subsequently, the configuration of the semiconductor manufacturing system according to the eleventh embodiment will be described. FIG. 82 is a block diagram showing a schematic configuration of the semiconductor manufacturing system according to the eleventh embodiment. As shown in FIG. 82, the semiconductor manufacturing system SS1 includes a semiconductor manufacturing apparatus 402, a vacuum pump 40404, a piping 403 connecting between the semiconductor manufacturing apparatus 402 and the vacuum pump 404, a second information processing apparatus 405 connected to the vacuum pump 404 via a wiring, and a display apparatus 406 connected to the second information processing apparatus 405 via the wiring.

The data of the state quantity is input to the second information processing apparatus 405 from the vacuum pump 404 and the set of the group and the common condition output from the first information processing apparatus 401 is input. The second information processing apparatus 405 outputs the comparison result to the display apparatus 406 to display the comparison result. Here, the comparison result is the result of comparing the common condition corresponding to the group to which the operating vacuum pump 404 belongs and the occurrence tendency of the second abnormality data detected from the data of the state quantity of the vacuum pump 404.

Figure 83:
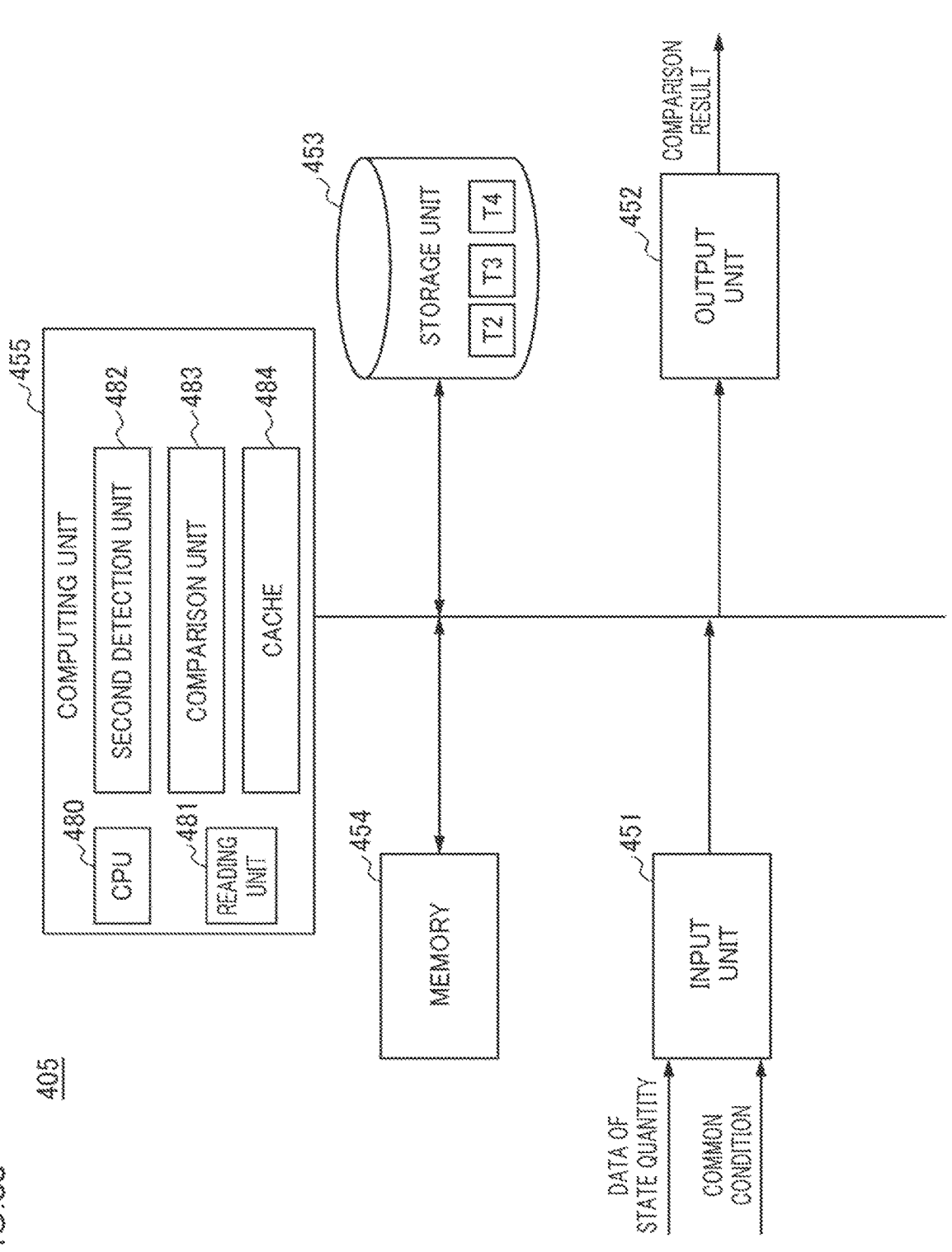
FIG. 83 is a block diagram showing a schematic configuration of a second information processing apparatus according to the eleventh embodiment.

FIG. 83 is a block diagram showing a schematic configuration of the second information processing apparatus according to the eleventh embodiment. As shown in FIG. 83, the second information processing apparatus 405 includes an input unit 451, an output unit 452, a storage unit 453, a memory 454, and a computing unit 455.

The input unit 451 is connected to the vacuum pump 404, and the data of the state quantity (for example, a current value) is input. In addition, the set of the group identification information and the common condition output from the first information processing apparatus 401 is input to the input unit 451.

The computing unit 455 has a central processing unit (CPU) 480, a reading unit 481, a second detection unit 482, a comparison unit 483, and a cache 484 in which a program is stored. The computing unit 455 stores the set of the group and the common condition input to the input unit 451 in the storage unit.

FIG. 84 is a diagram showing an example of a table stored in the storage unit by the computing unit. The table T42 shows a case where the group of vacuum pumps is the group of vacuum pumps used in the same process, and in this case, is a case where the group identification information is the process identification information. The set of the process identification information and the common condition is stored in the table T42.

The table T43 shows a case where the group of vacuum pumps is the group of vacuum pumps connected to the same semiconductor manufacturing apparatus, and in this case, is a case where the group identification information is the semiconductor manufacturing apparatus identification information. The set of the semiconductor manufacturing apparatus identification information and the common condition is stored in the table T43.

The table T44 shows a case where the group of vacuum pumps is the group of vacuum pumps corresponding to the same manufacturing number, and in this case, is a case where the group identification information is the manufacturing number. The set of the manufacturing number and the common condition is stored in the table T44. As a result, a part or all of the tables T42 to T44 are stored in the storage unit 453. As a result, the storage unit 453 stores the common condition of the occurrence tendency of the abnormality data of the vacuum pump belonging to the setting group for each setting group which is determined using the occurrence tendency of the first abnormality data detected from the data of the state quantity of the vacuum pump belonging to the setting group of vacuum pumps.

Figure 85:
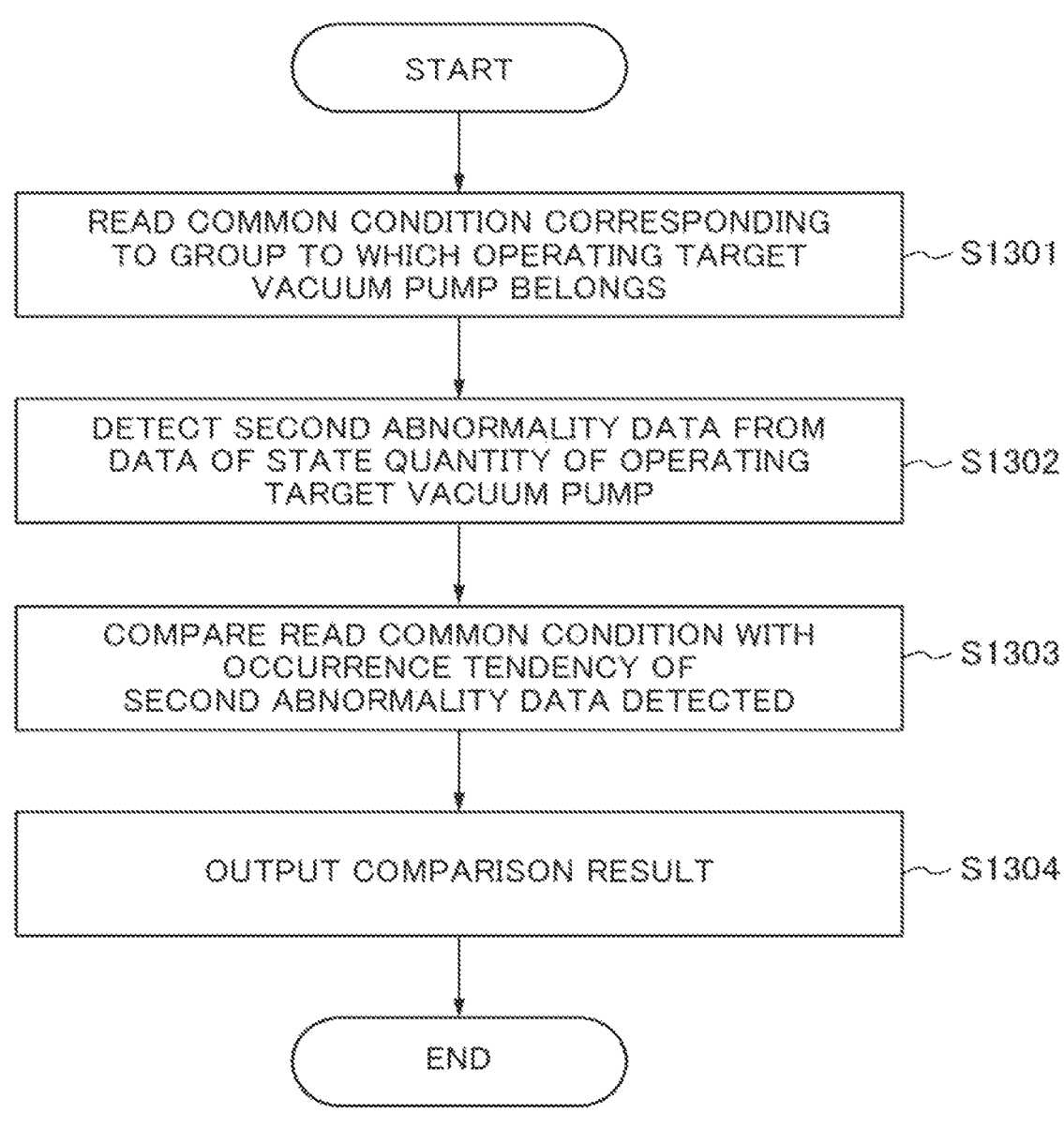
FIG. 85 is a flowchart showing an example of processing of the second information processing apparatus.

FIG. 85 is a flowchart showing an example of processing of the second information processing apparatus.

First, the reading unit 481 reads the common condition corresponding to the group to which the operating vacuum pump 404 belongs from the storage unit 453 (step S1301). For example, when the group is the group of vacuum pumps corresponding to the same manufacturing number, the reading unit 481 reads the common condition corresponding to the group of vacuum pumps of the same manufacturing number as the operating vacuum pump 404 from the storage unit 453. That is, the reading unit 481 reads the common condition corresponding to the manufacturing number of the operating vacuum pump 404 from the table T44 of the storage unit 453.

Alternatively, for example, when the group is the group of vacuum pumps connected to the semiconductor manufacturing apparatus corresponding to the same manufacturing number, the reading unit 481 reads from the storage unit 453 the common condition corresponding to the group of vacuum pumps connected to the same semiconductor manufacturing apparatus as the semiconductor manufacturing apparatus to which the operating vacuum pump 404 is connected. That is, the reading unit 481 reads from the table T43 of the storage unit 453 the common condition corresponding to the semiconductor manufacturing apparatus identification information for identifying the semiconductor manufacturing apparatus to which the operating vacuum pump 404 is connected.

Alternatively, for example, when the group is the group of vacuum pumps used in the same process, the reading unit 481 reads from the storage unit 453 the common condition corresponding to the group of vacuum pumps used in the same process as the process used by the operating vacuum pump 404. That is, the reading unit 481 reads from the table T42 of the storage unit 453 the common condition corresponding to the process identification information for identifying the process used by the operating vacuum pump 404.

Next, the second detection unit 482 detects the second abnormality data from the data of the state quantity of the operating vacuum pump 404 (step S1302).

Next, the comparison unit 483 compares the read common condition with the occurrence tendency of the detected second abnormality data (step S1303).

For example, in the case where the setting group of vacuum pumps is the group of vacuum pumps corresponding to the same manufacturing number, the comparison unit 483 compares the common condition corresponding to the group of vacuum pumps having the manufacturing number as the operating vacuum pump 404 with the occurrence tendency of the second abnormality data of the operating vacuum pump 404.

Alternatively, for example, in the case where the setting group of vacuum pumps is the group of vacuum pumps connected to the semiconductor manufacturing apparatus corresponding to the same manufacturing number, the comparison unit 483 compares the common condition corresponding to the group of vacuum pumps connected to the same semiconductor manufacturing apparatus as the semiconductor manufacturing apparatus to which the operating target vacuum pump is connected with the occurrence tendency of the second abnormality data of the operating target vacuum pump.

Alternatively, for example, in the case where the setting group of vacuum pumps is the group of vacuum pumps used in the same process, the comparison unit 483 compares the common condition corresponding to the group of vacuum pumps used in the same process as the process used by the operating target vacuum pump with the occurrence tendency of the second abnormality data of the operating target vacuum pump.

Here, as the comparison method, for example, there is a method (for example, a method of judging whether to exceed a threshold value) of (1) simply comparing a threshold value with an abnormality occurrence tendency of an operating vacuum pump when a common condition is a threshold value, a method of (2) comparing a continuous value with an abnormality occurrence tendency data of an operation pump when a common condition is a continuous numerical value (referred to as a continuous value) and calculating the corresponding operation continuation degree, or a method of (3) comparing an abnormality occurrence pattern with an abnormality occurrence tendency of an operation pump when a common condition is an abnormality occurrence pattern, calculating a divergence value (or matching tendency degree) from the abnormality occurrence pattern of the abnormality occurrence tendency of the operation pump, and calculating an operation continuation possibility ratio from an operation continuation degree corresponding to a set of the divergence value and the abnormality occurrence pattern, and the like.

In the case of the above (1), for example, the common condition is a threshold value set based on the abnormality data detected in the data of the state quantity of the vacuum pump, and the comparison unit 483 compares the threshold value with the occurrence tendency of the detected second abnormality data. Here, the threshold value may be a threshold value of the number of times that a specific state quantity (for example, current value) per unit time deviates from the setting range. In this case, the comparison unit 483 may compare the threshold value with the number of times that the specific state quantity deviates from the set range per unit time which is detected from the data of the state quantity of the operating vacuum pump 404.

Specifically, for example, the comparison unit 483 may set the threshold value as a threshold value of a fluctuation width of the average current value, the abnormality occurrence tendency of the vacuum pump as the average current value to judge whether the average current value exceeds the threshold value of the fluctuation width of the average current value. In this case, for example, the comparison unit 483 may output the operation continuation degree as 0 when the average current value exceeds the threshold value of the fluctuation width of the average current value, and output the operation continuation degree as 1 when the average current value falls within the fluctuation width of the average current value.

In the case of the above (2) and (3), for example, the comparison unit 483 may perform the comparison and the digitalization to output digitalized data (for example, the operation continuation degree or the operation continuation possibility ratio) as the comparison result.

In the case of the above (3), the common condition may be data representing a time change in a permissible range of the abnormality detected in the data of the state quantity of the vacuum pump. In this case, the comparison unit 483 may compare the data representing the time change in the permissible range of the abnormality with the time series data of the abnormality detected from the data of the state quantity of the operating vacuum pump 404.

Here, the data representing the time change in the permissible range of the abnormality may be data indicating the time change in the permissible range of the number of times that a specific state quantity (for example, current value or average current value) per unit time deviates from the set range. In this case, the comparison unit 483 may compare the data representing the time change in the permissible range with the time series data of the number of times that the specific state quantity (for example, current value) per unit time detected from the data of the state quantity of the operating vacuum pump 404 deviates from the set range.

Alternatively, the common condition may be a first abnormality occurrence rule data indicating an abnormality occurrence rule set based on the abnormality detected in the state quantity data of the vacuum pump. In this case, the comparison unit 483 may compare the first abnormality occurrence rule data with the second abnormality occurrence rule data indicating the abnormality occurrence rule detected from the state quantity data of the operating vacuum pump 404.

Here, the first abnormality occurrence rule data may be the number of times range set based on the number of times of abnormality occurrence (for example, the number of times of generation of spike value) detected in the state quantity data of the continuously operable vacuum pump. In this case, the comparison unit 483 may compare the set number of times range with the number of times of abnormality occurrence detected from the data of the state quantity of the operating vacuum pump 404 to determine the separation degree from the set number of times range.

At this time, the comparison unit 483 may judge the state of the operating vacuum pump 404 by dividing the state of the operating vacuum pump 404 into a normal state, a state requiring attention, and a state requiring replacement. Then, the comparison unit 483 may output the judged state of the operating vacuum pump from the output unit 452 as the comparison result.

Next, the comparison unit 483 outputs, for example, the comparison result from the output unit 452 to the display apparatus 406 (step S1304). Here, as the comparison result, there are the result on whether or not it exceeds the threshold value, the operation continuation degree, the operation continuation possibility ratio, or the divergence value (or matching tendency degree) from the abnormality occurrence pattern of the abnormality occurrence tendency of the operation pump, and the like. These comparison results are displayed on the display apparatus 406.

It is to be noted that the comparison unit 483 is not limited to outputting data to the display apparatus, but may output data via the communication network.

As described above, the second information processing apparatus according to the eleventh embodiment includes a reading unit reading the common condition corresponding to the group to which the operating target vacuum pump belongs from the storage unit 453, a detection unit detecting the second abnormality data from the data of the state quantity of the operating target vacuum pump, and a comparison unit comparing the read common condition with the detected occurrence tendency of the second abnormality data. Here, the storage unit 453 stores the common condition of the occurrence tendency of the abnormality data of the vacuum pump belonging to the setting group for each setting group which is determined using the occurrence tendency of the first abnormality data detected from the data of the state quantity of the vacuum pump belonging to the setting group of the vacuum pumps.

According to this configuration, it is possible to compare the occurrence tendency of the abnormal state of the operating target vacuum pump with the common condition based on the occurrence tendency of the abnormal state of the past vacuum pump of the group to which the target vacuum pump belongs. Therefore, it is possible to diagnose the internal state of the pump from the abnormal state of the operating target vacuum pump.

Twelfth Embodiment

Figure 86:
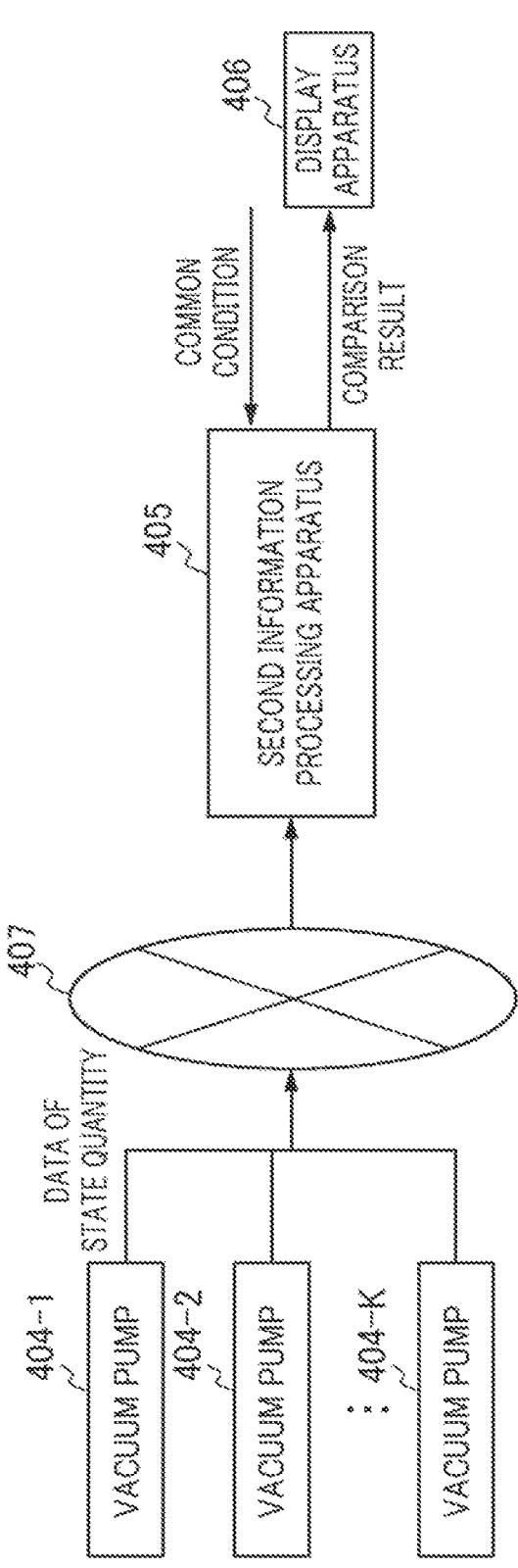
FIG. 86 is a block diagram showing a schematic configuration of a semiconductor manufacturing system according to a twelfth embodiment.

Subsequently, a configuration of a semiconductor manufacturing system according to a twelfth embodiment will be described. FIG. 86 is a block diagram showing a schematic configuration of the semiconductor manufacturing system according to the twelfth embodiment. As shown in FIG. 86, a semiconductor manufacturing system SS2 according to the twelfth embodiment is different from the semiconductor manufacturing system SS1 according to the eleventh embodiment in FIG. 82 in that vacuum pumps 404-1, 404-2, . . . , 404-K (K is an integer of 1 or more) is connected to a second information processing apparatus 405 via the communication circuit network 407. According to this configuration, the second information processing apparatus 405 can independently perform computations on data of each of the plurality of state quantities input via the communication circuit network 407.

Thirteenth Embodiment

Figure 87:
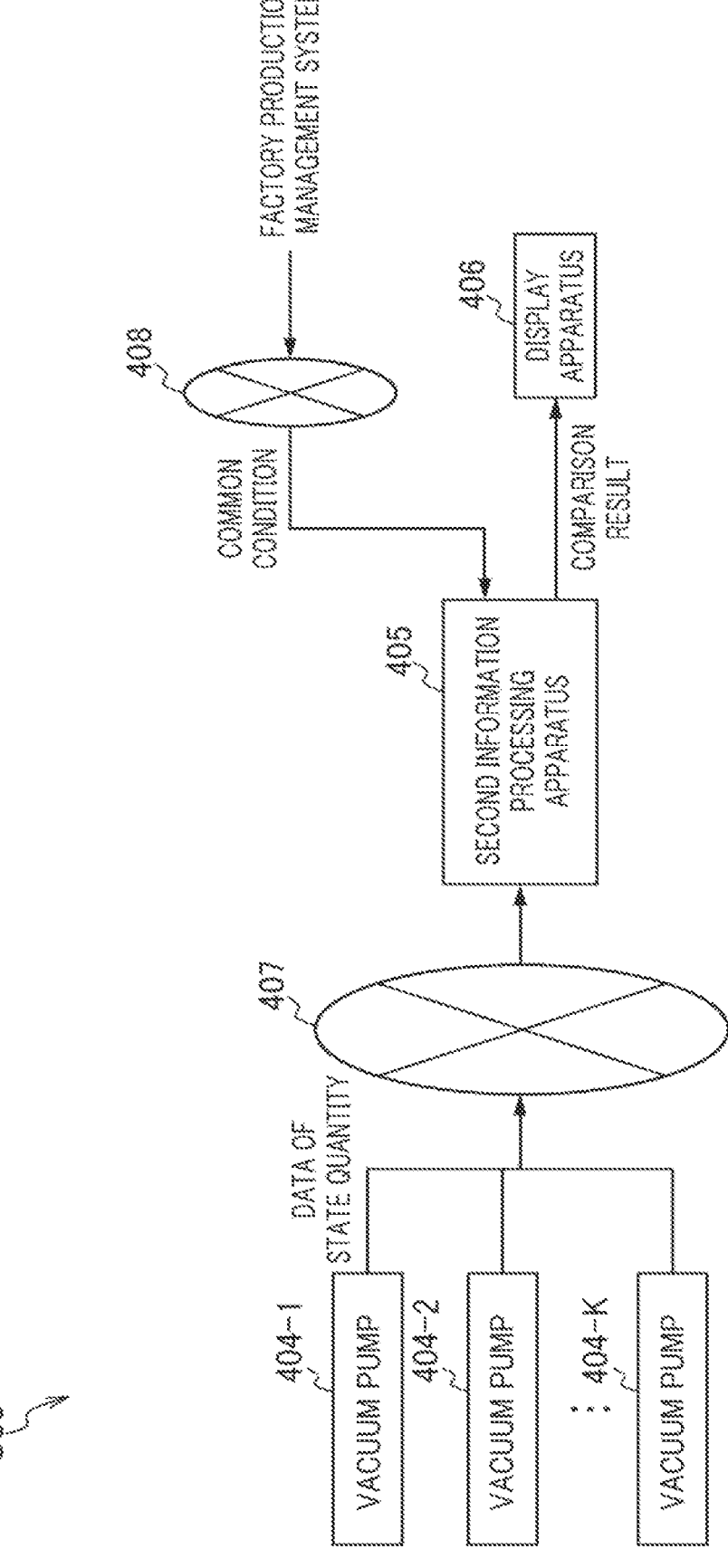
FIG. 87 is a block diagram showing a schematic configuration of a semiconductor manufacturing system according to a thirteenth embodiment.

Subsequently, a configuration of a semiconductor manufacturing system according to a thirteenth embodiment will be described. FIG. 87 is a block diagram showing a schematic configuration of a semiconductor manufacturing system according to the thirteenth embodiment. As shown in FIG. 87, a semiconductor manufacturing system SS3 according to the thirteenth embodiment is different from the semiconductor manufacturing system SS2 according to the twelfth embodiment of FIG. 86 in that a common condition is further input to a second information processing apparatus 405 from an upper factory production management system via a communication circuit network 408. According to this configuration, since the common condition is automatically input from the upper factory production management system to the second information processing apparatus 405, it is possible to remove a manual input operation to reduce manual man-hours.

It is to be noted that a computing unit 415 may function as a first detection unit 421 and a determination unit 422 by reading and executing a program stored in a storage unit 413. Similarly, the computing unit 455 may function as a reading unit 481, a second detection unit 482, and a comparison unit 483 by reading and executing a program stored in a storage unit 453.

The first information processing apparatus 401 and the second information processing apparatus 405 are described as separate systems, but are not limited thereto, and one information processing system may include the first information processing apparatus 401 and the second information processing apparatus 405.

In addition, the program for executing each processing of the first information processing apparatus 401 common to each embodiment is recorded in the computer-readable recording medium, the program recorded on the recording medium is read by the computer system, and the processor is executed to perform the above-described various processes related to the first information processing apparatus 401 common to each embodiment.

In addition, the program for executing each processing of the second information processing apparatus 405 according to each embodiment is recorded in the computer-readable recording medium, the program recorded on the recording medium is read by the computer system, and the processor is executed to perform the above-described various processes related to the second information processing apparatus 405 according to each embodiment.

Hereinabove, an embodiment can be embodied by modifying constituent elements within the range without departing from the gist thereof in implementation stages, without being limited to the above embodiments as they are.

For example, the vacuum pump considered in the above embodiment is not limited to a multi-stage roots pump, a screw pump, and a claw type pump which are displacement type dry vacuum pumps, but the embodiments may also be applied to a momentum transport type dry pump, for example, a turbomolecular pump. As the applications to which the system of the above embodiment can be applied, the system can be used for not only the exhaust system used in the semiconductor manufacturing process (for example, CVD), but also for a food manufacturing process and a pharmaceutical manufacturing process. In addition, various inventions can be formed by appropriately combining a plurality of constituent elements disclosed in the above embodiment. For example, some constituent elements may be deleted from all the constituent elements shown in the embodiment. In addition, the constituent elements of different embodiments may be appropriately combined.

REFERENCE SIGNS LIST

1 Semiconductor manufacturing apparatus
2 Piping
3 Vacuum pump
4, 4b Control apparatus
5, 5b Information processing apparatus
6 Piping
7 Abatement apparatus
8 Gas sensor
9 Storage apparatus
10, 10b Semiconductor manufacturing system
11 Chamber film forming furnace
12 Control unit
31 Booster pump
32, 34 Piping
33 Main pump
35 Pressure gauge
36 Power supply
37 Inverter
38 Motor
39 Rotor
41 Storage processing circuit
42 Generation circuit
43 Determination circuit
51 Input unit
52 Output unit
53 Storage unit
54 Memory 55, 55b Central processing unit (CPU)
551 Division unit
552, 552b Determination unit
553, 553b Comparison unit
554 Judgment criterion determination unit
555 Output unit
556 Warning output unit
100 Substrate processing apparatus
201 Semiconductor manufacturing apparatus
202 Piping
203 Vacuum pump
204 Control apparatus
205 Information processing apparatus
206 Display apparatus
207 Management apparatus
208-1, 208-2 Process apparatus
209 Information processing system
210, 210b, 210c, 210d Semiconductor manufacturing system
211 Film forming process chamber
212 Control unit
220 Criterion data determination apparatus
221 Input unit
222 Output unit
223 Storage unit
224 Memory
225 CPU
226 Determination unit
235 Pressure gauge
236 Power supply
237 Inverter
238 Motor
239 Rotor
251 Input unit
252 Output unit
253 Storage unit
254 Memory
255 Computing unit
256 Communication unit
261-1 to 261-K Gateway
262 Terminal apparatus
280 Central processing unit (CPU)
281 Abnormality data detection unit
282 Comparison unit
283 Cache
301 Semiconductor manufacturing apparatus
302 Piping
303 Vacuum pump
304 Control apparatus
305 Information processing apparatus
306 Display apparatus
307 Management apparatus
308-1, 308-2 Process apparatus
309 Information processing system
310, 310b, 310c, 310d Semiconductor manufacturing system
311 Film forming process chamber
312 Control unit
320 Criterion data determination apparatus
321 Input unit
322 Output unit
323 Storage unit
324 Memory
325 CPU
326 Determination unit
335 Pressure gauge
336 Power supply 337 Inverter
338 Motor
339 Rotor
351 Input unit
352 Output unit
353 Storage unit
354 Memory
355 Computing unit
380 Central processing unit (CPU)
381 Abnormality data detection unit
382 Comparison unit
383 Cache
356 Communication unit
361-1 to 361-K Gateway
362 Terminal apparatus
401 First information processing apparatus
411 Input unit
412 Output unit
413 Storage unit
414 Memory
415 Computing unit
420, 480 CPU
421 First detection unit
422 Determination unit
423 Cache
402 Semiconductor manufacturing apparatus
403 Piping
404 Vacuum pump
405 Second information processing apparatus
451 Input unit
452 Output unit
453 Storage unit
454 Memory
455 Computing unit
481 Reading unit
482 Second detection unit
483 Comparison unit
484 Cache
406 Display apparatus
407, 408 Communication circuit network
SS1, SS2, SS3 Semiconductor manufacturing system
T41, T42, T43, T44 Table

The invention claimed is:

1. A target vacuum pump criterion data determination apparatus, comprising:
   one or more processors; and
   one or more memories coupled to the one or more processors, the one or more memories having instructions stored thereon which, when executed by the one or more processors, cause the criterion data determination apparatus to:
   access a storage device configured to store abnormality data, the abnormality data being detected in data of a state quantity from a continuously operable vacuum pump for a predetermined period, the predetermined period based on a set time of a continuously operable vacuum pump after the set time has passed since it was operated, wherein the abnormality data being from the continuously operable vacuum pump that is different from a target vacuum pump;
   determine a criterion data for judging an operation of the target vacuum pump during the operation of the target vacuum pump based on the abnormality data of the continuously operable vacuum pump for the predetermined period based on the set time, the criterion data comprising a parameter related to the abnormality data, wherein the criterion data is determined, stored, and applied for each manufacturing process of a semiconductor manufacturing apparatus;
   acquire, during operation of the target vacuum pump, a state quantity comprising sensor data used in the target vacuum pump;
   compare the state quantity of the operating target vacuum pump with a statistical quantity of the criterion data based on the semiconductor manufacturing process; and
   perform a control to issue a notification to cause the operation of the target vacuum pump to stop or to continue the operation of the target vacuum pump according to the comparison result.

2. The criterion data determination apparatus according to claim 1,
   wherein the one or more processors determine the criterion data for each attribute of a vacuum pump.

3. The apparatus of claim 1, wherein the sensor data comprises one or more of: a driving current of a motor included in the target vacuum pump, a rotation speed of the motor, a pressure in the vacuum pump, a temperature of the vacuum pump, or a vibration of the vacuum pump, and wherein the apparatus comprises an input unit connected to one or more sensors selected from the group consisting of: an inverter, a pressure gauge, a temperature sensor, and a vibration sensor, the input unit being configured to receive the sensor data from the target vacuum pump during operation.

4. A criterion data determination method, comprising:
   accessing a storage device configured to store abnormality data, the abnormality data being detected in data of a state quantity for a predetermined period, the predetermined period based on a set time of a continuously operable vacuum pump after the set time has passed since it was operated, wherein the abnormality data being from the continuously operable vacuum pump that is different from a target vacuum pump;
   determining a criterion data for judging an operation of the target vacuum pump based on the abnormality data of the continuously operable vacuum pump for a predetermined period based on the set time, the criterion data comprising a parameter related to the abnormality data, wherein the criterion data is determined, stored, and applied for each manufacturing process of a semiconductor manufacturing apparatus;
   acquiring, during operation of the target vacuum pump, a state quantity comprising sensor data received from the target vacuum pump;
   comparing the state quantity of the target vacuum pump with a statistical quantity of the criterion data based on the semiconductor manufacturing process; and
   performing a control to issue a notification to cause the operation of the target vacuum pump to stop or to continue the operation of the vacuum pump according to the comparison result.

5. The apparatus of claim 4, wherein the sensor data comprises one or more of: a driving current of a motor included in the target vacuum pump, a rotation speed of the motor, a pressure in the vacuum pump, a temperature of the vacuum pump, or a vibration of the vacuum pump, and wherein the apparatus comprises an input unit connected to one or more sensors selected from the group consisting of: an inverter, a pressure gauge, a temperature sensor, and a vibration sensor, the input unit being configured to receive the sensor data from the target vacuum pump during operation.

6. A non-transitory computer readable recording medium storing a program that upon execution on a computer to cause a system at least to:

access a storage device configured to store criterion data, the criterion data being indicative of judging a failure arrival possibility based on an abnormality data detected in data of a state quantity for a predetermined period, the predetermined period based on a set time of a continuously operable vacuum pump after the set time has passed since it was operated, wherein the abnormality data being from the continuously operable vacuum pump that is different from a target vacuum pump, the criterion data comprising a parameter related to the abnormality data, wherein the criterion data is determined, stored, and applied for each manufacturing process of a semiconductor manufacturing apparatus;

acquire, during operation of the target vacuum pump, a state quantity comprising sensor data received from the target vacuum pump;

compare a tendency of an abnormality data detected from data of a state quantity of an operating target vacuum pump with the criterion data stored in the storage device, and output the comparison result;

compare the state quantity of the operating target vacuum pump with a statistical quantity of the criterion data based on the semiconductor manufacturing process; and perform a control to issue a notification to cause the operation of the target vacuum pump to stop or to continue the operation of the vacuum pump according to the comparison result.

7. The apparatus of claim 6, wherein the sensor data comprises one or more of: a driving current of a motor included in the target vacuum pump, a rotation speed of the motor, a pressure in the vacuum pump, a temperature of the vacuum pump, or a vibration of the vacuum pump, and wherein the apparatus comprises an input unit connected to one or more sensors selected from the group consisting of: an inverter, a pressure gauge, a temperature sensor, and a vibration sensor, the input unit being configured to receive the sensor data from the target vacuum pump during operation.

8. A non-transitory computer readable recording medium storing a program that upon execution causes a computer to cause a system at least to:

access a storage device configured to store abnormality data, the abnormality data being detected in data of a state quantity for a predetermined period, the predetermined period based on a set time of a continuously operable vacuum pump after the set time has passed since it was operated, the continuously operable vacuum pump being different from a target vacuum pump;

determine a criterion data for judging a failure arrival possibility of the target vacuum pump based on the abnormality data of the continuously operable vacuum pump for a predetermined period based on the set time, the criterion data comprising a parameter related to the abnormality data, wherein the criterion data is determined, stored, and applied for each manufacturing process of a semiconductor manufacturing apparatus;

acquire, during operation of the target vacuum pump, a state quantity comprising sensor data received from the target vacuum pump;

compare the state quantity of the operating target vacuum pump with a statistical quantity of the criterion data based on the semiconductor manufacturing process; and perform a control to issue a notification to cause the operation of the target vacuum pump to stop or to continue the operation of the vacuum pump according to the comparison result.

9. The apparatus of claim 8, wherein the sensor data comprises one or more of: a driving current of a motor included in the target vacuum pump, a rotation speed of the motor, a pressure in the vacuum pump, a temperature of the vacuum pump, or a vibration of the vacuum pump, and wherein the apparatus comprises an input unit connected to one or more sensors selected from the group consisting of: an inverter, a pressure gauge, a temperature sensor, and a vibration sensor, the input unit being configured to receive the sensor data from the target vacuum pump during operation.

* * * * *